(12) United States Patent
Hamilton et al.

(10) Patent No.: US 12,085,362 B2
(45) Date of Patent: Sep. 10, 2024

(54) VIEWING OPTIC WITH ROUND COUNTER SYSTEM

(71) Applicant: Sheltered Wings, Inc., Barneveld, WI (US)

(72) Inventors: Sam Hamilton, Barneveld, WI (US); Ian Klemm, Barneveld, WI (US); Calen Havens, Barneveld, WI (US); Tom Cody, Barneveld, WI (US); Craig Schultz, Barneveld, WI (US); Garrison Bollig, Barneveld, WI (US); Andy Carlson, Barneveld, WI (US); William Lowry, Barneveld, WI (US); Nicholas Laufenberg, Barneveld, WI (US); Alexander Lewis, Barneveld, WI (US)

(73) Assignee: Sheltered Wings, Inc., Barneveld, WI (US)

( * ) Notice: Subject to any disclaimer, the term of this patent is extended or adjusted under 35 U.S.C. 154(b) by 0 days.

(21) Appl. No.: 17/964,573

(22) Filed: Oct. 12, 2022

(65) Prior Publication Data

US 2023/0152059 A1  May 18, 2023

Related U.S. Application Data

(63) Continuation of application No. 16/746,176, filed on Jan. 17, 2020, now Pat. No. 11,473,873.

(Continued)

(51) Int. Cl.
*F41G 1/38* (2006.01)
*F41A 9/62* (2006.01)

(Continued)

(52) U.S. Cl.
CPC .................. *F41G 1/38* (2013.01); *F41A 9/62* (2013.01); *F41A 9/65* (2013.01); *G02B 23/16* (2013.01);

(Continued)

(58) Field of Classification Search
None
See application file for complete search history.

(56) References Cited

U.S. PATENT DOCUMENTS

| 2,514,257 A | 7/1950 | Reavis |
| 3,058,391 A | 10/1962 | Leupold |

(Continued)

FOREIGN PATENT DOCUMENTS

| EP | 1340956 | 12/2006 |
| EP | 1772695 | 7/2010 |

(Continued)

OTHER PUBLICATIONS

International Search Report and Written Opinion for International Application No. PCT/US2020/014082 dated Apr. 1, 2020, 18 pages.

(Continued)

*Primary Examiner* — Reginald S Tillman, Jr.
(74) *Attorney, Agent, or Firm* — Husch Blackwell LLP

(57) ABSTRACT

The disclosure relates to a viewing optic. In one embodiment, the disclosure relates to a display system for a viewing optic. In one embodiment, the disclosure relates to a viewing optic having a display system with multiple active displays for generating images that are projected into a first focal plane of an optical system. In one embodiment, the disclosure relates to a viewing optic with an active display and a round counter system.

20 Claims, 102 Drawing Sheets

Related U.S. Application Data

(60) Provisional application No. 62/794,233, filed on Jan. 18, 2019, provisional application No. 62/794,065, filed on Jan. 18, 2019.

(51) Int. Cl.
*F41A 9/65* (2006.01)
*G02B 23/16* (2006.01)
*G02B 27/01* (2006.01)

(52) U.S. Cl.
CPC ..... *G02B 27/0101* (2013.01); *G02B 27/0189* (2013.01); *G02B 2027/0141* (2013.01)

(56) References Cited

U.S. PATENT DOCUMENTS

| | | |
|---|---|---|
| 3,464,770 A | 9/1969 | Schmidt |
| 3,533,696 A | 10/1970 | Winter |
| 3,597,040 A | 8/1971 | Gotoh |
| 4,248,496 A | 2/1981 | Akin et al. |
| 4,395,096 A | 7/1983 | Gibson |
| 4,554,744 A | 11/1985 | Huckenbeck |
| 4,561,204 A | 12/1985 | Binion |
| 4,695,161 A | 9/1987 | Reed |
| 4,863,269 A | 9/1989 | Ellis |
| 4,965,439 A | 10/1990 | Moore |
| 5,026,158 A | 6/1991 | Golubic |
| 5,052,801 A | 10/1991 | Downes, Jr. et al. |
| 5,092,670 A | 3/1992 | Preston |
| 5,225,838 A | 7/1993 | Kanter et al. |
| 5,291,263 A | 3/1994 | Kong |
| 5,303,495 A | 4/1994 | Harthcock |
| 5,311,203 A | 5/1994 | Norton |
| 5,339,720 A | 8/1994 | Pellarin et al. |
| 5,355,224 A | 10/1994 | Wallace |
| 5,375,072 A | 12/1994 | Cohen |
| 5,491,546 A | 2/1996 | Wascher |
| 5,528,354 A | 6/1996 | Uwira |
| 5,669,174 A | 9/1997 | Teetzel |
| 5,686,690 A | 11/1997 | Lugheed et al. |
| 5,721,641 A | 2/1998 | Aoki |
| 5,771,623 A | 6/1998 | Pernstich et al. |
| 5,903,996 A | 5/1999 | Morley |
| 5,920,995 A | 7/1999 | Sammut |
| 5,926,259 A | 7/1999 | Bamberger et al. |
| 6,032,374 A | 3/2000 | Sammut |
| 6,128,054 A | 10/2000 | Schwarzenberger |
| 6,132,048 A | 10/2000 | Gao et al. |
| 6,247,259 B1 | 6/2001 | Tsadka et al. |
| 6,252,706 B1 | 6/2001 | Kaladgew |
| 6,269,581 B1 | 8/2001 | Groh |
| 6,453,595 B1 | 9/2002 | Sammut |
| 6,487,809 B1 | 12/2002 | Gaber |
| 6,516,551 B2 | 2/2003 | Gaber |
| 6,516,699 B2 | 2/2003 | Sammut et al. |
| 6,583,862 B1 | 6/2003 | Perger |
| 6,614,975 B2 | 9/2003 | Richardson et al. |
| 6,640,482 B2 | 11/2003 | Carlson |
| 6,681,512 B2 | 1/2004 | Sammut |
| 6,691,447 B1 | 2/2004 | Otteman |
| 6,862,832 B2 | 3/2005 | Barrett |
| 7,124,531 B1 | 10/2006 | Florence et al. |
| 7,196,329 B1 | 3/2007 | Wood et al. |
| 7,269,920 B2 | 9/2007 | Staley, III |
| 7,295,296 B1 | 11/2007 | Galli |
| 7,296,358 B1 | 11/2007 | Murphy et al. |
| 7,310,071 B2 | 12/2007 | Cuprys |
| 7,325,320 B2 | 2/2008 | Gnepf et al. |
| 7,333,270 B1 | 2/2008 | Pochapsky et al. |
| 7,516,571 B2 | 4/2009 | Scrogin et al. |
| 7,575,327 B2 | 8/2009 | Uchiyama |
| 7,586,586 B2 | 9/2009 | Constantikes |
| 7,654,029 B2 | 2/2010 | Peters et al. |
| 7,690,145 B2 | 4/2010 | Peters et al. |
| 7,703,679 B1 | 4/2010 | Bennetts et al. |
| 7,712,225 B2 | 5/2010 | Sammut |
| 7,719,769 B2 | 5/2010 | Sugihara et al. |
| 7,721,481 B2 | 5/2010 | Houde-Walter |
| 7,805,020 B2 | 9/2010 | Trudeau et al. |
| 7,832,137 B2 | 11/2010 | Sammut et al. |
| 7,856,750 B2 | 12/2010 | Sammut et al. |
| 7,859,650 B2 | 12/2010 | Vermillion et al. |
| 7,864,432 B2 | 1/2011 | Ottney |
| 7,905,046 B2 | 3/2011 | Smith et al. |
| 7,911,687 B2 | 3/2011 | Scholz |
| 7,937,878 B2 | 5/2011 | Sammut et al. |
| 7,946,048 B1 | 5/2011 | Sammut |
| 8,001,714 B2 | 8/2011 | Davidson |
| 8,046,951 B2 | 11/2011 | Peters et al. |
| 8,051,597 B1 | 11/2011 | D'Souza et al. |
| 8,081,298 B1 | 12/2011 | Cross |
| 8,109,029 B1 | 2/2012 | Sammut et al. |
| 8,201,741 B2 | 6/2012 | Bennetts et al. |
| 8,230,635 B2 | 7/2012 | Sammut et al. |
| 8,353,454 B2 | 1/2013 | Sammut et al. |
| 8,365,455 B2 | 2/2013 | Davidson et al. |
| 8,448,372 B2 | 5/2013 | Peters et al. |
| 8,468,930 B1 | 6/2013 | Bell |
| 8,488,969 B1 | 7/2013 | Masarik |
| 8,656,630 B2 | 2/2014 | Sammut |
| 8,707,608 B2 | 4/2014 | Sammut et al. |
| 8,713,843 B2 | 5/2014 | Windauer |
| 8,826,583 B2 | 9/2014 | Kepler et al. |
| 8,833,655 B2 | 9/2014 | McCarty et al. |
| 8,857,714 B2 | 10/2014 | Benson |
| 8,886,046 B2 | 11/2014 | Masarik |
| 8,893,971 B1 | 11/2014 | Sammut et al. |
| 8,905,307 B2 | 12/2014 | Sammut et al. |
| 8,923,703 B2 | 12/2014 | Masarik et al. |
| 8,959,824 B2 | 2/2015 | Sammut et al. |
| 8,966,806 B2 | 3/2015 | Sammut et al. |
| 8,991,702 B1 | 3/2015 | Sammut et al. |
| 9,038,901 B2 | 5/2015 | Paterson et al. |
| 9,042,736 B2 | 5/2015 | Masarik |
| 9,068,794 B1 | 6/2015 | Sammut |
| 9,121,671 B2 | 9/2015 | Everett |
| 9,151,574 B2 | 10/2015 | Lowrey, III |
| 9,175,927 B2 | 11/2015 | Tubb |
| 9,225,419 B2 | 12/2015 | Masarik |
| 9,250,038 B2 | 2/2016 | Sammut et al. |
| 9,255,771 B2 | 2/2016 | Sammut et al. |
| 9,279,975 B2 | 3/2016 | Berlips |
| 9,310,163 B2 | 4/2016 | Bay |
| 9,323,061 B2 | 4/2016 | Edwards et al. |
| 9,335,123 B2 | 5/2016 | Sammut |
| 9,389,425 B2 | 7/2016 | Edwards et al. |
| 9,429,745 B2 | 8/2016 | Brumfield |
| 9,438,774 B2 | 9/2016 | Masarik |
| 9,459,077 B2 | 10/2016 | Sammut et al. |
| 9,500,444 B2 | 11/2016 | Sammut et al. |
| 9,516,202 B2 | 12/2016 | Masarik et al. |
| 9,574,850 B2 | 2/2017 | Sammut et al. |
| 9,612,068 B2 | 4/2017 | Burden |
| 9,612,086 B2 | 4/2017 | Sammut et al. |
| 9,615,004 B2 | 4/2017 | Masarik |
| 9,632,304 B2 | 4/2017 | Waterman |
| 9,705,605 B2 | 7/2017 | Masarik |
| 9,869,530 B2 | 1/2018 | Sammut et al. |
| 9,995,901 B2 | 6/2018 | Petersen |
| 10,003,756 B2 | 6/2018 | Masarik et al. |
| 10,060,703 B2 | 8/2018 | Sammut et al. |
| 10,113,837 B2 | 10/2018 | Masarik et al. |
| 10,175,031 B2 | 1/2019 | VanBecelaere |
| 10,180,565 B2 | 1/2019 | Havens |
| 10,254,082 B2 | 4/2019 | Sammut et al. |
| 10,295,307 B2 | 5/2019 | Sammut et al. |
| 10,584,941 B2 | 3/2020 | Masarik et al. |
| 10,673,301 B1 | 6/2020 | McAuley |
| 10,693,341 B1 | 6/2020 | McAuley |
| 10,721,000 B2 | 7/2020 | Masarik et al. |
| 10,742,913 B2 | 8/2020 | Vaklev et al. |
| 10,796,860 B2 | 10/2020 | Iliev et al. |
| 10,801,813 B2 | 10/2020 | Moseman et al. |
| 10,812,687 B2 | 10/2020 | Masarik et al. |

(56) References Cited

U.S. PATENT DOCUMENTS

| | | | |
|---|---|---|---|
| 11,473,873 B2 * | 10/2022 | Hamilton | F41A 9/65 |
| 2002/0159148 A1 | 10/2002 | Huber | |
| 2003/0010190 A1 | 1/2003 | Sammut et al. | |
| 2003/0012035 A1 | 1/2003 | Bernard | |
| 2003/0132860 A1 | 7/2003 | Feyereisen et al. | |
| 2004/0025396 A1 | 2/2004 | Schlierbach | |
| 2004/0080938 A1 | 4/2004 | Holman | |
| 2004/0201886 A1 | 10/2004 | Skinner et al. | |
| 2005/0021282 A1 | 1/2005 | Sammut et al. | |
| 2005/0046706 A1 | 3/2005 | Sesek et al. | |
| 2005/0198885 A1 | 9/2005 | Staley, III | |
| 2005/0219690 A1 | 10/2005 | Lin | |
| 2005/0250085 A1 | 11/2005 | Lemp, III et al. | |
| 2005/0268521 A1 | 12/2005 | Cox et al. | |
| 2006/0048432 A1 | 3/2006 | Staley et al. | |
| 2006/0201047 A1 | 9/2006 | Lowrey | |
| 2006/0254115 A1 | 11/2006 | Thomas et al. | |
| 2007/0044364 A1 | 3/2007 | Sammut et al. | |
| 2007/0097351 A1 | 3/2007 | York et al. | |
| 2007/0137008 A1 | 6/2007 | Anstee | |
| 2007/0137088 A1 | 6/2007 | Peters et al. | |
| 2007/0157502 A1 | 7/2007 | Holmberg | |
| 2007/0180751 A1 | 8/2007 | Joannes | |
| 2007/0234626 A1 | 10/2007 | Murdock et al. | |
| 2007/0277421 A1 | 12/2007 | Perkins et al. | |
| 2008/0039962 A1 | 2/2008 | Mcrae | |
| 2008/0163536 A1 | 7/2008 | Koch et al. | |
| 2008/0290164 A1 | 11/2008 | Papale et al. | |
| 2009/0109404 A1 | 4/2009 | Thornton | |
| 2009/0200376 A1 | 8/2009 | Peters et al. | |
| 2009/0205239 A1 | 8/2009 | Smith, III | |
| 2009/0225236 A1 | 9/2009 | Yoon | |
| 2009/0320348 A1 | 12/2009 | Kelly | |
| 2010/0207152 A1 | 8/2010 | Won | |
| 2010/0225833 A1 | 9/2010 | Methe et al. | |
| 2010/0275768 A1 | 11/2010 | Quinn | |
| 2010/0281725 A1 | 11/2010 | Arbouw | |
| 2011/0121159 A1 | 5/2011 | Mourar et al. | |
| 2011/0141381 A1 | 6/2011 | Minikey et al. | |
| 2011/0162250 A1 | 7/2011 | Windauer et al. | |
| 2011/0252682 A1 | 10/2011 | Delgado Acarreta | |
| 2011/0314720 A1 | 12/2011 | Cheng | |
| 2012/0000108 A1 | 1/2012 | Zusman | |
| 2012/0044571 A1 | 2/2012 | Mukawa | |
| 2012/0048931 A1 | 3/2012 | Arbouw | |
| 2012/0075168 A1 | 3/2012 | Osterhout et al. | |
| 2012/0097741 A1 | 4/2012 | Karcher | |
| 2012/0126001 A1 | 5/2012 | Justice et al. | |
| 2012/0167423 A1 | 7/2012 | Kindt et al. | |
| 2012/0186131 A1 | 7/2012 | Windauer | |
| 2013/0033746 A1 | 2/2013 | Brumfield | |
| 2013/0167425 A1 | 7/2013 | Crispin | |
| 2013/0199074 A1 | 8/2013 | Paterson et al. | |
| 2013/0279013 A1 | 10/2013 | Edwards et al. | |
| 2014/0059915 A1 | 3/2014 | Sammut et al. | |
| 2014/0063261 A1 | 3/2014 | Betensky et al. | |
| 2014/0075820 A1 | 3/2014 | Ben-Ami | |
| 2014/0101982 A1 | 4/2014 | McPhee | |
| 2014/0110482 A1 | 4/2014 | Bay | |
| 2014/0182187 A1 | 7/2014 | McHale | |
| 2014/0226214 A1 | 8/2014 | Edwards et al. | |
| 2015/0055119 A1 | 2/2015 | Hamilton | |
| 2015/0106046 A1 | 4/2015 | Chen et al. | |
| 2015/0233674 A1 | 8/2015 | Beckman | |
| 2015/0247702 A1 | 9/2015 | Davidson et al. | |
| 2015/0362288 A1 | 12/2015 | Sammut et al. | |
| 2015/0369565 A1 | 12/2015 | Kepler | |
| 2015/0377572 A1 | 12/2015 | Darragjati | |
| 2016/0061566 A1 | 3/2016 | Chen | |
| 2016/0061567 A1 | 3/2016 | Regan et al. | |
| 2016/0069629 A1 | 3/2016 | Seckman | |
| 2016/0138890 A1 | 5/2016 | Hofmann et al. | |
| 2016/0169625 A1 | 6/2016 | Richards et al. | |
| 2016/0195351 A1 | 7/2016 | Burden | |
| 2016/0223293 A1 | 8/2016 | Maryfield et al. | |
| 2016/0223805 A1 | 8/2016 | Waterman | |
| 2016/0265880 A1 | 9/2016 | Maryfield et al. | |
| 2017/0051993 A1 | 2/2017 | Imbriano et al. | |
| 2017/0143442 A1 | 5/2017 | Tesar et al. | |
| 2017/0227327 A1 | 8/2017 | Thomas et al. | |
| 2018/0224241 A1 | 8/2018 | Havens | |
| 2018/0224244 A1 | 8/2018 | Havens | |
| 2018/0224650 A1 | 8/2018 | Havens | |
| 2018/0224651 A1 | 8/2018 | Havens | |
| 2018/0224652 A1 | 8/2018 | Havens | |
| 2019/0146205 A1 | 5/2019 | Havens | |
| 2019/0219812 A1 | 7/2019 | Havens | |
| 2019/0324260 A1 | 10/2019 | Hamilton | |

FOREIGN PATENT DOCUMENTS

| | | |
|---|---|---|
| JP | 2006-003020 A | 1/2006 |
| JP | 2009-500637 A | 1/2009 |
| WO | 2005015285 A2 | 2/2005 |
| WO | 2006/060007 | 6/2006 |
| WO | 2014/167276 | 10/2014 |
| WO | 2015/103155 | 7/2015 |
| WO | 2018145097 | 8/2018 |
| WO | 2018/172738 A1 | 9/2018 |

OTHER PUBLICATIONS

International Search Report and Written Opinion for International Application No. PCT/US19/45493 dated Apr. 28, 2020, 13 pages.

ATN X-Sight 3-12x Digital Scopes for Rifles—Day & Night vision optics https://www.atncorp.com/x-sight-night-vision-rifle-scope-3-12x printed Jul. 12, 2016 10 pages.

Barska 2013 Master Catalog 2013 124 pages.

T. Edwards et al. High-brightness display in integrated weapon sight systems abstract http://proceedings.spiedigitallibrary.org/proceeding.aspx?articleid=1882790 printed Jul. 12, 2016 2 pages.

3-9x First Focal Plane Adjustable Objective Rifle Scope—Monstrum Tactical; http://monstrumtractical.com/products/3-9x-first-focal-plan-rifle-scope-adjustable-objective-range-finder-reticle?variant=15621625091 printed Jul. 12, 2016 7 pages.

Nightforce Optics Inc. Reticle Mil-R product sheets 2013 2 pages.

International Search Report and Written Opinion for International Patent Application No. PCT/US19/28540, dated Aug. 16, 2019, 7 pages.

International Search Report and Written Opinion for International Patent Application No. PCT/US2018/017079 dated Apr. 26, 2018, 29 pages.

International Preliminary Report on Patentability for International Application No. PCT/US2020/014082 dated Jun. 16, 2021.

Office Action issued for Chinese Patent Application No. 202080015937.X dated Dec. 21, 2022, 26 pages.

Extended European Search Report issued for European Patent Application No. 20740873.3, dated Feb. 3, 2023, 7 pages.

* cited by examiner

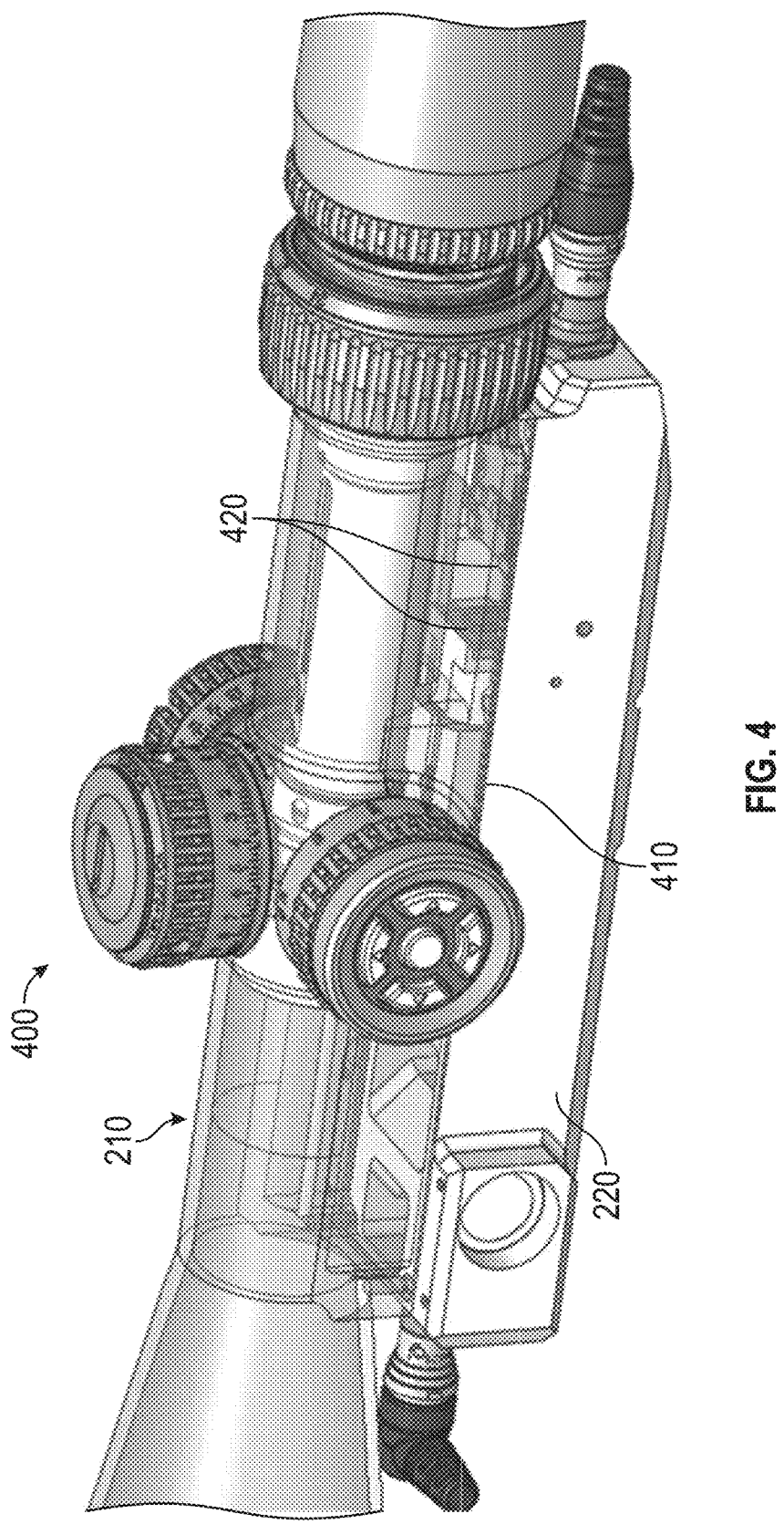

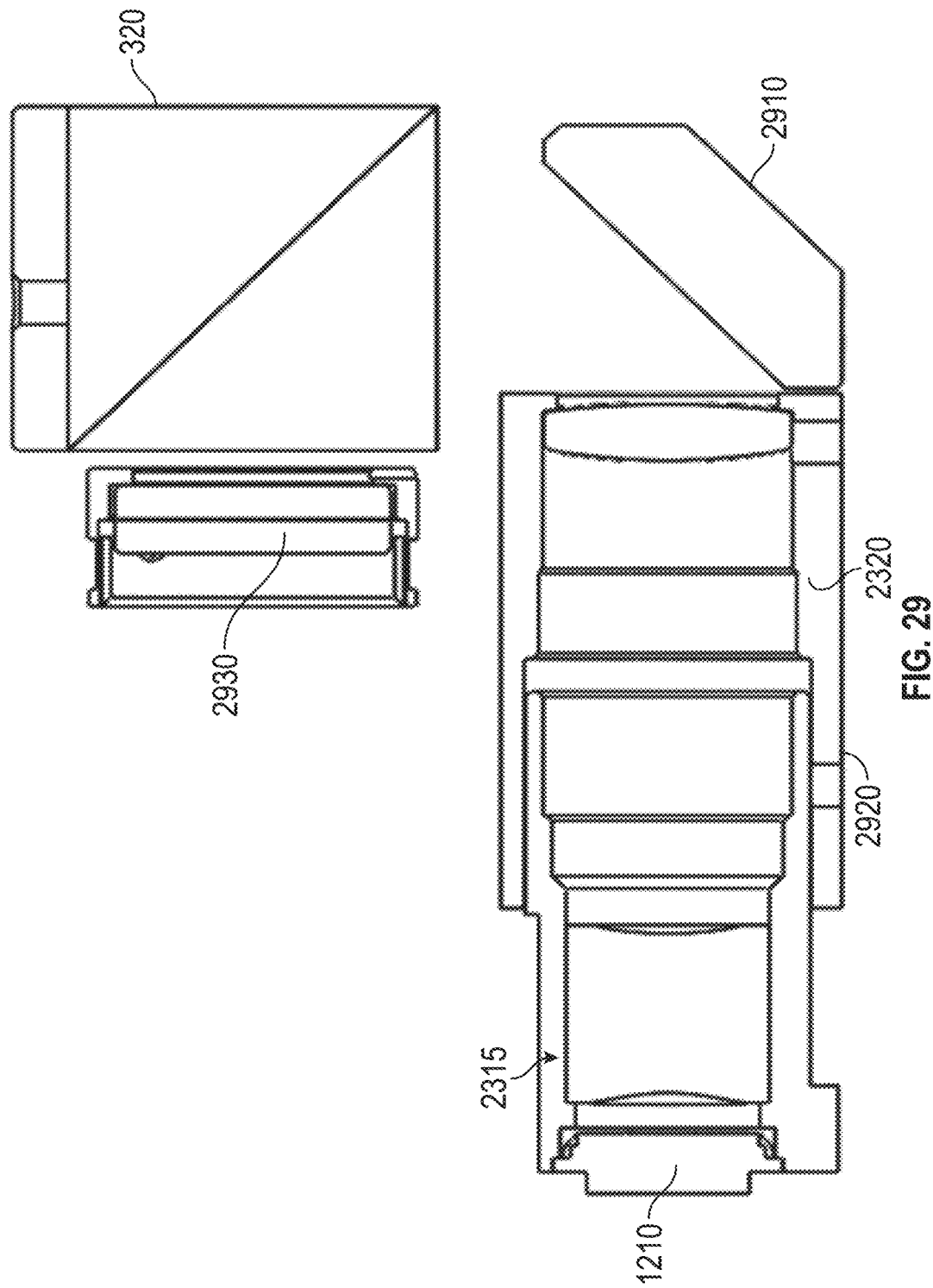

1: Near Zero
2: Far Zero

A: Scope/Optic  
B: Barrel of Weapon  
C: Loophole

—— Line of sight  
--▶ Bullet Trajectory  
*Angles are exaggerated to emphasize concept

VIEWING OPTIC WITH ROUND COUNTER SYSTEM

CROSS-REFERENCE TO RELATED APPLICATIONS

This application is a continuation patent application of U.S. patent application Ser. No. 16/746,716 filed Jan. 17, 2020, which is a non-provisional application of and claims priority to U.S. Provisional Patent Application No. 62/794,065 filed Jan. 18, 2019, and to U.S. Provisional Patent Application No. 62/794,233 filed Jan. 18, 2019, all of which are incorporated herein by reference in their entirety.

FIELD

The disclosure relates to a viewing optic with an integrated display system. In one embodiment, the viewing optic has an active display system that generates and projects the image into a first focal plane of the optical system. In yet another embodiment, the disclosure relates to a viewing optic with a round counter system.

BACKGROUND

Riflescopes have been used for well over a century and while the quality and features of these devices have improved tremendously over the years, the core components (and the limitations of those components) used in their design, manufacture and use are still very much the same today as they were 100 years ago. Riflescopes create a magnified or unmagnified image of a scene that is distant from the shooter on a focal plane, which is coincident with an aiming feature, or reticle. The reticle consists of wire or a material deposited in a pattern onto a glass surface and it is used as an aiming reference, which corresponds to the trajectory of the rifle to which it's attached. The reticle may also have specific features included to aid the shooter in making distance judgements and in compensating for bullet deviation at different distances.

Turrets are also used to adjust the reticle position in relation to the target in order to compensate for bullet deviation. This is a very developed and reliable system that can be used in the hands of the experienced and skilled shooter to make challenging long range shots. With the aid of a laser rangefinder (LRF) and a ballistic computer and careful attention to detail, an experienced shooter can routinely hit targets at the maximum effective range of their firearm by making the necessary mechanical adjustments to the firearm and/or executing the correct holds on the reticle pattern.

While this system performs well, there is always a desire to improve upon the system. In particular, there is a desire to reduce the complexity involved in hitting long range targets. A large amount of information is needed on a shot-by-shot basis in order to effectively hit long range targets and the shooter must be able to process this information and make the correct judgments and calculations in real time. In addition to the riflescope, other tools are needed by the shooter to ensure accurate shot placement. For instance, a bubble level mounted externally to the riflescope is needed to ensure that the optic is level before executing a shot. This requires the shooter to remove his head from the pupil of the optic to check his or her level.

A laser rangefinder and ballistic computer are also needed to measure target range and calculate a bullet trajectory. This once again requires the shooter to attend to an external device and then remember the data when making the necessary adjustments. If a weapon mounted laser rangefinder is used, then the shooter needs to take special care to ensure that the aiming point of the optic is corresponding exactly with the aiming point of the LRF.

Additionally, and not trivial to the use of riflescopes, is that they are only useful during daylight hours. Once night begins to descend, thermal and/or night vision devices must be attached to the weapon in front of the riflescope. These devices capture other forms of radiation that are not visible to the human eye due to their wavelength or low intensity. These devices then either recreate the image of the scene or intensify it and reimage the scene into the objective of the riflescope. Effective and necessary for low light conditions, these devices are also heavy and large.

In the particular case of thermal imaging devices, a thermal scene is imaged via infrared optics onto a special thermal sensor. The image is then recreated on a micro display and the micro display is, in turn, reimaged into the objective of the riflescope with a visible optics system. The two separate optical systems required to accomplish this result in a rather large, heavy, and expensive device.

As technology advances, there is a need for some level of system integration in order to reduce the heavy processing requirements placed on the shooter. This integration is also required to decrease the "time to engagement" that is traditionally quite long when multiple devices have to be referenced and calculations and adjustments have to be made. And finally, the size and weight of additional devices needed for effective use of the riflescope in low light conditions can be reduced with a more integrated solution.

Previous devices have attempted to address some of these issues in different ways with varying degrees of success. However, all attempts prior have implemented their solutions in the Second Focal Plane of the optic. This is very disadvantageous because the second focal plane in a riflescope is only well correlated to the image of the scene at a single magnification setting. The location of the aiming point is only accurate at one location in the turret adjustment as well. Because of this serious limitation, additional electronics are necessary to track the variables in the rest of the system and adjust the aiming point accordingly. Other systems provide approximate aiming point solutions through the illumination of features at generic, coarsely-spaced intervals instead of having a quasi-infinite range of points to select. Weaker systems are only capable of displaying basic information such as distance to target or current weather conditions.

When firing semi-automatic and automatic firearms in law enforcement, military actions and in target shooting competition it is desirable to know when the magazine is about to run out of ammunition Competition shooters need to know this information, so they can be prepared to release the empty magazine and replace it with a full one with minimum loss of shooting time. In police and military operations the need to know is far more serious. Police officers and soldiers can lose their lives in the split second it takes to realize a magazine must be replaced, or an enemy or felon can escape in that time. And studies have shown that under the stress of a firefight it is nearly impossible for the user to keep accurate track of the cartridges fired and those remaining.

Prior attempts to monitor the ammunition status by indicating the number expended or the number of rounds remaining have met with indifferent success, and by and large applied generally only to pistols and not other firearms. The apparatus often was large and cumbersome and required modifications to each firearm for retrofitting or required redesign for installation with original equipment manufacturers. Such systems did not distinguish between an empty condition and a jammed condition. However, one of the largest drawbacks to prior systems is that the information on ammunition status is not provided directly in the field of view of the user/shooter. The user/shooter must take their eyes off the target to receive the information on ammunition status.

Thus, a need still exists for a viewing optic that can project information into the first focal plane of an optical system. It is important that a user/shooter can be provided information on the ammunition status while maintaining visual on a target of interest. The apparatuses, systems, and methods disclosed herein address all of these shortcomings in an innovative fashion.

SUMMARY

In one embodiment, the disclosure relates to a system comprising a viewing optic, and a round counter system. In one embodiment, the disclosure relates to a system comprising a viewing optic, a round counter system and a firearm. In one embodiment, the disclosure relates to a round counter system configured to communicate with a viewing optic having an active display. In one embodiment, the round counter system communicates information regarding ammunition status to an active display, wherein the active display projects the information regarding ammunition status in the first focal plane of the viewing optic.

In one embodiment, the round counter system comprises a magazine follower having one or more magnets that is inserted into the magazine and a low-profile magnetic sensor to be placed on the magwell or other location of the receiver. The round counter system disclosed herein can work in conjunction with a viewing optic having an integrated display system to display the ammunition status into the first focal plane of the viewing optic.

In one embodiment, the magnetic sensors can reside in a remote connected to the viewing optic. The remote is attached to the magazine well of the firearm and the magnetic sensors send information to the viewing optic as the magazine follower rises when the rounds are stripped from the magazine by the firearm.

In one embodiment, the round counter system comprises a magazine follower with one or more magnets, such that as the magazine follower moves through the magazine, the magnet is positioned in front of one or more Hall-effect sensors. The activated Hall-effect sensor corresponds to the current position of the magnetic field, and thus, the magazine follower A signal associated with the Hall-effect sensor detecting the magnetic field is communicated to a processing unit, which correlates the height of the magazine follower with the number of rounds remaining in the cartridge. The processing unit is configured to communicate with an active display of a viewing optic, which displays round count information in the first focal plane of the viewing optic.

In one embodiment, the one or more Hall effect sensors can be located on a circuit board within the magazine well. In still another embodiment, the one or more Hall effect sensors can be located in the receiver of the firearm. In another embodiment, the one or more Hall-effect sensors are located on a circuit board.

In one embodiment, the disclosure relates to a system comprising: a viewing optic having an optical system configured to focus a target image from an outward scene to a first focal plane and an active display configured to generate a digital image, and a round counter configured to track ammunition status and to communicate ammunition status to the active display; wherein the ammunition status is projected into the first focal plane of the viewing optic.

In one embodiment, the disclosure relates to a system comprising: a viewing optic having: (a) a main tube; (b) an objective system coupled to a first end of the main tube that focuses a target image from an outward scene; (c) an ocular system coupled to the second end of the main tube, the main tube, objective system and ocular system being configured to define at least a first focal plane; and (d) an active display configured to generate a digital image; and a round counter system comprising a magazine follower having one or more magnets inserted into a magazine and multiple magnetic sensors placed on a magwell, wherein an activated magnetic sensor corresponds to the position of magazine follower, and a processor configured to correlate the position of the magazine follower with ammunition status and to communicate with the active display, wherein the ammunition status is projected into the first focal plane of the viewing optic.

In one embodiment, the disclosure relates to a method comprising: (a) moving a magazine follower with one or more magnets through a magazine; (b) activating a magnetic sensor when the magazine follower is in proximity to the magnetic sensor; (c) determining ammunition status based on the position of the magazine follower as indicated by the activated magnetic sensor; (d) communicating the ammunition status to an active display in a viewing optic; (e) generating a digital image of the ammunition status using the active display; and (f) projecting the digital image into the first focal plane of the viewing optic.

In one embodiment, the viewing optic has a main tube, an objective system coupled to a first end of the main tube and an ocular system coupled to a second end of the main tube. The main tube, the objective system and the ocular system are cooperatively configured to define at least one focal plane. The viewing optic further includes a beam combiner located between the objective system and the first focal plane. The viewing optic further includes an integrated display system comprising an active display, wherein the active display generates and projects a digital image to the beam combiner so the digital image and the target image from the objective lens system can be combined at the first focal plane.

In one embodiment, the disclosure relates to a viewing optic with a first optical system comprised of an objective lens system that focuses an image from a target down to a first focal plane (hereafter referred to as the "FFP Target Image"), followed by an erector lens system that inverts the FFP Target Image and focuses it to a second focal plane (hereafter referred to as the "SFP Target Image"), a beam combiner that is placed between the objective lens system and the FFP Target Image, an eyepiece lens system that collimates the SFP Target Image so that it can be observed by the human eye, and a second optical system. In one embodiment, the second optical system has an active display for generating an image, and a lens system that collects the light from the active display. The image from the digital display is directed to the beam combiner so that the digital image and the target image from the objective lens system can be combined at the first focal plane and viewed simultaneously.

In one embodiment, the disclosure relates to a viewing optic having a main body with an optics system for viewing an outward scene and a base coupled to the main body with an integrated display system for generating images and directing the generated images for simultaneous overlaid viewing of the generated images and images of the outward scene in the first focal plane of the main body. In one embodiment, the base is separable from the main body. In one embodiment, the base couples to a bottom portion of the main body. In yet another embodiment, the base has a cavity that contains the integrated display system. In another embodiment, the cavity can also have a compartment for one or more power sources.

In one embodiment, the disclosure relates to a viewing optic having a body with direct viewing optics for viewing images of an outward scene and a base having an integrated display system, wherein the integrated display system generates images with an active display and directs the images for simultaneous overlaid viewing of the generated images and images of the outward scene.

In one embodiment, the disclosure relates to a viewing optic with a body having a main optical system comprised of an objective lens system that focuses an image from a target down to a first focal plane (hereafter referred to as the "FFP Target Image"), a beam combiner that is placed between the objective lens system and the FFP Target Image, followed by an erector lens system that inverts the FFP Target Image and focuses it to a second focal plane (hereafter referred to as the "SFP Target Image"), and finally an eyepiece lens system that collimates the SFP Target Image so that it can be observed by the human eye, and a base coupled to a bottom portion of the body having a cavity with an integrated display system for generating images and directing the generated images for simultaneous overlaid viewing of the generated images and images of the outward scene in the first focal plane of the body.

In another embodiment, the disclosure relates to a viewing optic having a body with an optical system for viewing an outward scene and a base with an active display for generating an image, wherein the generated image is combined into the image of the outward scene in the first focal plane of the optical system.

In another embodiment, the disclosure relates to a viewing optic having a main body with an optical system for viewing an outward scene and a base coupled to a bottom portion of the main body with a cavity having an active display for generating an image, wherein the generated image is combined into the image of the outward scene in the first focal plane of the optical system.

In one embodiment, the disclosure relates to a viewing optic having a body with a first optical system for viewing an outward image and a second optical system comprised of a digital display mounted in a housing, wherein the housing is parallel to the first optical system, wherein the image of the second optical system is combined into the image of the first optical system in the first focal plane of the optic. In one embodiment, the second optical system comprises an active display. In yet another embodiment, the second optical system comprises a lens system that collects the light from the active display.

In one embodiment, the disclosure relates to a viewing optic having a main body with a first optical system for viewing an outward image and a housing coupled to the main body with an integrated display system for generating an image, wherein the image of the integrated display system is combined into the image of the first optical system in the first focal plane of the optic.

In one embodiment, the integrated display system comprises an active display, collector optics and a reflective surface or material, including but not limited to a mirror. In one embodiment, the active display can generate images including but not limited to text, alpha-numerics, graphics, symbols, and/or video imagery, icons, etc., including active target reticles, corrected aim-points, range measurements, and wind information.

In one embodiment, the disclosure relates to a viewing optic comprising: a viewing optic comprising: an optical system configured to define a first focal plane; an active display for generating an image, and a reflective material for directing the image to the first focal plane; and one or more adjustment mechanisms for performing one or more of the following: (a) moving the active display in relation to the reflective material, and (b) moving the reflective material in relation to the active display.

In one embodiment, the disclosure relates to housing coupled to a main body of a viewing optic, wherein the housing contains a display for generating images that can be injected into the first focal plane of the main body, such that the image of the display on the first focal plane is not tied to the movement of the erector tube.

In one embodiment, the disclosure relates to a viewing optic comprising a main body with an optical system for viewing an outward scene and a base coupled to a bottom portion of the main body, the base having an active display for generating an image, wherein the generated image is combined into an image of the outward scene in a first focal plane of the optical system, a sensor for detecting the presence of a user and a processor in communication with the sensor and capable of controlling power state of the viewing optic.

In one embodiment, the active display is configured to emit light in a direction that is substantially parallel to an optical axis of the viewing scope.

In one embodiment, the active display is configured to emit light in a direction that is substantially perpendicular to an optical axis of the viewing scope.

In one embodiment, the mirror is oriented at an angle of approximately 45° relative to the emitted light of the display.

In one embodiment, the display and the mirror are located on a common side of the viewing optic main body.

In one embodiment, the display and the mirror are located on opposite sides of the viewing optic main body.

In one embodiment, the display and the mirror are located on a common side of a base coupled to the viewing optic main body.

In one embodiment, the display and the mirror are located on opposite sides of a base coupled to the viewing optic main body.

In one embodiment, the mirror is located on the objective side of the base coupled to the viewing optic main body.

In one embodiment, the active display is located on the ocular side of the base coupled to the viewing optic main body.

In one embodiment, the methods and apparatuses disclosed herein allow the end user to easily discern a digital overlay from a day optic scene.

In one embodiment, the disclosure relates to a viewing optic that has both an analog reticle and a digital reticle visible to the user when looking through the scope.

In one embodiment, the viewing optic is used in conjunction with a firearm. In one embodiment, the viewing optic is a riflescope. In one embodiment, the riflescope can be used with an external laser rangefinder with ballistic calculation capability. In one embodiment, the riflescope is rigidly mounted to the firearm and the laser rangefinder is mounted to either the firearm or the riflescope.

In one embodiment, the disclosure relates to sighting system comprising a riflescope having a main body with a first optical viewing system for viewing an outward scene and a base having an integrated display system for generating an image, wherein the base is coupled to a bottom portion of the main body, and further wherein the generated image and an image of the outward scene are combined in a first focal plane of the optics system, a laser rangefinder that measures the distance to the target and components to compute the ballistics for hitting that target. In one embodiment, the integrated display system can digitally display computed information and the correct point of aim, which corresponds with the point of impact of the rifle bullet, wherein the digitally displayed aim point and the outward scene are overlaid and displayed in the first focal plane of the riflescope.

In one embodiment, the disclosure relates to sighting system comprising a riflescope having a main body with a first optical viewing system for viewing an outward scene and a base having an integrated display system for generating an image, wherein the base is coupled to a bottom portion of the main body, and further wherein the generated image and an image of the outward scene are combined in a first focal plane of the optics system, a laser rangefinder that measures the distance to the target and the components to compute the ballistics for hitting that target are located in the main body of the riflescope.

In another embodiment, the methods and apparatuses disclosed herein allows for the maximized range of vertical adjustment of an active reticle within a riflescope by specifically orientating the device responsible for emitting the augmentation image.

In another embodiment, the disclosure relates to a method for aligning the tilt of the vertical axis of a micro display and the vertical axis of a reticle in the optical system of a viewing optic, which is compact, simple, and accurate.

In one embodiment, the methods and apparatuses disclosed herein allow for the seamless combination of a processed digital image into a day visible optic.

In one embodiment, the disclosure relates to an active display integrated into the first focal plane (FFP) utilizing axially orientated data or communication ports thereby maintaining a minimized physical top down profile.

An advantage of the apparatuses and methods disclosed herein is that a multitude of advanced targeting functions can be utilized while preserving a direct view of the target scene.

An advantage of the apparatuses and methods disclosed herein is that the generated image from the integrated display system is combined with the outward image from the target in front of the first focal plane and then focused onto the first focal plane, as such, the target image and generated image from the integrated display system never move in relation to one another.

An advantage of the apparatuses and methods disclosed herein is that the injection of the generated image from the active display into the first focal plane of the optics system allows the generated image to be unaffected by any change in the turret adjustment or position of the erector system.

An advantage of the apparatuses and methods disclosed herein is that by superimposing the generated image of an active display onto the first focal plane, the user is able to use a traditional glass etched reticle for aiming purposes if the electronics should fail or the power supply be exhausted. This is an important failsafe which the apparatuses and methods disclosed herein supplies.

An advantage of the apparatuses and methods disclosed herein is that by displaying the generated image from the integrated display system on the first focal plane, the location of the electronic aiming point stays accurate in relation to the target regardless of the current magnification setting of the riflescope or any other adjustments.

Features, components, steps or aspects of one embodiment described herein may be combined with features, components, steps or aspects of other embodiments without limitation.

BRIEF DESCRIPTION OF THE DRAWINGS

FIG. 4 is a representative schematic displaying a longitudinally-split main body of a viewing optic according to one embodiment of the disclosure.

FIG. 29 is a representative depiction of a side cutaway view of an integrated display system with a microdisplay, optics system, and a mirror with tilt adjustment capabilities installed into a viewing optic according to one embodiment of the disclosure.

DETAILED DESCRIPTION

Figure 1A:
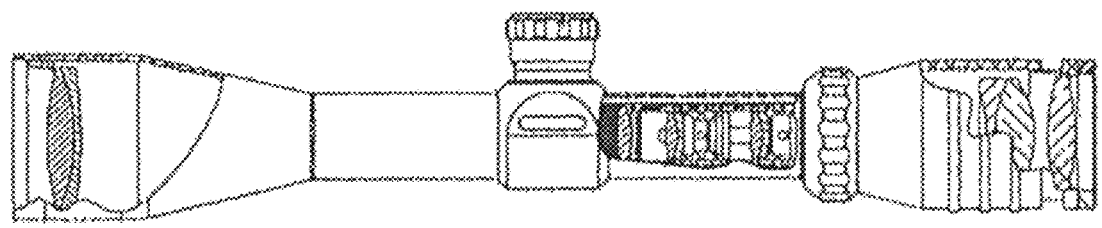
FIG. 1A is a schematic depicting parts of a riflescope.

The apparatuses and methods disclosed herein will now be described more fully hereinafter with reference to the accompanying drawings, in which embodiments of the disclosure are shown. The apparatuses and methods disclosed herein may, however, be embodied in many different forms and should not be construed as limited to the embodiments set forth herein. Rather, these embodiments are provided so that the disclosure will be thorough and complete and will fully convey the scope of the invention to those skilled in the art.

It will be appreciated by those skilled in the art that the set of features and/or capabilities may be readily adapted within the context of a standalone weapons sight, front-mount or rear-mount clip-on weapons sight, and other permutations of filed deployed optical weapons sights. Further, it will be appreciated by those skilled in the art that various combinations of features and capabilities may be incorporated into add-on modules for retrofitting existing fixed or variable weapons sights of any variety.

It will be understood that when an element or layer is referred to as being "on", "connected to" or "coupled to" another element or layer, it can be directly on, connected or coupled to the other element or layer. Alternatively, intervening elements or layers may be present. In contrast, when an element is referred to as being "directly on," "directly connected to" or "directly coupled to" another element or layer, there are no intervening elements or layers present.

Like numbers refer to like elements throughout. As used herein, the term "and/or" includes any and all combinations of one or more of the associated listed items.

It will be understood that, although the terms first, second, etc. may be used herein to describe various elements, components, regions, and/or sections, these elements, components, regions, and/or sections should not be limited by these terms. These terms are only used to distinguish one element, component, region, or section from another element, component, region, or section. Thus, a first element, component, region, or section discussed below could be termed a second element, component, region, or section without departing from the disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

I. Definitions

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, distances from a user of a device to a target.

The term "and/or" as used in a phrase such as "A and/or B" herein is intended to include both A and B; A or B; A (alone); and B (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

As used herein, an "active display" comprises image-creating pixel modulation. In one embodiment, the active display is an emissive active display. Emissive active displays, including but not limited to Organic light-emitting diodes (OLED) and Light-Emitting Diodes (LED), feature the image and light source in a single device, and therefore an external light source is not required. This minimizes system size and power consumption, while providing exceptional contrast and color space. OLEDs are made from ultra-thin organic semiconducting layers, which light up when they are connected to voltage (charge carriers become injected and luminance mainly is proportional to the forward current). The major layers comprise several organic materials in sequence (for example, charge transport, blocking and emission layers—each with a thickness of several nanometers), which are inserted between an anode and a cathode. The terms "active display," "digital display" and "microdisplay" are used interchangeably.

As used herein, "ammunition status" can refer to all or one or more of the following: the number of rounds in magazine, whether a round is in the chamber, and whether rounds are in the magazine but not in the chamber.

As used herein, the term "bullpup" is a firearm with its action and magazine behind the trigger. This creates shorter weapons in comparison to rifles with the same size of gun barrel. This means the advantages of a longer barrel such as muzzle velocity and accuracy are retained while reducing the overall size and weight of the weapon.

As used herein, an "erector sleeve" is a protrusion from the erector lens mount which engages a slot in the erector tube and/or cam tube or which serves an analogous purpose. This could be integral to the mount or detachable.

As used herein, an "erector tube" is any structure or device having an opening to receive an erector lens mount.

As used herein, a "firearm" is a portable gun, being a barreled weapon that launches one or more projectiles often driven by the action of an explosive force. As used herein, the term "firearm" includes a handgun, a long gun, a rifle, shotgun, a carbine, automatic weapons, semi-automatic weapons, a machine gun, a sub-machine gun, an automatic rifle, and an assault rifle.

As used herein, a "Hall effect sensor" is a device that is used to measure the magnitude of a magnetic field. The output voltage is directly proportional to the magnetic field strength through it. Hall effect sensors are used for proximity sensing, positioning, speed detection, and sensing applications.

As used herein, an "integrated display system" refers to a system for generating an image. In one embodiment, the integrated display system includes an active display. In one embodiment, the integrated display system includes an active display and collector optics. In yet another embodiment, the integrated display system includes an active display, collector optics, and a reflective surface.

In one embodiment, the integrated display system can be used to generate a digital image with an active display and direct the digital image into a first focal plane of an optical system for simultaneous viewing of the digital image and an image of an outward scene. As used herein, a "sighting system" refers to one or more optical devices and other systems that assist a person in aiming a firearm or other implement.

As used herein, a "magazine well" or "magwell" acts as a funnel, guiding the magazine into position.

As used herein, the term "marks" may comprise any of various visually perceptible lines, circles, dots, cross hairs, horseshoe patterns, geometric shapes, characters, numbers, letters, indicia, or symbols.

As used herein, the term "passive reticle" refers to a reticle with fixed marks that cannot be altered by a user. A representative example of a passive reticle is an etch and fill reticle. Another example is a holographic reticle, where the marks cannot be altered by the user. A passive reticle can be located in a first focal plane, a second focal plane or both the first and second focal planes.

As used herein, the term "receiver" refers to the part or frame of a firearm that integrates other components by providing housing for internal action components such as the hammer, bolt or breechblock, firing pin, extractor and trigger mechanism, and has threaded interfaces for attaching ("receiving") components such as the barrel, stock and action parts. The receiver is often made of forged, machined, or stamped steel or aluminum; in addition to these traditional materials, modern science and engineering have introduced polymers and sintered metal powders to receiver construction.

As used herein, the term "round" and "cartridge" are used interchangeably.

As used herein, the term "viewing optic" refers to an apparatus used by a shooter or a spotter to select, identify or monitor a target. The "viewing optic" may rely on visual observation of the target, or, for example, on infrared (IR), ultraviolet (UV), radar, thermal, microwave, or magnetic imaging, radiation including X-ray, gamma ray, isotope and particle radiation, night vision, vibrational receptors including ultra-sound, sound pulse, sonar, seismic vibrations, magnetic resonance, gravitational receptors, broadcast frequencies including radio wave, television and cellular receptors, or other image of the target. The image of the target presented to the shooter by the "viewing optic" device may be unaltered, or it may be enhanced, for example, by magnification, amplification, subtraction, superimposition, filtration, stabilization, template matching, or other means. The target selected, identified or monitored by the "viewing optic" may be within the line of sight of the shooter, or tangential to the sight of the shooter, or the shooter's line of sight may be obstructed while the target acquisition device presents a focused image of the target to the shooter. The image of the target acquired by the "viewing optic" may be, for example, analog or digital, and shared, stored, archived, or transmitted within a network of one or more shooters and spotters by, for example, video, physical cable or wire, IR, radio wave, cellular connections, laser pulse, optical, 802.11b or other wireless transmission using, for example, protocols such as html, SML, SOAP, X.25, SNA, etc., Bluetooth™, Serial, USB or other suitable image distribution method. The term "viewing optic" is used interchangeably with "optic sight."

As used herein, the term "outward scene" refers to a real world scene, including but not limited to a target.

As used herein, the term "shooter" applies to either the operator making the shot or an individual observing the shot in collaboration with the operator making the shot.

II. Viewing Optic

Figure 1B:
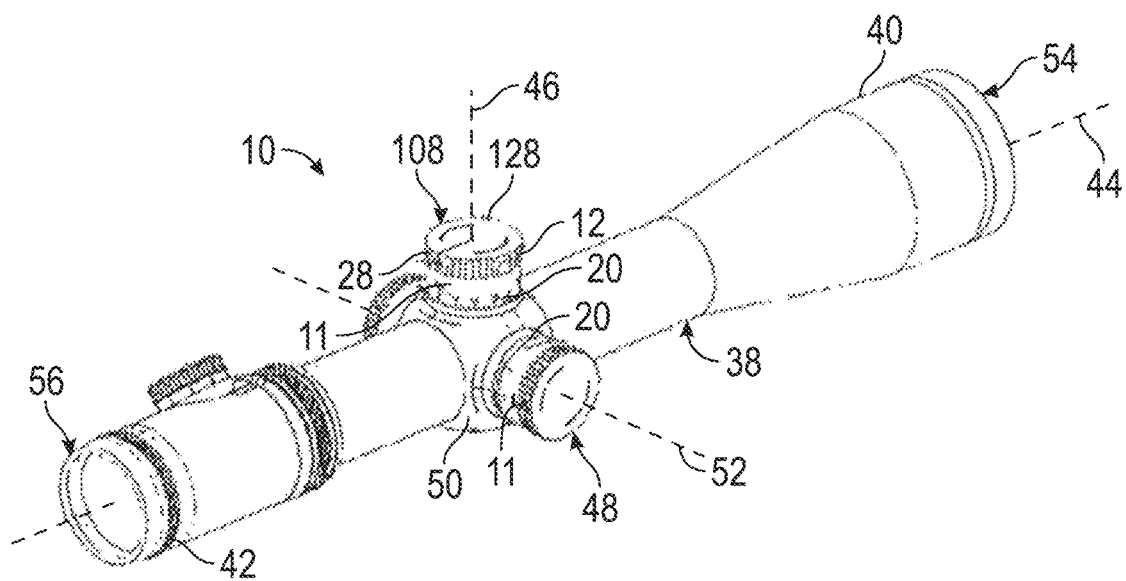
FIG. 1B is a schematic depicting additional parts and components of a viewing optic in accordance with one embodiment of the disclosure.

FIG. 1A illustrates the traditional design of a riflescope, which is a representative example of a viewing optic. FIG. 1B illustrates an exemplary viewing optic 10 in accordance with embodiments of the disclosure. Specifically, FIG. 1B illustrates a riflescope. More particularly, the riflescope 10 has a body 38 that encloses a movable optical element 15. The body 38 is an elongate tube tapering from a larger opening at its front 40 to a smaller opening at its rear 42. An eyepiece 56 is attached to the rear of the scope body, and an objective lens 54 is attached to the front of the scope body. The center axis of the movable optical element defines the optical axis 44 of the rifle scope.

An elevation turret 12 and a windage turret 48 are two dials that are often found in the outside center part of the body 38. They are marked in increments by indicia 20 on their perimeters 11 and are used to adjust the elevation and windage of the movable optical element for points of impact change. These dials protrude from the turret housing 50. The turrets are arranged so that the elevation turret rotation axis 46 is perpendicular to the windage turret rotation axis 52.

Figure 1C:
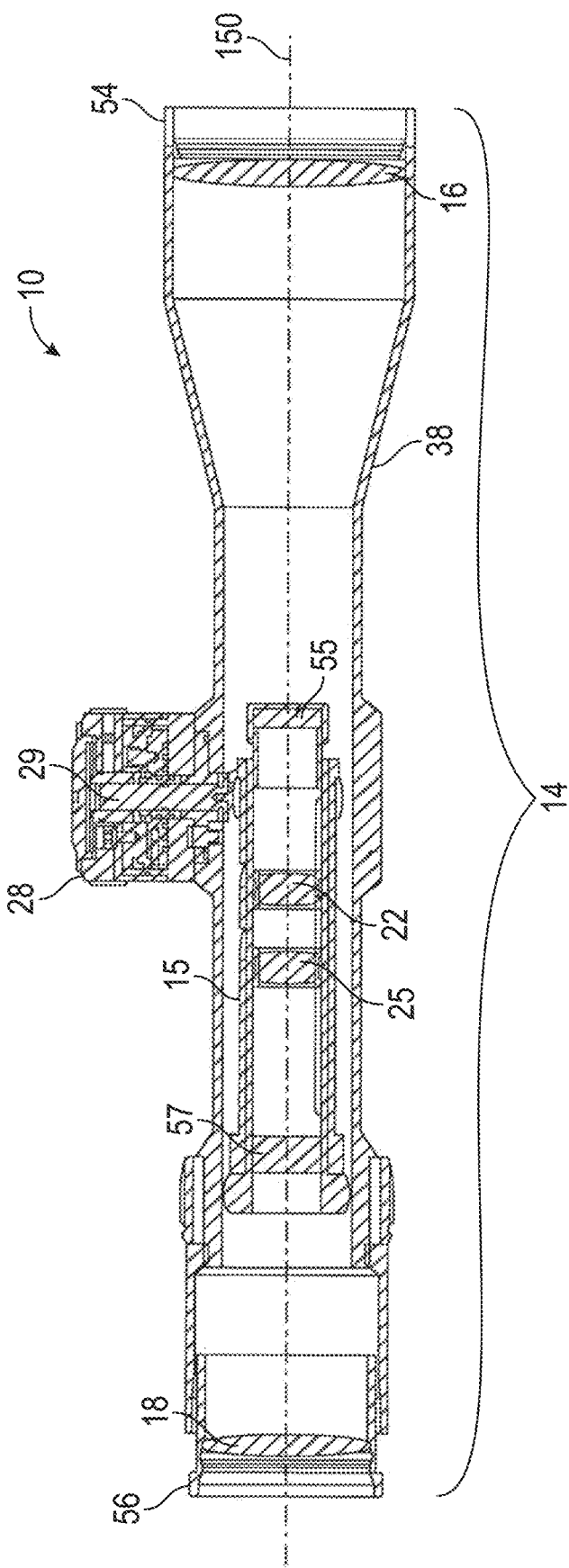
FIG. 1C is a cross section view of the viewing optic of FIG. 1B showing a moveable optic element inside the optic body according to one embodiment of the disclosure.

FIG. 1C shows a cross-section view of the sighting device from FIG. 1B with the basic components of optical system 14 and moveable optical element 15. As shown in FIG. 1C, optical system 14 includes an objective lens system 16, erector system 25, and eyepiece lens system 18. FIG. 1C shows a riflescope having a body 38, but optical system 14 could be used in other types of sighting devices as well. Erector system 25 may be included within a moveable optic element 15. The erector system 25 may include a power varying lens element or zoom element 25A. In FIG. 1C, moveable optic element 15 also includes a collector 22, as well as first focal plane reticle 55 and second focal plane reticle 57. When in use, adjustment of turret assembly 28 and turret screw 29 causes adjustment of moveable optic element 15.

The movable optical element 15 is adjusted by rotating the turret assembly 28 one or more clicks. As the turret is rotated, a turret screw 29 moves in and out of the scope, which pushes the erector tube. The erector tube is biased by a spring so when the turret screw is adjusted, it locates the erector tube against the bottom face of the turret screw. The erector tube provides a smaller view of the total image. As the erector tube is adjusted, the position of the reticle is modified against the image.

A reticle is a circular, planar or flat transparent panel or disk mounted within the scope body in perpendicular relationship to the optical axis or line-of-sight through the scope, and is positioned between the objective lens element 54 and the erector lens element, typically at a site considered to be a front focal plane of the optical system within the housing. In one embodiment, the reticle contains fine etched lines or hairline indicia comprising a center vertical hairline and a center horizontal hairline, which orthogonally or perpendicularly intersect at a center point.

Figure 1D:
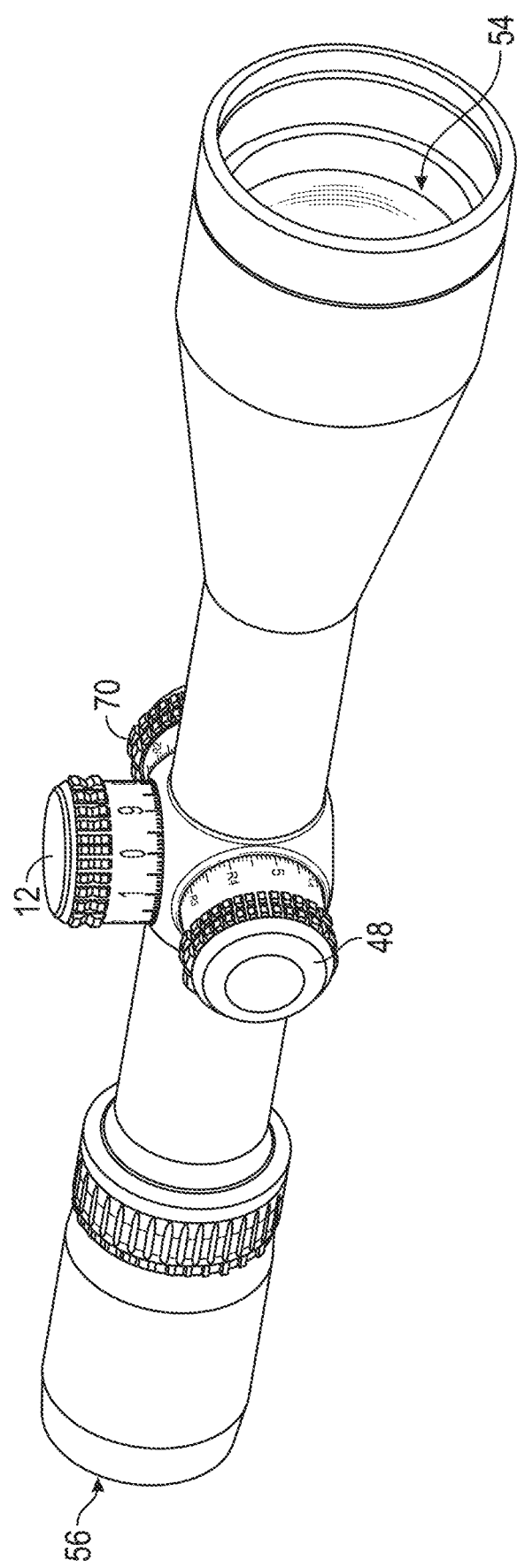
FIG. 1D is a schematic of a viewing optic depicting a parallax adjustment knob according to one embodiment of the disclosure.

In one embodiment, as shown in FIG. 1D, the viewing optic can have a parallax adjustment knob 70 or a focus knob. Parallax occurs when the optical plane of the image of a target is not coplanar with the optical plane of the image of the reticle. As a result of the offset between the two optical planes, the reticle can appear to move relative to the target when the marksman moves their eye around the center of the reticle. This parallax error can result in a shift in the point of impact from firing. The parallax adjustment of a viewing optic enables the marksman to eliminate optical error at different distances, by enabling the optical system to be adjusted to show the image of the target and the image of the reticle in the same optical plane. Parallax compensation changes neither the focus of the reticle nor the focus of the image; it simply moves the planes at which these two objects are in focus so that they share the same plane (are coincident).

As shown in FIG. 1D, the viewing optic can have a side wheel mounted to the rotatable parallax adjustment knob 70. The larger diameter of the side wheel provides more space for markers, such as range marker, to be applied, and is easier for the marksman to rotate and read when in use. The larger diameter of the side wheel serves to increase the accuracy and resolution of the range finding markers.

Figure 1E:
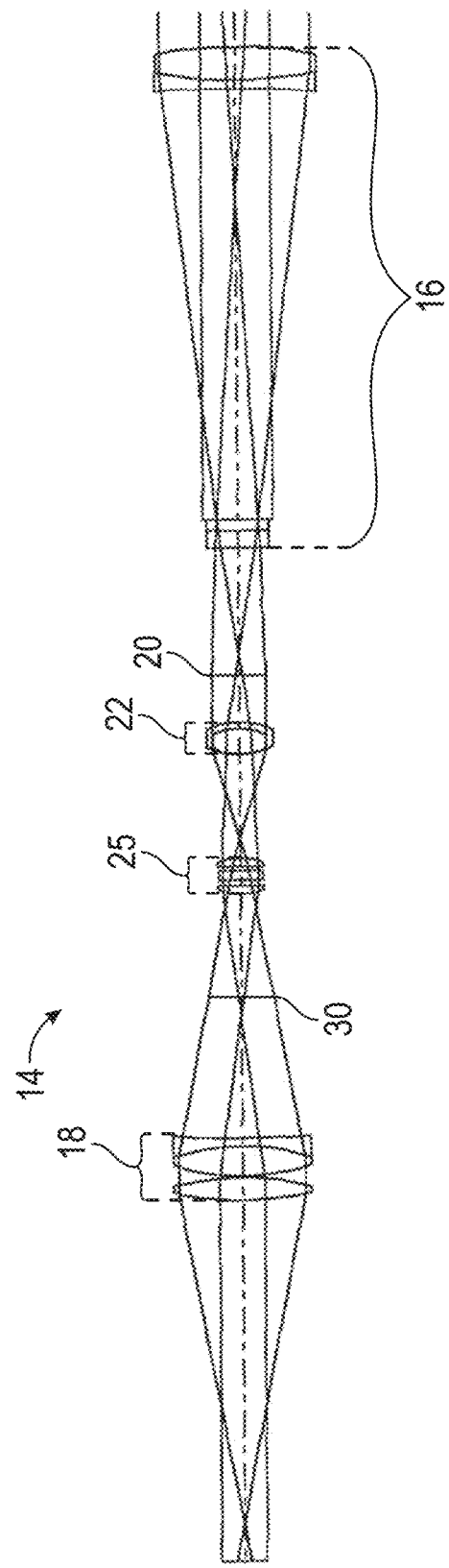
FIG. 1E is a schematic of the erector system in the optical element of the viewing optic according to one embodiment of the disclosure.

FIG. 1E shows a close-up view of an optical system 14 in cross-section, illustrating how light rays travel through the optical system 14. Optical system 14 may have additional optical components such as collector 22, and it is well known within the art that certain components, such as objective lens system 16, erector system 25, and eyepiece lens system 18 may themselves have multiple components or lenses.

In one embodiment, the viewing optic can have a focusing cell having one or more adjustable lens for providing parallax adjustment. In one embodiment, the one or more adjustable lens is one or parallax lenses.

In one embodiment, a focus lens is located between an ocular lens and an objective lens. The relative distance between the focus lens and the objective lens is adjustable, for providing parallax adjustment. In addition, erector lenses are located between the ocular lens and the focus lens. The relative distance between the erector lenses and the objective lens is adjustable, for providing magnification adjustment.

III. Viewing Optic with an Active Display

In one embodiment, the disclosure relates to a viewing optic having an active display that generates a digital image and projects the digital image into the first focal plane of the viewing optic. In one embodiment, the disclosure relates to a viewing optic that has an analog reticle and a digital image, including but not limited to a digital reticle, visible to the user when looking through the viewing optic. In one embodiment, the viewing optic can be used with an external laser rangefinder with ballistic calculation capability.

In one embodiment, the viewing optic has a moveable erector tube with an analog reticle or a glass etched reticle that is mounted to the erector tube in such a way that the analog or glass etched reticle moves in conjunction with said erector tube. In one embodiment, the digitally injected reticle does not move in conjunction with the erector tube. Thus, the digital reticle is accurate regardless of the turret or erector tube position.

In one embodiment, the disclosure relates to viewing optic with a digital display that can be injected into the first focal plane of the viewing optic such that the image of the digital display on the first focal plane is not tied to the movement of the erector tube. In one embodiment, the display can give users accurate ballistic hold points of aim, regardless of the erector tube/turret position of the riflescope.

In one embodiment, the disclosure relates to viewing optic with an aiming point that is agnostic to the position of the erector tube and/or turret position of the viewing optic. In one embodiment, if a ballistically determined aim point is beyond the field of view of the erector unit, the turrets can be dialed to bring the ballistically determined aimpoint into the field of view.

In one embodiment, the viewing optic has a main optical system comprised of an objective lens system that focuses an image from a target down to a first focal plane (hereafter referred to as the "FFP Target Image"), followed by an erector lens system that inverts the FFP Target Image and focuses it to a second focal plane (hereafter referred to as the "SFP Target Image"), a beam combiner that is placed between the objective lens system and the FFP Target Image, an eyepiece lens system that collimates the SFP Target Image so that it can be observed by the human eye, and a second optical system.

In one embodiment, the second optical system has an active display, and a lens system that collects the light from the active display. The image from the digital display is directed to the beam combiner so that the digital image and the target image from the objective lens system can be combined at the first focal plane and viewed simultaneously. In one embodiment, the second optical system can have a reflective material, including but not limited to a mirror.

Referring to the description above, the digital display is injected into the main optical system, between the objective lens system and the first focal plane, and then is focused onto the first focal plane. At the first focal plane, both the digital image from the digital display and the analog/glass etched reticle attached to the erector lens system share the same plane. However, the analog reticle is attached to a moveable erector lens system, while the image from the digital display is not. Therefore, if the erector lens system is moved, the analog reticle will move, but the digital image will remain stationary.

In one embodiment, the viewing optic can be rigidly mounted to a firearm. In another embodiment, a laser rangefinder can be mounted to either the firearm or the viewing optic. The laser rangefinder measures the distance to the target, computes the ballistics for hitting that target, provides that information into the active display so that the correct point of aim can be displayed with the point of impact of the rifle bullet.

It is important that the digital image remain stationary because the laser range finder is rigidly attached to viewing optic and its point of aim does not move. This allows the digital display to be digitally adjusted so that the digital laser designator corresponds with the laser on initial setup, and then the two will always remain in alignment, no matter how the erector lens system is moved.

Additionally, the barrel of a firearm is rigidly attached to the viewing optic, so the point of aim of the barrel never changes in relation to the digital display. This allows the digital display to be digitally adjusted so that a digital aim point corresponds with the barrel of the firearm at its initial "sight-in" distance during initial setup, and then the two will always remain in alignment.

When the need arises to shoot at different distances than the initial sight-in distance, the laser range finder can measure the distance and then do ballistic calculations to determine the new location of the point of aim. That new point of aim location is always relative to the initial sight in distance, so the riflescope simply needs to adjust the digital display aim point to correspond with the new point of aim.

A side benefit of this system is that, because the digital aim point is stationary, the user can easily test the accuracy of the turrets on the viewing optic that adjust the erector tube position using a reticle that has predetermined marks on it at regular intervals. As the erector tube moves, the reticle can be measured against the stationary digital aim point to see if the adjustment dialed on the turrets corresponds to the amount of movement measured between the digital aim point and the reticle attached to the erector lens system.

In one embodiment, the disclosure relates to a display system for a viewing optic comprising a first active display for generating a first image, and a second active display for generating a second image, wherein the first active display and second active display are perpendicular to one another, and further wherein either the first image or the second image is projected into a first focal plane of a viewing optic. In one embodiment, the display system further comprises an optical system having a first focal plane and a first beam combiner;

In one embodiment, the disclosure relates to a display system for a viewing optic comprising a first active display configured to generate an image, a second active display configured to generate a second image, a beam combiner located between the first active display and the second active display and configured to combine the first image and a second image to generate a combined image, wherein the combined image is projected into a first focal plane of a viewing optic. In one embodiment, the display system further comprises a collector lens system. In still another embodiment, the display system comprises a reflective material.

In one embodiment, the disclosure relates to a display system for a viewing optic comprising a first active display for generating a first image, and a second active display for generating a second image, wherein the first active display and second active display are perpendicular to one another, and further wherein either the first image or the second image are directed to a beam combiner for simultaneous overlaid viewing with an image of an outward scene in a first focal plane of a viewing optic.

In one embodiment, the disclosure relates to a display system for a viewing optic comprising a first active display configured to generate an image, a second active display configured to generate a second image, a beam combiner located between the first active display and the second active display and configured to combine the first image and a second image to generate a combined image, wherein the combined image is directed to an additional beam combiner for simultaneous overlaid viewing with an image of an outward scene in a first focal plane of a viewing optic. In one embodiment, the display system further comprises a collector lens system. In still another embodiment, the display system comprises a reflective material for directing the combined image to the additional beam combiner.

In one embodiment, the disclosure relates to a method for viewing with a viewing optic comprising generating a first image with a first active display; generating a second image with a second active display; combining the first image and the second image with a beam combiner to produce a combined image; and projecting the combined image into a first focal plane of a viewing optic.

In one embodiment, the disclosure relates to a method for viewing with a viewing optic comprising generating a first image with a first active display; generating a second image with a second active display; combining the first image and the second image with a beam combiner to produce a combined image; and directing the combined image to an additional, separate beam combiner for viewing the combined image and an image of an outward scene in a first focal plane of a viewing optic.

In one embodiment, the disclosure relates to a method for viewing with a viewing optic comprising viewing a field of view of an outward scene with viewing optics having a first focal plane and positioned along a viewing optical axis, generating a first image with a first active display; generating a second image with a second active display; combining the first image and the second image with a beam combiner to produce a combined image; and projecting the combined image into the first focal plane of a viewing optic. In one embodiment, projecting the combined image into a first focal plane uses a reflective material.

Figure 85:
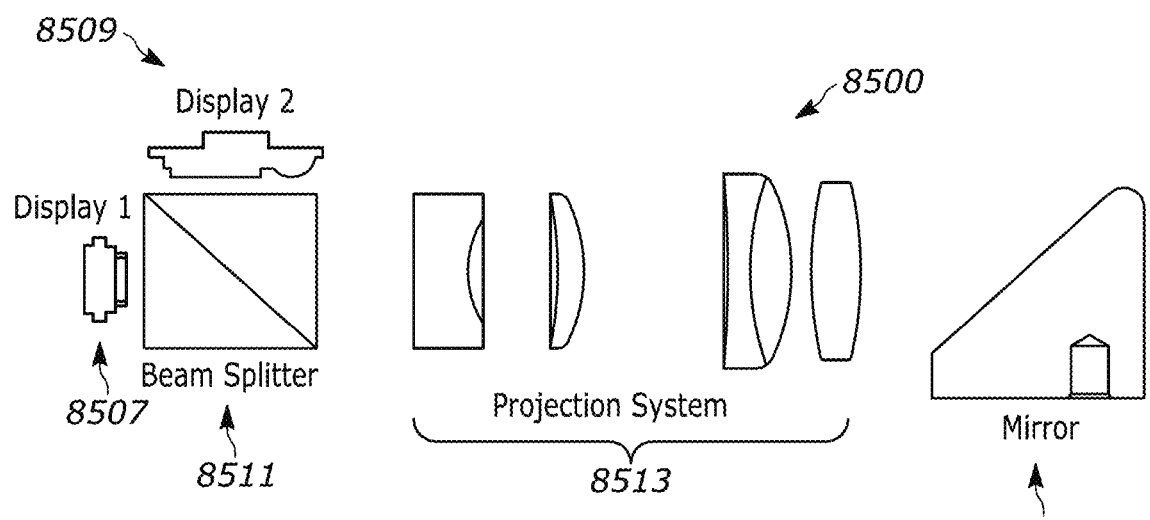
FIG. 85 is a representative depiction of a display system for a viewing optic having a first active display and a second active display.

FIG. 85 is a representative schematic of a display system 8500 having multiple active displays. The system 8500 has a first active display 8507 configured to generate a first image in a direction that is substantially parallel to an optical axis of the viewing optic. Further, the system has a second active display 8509 configured to generate an image in a direction that is substantially perpendicular to an optical axis of the viewing optic. The system further has a beam combiner 8511 configured to combine the generated image from the first active display 8507 and the second active display 8509. As shown in FIG. 85, the first active display 8507 is located to the left of the beam combiner 8511 and the second active display 8509 is located above the beam combiner.

The system further as a collection lens system 8513 located to the right of the beam combiner 8511. The system also has a reflective material 8515 located to the right of the collection lens system 8513.

In one embodiment, the first active display 8507 and the second active display 8509 generate a first image and a second image, respectively, which are directed to the beam combiner 8511. The beam combiner 8511 is configured to combine the first and second images into a combined generated image. The combined generated image is directed to the collection lens system 8513, and optionally to a reflective material 8515.

In one embodiment, the disclosure relates to a viewing optic having a display system with one or more active displays. In one embodiment, the viewing optic has a display system with a first active display configured to generate an image and a second active display configured to generate a second image. In one embodiment, the first active display and the second active display are parallel in reference to each other. In yet another embodiment, the first active display is perpendicular to the second active display.

In one embodiment, the disclosure relates to a viewing optic with multiple displays in conjunction with a passive sight picture to provide clear resolution and bright images to a user regardless of the time or light conditions. In another embodiment, the disclosure relates to a viewing optic with a combination of thermal and night vision technologies to be used in tandem in order to optimize sighting pictures in all environments and scenarios.

In one embodiment, the disclosure relates to a viewing optic having an integrated display system with appropriate brightness and clarity levels for thermal technology in a range of environmental brightness levels.

In one embodiment, the disclosure relates to a viewing optic with an integrated display system that uses multiple displays to augment a passive image provided by a day view optic.

Rather than projecting or displaying an entire image, the viewing optic with an integrated display system can use the thermal camera to augment a passive image rather than display an entirely new image. The ability to have two different displays also allows for optimal battery life while still providing sufficient brightness and image quality.

In one embodiment, the viewing optic with an integrated display system combines multiple displays into one viewing optic: a first display with high brightness quality and a second display with higher bit depth and higher resolution. In one embodiment, the viewing optic has two beam combiners. In one embodiment, the viewing optic has a first beam combiner in the main body and a second beam combiner in the base.

By using two displays, one display can be of the format that has low color depth and resolution, but high brightness for daytime use, and the other display can be of the type that has higher color depth and resolution, but lower brightness for low light use. In one embodiment, color depth, resolution and brightness can be a comparison between a first display and a second display. In another embodiment, the terms high color depth, low color depth, high resolution, low resolution, high brightness, and low brightness can be used in accordance with industry standards.

The advantage of the use of these two display types becomes clear when used with thermal and night vision cameras. In one embodiment, a thermal camera can be attached to the viewing optic and transmit a thermal image to the active display, which transmits the image into the field of view such that the thermal image is overlaid onto the passive image.

Figure 86:
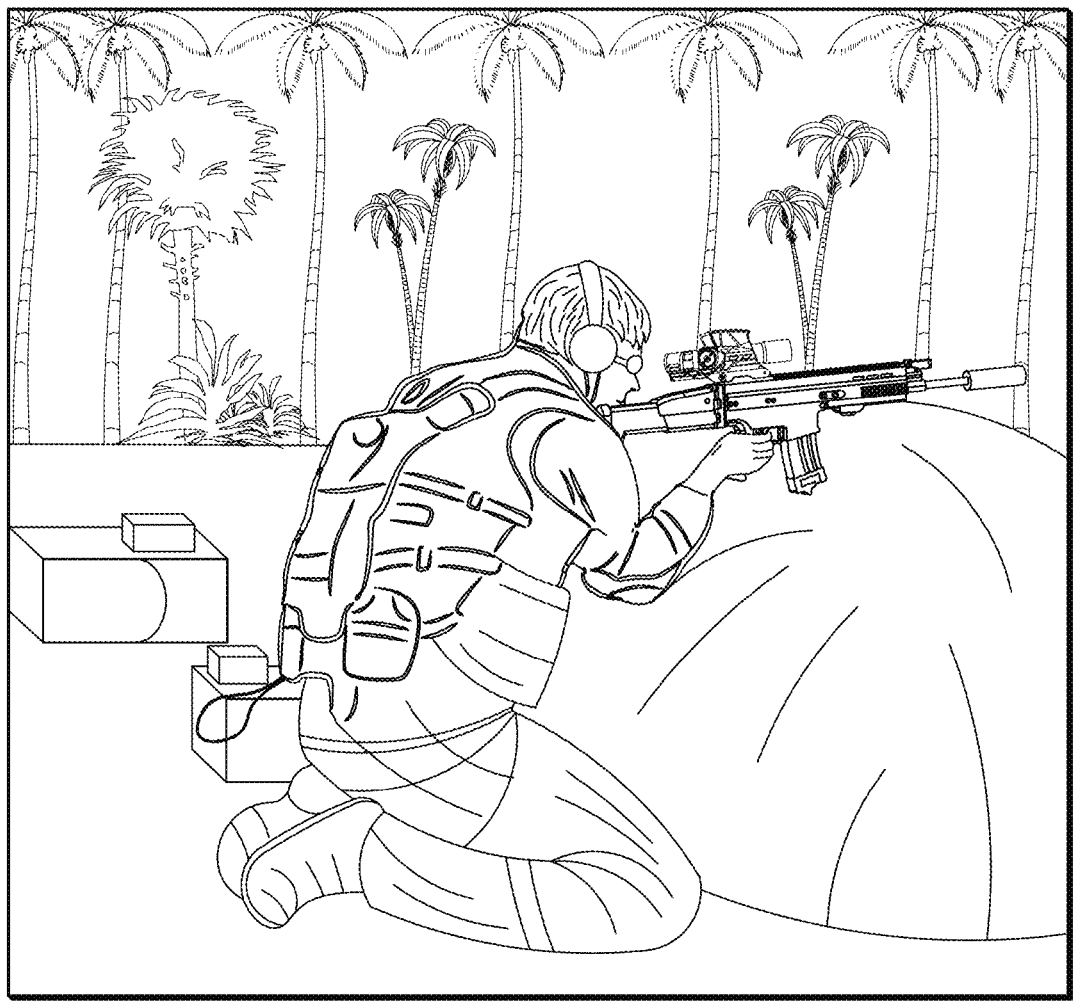
FIG. 86 is a representative depiction of an image from an active display having high bit depth and high resolution.
Figure 87:
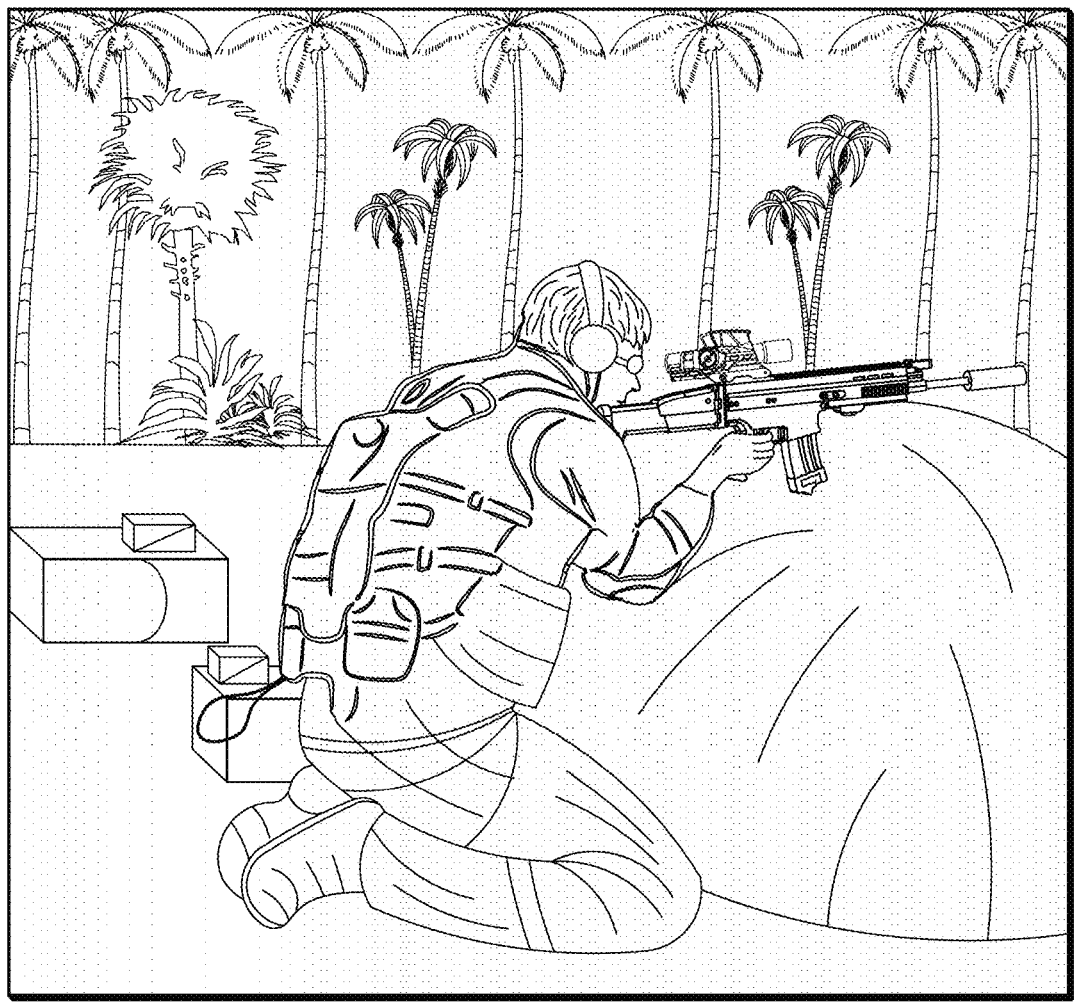
FIG. 87 is a representative depiction of an image from an active display having low bit depth and low resolution.

During daylight, the passive image is bright, therefore the thermal image from the active display must be bright enough such that the user can see it. At the current time, suitable displays that have a high enough brightness for use in these conditions have low color bit depth and lower resolution (FIGS. 86 and 87). This means that there are fewer shades of color available for the display to project between lighter and darker areas and the quality of the projected image is lower.

However, if this display is only used during the day, it only needs to augment the passive image, so color depth and resolution is much less important. For example, the sight can be programmed to only outline thermal signatures, rather than shade them in, since the passive image will provide the necessary details needed for a good image and the display will only help draw the user's eye to a heat source.

During low light conditions, the passive image begins to dim to the point that it becomes harder for the user to see detail. In this case, a high brightness display becomes unnecessary and allows the use of another display that has lower brightness, but higher bit depth and resolution.

In one embodiment, the viewing optic may have a light sensor that can detect when light levels go below a set threshold, the viewing optic uses the secondary display, which could have enough bit depth and resolution to accurately shade the heat source and augment or replace the passive image so that the user gets a clear image.

In another embodiment, a viewing optic with two or more active displays can project a thermal and night vision image into the field of view of the viewing optic. By using both a thermal camera and a low light camera, such as a low light CMOS, the two active displays could send an image from each camera into the field of view of the riflescope.

For example, the thermal camera could transmit outlines of heat sources to the low bit depth, low resolution display and the low light CMOS camera could transmit a night vision image to the high bit depth, high resolution display, so that both would be simultaneously imaged into the field of view.

Another advantage of a viewing optic with multiple active displays is that a high brightness display is a small display, which means it has a limited field of view. For daylight, this is not as big of a problem, because the user still has the ability of seeing a wider field of view from the passive optics. However, at night, when the passive image is less usable, a small display can become a liability for approaching threats. Fortunately, the lower brightness display is larger, so it allows a larger field of view for low light conditions. This again allows for the best of both worlds.

Lastly, high bit depth, high resolution displays use significantly more power than a low bit depth, low resolution display. This means that during daylight hours, only the low bit depth, low resolution display needs to be used and can significantly reduce overall power consumption than using a high resolution display all the time.

In one embodiment, the first and second active displays are configured to emit light in a direction that is substantially parallel to an optical axis of the viewing scope. In yet another embodiment, the first and second active displays are configured to emit light in a direction that is substantially perpendicular to an optical axis of the viewing optic.

In one embodiment, the first active display is configured to emit light in a direction that is substantially parallel to an optical axis of the viewing scope, and the second active display is configured to emit light in a direction that is substantially perpendicular to an optical axis of the viewing optic.

In yet another embodiment, the display system has a beam combiner configured to combine the generated image from the first active display and the generated image from the second active display.

In one embodiment, the first and second active displays are located to the right of the beam combiner. In another embodiment, the first and second active displays are located to the left of the beam combiner.

In one embodiment, the first active display is located to the left of the beam combiner, and the second active display is located to the right of the beam combiner.

In one embodiment, the first active display and the second active displays are located above the beam combiner. In still another embodiment, the first and second active displays are located below the beam combiner.

In one embodiment, the first active display is located above the beam combiner, and the second active display is located below the beam combiner.

In one embodiment, the first active display is located to the left of the beam combiner and the second active display is located below the beam combiner.

In one embodiment, the first active display is located to the right of the beam combiner and the second active display is located below the beam combiner.

In one embodiment, the first active display is located to the left of the beam combiner and the second active display is located above the beam combiner.

In one embodiment, the first active display is located to the right of the beam combiner and the second active display is located above the beam combiner.

In one embodiment, one or more active displays are located to the right of the beam combiner. In another embodiment, one or more active displays are located to the left of the beam combiner.

In one embodiment, one or more active displays are located to the left of the beam combiner, and one or more active displays are located to the right of the beam combiner.

In one embodiment, one or more active displays are located above the beam combiner. In still another embodiment, one or more active displays are located below the beam combiner.

In one embodiment, one or more active displays are located above the beam combiner, and one or more active displays are located below the beam combiner.

In one embodiment, one or more active displays are located to the left of the beam combiner and one or more active displays are located below the beam combiner.

In one embodiment, one or more active displays are located to the right of the beam combiner and one or more active displays are located below the beam combiner.

In one embodiment, one or more active displays are located to the left of the beam combiner and one or more active displays are located above the beam combiner.

In one embodiment, one or more active displays are located to the right of the beam combiner and one or more active displays are located above the beam combiner.

In one embodiment, the disclosure relates to a viewing optic having a main body with an optics system having a first focal plane and configured to view images of an outward scene, a beam combiner that is placed in line with the optics system, and a display system having a first active display configured to generate an image, an additional, separate and distinct beam combiner, and a second active display perpendicular to the first active display and configured to generated a second image, wherein the generated images from either the first active display or the second active display are projected into the first focal plane of the optics system providing simultaneous viewing of the generated images and images of the outward scene when looking through an eyepiece of the scope body. In one embodiment, the generated images from the first active display and the second active display are combined in the second beam combiner and directed to the first beam combiner system providing simultaneous viewing of the combined image and images of the outward scene in a first focal plane of the optics when looking through an eyepiece of the scope body.

In one embodiment, the second beam combiner is located to the right of the first active display. In yet another embodiment, the second active display can be placed into the system perpendicular to the primary active display. This allows both displays to be used and projected onto the focal plane of the viewing optic individually or simultaneously.

In one embodiment, the disclosure relates to a viewing optic comprising: an optical system for generating an image of an outward scene along a viewing optical axis and a beam combiner and a display system having a first active display configured to generate an image, and a second active display perpendicular to the first active display and configured to generate a second image, wherein the generated images from either the first active display or the second active display are directed to the beam combiner for simultaneous viewing of the generated image and image of the outward scene in the first focal plane of the optics system when looking through an eyepiece of the scope body.

In one embodiment, the disclosure relates to a viewing optic comprising: an optical system for generating an image of an outward scene along a viewing optical axis and a first beam combiner and a display system having a first active display configured to generate an image, a second active display configured to generate a second image, an additional, separate and distinct beam combiner for combining the first image and the second image, wherein the combined image is directed to the first beam combiner for simultaneous viewing of the generated image and image of the outward scene in the first focal plane of the optics system when looking through an eyepiece of the scope body.

IV. Viewing Optic with a Base

In one embodiment, the disclosure relates to a viewing optic, including but not limited to a riflescope, having a first housing coupled to a second housing. In one embodiment, the first housing is a main body. In yet another embodiment, the second housing is a base.

In one embodiment, the disclosure relates to a riflescope having a main body and a base coupled to the main body. In one embodiment, the base is separable from the main body. In one embodiment, the base is attached to a bottom portion of the main body. In one embodiment, a gasket is used to enclose the main body and the base.

In one embodiment, the disclosure relates to a riflescope having a main body with an optics system for generating images of an outward scene and a base coupled to the main body with an integrated display system for generating digital images and directing the digital images into a first focal plane of the optics system, thereby providing simultaneous viewing of the digital images and images of the outward scene.

In another embodiment, the disclosure relates to a riflescope having a main body with an optics system for generating images of an outward scene and a base coupled to the main body with an integrated display system having an active display for generating images and directing the generated images into a first focal plane of the optics system providing simultaneous viewing of the generated images and images of the outward scene when looking through an eyepiece of the scope body.

Figure 2:
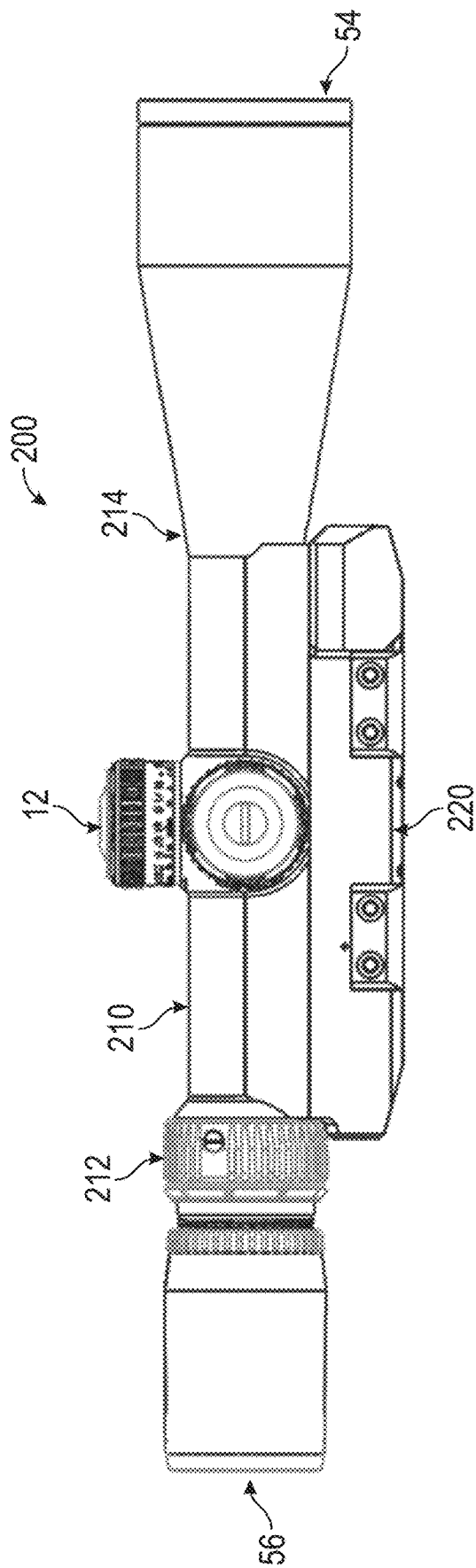
FIG. 2 is a side view of a riflescope having a main body and a base coupled to the main body according to one embodiment of the disclosure.

In a representative embodiment, FIG. 2 displays a side view of a riflescope 200 with a main body 210 and a base 220. In one embodiment, the base 220 is separable from the main body 210. The base 220 attaches at one end of the scope body near the magnification ring 212 and at the other end of the scope body near the objective assembly 214. In one embodiment, the main body 210 and the base 220 are made of the same material. In another embodiment, the scope body and the base are made of different material.

In one embodiment, the base 220 is approximately the length of the erector tube of the main body.

In one embodiment, the base has an integrated display system that can generate and display situational, geographical, and ballistic information in the first focal plane of the viewing optic including but not limited to: real time ballistic solutions; next round ballistic correction through in-flight tracer round detection and tracking; weapon pointing angle tracking using integrated high performance inertial sensors; precise pointing angle comparisons for advanced ballistic targeting and correction; target location and designation; pressure, humidity, and temperature; anti-fratricide and situational awareness data can be processed by the device and viewed while sighting; reticle targeting correction beyond scopes field of view for convenient ballistic drop correction at long ranges; weapon, round, and environmental characterization data.

In one embodiment, the viewing optic has one or more of the following capabilities and/or components: one or more microprocessors, one or more computers, a fully integrated ballistic computer; an integrated near infrared Laser Rangefinder; an integrated GPS and digital compass with the viewing optic capable of full coordinate target location and designation; integrated sensors for pressure, humidity, and temperature with the viewing optic capable of automatically incorporating this data in ballistic calculations; conventional viewing optic capabilities in all conditions, including zero-power off mode; wired and wireless interfaces for communication of sensor, environmental, and situational awareness data; ability to support digital interfaces such as Personal Network Node (PNN) and Soldier Radio Waveform (SRW); integrated tilt sensitivity with respect to vertical with ballistic correction possible for uphill and downhill shooting orientations; integrated imaging sensor; acquiring and processing target scene image frames; ability to record firing time history for purposes of applying cold bore/hot bore shot correction in an automated fashion; and built in backup optical range estimation capability with automatic angular to linear size conversion.

In one embodiment, the viewing optic can communicate wirelessly with one or more devices. In another embodiment, the viewing optic can communicate via a physical cable with one or more devices.

A. Main Body

In one embodiment, the main body is the shape of an elongate tube, which tapers from a larger opening at its front to a smaller opening at its rear and an eyepiece attached to the rear of the elongate tube, and an objective lens attached to the front of the elongate tube. In one embodiment, the first housing is a main body of a riflescope.

In one embodiment, the main body has a viewing input end, and a viewing output end, which can be aligned along viewing optical axis 44 (FIG. 1B) and can be inline. Objects or targets can be directly viewed by the eye of the user through the viewing input end, along the viewing direct view optics, and out the viewing output end. The main body can include an objective lens or lens assembly at the viewing input end. A first focal plane reticle can be positioned and spaced along the viewing optical axis A from the objective lens assembly.

In one embodiment, a picture or image reversal lens assembly can be positioned and spaced rearwardly along the viewing optical axis A from the first focal plane reticle. An erector tube having an erecting image system is located within the main body between the objective lens and the ocular lens in order to flip the image. This gives the image the correct orientation for land viewing. The erecting image system is usually contained within an erector tube.

The reversal lens assembly or erecting image system can comprise one or more lenses spaced apart from each other. The erector image system may include one or more movable optical elements, such as a focus lens that is movable along its optical axis to adjust the focus of the image and a magnification lens movable along its optical axis to optically magnify the image at the rear focal plane so that the target appears closer than its actual distance. Typically, the erector assembly includes a mechanical, electro-mechanical, or electro-optical system to drive cooperative movement of both the focus lens and one or more power-varying lens elements of the magnification lens to provide a continuously variable magnification range throughout which the erector assembly produces a focused, erect image of the distant target at the rear focal plane.

Variable magnification can be achieved by providing a mechanism for adjusting the position of the erector lenses in relationship to each other within the erector tube. This is typically done through the use of a cam tube that fits closely around the erector tube Each erector lens (or lens group) is mounted in an erector lens mount that slides within the erector tube. An erector sleeve attached to the erector lens mount slides in a straight slot in the body of the erector tube to maintain the orientation of the erector lens. The erector sleeve also engages an angled, or curving, slot in the cam tube. Turning the cam tube causes the erector lens mount to move lengthwise within the guide tube, varying the magnification. Each erector lens will have its own slot in the cam tube and the configuration of these slots determines the amount and rate of magnification change as the cam tube is turned.

An aperture in a second focal plane can be positioned and spaced rearwardly along the viewing optical axis A from the picture reversal assembly. An ocular lens assembly can be positioned and spaced rearwardly along the viewing optical axis A from the aperture in the second focal plane, at the eyepiece. The ocular lens assembly can include one or more lenses spaced apart from each other. In some embodiments, the viewing optical axis A and the direct viewing optics can be folded.

In one embodiment, the main body has a beam combiner. In one embodiment, the beam combiner can be positioned on and optically coupled to a viewing optical axis 44 as shown in FIG. 1B. In one embodiment, a beam combiner can be positioned near a viewing optic reticle. In another embodiment, a beam combiner can be positioned near a first focal plane viewing optic reticle.

In one embodiment, the beam combiner is located between the objective assembly and the first focal plane.

In still another embodiment, the main body has a beam combiner, wherein the beam combiner is not located near the ocular assembly. In one embodiment, the beam combiner is not located beneath the ocular assembly.

In one embodiment, the main body has a beam combiner that is located closer to the objective assembly as compared to the ocular assembly in the main tube of the viewing optic.

Figure 3:
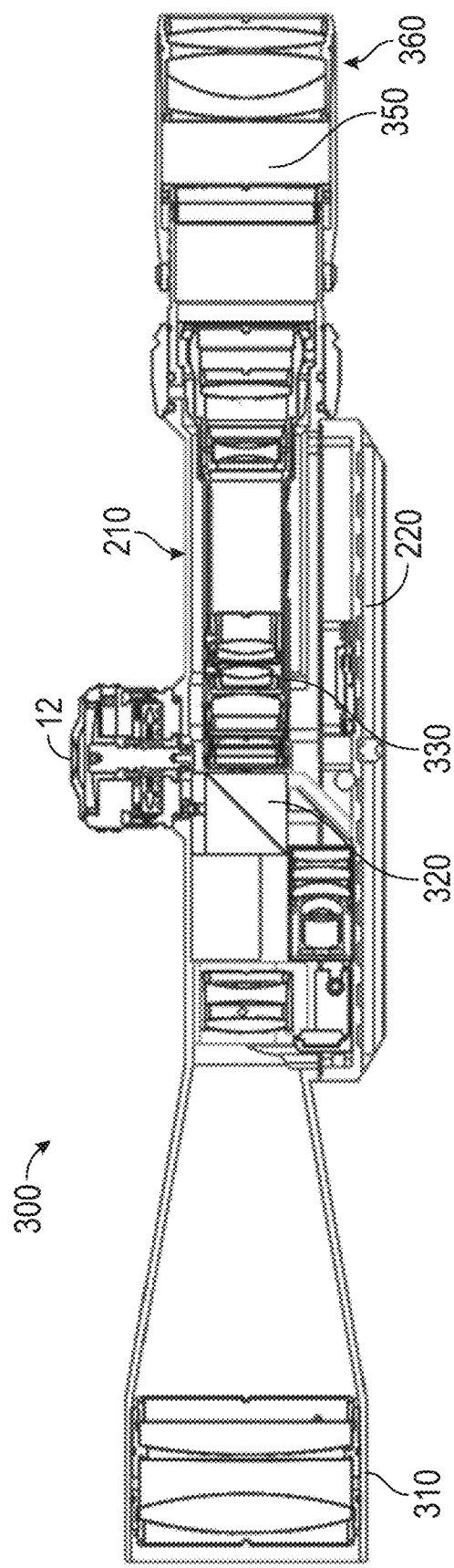
FIG. 3 is a cross-sectional view of a viewing optic with a main body having a beam combiner located between the objective assembly and the first focal plane according to one embodiment of the disclosure.

FIG. 3 displays a side cut-away view of a riflescope 300 with a main body 210 and a base 220. As shown, riflescope 300 has an objective assembly 310, a beam combiner 320, a first focal plane 330, a second focal plane 350, and an ocular assembly 360. The beam combiner 320 is located between the objective assembly 310 and the first focal plane 330.

In one embodiment, the viewing optic 400 can have a main body 210 that is longitudinally split to allow for assembly of the associated lenses and circuitry in the base 220. FIG. 4 is a representative example of a longitudinally split main tube 210 of a riflescope 400. FIG. 4 depicts the parting line 410 of the longitudinally split main tube. The split 420 in the bottom side of the main body 210 allows for coupling of a base 220 having an integrated display system.

In one embodiment, the bottom side of the main body has a longitudinal split. In one embodiment, the longitudinal split is approximately the length of the base that couples to the main body.

In one embodiment, the main body does not have an active display.

1. Beam Combiner

In one embodiment, the main body of the viewing optic has a beam combiner. In one embodiment, the beam combiner is one or more prismatic lenses (the prismatic lenses constitute the beam combiner). In another embodiment, the main body of the riflescope has a beam combiner that combines images generated from an integrated display system with images generated from the viewing optics along the viewing optical axis of the riflescope. In one embodiment, the integrated display system is located in a housing, which is separate and distinct from the main body. In one embodiment, the integrated display system is in a base that couples to the first housing or main body. In one embodiment, the integrated display system is in a cavity of a base that couples to the first housing or main body.

In one embodiment, a beam combiner is used to combine a generated image from an integrated display system with an image from an optical system for viewing an outward image, wherein the optical system is located in a main body of a riflescope, in front of a first focal plane in the main body, and then the combined image is focused onto the first focal plane, such that the generated image and the viewed image did not move in relation to one another. With the combined image focused onto the first focal plane, an aiming reference generated by the integrated display system will be accurate regardless of adjustments to the movable erector system.

In one embodiment, a beam combiner can be aligned with the integrated display system along the display optical axis and positioned along the viewing optical axis of the viewing optics of the main body of a riflescope, thereby allowing for the images from the integrated display to be directed onto the viewing optical axis for combining with the field of view of the viewing optics in an overlaid manner.

In another embodiment, the beam combiner and the integrated display system are in the same housing. In one embodiment, the beam combiner is approximately 25 mm from the objective assembly.

In one embodiment, the beam combiner is approximately 5 mm distance from the objective assembly. In one embodiment the beam combiner is positioned at a distance from the objective assembly including but not limited to from 1 mm to 5 mm, or from 5 mm to 10 mm or from 5 mm to 15 mm, or from 5 mm to 20 mm, or from 5 mm to 30 mm, or from 5 mm to 40 mm or from 5 to 50 mm.

In yet another embodiment, the beam combiner is positioned at a distance from the objective assembly including but not limited to from 1 mm to 4 mm, or from 1 mm to 3 mm, or from 1 mm to 2 mm.

In one embodiment, the beam combiner is positioned at a distance from the objective assembly including but not limited to at least 3 mm, at least 5 mm, at least 10 mm, and at least 20 mm. In yet another embodiment, the beam combiner is positioned at a distance from the objective assembly from 3 mm to 10 mm.

In another embodiment, the beam combiner is approximately 150 mm distance from the ocular assembly. In one embodiment the beam combiner is positioned at a distance from the ocular assembly including but not limited to from 100 mm to 200 mm or from 125 mm to 200 mm or from 150 mm to 200 mm or from 175 mm to 200 mm.

In one embodiment the beam combiner is positioned at a distance from the ocular assembly including but not limited to from 100 mm to 175 mm or from 100 mm to 150 mm or from 100 mm to 125 mm.

In one embodiment the beam combiner is positioned at a distance from the ocular assembly including but not limited to from 135 mm to 165 mm or from 135 mm to 160 mm or from 135 mm to 155 mm or from 135 mm to 150 mm or from 135 mm to 145 mm or from 135 mm to 140 mm.

In one embodiment the beam combiner is positioned at a distance from the ocular assembly including but not limited to from 140 mm to 165 mm or from 145 mm to 165 mm or from 150 mm to 165 mm or from 155 mm to 165 mm or from 160 mm to 165 mm.

In one embodiment the beam combiner is positioned at a distance from the ocular assembly including but not limited to at least 140 mm or at least 145 mm or at least 150 mm or at least 155 mm.

In still another embodiment, the main body has a beam combiner, wherein the beam combiner is located beneath the elevation turret on the outside center part of the scope body.

In one embodiment, the beam combiner can have a partially reflecting coating or surface that reflects and redirects the output or at least a portion of the active display output from the integrated display system onto the viewing axis to the viewer's eye at eyepiece while still providing good transmissive see-through qualities for the direct viewing optics path.

In one embodiment, the beam combiner can be a cube made of optical material, such as optical glass or plastic materials with a partially reflective coating. The coating can be a uniform and neutral color reflective coating, or can be tailored with polarizing, spectrally selective or patterned coatings to optimize both the transmission and reflection properties in the eyepiece. The polarization and/or color of the coating can be matched to the active display. This can optimize reflectance and efficiency of the display optical path with minimal impact to the direct viewing optics transmission path.

Although the beam combiner is shown as a cube, in some embodiments, the beam combiner can have different optical path lengths for the integrated display system, and the direct viewing optics along viewing optical axis A. In some embodiments, the beam combiner can be of a plate form, where a thin reflective/transmissive plate can be inserted in the direct viewing optics path across the optical axis A.

In one embodiment, the position of the beam combiner can be adjusted in relation to the reflective material to eliminate any errors, including but not limited to parallax error. The position of the beam combiner can be adjusted using a screw system, a wedge system or any other suitable mechanism.

In one embodiment, the position of the beam combiner can be adjusted in relation to the erector tube to eliminate any errors, including but not limited to parallax error.

2. Parallax System

In one embodiment, main body has a parallax adjustment system. In one embodiment, the parallax adjustment system uses a device to connect a focusing cell to the parallax adjustment element.

In one embodiment, the viewing optic disclosed herein has a main body with a focusing cell located closer to the objective end as compared to a traditional focusing cell and a beam combiner located in a space traditionally occupied by the focusing cell. In one embodiment, a connecting element connects the focusing cell to a parallax adjustment element.

Figure 5A:
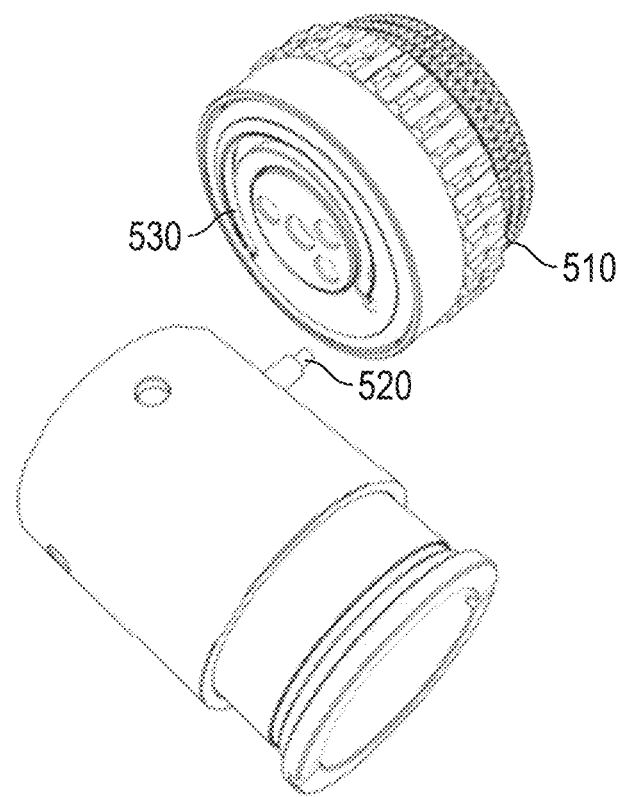
FIG. 5A is a representative schematic of a traditional parallax adjustment knob with a cam pin that rests in a cam grove on the parallax knob.
Figure 5B:
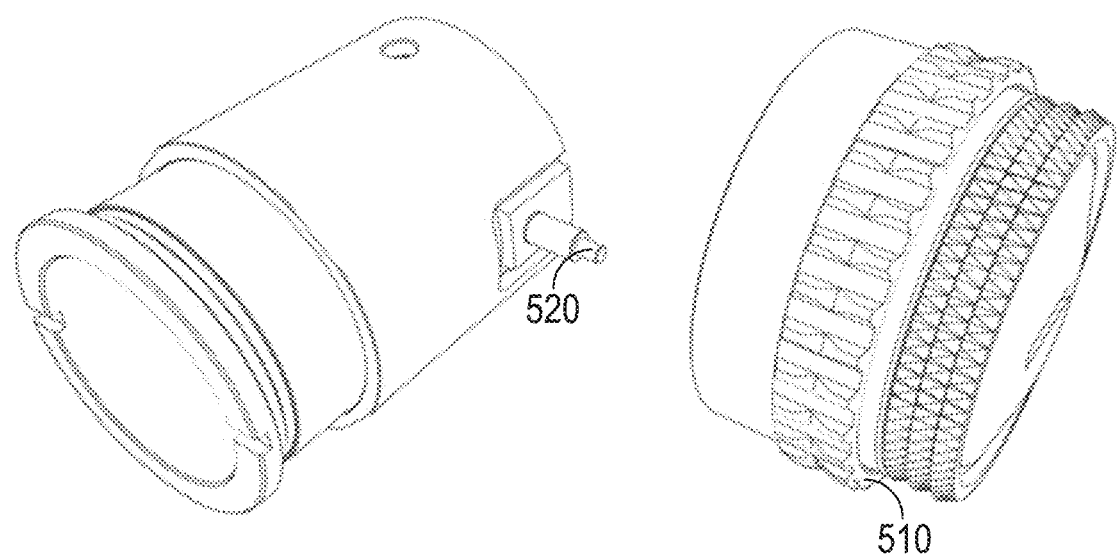
FIG. 5B is a representative schematic of traditional parallax adjustment knob showing a cam pin connecting aspects of a focus cell to a parallax knob.

In a typical riflescope, as depicted in FIG. 5A and FIG. 5B, the parallax knob 510 is connected to the focusing cell via a simple cross pin 520 that rides on a cam groove 530 in the parallax knob, converting the rotational motion of the knob into linear motion within the focusing cell. However, in some embodiments disclosed herein, the focusing cell is shifted toward the objective side, and thus, a connecting device is needed to connect the focusing cell to the parallax adjustment element.

The parallax adjustment system can eliminate or reduce parallax error between the image of the active display and a reticle in the main body of the viewing optic. The parallax adjustment system disclosed herein allows for a viewing optic having a digital display image and an image of an outward scene integrated into a first focal plane (FFP) of an optic system without parallax error.

In another embodiment, the focusing cell is located closer to the objective side of the main body as compared to the focusing cell of a traditional riflescope. In one embodiment, the focusing cell is shifted from about 5 mm to about 50 mm closer to the objective as compared to a focusing cell of a traditional riflescope. In one embodiment, the focusing cell is shifted at least 20 mm closer to the objective as compared to a focusing cell of a traditional riflescope. In one embodiment, the focusing cell is shifted at least 10 mm closer to the objective as compared to a focusing cell of a traditional riflescope. In yet another embodiment, the focusing cell is shifted no more than 50 mm closer to the objective side as compared to a focusing cell of a traditional riflescope. In one embodiment, the focusing cell is shifted 30 mm closer to the objective assembly as compared to the location of a focusing cell in a Vortex Diamondback riflescope, Vortex Viper riflescope, Vortex Crossfire riflescope, Vortex Razor riflescope.

In one embodiment the focusing cell is shifted closer to the objective as compared to a focusing cell of a traditional riflescope including but not limited to 15, 16, 17, 18, 19, 20, 21, 22, 23, 24, 25, 26, 27, 28, 29, 30, 31, 32, 33, 34, 35, 36, 37, 38, 39, and 40 mm closer to the objective side of the viewing optic.

In one embodiment, a device connects the shifted focusing cell to the adjustment knob. In one embodiment, the device allows for the remote location of the parallax adjustment lenses located in the focusing cell. In one embodiment, the mechanical device is a push-rod, a rod, a shaft, In one embodiment, the rod is from about 5 mm to about 50 mm in length. In one embodiment, the rod is at least 20 mm in length. In one embodiment, the rod is at least 10 mm in length. In yet another embodiment, the rod is no more than 50 mm in length.

In one embodiment the rod is 15, 16, 17, 18, 19, 20, 21, 22, 23, 24, 25, 26, 27, 28, 29, 30, 31, 32, 33, 34, 35, 36, 37, 38, 39, and 40 mm in length.

Figure 5C:
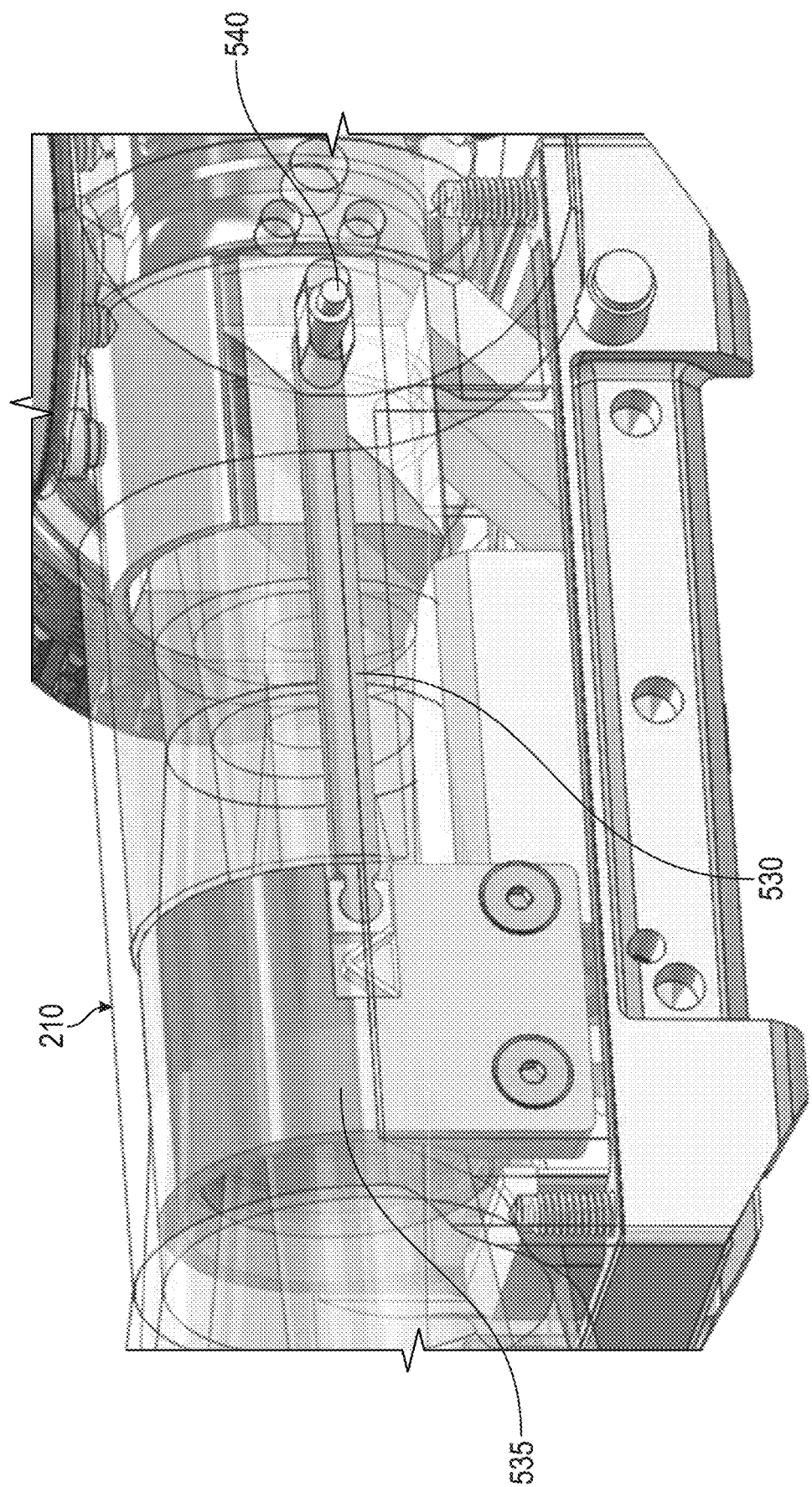
FIG. 5C is a representative schematic of a parallax adjustment system. A connecting rod is shown that can be used for parallax adjustment. The focusing cell (parallax lenses) has been moved to allow space for the beam combiner (prismatic lenses) to be placed forward of the first focal plane according to one embodiment of the disclosure.

FIGS. 5C-5F are representative schematics of a parallax adjustment system in the main tube 210 of a viewing optic according to one embodiment of the disclosure. As shown in FIG. 5C, a device, such as a rod or shaft, 530 connects the focusing cell (parallax lenses) 535, which have been moved closer to the objective end of the viewing optic, to a parallax cam track pin 540 within the parallax adjustment knob assembly. The shifted location of the parallax lenses provides the necessary space for the prismatic lenses forward of the first focal plane. One end of the connecting rod is coupled to the focusing cell and the other end of the connecting rod is coupled to a cam pin.

Figure 5D:
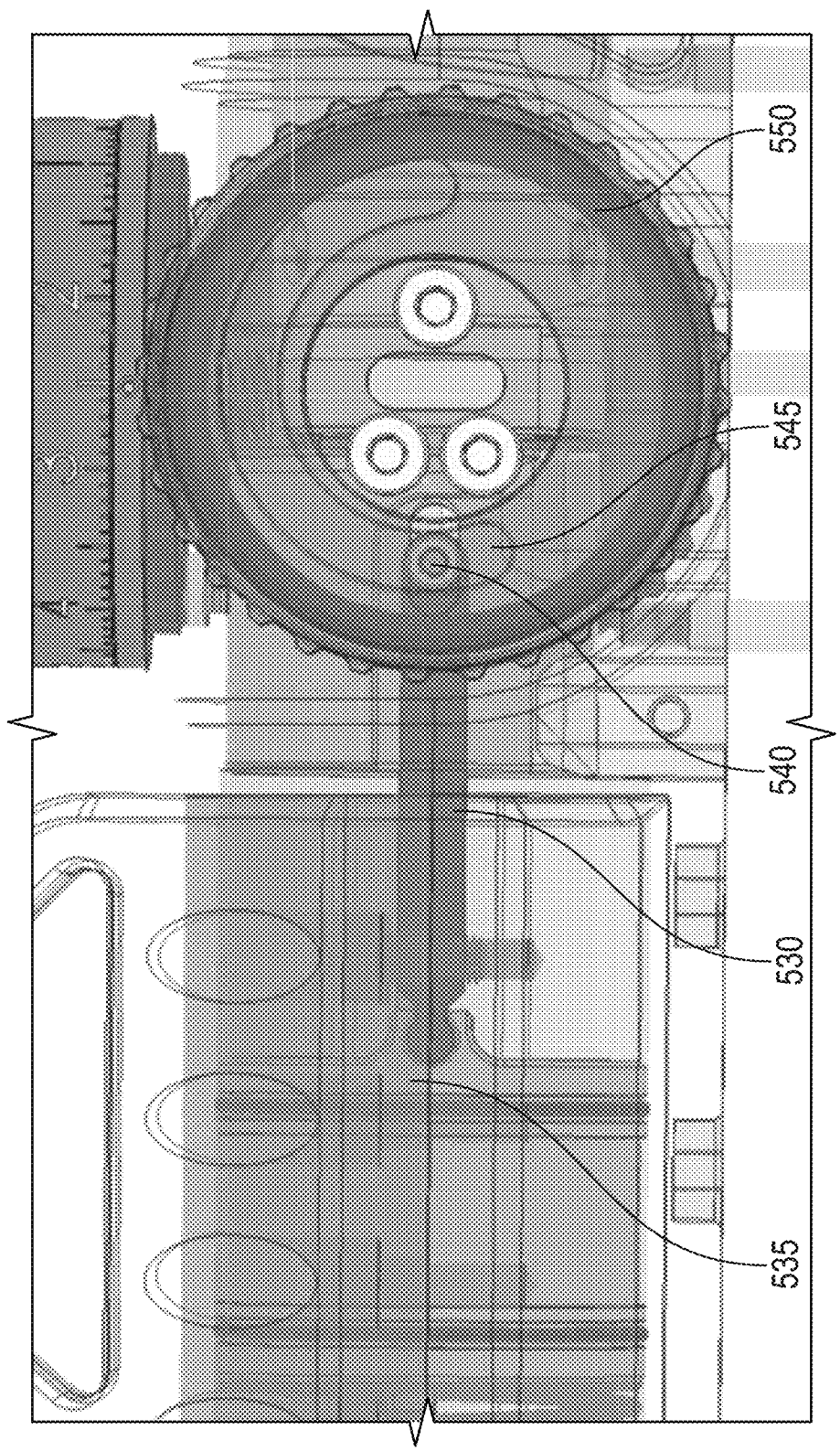
FIG. 5D is a representative schematic of a parallax adjustment system showing one end of the connecting rod having a cam-pin that rests in a cam grove of the parallax adjustment knob assembly according to one embodiment of the disclosure.

FIG. 5D shows the device 530 connecting the focusing cell 535 having the parallax lenses to the parallax cam track pin 540, which rides in the cam track 545 of the parallax adjustment assembly 550. In one embodiment, the parallax adjustment assembly 550 has a rotatable element to move the cam pin and adjust the parallax lenses.

Figure 5E:
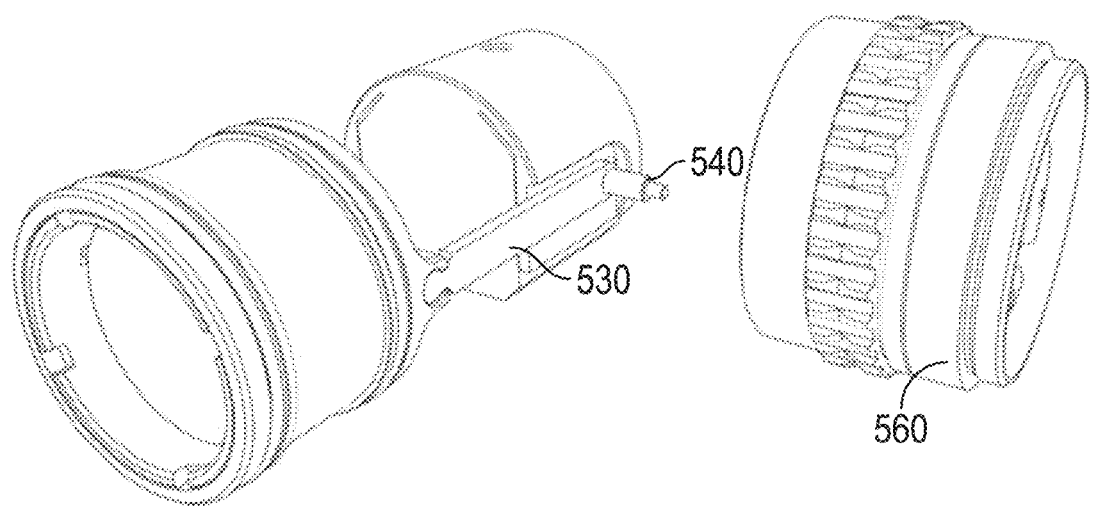
FIG. 5E is a representative schematic of a parallax adjustment system having a connecting rod with one end connected to a focusing cell and the other end of the rod connected to a cam pin according to one embodiment of the disclosure.

As shown in FIG. 5E, in order to provide space in the main body of the viewing optic for the beam combiner (prismatic lenses), the focusing shell is shifted closer to the objective assembly. Thus, a mechanism is needed to connect the focusing cell to the parallax knob assembly. A connecting device 530 connects the focusing cell to a cam pin 540 that rides in a cam groove of the parallax knob assembly 560.

Figure 5F:
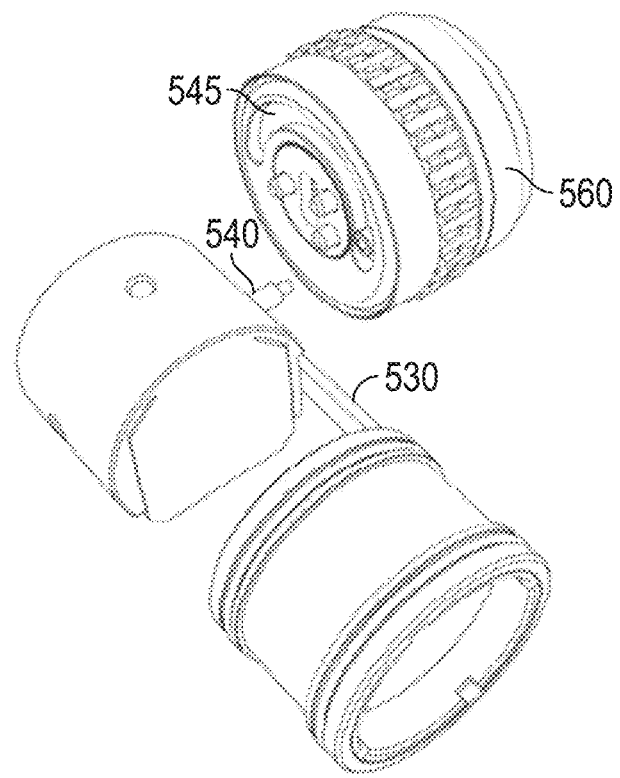
FIG. 5F is a representative schematic of a parallax adjustment system having a connecting rod with one end connected to a focusing cell and the other end of the rod connected to a cam pin that rests in a cam groove on the parallax knob according to one embodiment of the disclosure.

As shown in FIG. 5F the cam pin 540 rides in a cam groove 545 of the parallax knob assembly 560, allowing adjustment of the focusing cell via the parallax knob assembly.

In one embodiment, the shifted focusing cell, which has the parallax lenses, in the main body provides space to integrate a beam combiner ahead of a first focal plane of the objective system.

In one embodiment, the beam combiner in the main body of the riflescope disclosed herein is located in the space where the focusing cell is typically mounted in a traditional riflescope.

In one embodiment, the disclosure relates to a viewing optic comprising: (a) a main tube; (b) an objective system coupled to a first end of the main tube; (c) an ocular system coupled to the second end of the main tube, (d) a focusing cell located between the objective system and a beam combiner, wherein the beam combiner is positioned between the focusing cell and a first focal plane reticle; and (e) a rod connecting the focusing cell to a parallax adjustment element. In one embodiment, the rod connects the focusing cell to a cam pin of the parallax adjustment element. In some embodiments, the parallax adjustment element has a knob.

3. Magnification Tracking System

In one embodiment, the disclosure relates to viewing optic and methods for tracking the magnification setting of a viewing optic, wherein the components of the tracking mechanism are reliable, completely transparent to the operator, and environmentally protected.

When a reticle is in the first focal plane, the reticle is in front of the erector system and thus the reticle changes proportionally with the change in lens position creating a magnified image. The erector system changes position through the use of a magnification ring that is located on the external portion of a rifle scope near the ocular housing. Typically, a magnification ring is connected with a screw to an outer erector sleeve, forcing the outer erector sleeve to rotate with the magnification ring when rotated causing cam grooves to change the position of the zoom lenses located in the erector system. When projecting a digital image onto the first focal plane it is necessary to scale that image with the scaling of the reticle to make the digital image usable.

The magnification adjustment mechanism is coupled to the power-varying lens or zoom lens element, which provides the ability to adjust an optical magnification of the image of the distant object.

Figure 6:
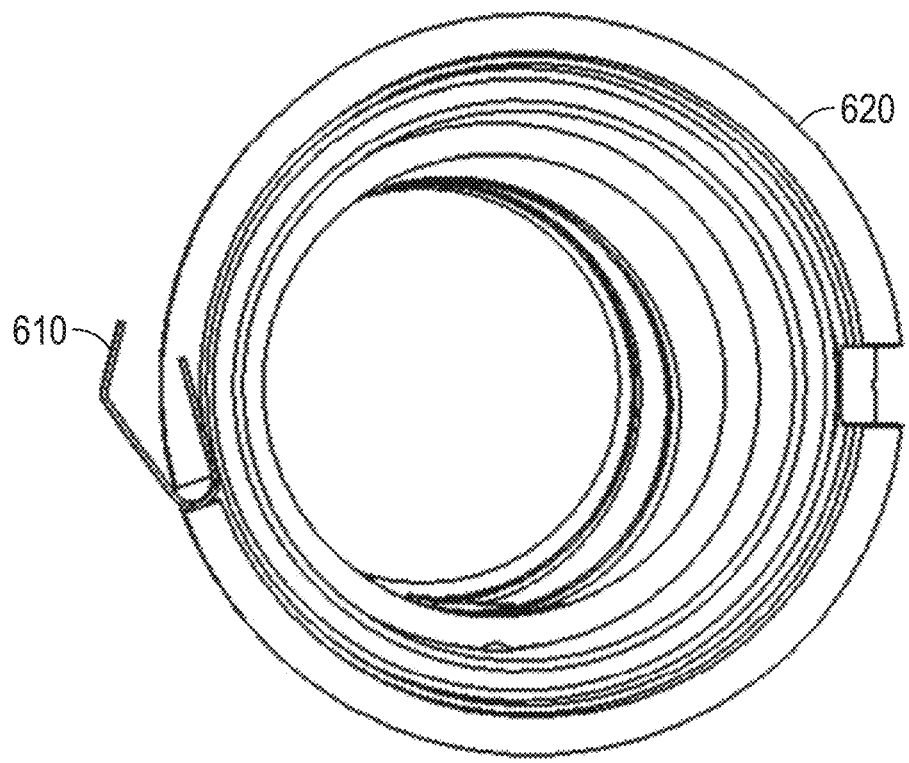
FIG. 6 is a representative schematic showing an outer erector sleeve with a potentiometer wiper according to one embodiment of the disclosure.
Figure 7:
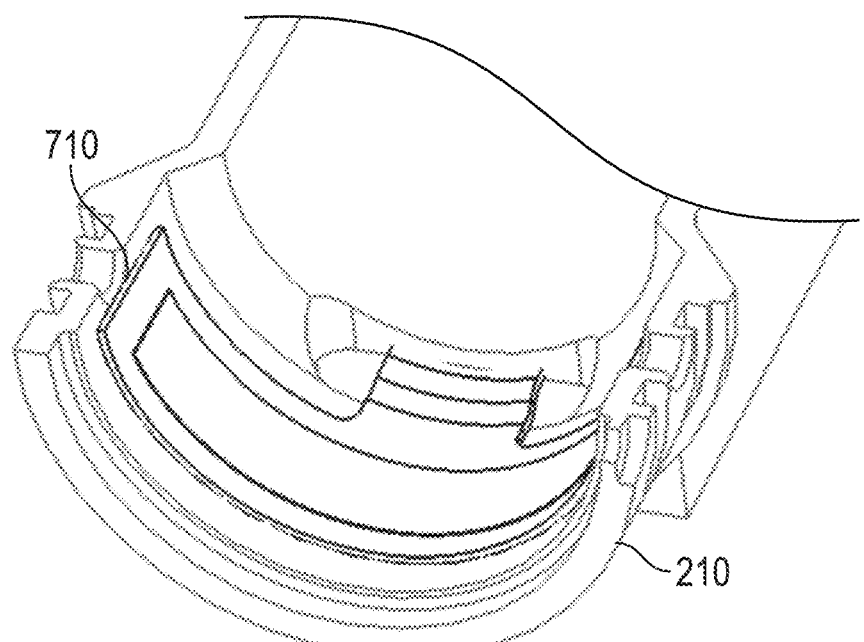
FIG. 7 is a representative schematic showing a membrane potentiometer placement on main body of a riflescope according to one embodiment of the disclosure.

In one embodiment, and as shown in FIG. 6, a potentiometer wiper 610 is located on the outside diameter of an outer erecter sleeve 620. The potentiometer wiper contacts a membrane potentiometer 710 located on the internal diameter of the main body 210 of the riflescope (see FIG. 7).

Figure 8:
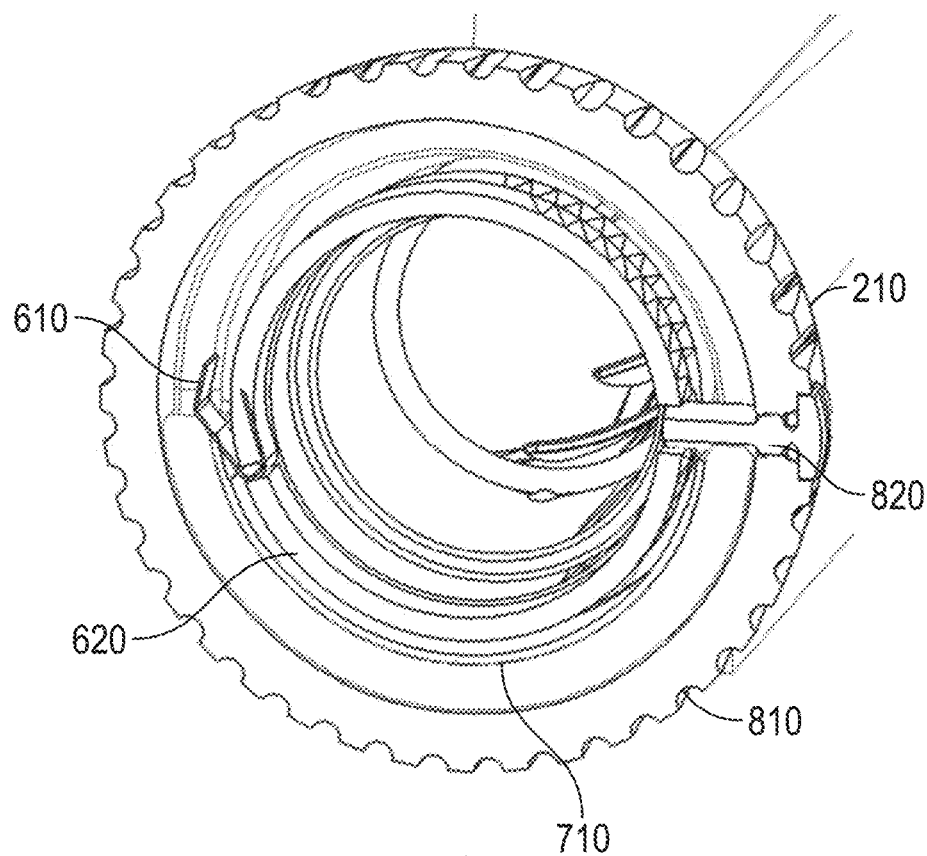
FIG. 8 is a representative schematic showing outer erector sleeve with potentiometer wiper installed and membrane potentiometer installed on main body of a riflescope according to one embodiment of the disclosure.

As shown in FIG. 8, in one embodiment, the potentiometer wiper 610 is a flat spring with two points of contact to insure it maintains contact with the membrane potentiometer 710. The flat spring is located between the outer erector sleeve 620 and inner erector tube. The potentiometer wiper 610 is located on the inside diameter of the riflescope on the opposing inner wall of the magnification ring slot screw 820. The potentiometer wiper 610 is fastened to the side inner side of the scope tube using adhesive.

In one embodiment, the potentiometer wiper has the ability to lay completely flat on the outside diameter of the outer erector sleeve. In one embodiment, the potentiometer wiper is placed internally on the outer erector sleeve.

In one embodiment, the potentiometer wiper is not placed on the magnification ring 810 of FIG. 8.

The magnification tracking system disclosed herein is located internally and no part is exposed to the environment, which offers a few advantages. First, the system is internal resulting in no seals being needed to protect the wiper/erector system from the environment. Secondly, magnification tracking system is completed when the erector system is installed into the riflescope. This eliminates the possibility for debris to enter the system through a screw hole on the exterior of the magnification ring.

In one embodiment, the disclosure relates to a system for tracking magnification setting of a viewing optic, wherein the system uses a sensor and a material that has varying degrees of optical reflectance/absorption. In one embodiment, the sensor is located in a base of a viewing optic, wherein the base couples to the main body of the viewing optic, and the material is located in the main body of a viewing optic.

In one embodiment, the disclosure relates to a viewing optic having a main body comprising an erector tube with an erector lens system, a cam tube or sleeve surrounding or encapsulating the erector tube, a material with varying degrees of optical reflectance/absorption coupled to the cam tube and a base coupled to the main body, wherein the base has an integrated display system and a photosensor for detecting optical reflectance/absorption from the material. In one embodiment, the base has a printed circuit board or microprocessor for communicating with the photosensor and one or more microcontrollers or electronic controllers.

In one embodiment, the viewing optic has a main body with a magnification adjustment ring for adjusting an optical magnification of an image, and a base coupled to the main body having an integrated display system, a micro-processor, and a system to deliver the magnification setting of the optic to the microprocessor, wherein the microprocessor communicates with the active display of the integrated display system.

In one embodiment, the disclosure relates to a system for tracking magnification setting of a viewing optic with no mechanical link between the moving parts of the opto-mechanical system and the sensing device. The magnification tracking system disclosed herein is embedded in a base coupled to the main body of the viewing optic and does not have a mechanical link between the stationary and the moving parts of the system.

In one embodiment, the disclosure relates to a viewing optic having a main body with an erector tube housing an erector lens assembly and a cam sleeve surrounding the erector tube and having a material with varying degrees of optical absorption/reflectance and a base coupled to the main body, wherein the base has a photosensor. In one embodiment, the material with varying degrees of optical absorption/reflectance surrounds the cam sleeve at the end of the cam sleeve near the magnification adjustment ring of the main body. In one embodiment, the photosensor is located beneath the material with varying degrees of optical absorption/reflectance on the cam sleeve.

When the magnification adjustment ring 212 of the viewing optic is rotated by the operator/user, the outer cam sleeve is rotated, which moves two lens cells, thereby changing the effective optical magnification of the riflescope.

In one embodiment, the cam sleeve has material with varying degrees of optical reflectance/absorption. In one embodiment, the material is affixed to the outer diameter of the cam sleeve.

In one embodiment, the material is a strip of material. In one embodiment, the material is approximately 10 mm wide and 40 mm long. In one embodiment, a first side of the material has an adhesive that is used to attach it to the outer cam sleeve. In another embodiment, the other side of the strip has a printed grayscale gradient on it, such that when an LED is directed to it, varying amounts of light are reflected depending on the portion of the gradient being exposed to the LED.

In one embodiment, the PCB has an LED and a photosensor. In one embodiment, the LED and photosensor are located directly beneath the gradient strip, which is attached to the outer diameter of the outer cam sleeve. The LED illuminates the gradient strip and the photosensor receives a portion of the light reflected off the gradient strip, which can then send a signal to a microcontroller, wherein the strength of the signal varies with the amount of light detected.

When the magnification adjustment ring is rotated by the operator a different portion of the gradient strip is exposed to the LED and photosensor, which in turn changes the signal strength sent to a microcontroller. The optical magnification setting of the system is therefore able to be tracked by associating it with the amount of light detected by the photosensor.

Figure 65:
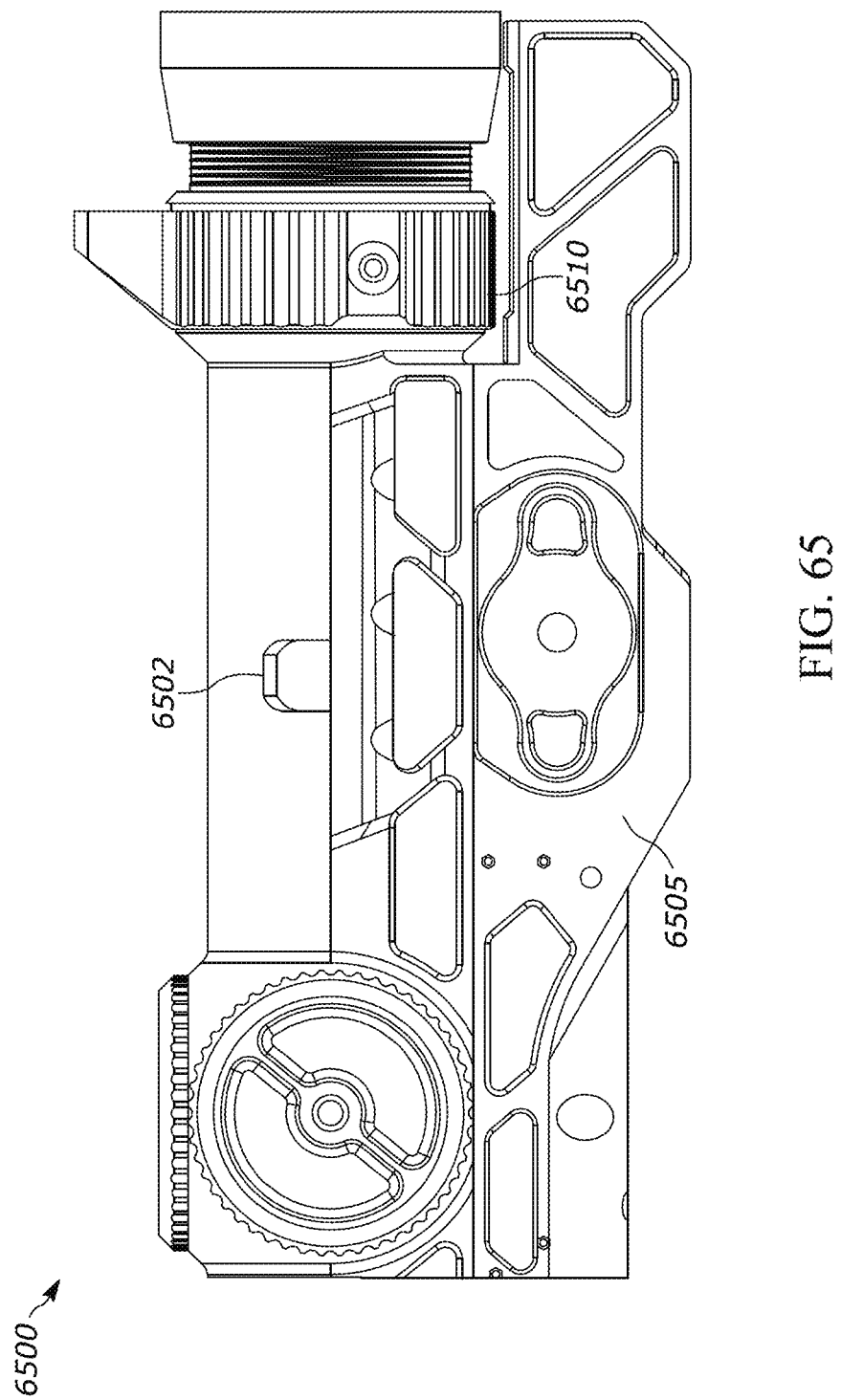
FIG. 65 is a representative depiction of a side view of a 1-8× Active Reticle riflescope. The magnification adjustment ring can be seen on the right side of the image.

FIG. 65 depicts a side view of a 1-8× riflescope 6500 having a main body 6502 and a base 6505 coupled to the main body 6502. The magnification adjustment ring 6510 can be seen on the right side of the image.

Figure 66:
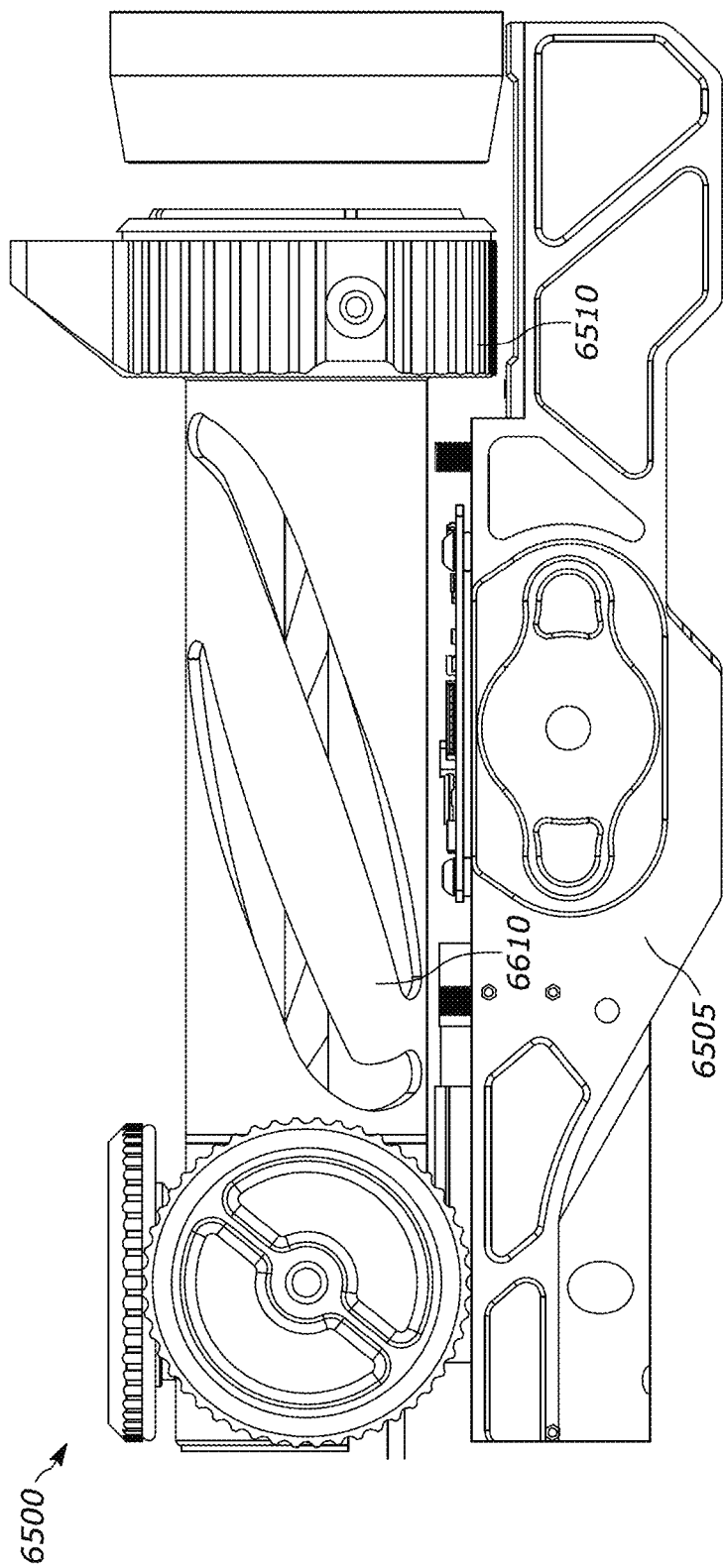
FIG. 66 is a representative depiction of a side view of a 1-8× Active Reticle riflescope with the body of the scope hidden and revealing the outer cam sleeve, which rotates with the magnification adjustment ring thereby changing the magnification setting.

FIG. 66 depicts a side view of riflescope 6500 with the body of the scope hidden and revealing the outer cam sleeve 6610, which rotates with the magnification adjustment ring 6510, thereby changing the magnification setting.

Figure 67:
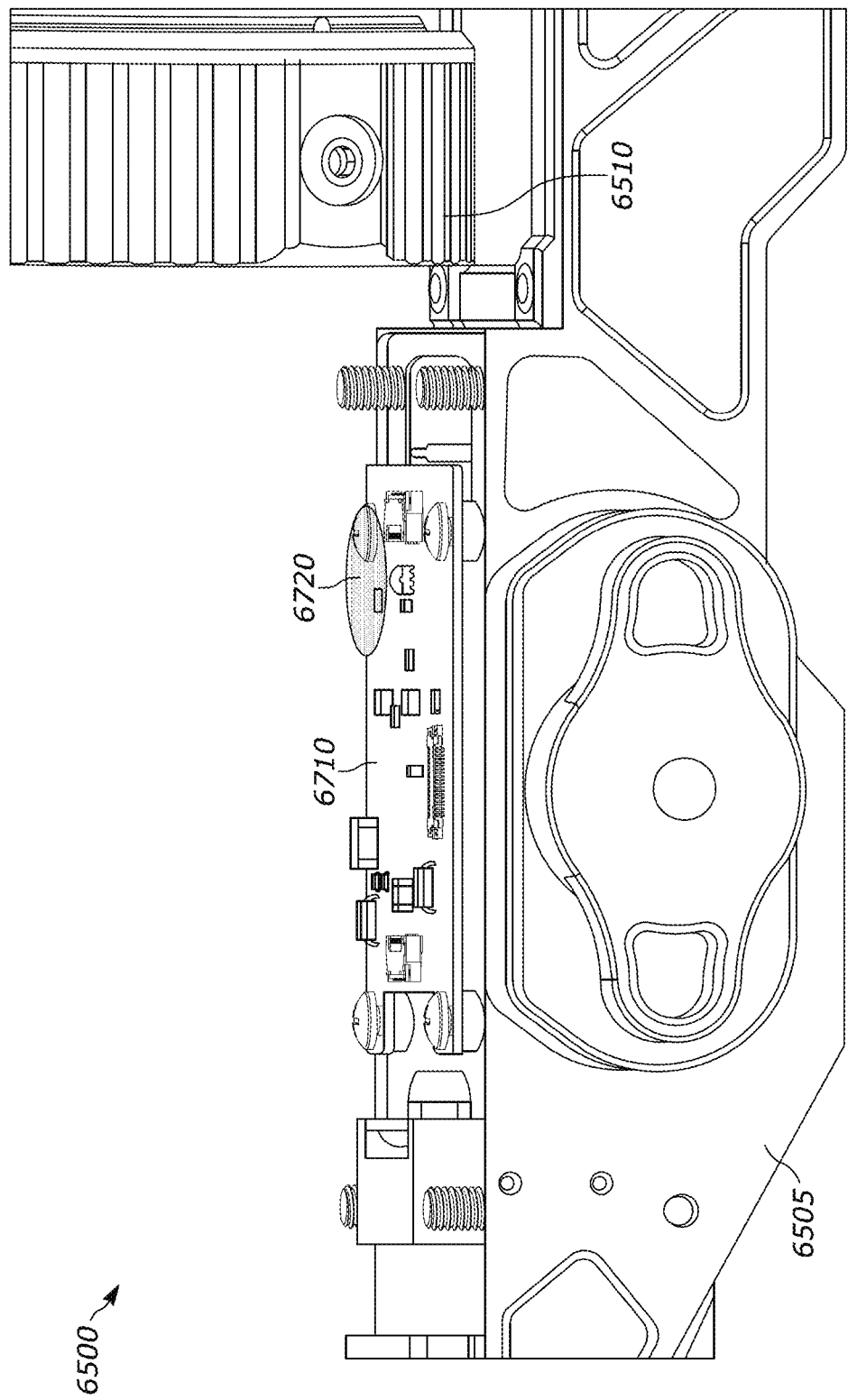
FIG. 67 is a representative depiction a view of the base of the viewing optic with a circuit board that contains the photosensor and LED used to measure the position of the reflective gradient material that is attached to the outer cam sleeve. The outer cam sleeve and associated optical system is hidden in this image.

FIG. 67 depicts a view of the base 6505 of the viewing optic 6500 with a printed circuit board 6710 that contains the photosensor and LED 6720 used to measure the position of the reflective gradient material that is attached to the outer cam sleeve in the main body. The outer cam sleeve and associated optical system is hidden in this image.

Figure 68:
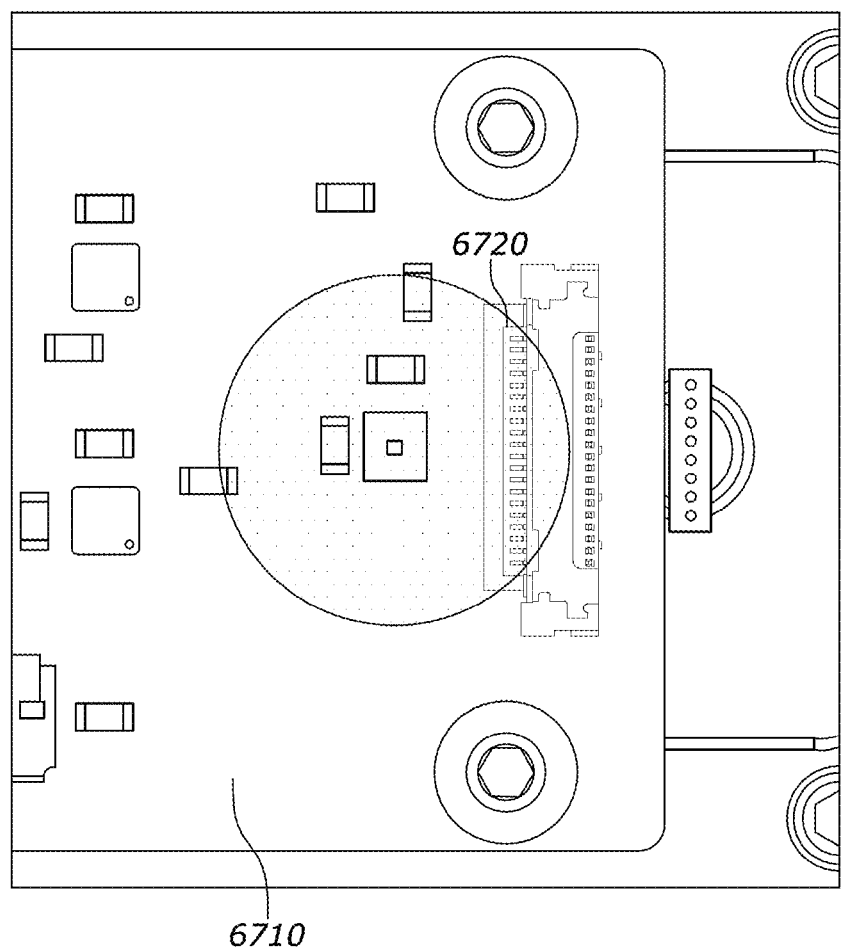
FIG. 68 is a representative exploded view of the photosensor and LED with a simulated cone of vision drawn to illustrate the angle of acceptance of light for the photosensor.

FIG. 68 is an exploded view of printed circuit board 6710 the photosensor and LED 6720 with a simulated cone of vision drawn to illustrate the angle of acceptance of light for the photosensor.

Figure 69:
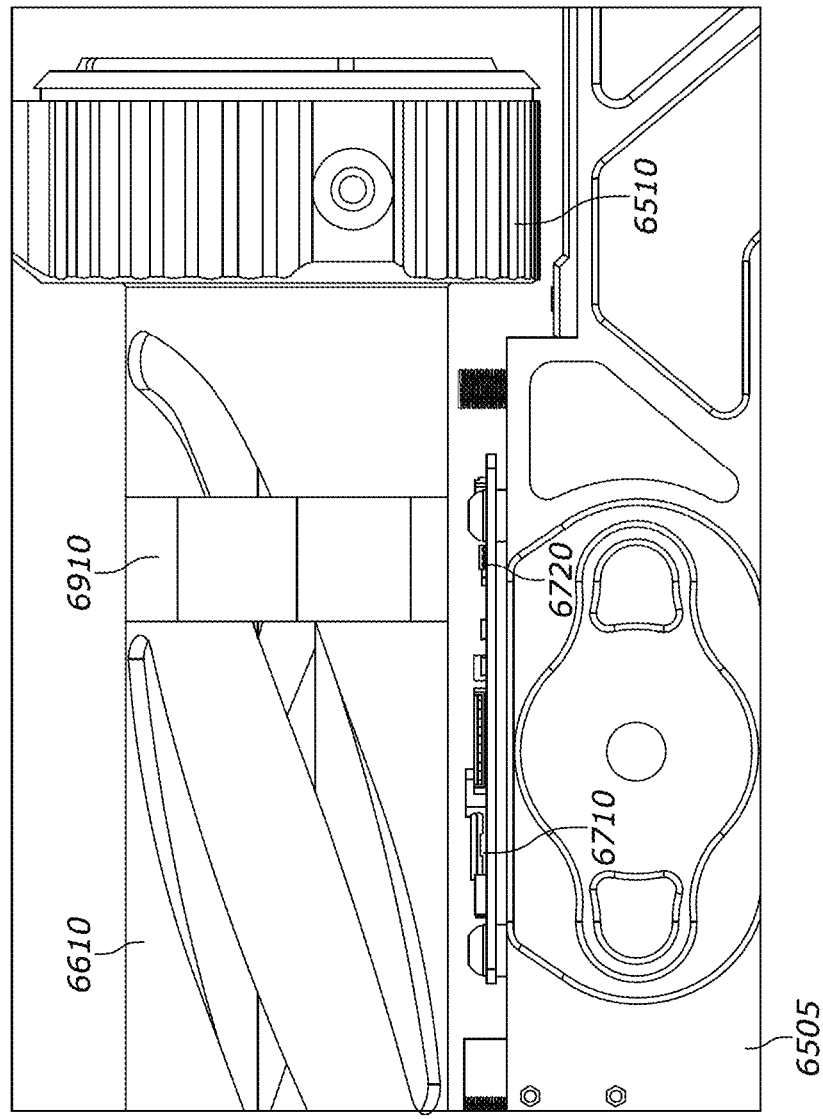
FIGS. 69 and 70 are representative images of the photosensor and LED working in conjunction with the reflective gradient strip that is attached to the outer cam sleeve to measure the magnification setting of the optic. This illustration shows a gradient strip that has 4 specific sections of differing reflectivities, each associated with an optical magnification setting, but it should be noted that this strip could be infinitely varying in its reflectivity.
Figure 70:
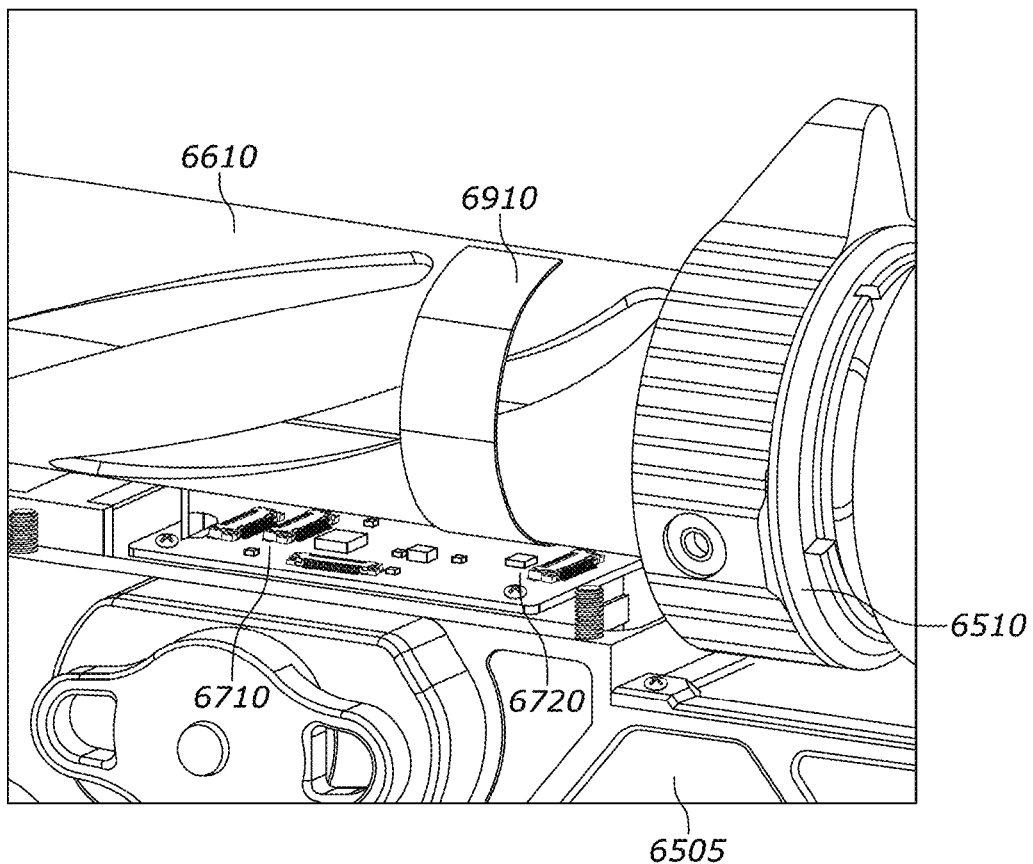

FIGS. 69 and 70 are images of the photosensor and LED 6720 working in conjunction with the reflective gradient strip 6910 that is attached to the outer cam sleeve 6610 to measure the magnification setting of the optic. This illustration shows a gradient strip 6910 that has 4 specific sections of differing reflectivities but it should be noted that this strip could be infinitely varying in its reflectivity. The gradient strip 6910 couples to the cam sleeve at a portion of the cam sleeve located near the magnification adjustment ring. The printed circuit board 6710 is located in the base 6505 that couples to the main body of the viewing optic. The LED and photosensor 6720 on the PCB 6710 are located below the gradient strip 6910.

In one embodiment, the disclosure relates to a viewing optic comprising: a main body with a first end and a second end and having a center axis; an objective lens system disposed within the body; an eyepiece lens disposed within the body; an erector tube disposed within the main body and having an erector lens system; the objective lens system, eyepiece lens, and erector lens system forming an optical system having a first focal plane and a second focal plane, the first focal plane proximate the objective lens system and the second focal plane proximate the eyepiece lens; a cam sleeve surrounding the erector tube that moves in conjunction with a magnification adjustment ring for adjusting the optical magnification of an image, a material with varying degrees of optical absorption/reflectance that is coupled to the cam sleeve; and a base coupled to the main body and having a photosensor that detects the light from the material, a microprocessor in communication with the photosensor, and an active display in communication with the microprocessor that generates an image based on the magnification setting and projects the generated image into the first focal plane of the viewing optic. In one embodiment, the generated image from the active display is based on the signal obtained from the photosensor.

Delivering the magnification setting to the microprocessor has many benefits including but not limited to changing a reticle pattern based on a magnification setting and changing the font size of alpha-numeric information automatically as magnification changes. In addition, if multiple display "pages" are stored in a memory system, the micro-controller can automatically switch between the "display" pages depending on the magnification setting in order to present the operator with the most relevant data.

4. Additional Components

In one embodiment, viewing optic can be controlled by buttons that are integral to the riflescope or externally attached buttons.

In one embodiment, the main body of the viewing optic can have a camera system.

In one embodiment, the main body of the viewing optic may have one or more computational systems. The integrated display system described below may be in communication with, or otherwise associated with the computational system. In some embodiments, the computational system may be enclosed within the first housing or body of the viewing optic. In some embodiments, the computational system may be coupled to an exterior portion of the viewing optic.

Figure 9:
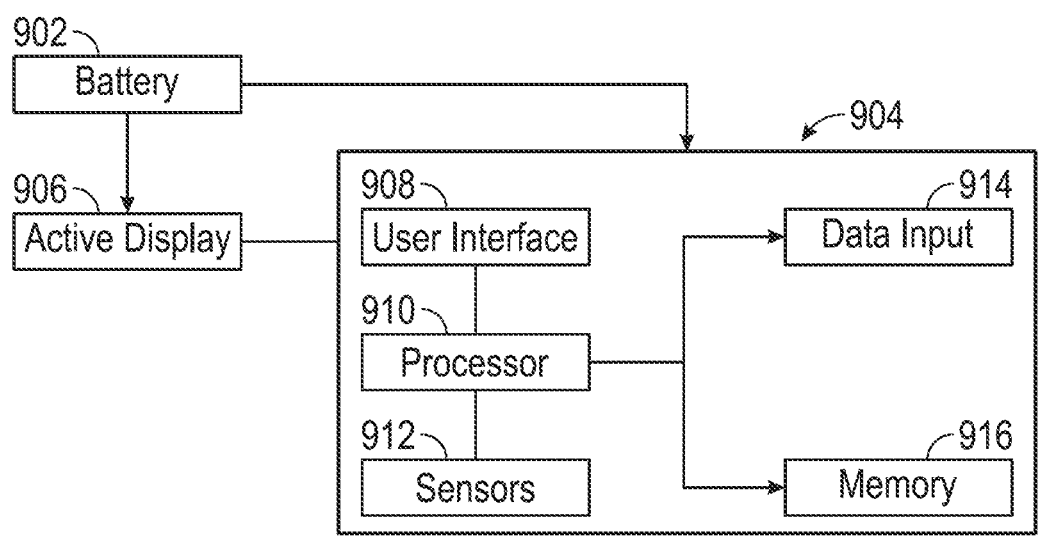
FIG. 9 is a block diagram of various components of the viewing optic according to an embodiment of the disclosure according to one embodiment of the disclosure.

FIG. 9 is a block diagram of various electronic components of the viewing optic according to an embodiment of the disclosure. A battery 902 can provide power to a computational system or control module 904 and an active display 906. In one embodiment, the computational system 904 may include, without limitation, a user interface 908, data input device 914, a processor 910, memory 916, and one or more sensors 912.

In one embodiment, the user interface 908 may include a plurality of input and/or output devices such as buttons, keys, knobs, touchscreens, displays, speakers, microphones, etc. Some components of the user interface such as, for example, buttons, may be used to manually enter data such as, for example, wind data, display intensity data, reticle intensity data, ballistic profile data, ballistic coefficient data, muzzle velocity data, primary zero data, static conditions of the rifle-scope system, GPS coordinate data, compass coordinate data, sight-above-bore data, etc. This data may be received by the processor and saved into the memory. The data may also be used by the processor in an algorithm or to execute an algorithm.

The data input device 914 may include wired or wireless communications devices and/or may include any type of data transfer technology such as, for example, a USB port, a mini USB port, a memory card slot (e.g., a microSD slot), NFC transceiver, Bluetooth® transceiver, Firewire, a ZigBee® transceiver, a Wi-Fi transceiver, an 802.6 device, cellular communication devices, and the like. It is noted that, while termed a data input device, such may be used in two way communications, providing data output as well.

In one embodiment, the processor 910 may be any type of processor known in the art that may receive inputs, execute algorithms and/or processes, and may include, without limitation, one or more general-purpose processors and/or one or more special-purpose processors (such as digital signal processing chips, graphics acceleration chips, and/or the like). The processor may be used to control various processes, algorithms, and/or methods in the operation of the riflescope. The processor may control operation of a display system and/or a reticle. The processor may also receive inputs from the user interface, the data input, the memory, the sensor(s), a position encoder associated with the position of an adjustable component (e.g., the vertical adjustment knob, the windage adjustment knob or the parallax dial), and/or from other sources.

In one embodiment, memory 916 may include any type of digital data storage such as such as random access memory ("RAM") and/or read-only memory ("ROM"), which can be programmable, flash-updateable, and/or the like. In other embodiments, the memory may include memory from an externally connected device including, for example, a disk drive, a drive array, an optical storage device, or a solid-state storage device. In some embodiments, the memory may be configured to store ballistic information that includes data that can be used, for example, to correct for the amount a bullet may drop over a given distance and/or the horizontal deflection of the bullet.

Data may be entered from another device (e.g., the processor may receive data via the data input device that may be entered from another device such as computer, laptop, GPS device, a rangefinder, tablet, or smartphone, etc.) and stored into the memory. Such data may include, for example, calibration data, a ballistic profile lookup table that cross-references rotational data and/or linear data with shoot-to-range values, rifle data, projectile data, user data, etc.

The sensor(s) 912 may be used to sense any of a variety of environmental conditions or characteristics associated with the use of the riflescope. For example, the sensor(s) may sense atmospheric conditions (such as humidity, temperature, pressure, etc.), inclination, rifle cant, and/or the sight direction of the rifle (compass direction). Any number of sensors may be included. Sensor data may be recorded by the processor and saved into the memory and/or used in the processing of instructions for operation of the viewing optic.

The control module 904 may also include software elements, which may be located within working memory 916. The software elements may include an operating system and/or other code, such as one or more application programs.

In one embodiment, a camera can communicate with control module.

B. Second Housing

In one embodiment, the second housing is coupled to the first housing and contains an integrated display system. In one embodiment, the second housing is a base coupled to a portion of the main body of a viewing optic. In one embodiment, the base is separable from the main body of a viewing optic.

In one embodiment, the second housing is not an image stabilization device. In one embodiment, the length of the base having an integrated display system is from 35% to 70% the length of the main body of a riflescope to which the base is coupled. In yet another embodiment, the base having an integrated display system is from 40% to 65% the length of the main body of a riflescope to which the base is coupled. In still another embodiment, the base having an integrated display system is no more than 65% of the length of the main body of the riflescope to which the base is coupled.

In one embodiment, the main body of the riflescope is about 2.5× the length of the base having an integrated display system. In yet another embodiment, the main body is from 1.5× to 2.5× the length of the base having an integrated display system. In yet another embodiment, the main body is at least 1.5× the length of the base having an integrated display system.

As shown in FIG. 2, the base 220 can be bolted to the scope body 210 of the riflescope to form a totally enclosed and integrated system. The base 220 can then be directly attached to the firearm without the need for traditional riflescope rings.

Figure 10:
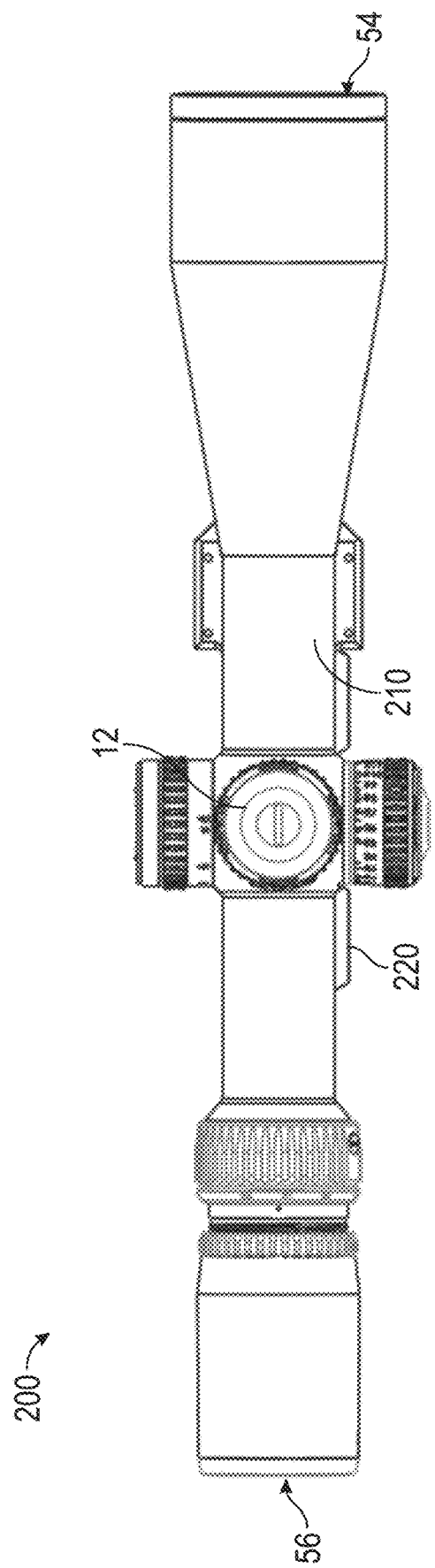
FIG. 10 is top view of a riflescope having a main body and a base according to one embodiment of the disclosure.

FIG. 10 displays a top view of the riflescope 200 with a main body 210 and a base 220. FIG. 10 demonstrates that the base 220 does not cause the riflescope to bulge at any position or be out of proportion with a traditional riflescope. The riflescope disclosed herein having a main body and a base maintains the traditional, sleek design of a riflescope.

Figure 11:
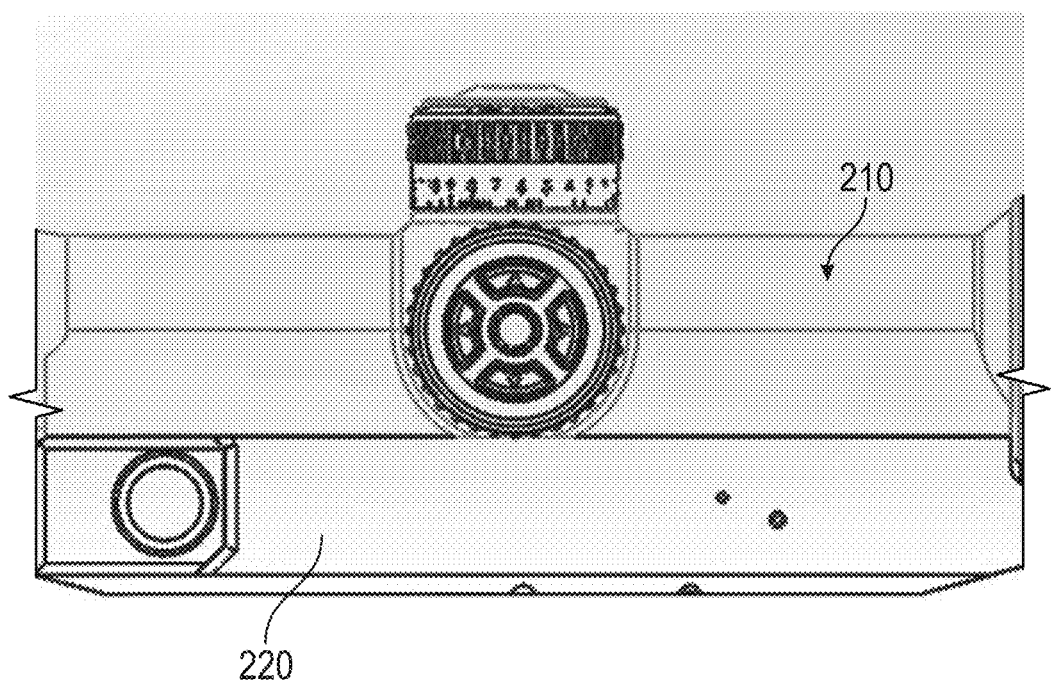
FIG. 11 is a side view of a portion of the riflescope having a main body and a base according to one embodiment of the disclosure.

FIG. 11 displays the base 220 attached to the main body 210 of the riflescope. The base 220 is aligned and flush with the outer edges of the main body 210.

In one embodiment, and as shown in FIG. 2, the base having an integrated display system is coupled to the bottom side of the main body 210 of the riflescope, with one end of the base coupling at approximately the power selection ring or magnification ring 212 of the main body 210 and the other end of the base coupling at about the start of the objective assembly 214 of the main body. In one embodiment, the base 220 is coupled to the main body 210 by threaded fasteners, unthreaded integral and non-integral locating and recoil transmission features, and an elastomeric seal.

In one embodiment, the base can be populated with the components necessary for generating a digital display and then the base can be bolted to the main body of the riflescope to form a totally enclosed and integrated system.

In one embodiment, the base and the main body of the scope are an enclosed, integrated system. In one embodiment, the base is coupled to the main body without the use of clamps, which are designed for easy removal.

In one embodiment, a viewing optic, which has a main body and a base coupled to the main body, can be coupled to a firearm without the need for traditional riflescope rings. In one embodiment, a viewing optic has a main body and a base coupled to the main body, wherein the bottom side of the base has a mounting rail.

In one embodiment, the base of the viewing optic can include a mounting rail for mounting to a desired firearm, equipment or device, and can have an adjustment mechanism including an elevation adjustment drum for adjusting the elevational position of the optics. A lateral adjustment mechanism is also typically provided for side-to-side adjustment. The adjustment mechanisms can be covered with a protection cap.

In one embodiment, the top side of the base couples to the bottom-side of the main body of a viewing optic and the bottom-side of the base has a mounting rail. In one embodiment, the top side of the base couples to a lateral split in the bottom-side of the main body of a viewing optic.

In one embodiment, the base comprises an integrated display system for generating images with an active display and directing the images along the display optical axis for simultaneous overlaid viewing of the generated images with images of the outward scene, wherein the generated image is injected into the first focal plane of a main body of a viewing optic.

In one embodiment, the base is separate and distinct from a laser rangefinder device. In one embodiment, the base is an independent apparatus from a laser rangefinder device.

In one embodiment, the second housing or base is not an add-on accessory. In another embodiment, the second housing or base is not coupled as an add-on accessory adjacent to an eyepiece of the viewing optics with an adapter.

In one embodiment, the second housing or base is not separable from the main body by the end-user. In one embodiment, the second housing or base is not interchangeable with multiple or other viewing optics.

In one embodiment, the disclosure relates to a system comprising a viewing optic having a main body with a first optical system and a base coupled to the main body and having a second optical system, such as an integrated display system, and a laser rangefinder device.

1. Integrated Display System

In one embodiment, the second housing comprises an integrated display system. In another embodiment, a base comprises an integrated display system. In yet another embodiment, the base having an integrated display system is coupled to a main body of a riflescope. In still another embodiment, the base is coupled to a bottom portion of a main body of a riflescope.

In one embodiment, the base has an integrated display system comprising an active display, collector optics, and a reflective material, including but not limited to a mirror. In one embodiment, the integrated display system has the following architecture: an active display, followed by collector optics, followed by a reflective material such as a mirror.

Figure 12:
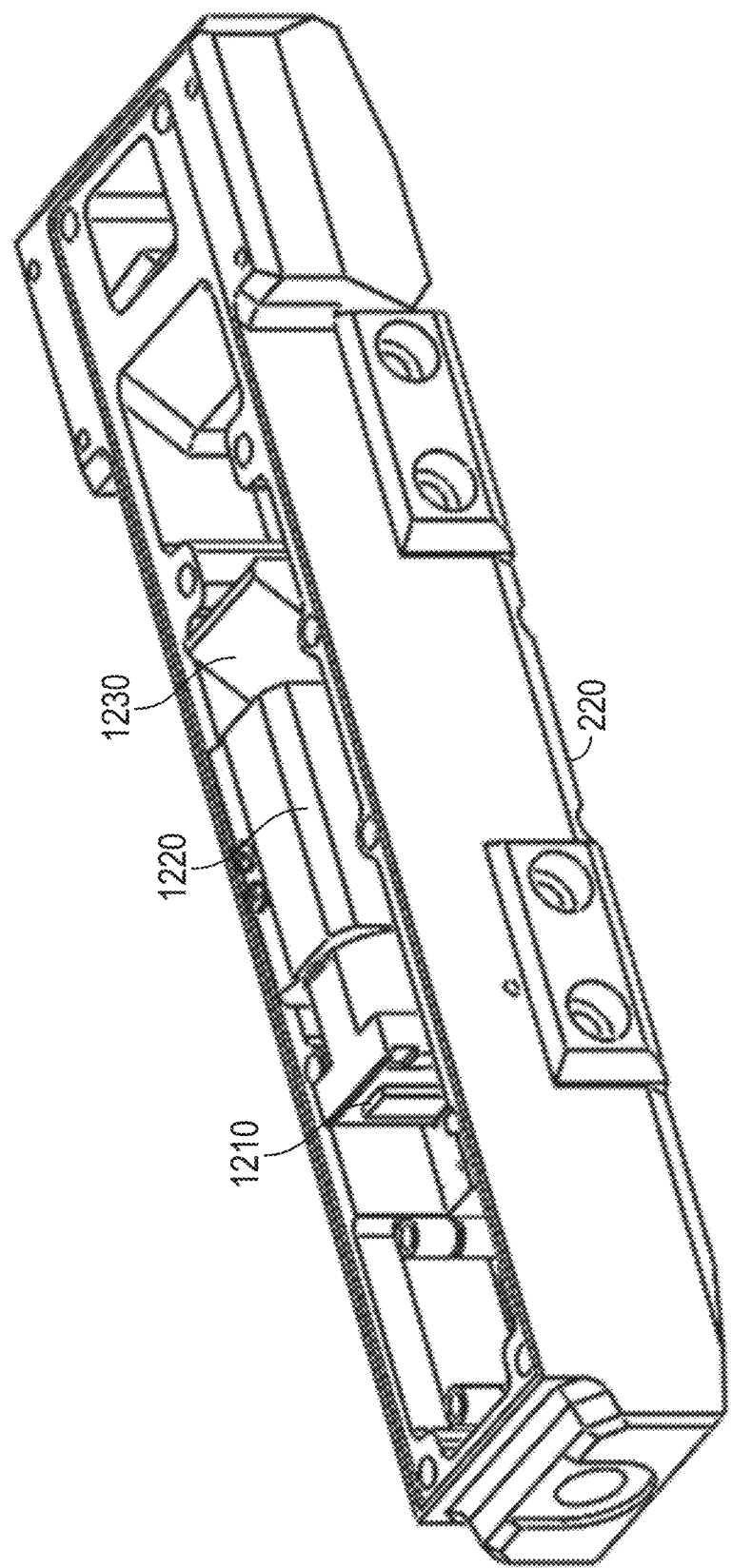
FIG. 12 is a schematic of a cut away side view of the riflescope with a main body having a glass etched reticle and a base with an integrated display system according to one embodiment of the disclosure.

FIG. 12 depicts a top cut-away view of the base 220 that couples to a main body of a viewing optic. The base 220 comprises an integrated display system having a micro display 1210, collector optics 1220, and a mirror 1230. In one embodiment, the mirror 1230 can be positioned at any suitable angle.

Figure 13:
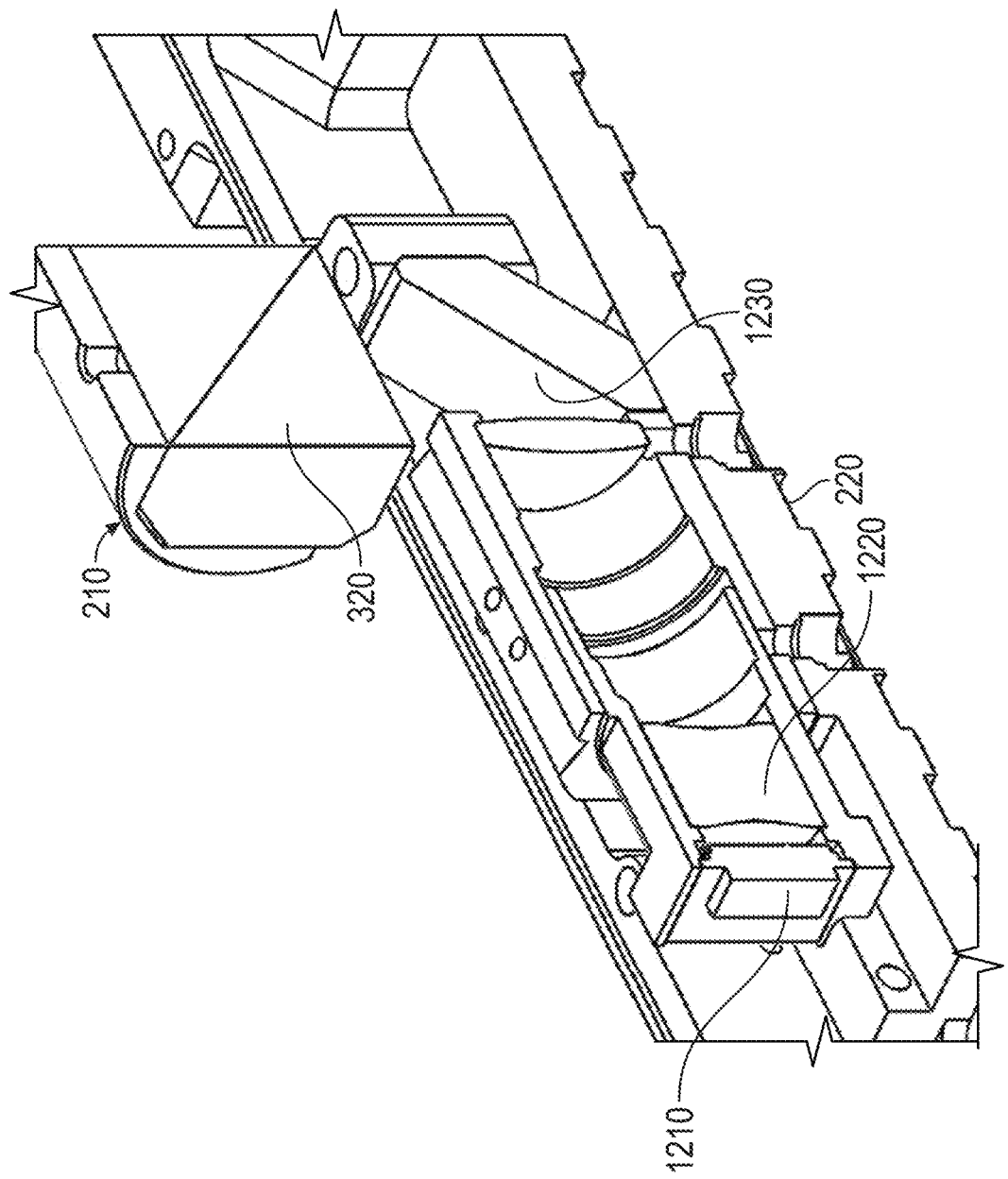
FIG. 13 is a representative schematic of showing a side cutaway view of an integrated display system according to one embodiment of the disclosure.

FIG. 13 depicts a side cut-away view of a base 220 with an integrated display system having a micro display 1210, collector optics 1220, and a mirror 1230. A main body 210 has a beam combiner 320 located above the mirror 1230.

Figure 14:
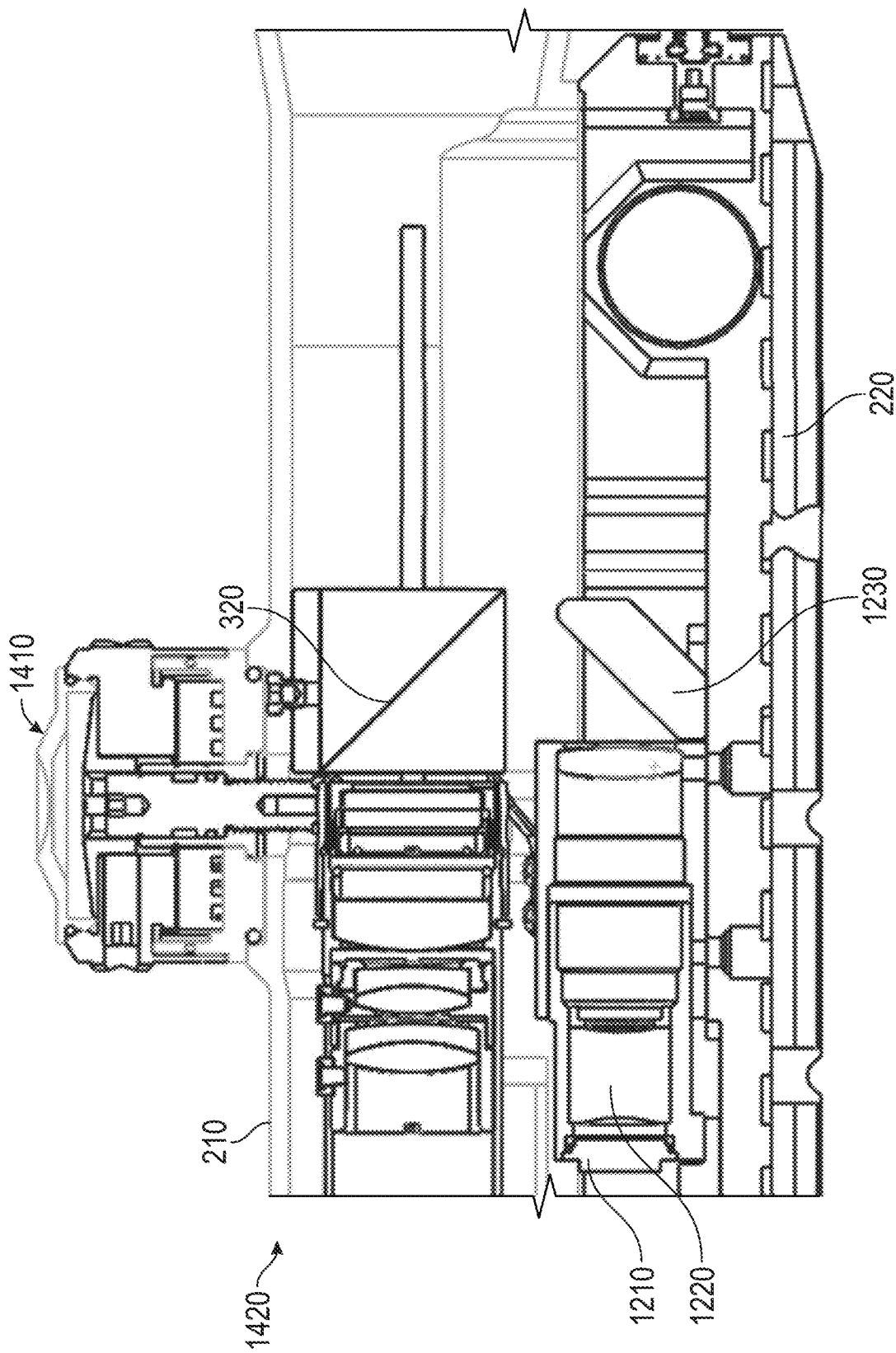
FIG. 14 is a schematic of a cut away side view of a main body of a viewing optic and a base with an integrated display system, with the base coupled to at least a portion of the main body according to one embodiment of the disclosure.

FIG. 14 depicts a side cut-away view of riflescope with a main body 210 and a separable base 220. The base 220 comprises a micro display 1210, collector optics 1220, and a mirror 1230. The mirror 1230 is positioned at about 45 degrees. The scope body 210 has a beam combiner 320 that is located approximately above the angled mirror 1230. The beam combiner 320 is located approximately below the elevation adjustment knob 1410 of the scope body 210. The active display 1210 is located in the base on the ocular assembly side 1420 when the base 220 is coupled to the main body 210 of the viewing optic.

Figure 15:
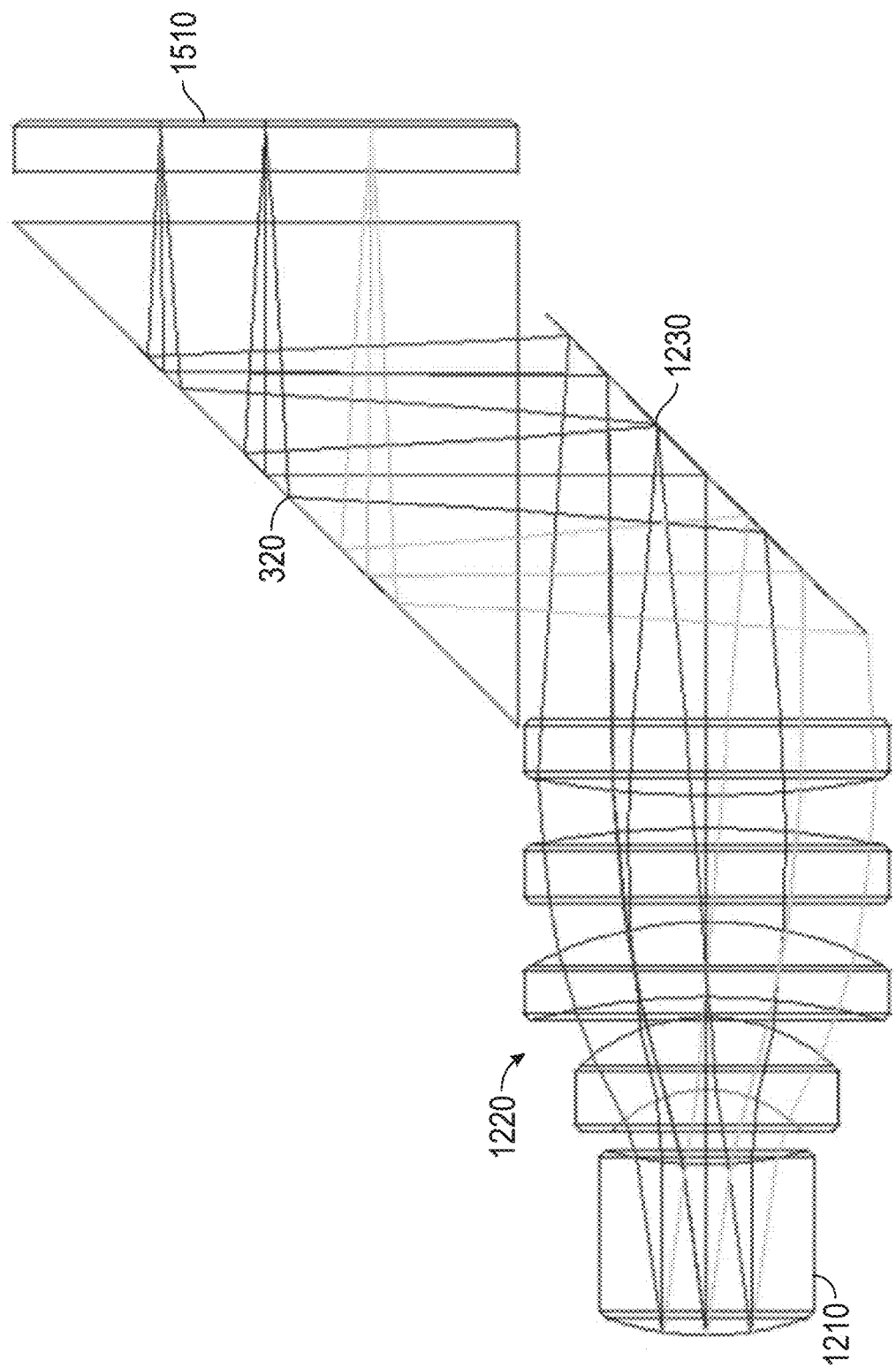
FIG. 15 is a representative depiction of an integrated display system for imaging the digital display onto a first focal plane of an optic system of the main body of the viewing optic according to one embodiment of the disclosure.

As depicted in FIG. 15, the images generated from the micro display 1210 can be redirected from the display optical axis A onto the viewing optical axis A through a mirror 1230 to a beam combiner 320 in the main body 210 for simultaneously superimposing or overlaying into the first focal plane 1510 the digital images onto the images of the scene viewed by the viewer through the optics. Because the beam combiner 320 is positioned before the first focal plane 1510, and the combined image is focused on the first focal plane, the displayed image and the viewed image do not move in relation to one another. This is a major advancement compared to devices that inject the image into the second focal plane.

Figure 16:
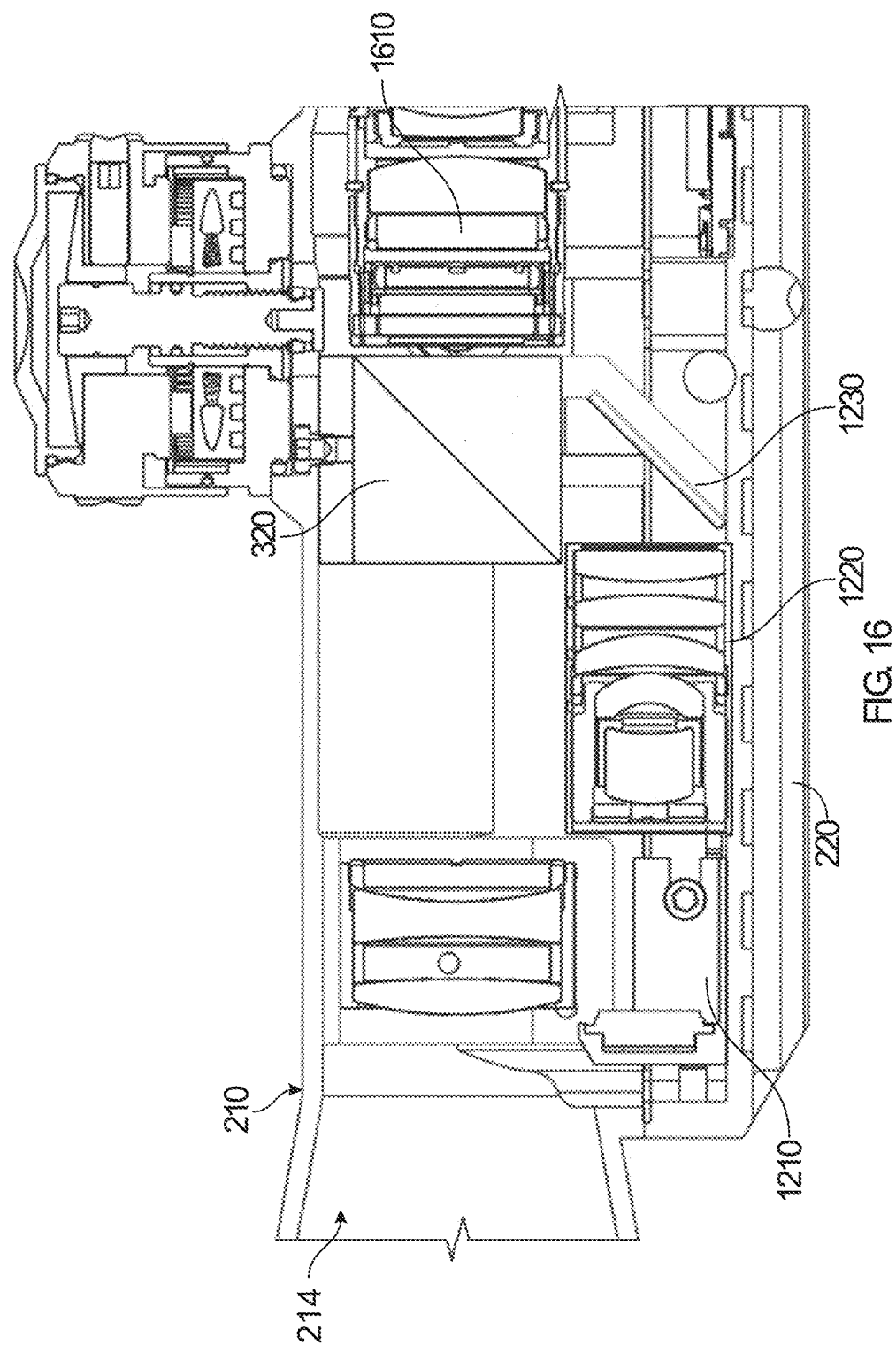
FIG. 16 is a schematic of a main body of a viewing optic and a base with an integrated display system with an active display located in a portion of the base closest to the objective assembly as compared to the ocular assembly of the main body of the viewing optic according to one embodiment of the disclosure.

In one embodiment, as shown in FIG. 16, the active display 1210 is located in a portion of the base closest to the objective assembly 214 as compared to the ocular assembly of the main body of a riflescope, when the base is coupled to the main body of a riflescope. The main body of the riflescope has an analog reticle 1610.

Figure 17:
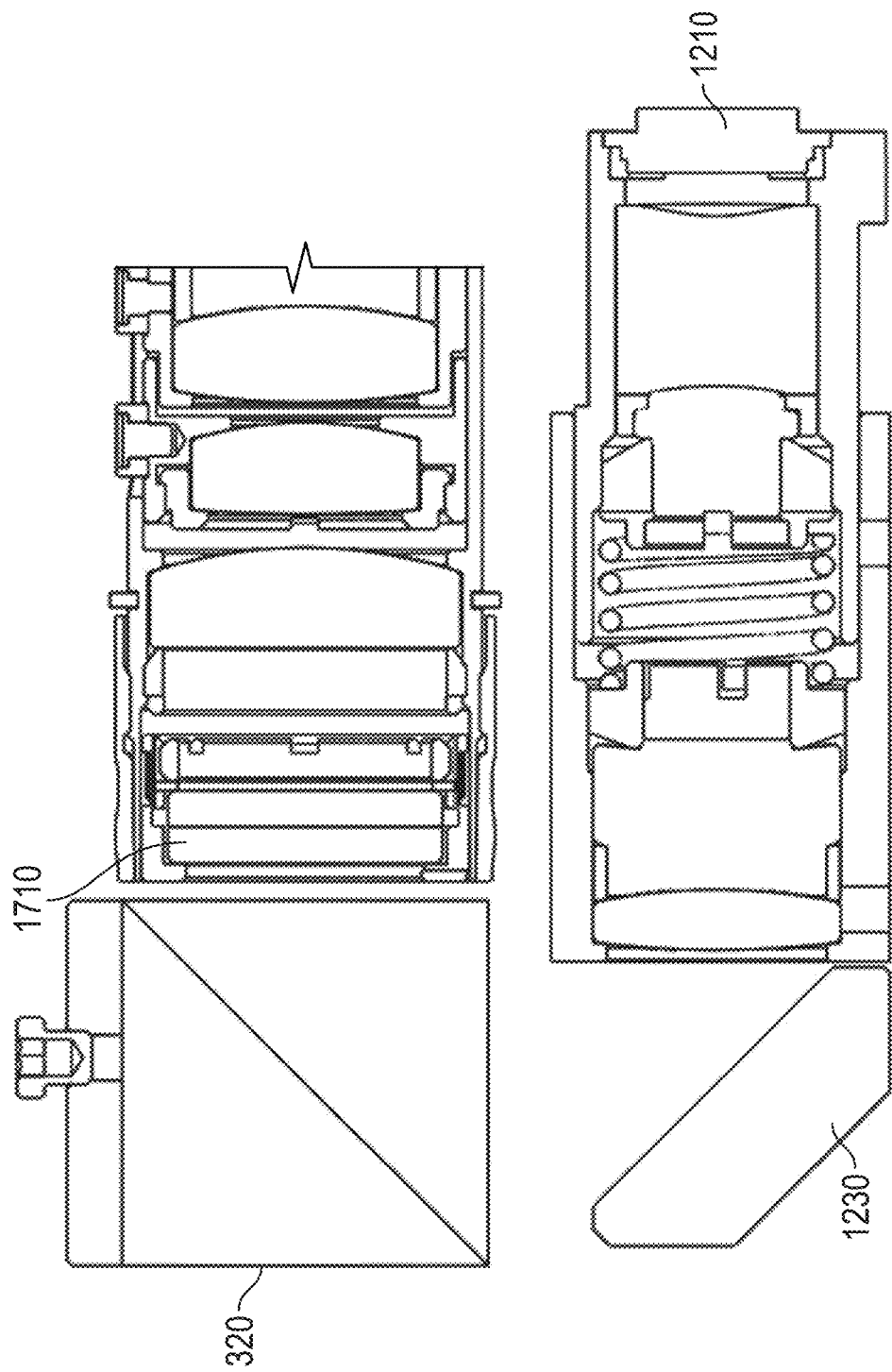
FIG. 17 is a schematic of a main body of a viewing optic and a base with an integrated display system with an active display located in a portion of the base closest to the ocular assembly as compared to the objective assembly of the main body of the viewing optic according to one embodiment of the disclosure.

FIG. 17 depicts the riflescope 200 with a main body 210 with a beam combiner 320 and a base 220 coupled to the main body and having an integrated display system. As shown in FIG. 17, the active display 1210 is located in a portion of the base closest to the ocular assembly as compared to the objective assembly of the main body of a riflescope, when the base is coupled to the main body of a riflescope. By superimposing the image from the integrated display system onto the first focal plane, the user is still able to use a traditional glass etched reticle 1610 for aiming purposes.

In one embodiment, the integrated display system can direct generated images from the active display along a display optical axis A. The generated images can be directed from the display optical axis A to a mirror in the base to a beam combiner in a main body of a riflescope for simultaneously superimposing or overlaying the generated images onto the images of the scene viewed by the viewer through an optics system of the main body, wherein the combined image is injected into or focused onto the first focal plane of the optic system of the main body.

In one embodiment, the image generated from the active display in the base is focused on the first focal plane of the main body of a riflescope, which allows the display generated images to maintain alignment with externally mounted accessories.

In one embodiment, the image generated from the active display in the base is focused on the first focal plane of the main body of a riflescope, thus, the generated image is not tied to the movement of the erector tube. The generated image is independent of movement of the erector tube.

In one embodiment, light from an active micro-display is collected by a group of optical lenses. The light from the display is reflected to a beam combiner in the riflescope main tube assembly and an image of the display is formed that is coincident with the first focal plane of the riflescope. This image of the display is combined with the image coming from the scene (target) and is perceived as being "underneath" the traditional wire or glass etched reticle. In one embodiment, the "traditional" reticle, which is still utilized, occludes both the image of the scene and the image of the display. If the luminance of the display is increased to sufficient brightness levels, the image of the OLED display will saturate the image of the scene and will appear to occlude the scene as well.

In yet another embodiment, the integrated display system in the base can direct generated images along a display optical axis "B," onto viewing optical axis A in the main body of a riflescope. The images can be redirected from the display optical axis B with a mirror or similar reflective material in the base to a beam combiner in the main body onto the viewing optical axis A in the main body, which allows for simultaneously superimposing or overlaying the generated images onto the images of the scene viewed by the viewer through the optics of the main body. The generated images from the active display in the base are directed toward a mirror, which reflects the images to a beam combiner.

In one embodiment, display optical axis "B" and viewing optical axis "A" are substantially parallel, although other embodiments may be differently oriented as desired.

A. Active Display

In one embodiment, the integrated display system has an active display. In one embodiment, the active display is controlled by a microcontroller or computer. In one embodiment, the active display is controlled by a microcontroller with an integrated graphics controller to output video signals to the display. In one embodiment, information can be sent wirelessly or via a physical connection into the viewing optic via a cable port. In still another embodiment, numerous input sources can be input to the microcontroller and displayed on the active display.

In one embodiment, an active display and a beam combiner are not located in the same housing. In one embodiment, an active display and a beam combiner are located in separate housings.

In one embodiment, the active display can be a reflective, transmissive or an emissive micro-display including but not limited to a micro display, transmissive active matrix LCD display (AMLCD), Organic light-emitting diode (OLED) display, Light-Emitting Diode (LED) display, e-ink display, a plasma display, a segment display, an electroluminescent display, a surface-conduction electron-emitter display, a quantum dot display, etc.

In one embodiment, the LED array is a micro-pixelated LED array and the LED elements are micro-pixelated LEDs (also referred to as micro-LEDs or μLEDs in the description) having a small pixel size generally less than 75 μm. In some embodiments, the LED elements may each have a pixel size ranging from approximately 8 μm to approximately 25 μm and have a pixel pitch (both vertically and horizontally on the micro-LED array) ranging from approximately 10 μm to approximately 30 μm. In one embodiment, the micro-LED elements have a uniform pixel size of approximately 14 μm (e.g., all micro-LED elements are the same size within a small tolerance) and are arranged in the micro-LED array with a uniform pixel pitch of approximately 25 μm. In some embodiments, the LED elements may each have a pixel size of 25 μm or less and a pixel pitch of approximately 30 μm or less.

In some embodiments, the micro-LEDs may be inorganic and based on gallium nitride light emitting diodes (GaN LEDs). The micro-LED arrays (comprising numerous μLEDs arranged in a grid or other array) may provide a high-density, emissive micro-display that is not based on external switching or filtering systems. In some embodiments, the GaN-based, micro-LED array may be grown on, bonded on, or otherwise formed on a transparent sapphire substrate.

In one embodiment, the sapphire substrate is textured, etched, or otherwise patterned to increase the internal quantum efficiency and light extraction efficiency (i.e., to extract more light from the surface of the micro-LEDs) of the micro-LEDs. In other embodiments, silver nanoparticles may be deposited/dispersed on the patterned sapphire substrate to coat the substrate prior to bonding the micro-LEDs to further improve the light efficiency and output power of the GaN-based micro-LEDs and of the micro-LED array.

In one embodiment, the active display can be monochrome or can provide full color, and in some embodiments, can provide multi-color. In other embodiments, other suitable designs or types of displays can be employed. The active display can be driven by electronics. In one embodiment, the electronics can provide display functions, or can receive such functions from another device in communication therewith.

In one embodiment, the active display can be part of a backlight/display assembly, module or arrangement, having a backlight assembly including a backlight illumination or light source, device, apparatus or member, such as an LED backlight for illuminating the active display with light. In some embodiments, the backlight source can be a large area LED and can include a first or an integrated lens for collecting and directing generated light to a second, illumination or condenser lens, for collecting, concentrating and directing the light onto active display, along display optical axis B, with good spatial and angular uniformity. The backlight assembly and the active display are able to provide images with sufficient high brightness luminance to be simultaneously viewed with a very high brightness real world view through optics, while being at low power.

The backlight color can be selected to be any monochrome color or can be white to support a full color microdisplay. Other backlight design elements can be included, such as other light sources, waveguides, diffusers, micro-optics, polarizers, birefringent components, optical coatings and reflectors for optimizing performance of the backlight, and which are compatible with the overall size requirements of the active display, and the luminance, power and contrast needs.

FIGS. 16 and 17 depict representative examples of an integrated display system in a base that couples to a main body, showing a display, an optics system, and a mirror. The integrated system functions with an optics system housed in a main body of a viewing optic, which is depicted above the integrated display system.

Representative examples of micro displays that can be used include but are not limited to: Microoled, including MDP01 (series) DPYM, MDP02, and MDP05; Emagin such as the SVGA, micro-displays with pixel pitches are 9.9×9.9 micron and 7.8×7.8 micron, and Lightning Oled Microdisplay, such as those produced by Kopin Corporation. Micro LED displays can also be used including but not limited to those produced by VueReal and Lumiode.

In one embodiment, the electronics working with the active display can include the ability to generate display symbols, format output for the display, and include battery information, power conditioning circuitry, video interface, serial interface and control features. Other features can be included for additional or different functionality of the display overlay unit. The electronics can provide display functions or can receive such functions from another device in communication therewith.

In one embodiment, the active display can generate images including but not limited to text, alpha-numeric, graphics, symbols, and/or video imagery, icons, etc., including active target reticles, range measurements and wind information, GPS and compass information, firearm inclination information, target finding, recognition and identification (ID) information, and/or external sensor information (sensor video and/or graphics), or images for situational awareness, for viewing through the eyepiece along with the images of the view seen through optics. The direct viewing optics can include or maintain an etched reticle and bore sight and retain high resolution.

In one embodiment, the utilization of an active display allows for a programmable electronic aiming point to be displayed at any location in the field of view. This location could be determined by the user (as in the case of a rifle that fires both supersonic and subsonic ammo and thus has two different trajectories and "zeros") or could be calculated based upon information received from a ballistic calculator. This would provide a "drop compensated" aiming point for long range shooting that could be updated on a shot to shot interval.

In one embodiment, the active display can be oriented to achieve maximum vertical compensation. In one embodiment, the active display is positioned to be taller than it is wide.

Figure 18:
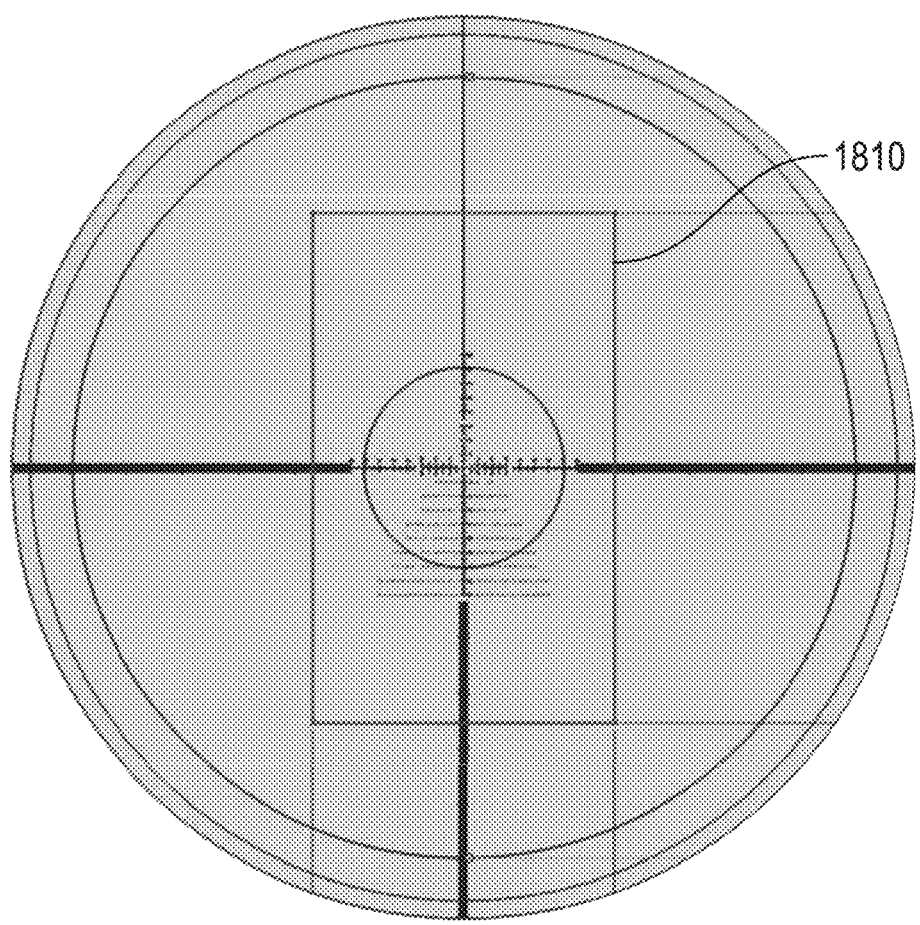
FIG. 18 is a representative schematic showing aspect ratio of a micro-display according to one embodiment of the disclosure.

In one embodiment, the active display is oriented as shown in FIG. 18, which allows for the maximized range of vertical adjustment 1810 of an active reticle within a riflescope. Maximized vertical adjustment is beneficial since it allows for the ballistic compensation of scenarios at longer range.

In one embodiment, the integrated display system further comprises a processor in electronic communication with the active display.

In another embodiment, the integrated display system may include memory, at least one sensor, and/or an electronic communication device in electronic communication with the processor.

In one embodiment, the disclosure relates to a viewing optic having a main body with an optics system for generating images of an outward scene and a main body beam combiner that is placed in line with the optics system, and a base coupled to the main body with an integrated display system having a first active display for generating images, and a second active display perpendicular to the first active display, wherein the generated images from either the first active display or the second active display are projected into a first focal plane of the optics system providing simultaneous viewing of the generated images and images of the outward scene when looking through an eyepiece of the scope body.

In one embodiment, the disclosure relates to a viewing optic having a main body with an optics system for generating images of an outward scene and a main body beam combiner that is placed in line with the optics system, and a base coupled to the main body with an integrated display system having a first active display for generating image, a second active display for generating an image, a base beam combiner configured to combine the first image and the second image, and a reflective material for directing the combined image to the main body beam combiner for simultaneous overlaid viewing of the combined image and the image of an outward scene in a first focal plane when looking through an eyepiece of the scope body.

In one embodiment, a base beam combiner is located to the right of the first display. In yet another embodiment, a second active display can be placed into the system perpendicular to the primary active display. This allows both displays to be used and projected onto the focal plane of the viewing optic individually or even simultaneously.

Method of Use for Range Finding

In one embodiment, the active display can display range measurements obtained from a laser rangefinder. In one embodiment, a LRF can be coupled to a viewing optic. In one embodiment, the LRF is directly coupled to the outer scope body of the riflescope. In another embodiment, a portion of a LRF is directly coupled to the outer portion of the scope body of the riflescope.

In one embodiment, the LRF is indirectly coupled to the outer scope body of the riflescope. In another embodiment, a portion of a LRF is indirectly coupled to the outer portion of the scope body of the riflescope.

In yet another embodiment, a LRF is not coupled to the riflescope but communicates with the riflescope via either hard-wiring or wirelessly.

In general operation, a LRF provides a pulse of laser light that is projected into the scene via the projection optics. This laser light illuminates the object, and a portion of the laser light is reflected back toward the LRF. Part of the reflected laser light returning to the device is captured by the receiving optical system and is directed to a detector. The device includes a timer starting when the laser light pulse is transmitted and stopping when the returning laser light is detected. A calculator portion of the device uses the elapsed time from transmission of the laser light pulse until detection of the returning reflected laser light to calculate the distance to the object.

In one embodiment, distance calculations are transmitted to the active display, and the generated images (distance measurements or calculations) are redirected from the display optical axis "B" onto the viewing optical axis A with a mirror and a beam combiner for simultaneously superimposing or overlaying the images (distance measurements or calculations) onto the images of the scene viewed by the viewer through the viewing optics.

Windage Range Bar

In another embodiment, the active display can generate a windage range. In one embodiment, a user can supply a range of wind values, and software can generate windage data, for example a windage range variance bar. In one embodiment, the windage data is transmitted to the active display, and the generated images, e.g., windage range variance bar, is redirected from the display optical axis "B" onto the viewing optical axis "A" with a mirror and a beam combiner for simultaneously superimposing or overlaying the images (windage range variance bar) onto the images of the scene viewed by the viewer through the viewing optics.

In one embodiment, the windage data includes the minimum wind hold point to the maximum wind hold point.

In one embodiment, the windage data is transmitted to the active display, and the active display can generate a digital reticle into the field of view at the appropriate wind hold.

Display Colors for Mental Cues

In one embodiment, the active display can generate a color display to convey an extra level of information to the user in a quick-to-comprehend format. In one embodiment, the active display can generate a series of color coded symbols to indicate a readiness to fire.

In one embodiment, the active display can generate a series of color coded symbols to color code objects in the target scene. In one embodiment, the active display can color code friendly forces from enemy forces. In another embodiment, the active display can color code targets of interest.

In one embodiment, the active display can generate a series of color coded symbols to indicate status of windage adjustment. In one embodiment, a red dot can indicate that windage adjustment has not been completed while a green symbol could indicate that windage adjustment has been completed.

In another embodiment, the active display can generate an aiming point with color. In one embodiment, the aiming point would be a red color if proper adjustments, including but not limited to windage, range, and elevation, have not been performed. In another embodiment, the aiming point would be a yellow color if some but not all shooting adjustments have been completed. In still another embodiment, the aiming point would be green if all the requisite shooting adjustments have been completed, and the aiming point is fully compensated.

In yet another embodiment, flashing and steady states of symbols may be utilized to convey similar status information regarding the adjustment of the aiming point.

In still another embodiment, the active display can generate text that is shown in colors to indicate status. In one embodiment, red text can indicate that in input parameter has not been entered or calculated, and green for text indicating a parameter which has been input or calculated.

Markers for Impact Zone in Range Finding

In one embodiment, an active display can generate circles, squares, or other shapes to allow the user to quickly encompass or encircle the impact zone of a projectile.

Hold-Over Estimation and Compensation

In another embodiment, the active display can generate an aiming point compensated for a moving target based on user input for the direction and rate of movement. For example, the user may input a rate of movement of 5 miles per hour to the left. This would be added to the windage value if the wind and movement are in the same direction and subtracted from the windage value if the wind and movement are in opposite direction. Then, when the aiming point and/or windage value bar are plotted on the display, the aiming point will include the proper amount of hold-over to allow the user to place the aiming point dot on the desired impact zone and take the shot, rather than to have to place the aiming point ahead of the moving target to compensate for movement.

Team Operation Via Camera and Remote Display Manipulation

In one embodiment, the active display in conjunction with a network interface allow for an additional level of enhanced operation and usage. In one embodiment, the reticle images of a plurality of shooters over a network can be viewed. Each shooter's reticle camera image is shown on one or more consoles, and network processes and interfaces enable a group-level of coordination, training, and cooperation not before available in individual riflescopes.

Training and Coaching. In a training or coaching scenario, the coach can see how each shooter has aligned his or her reticle on his or her respective target. By being able to actually see the reticle alignment, the coach or trainer can then provide instructions on adjustments and repositioning, such as by verbal instructions (e.g. by radio or in person).

In another embodiment, the coach's console can be provided with a pointing means, such as a mouse or joystick, for which control data is transferred from the console to the rifle's integrated display system via the network. This coach's mouse or joystick then controls an additional dot or pointer in the display of the scope of each shooter, which allows the coach to visually show the shooter which target to use, which range marker bar to use, and where to position the reticle relative to the target. In one embodiment, each shooter can be provided with his or her own coach's dot so that the coach may provide individualized instruction to each shooter.

Fire Coordination. In another embodiment, the active display can be used in the coordination and implementation of a multi-shooter fire team. In one embodiment, the commander of the team operates a coach's console and uses the coach's dots to assist in assigning targets to each shooter, communicating changes in reticle placement, etc.

Snapshots for Remote Review and Approval. In another embodiment, the active display and network processes can allow the shooter, provided with a control means, to take a "snapshot" of his or her reticle view. This snapshot of the user's reticle view can include an image of a target of question. When the image is received by the commander or coach, the commander or coach review the image and approve or disapprove taking the shot. For example, in a coaching scenario, the user may take a snapshot of an animal he or she believes is a legal animal (age, species, gender, etc.) to take. If the coach agrees, the coach can so indicate by positioning or moving the coach's dot in the shooter's reticle.

Biometric Classification of Target. In another embodiment, the snapshot of the reticle image is received by a biometric recognition and/or classification process, such as a facial recognition system. The biometric recognition and/or classification process may be on board the gun, such as being integrated into the display control logic, or may be remote to the gun interconnected via the network. The results of the recognition and/or classification process may be provided in the reticle by transmitting the results via the network to the control logic and updating the display appropriately.

Side-by-Side Image Display. In another embodiment, an image is downloaded to the integrated display system via the network and is displayed coincidentally in the reticle with the viewed images of target. A downloaded image can be used to make a side-by-side comparison by the user of the currently viewed target with a previously-taken image or photo of a target similar to that which the shooter is instructed or desiring to take. For example, during doe season, a new shooter may be provided an image of a deer doe for reference in the reticle, which can be compared in real time to the actual animal being viewed through the scope. In a military or law enforcement application, an image of a sought enemy or fugitive can be displayed in the reticle for real-time comparison by a sniper to face of a person being viewed through the scope.

Representative Examples of Active Displays a. 530-570 nm

In one embodiment, the disclosure relates to an integrated display system that uses a 530-570 nm micro display.

Figure 19:
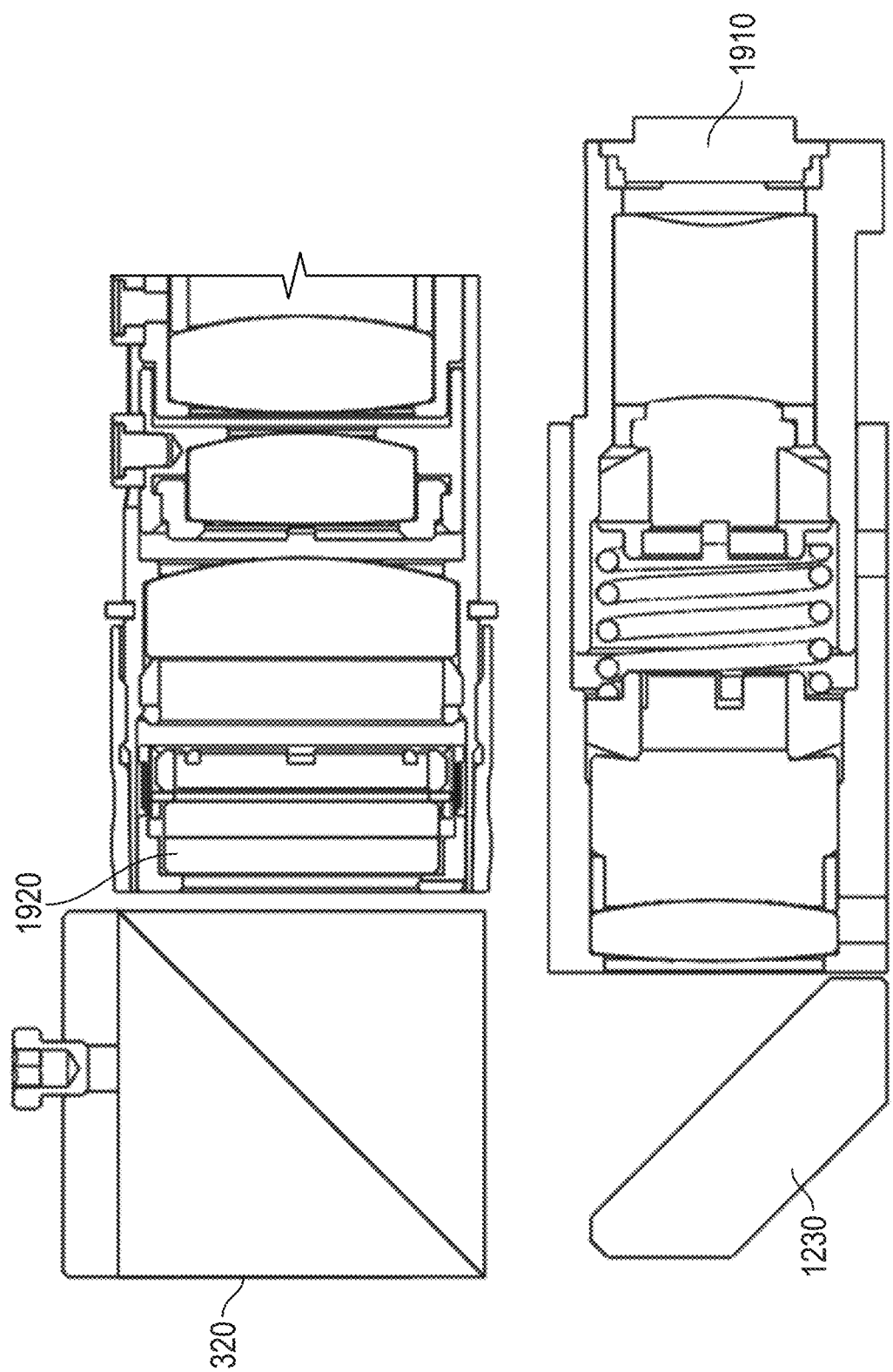
FIG. 19 depicts an integrated display system with a 530 nm-570 nm digital display according to one embodiment of the disclosure.

FIG. 19 depicts an integrated display system with a 530 nm-570 nm digital display 1910.

Figure 20:
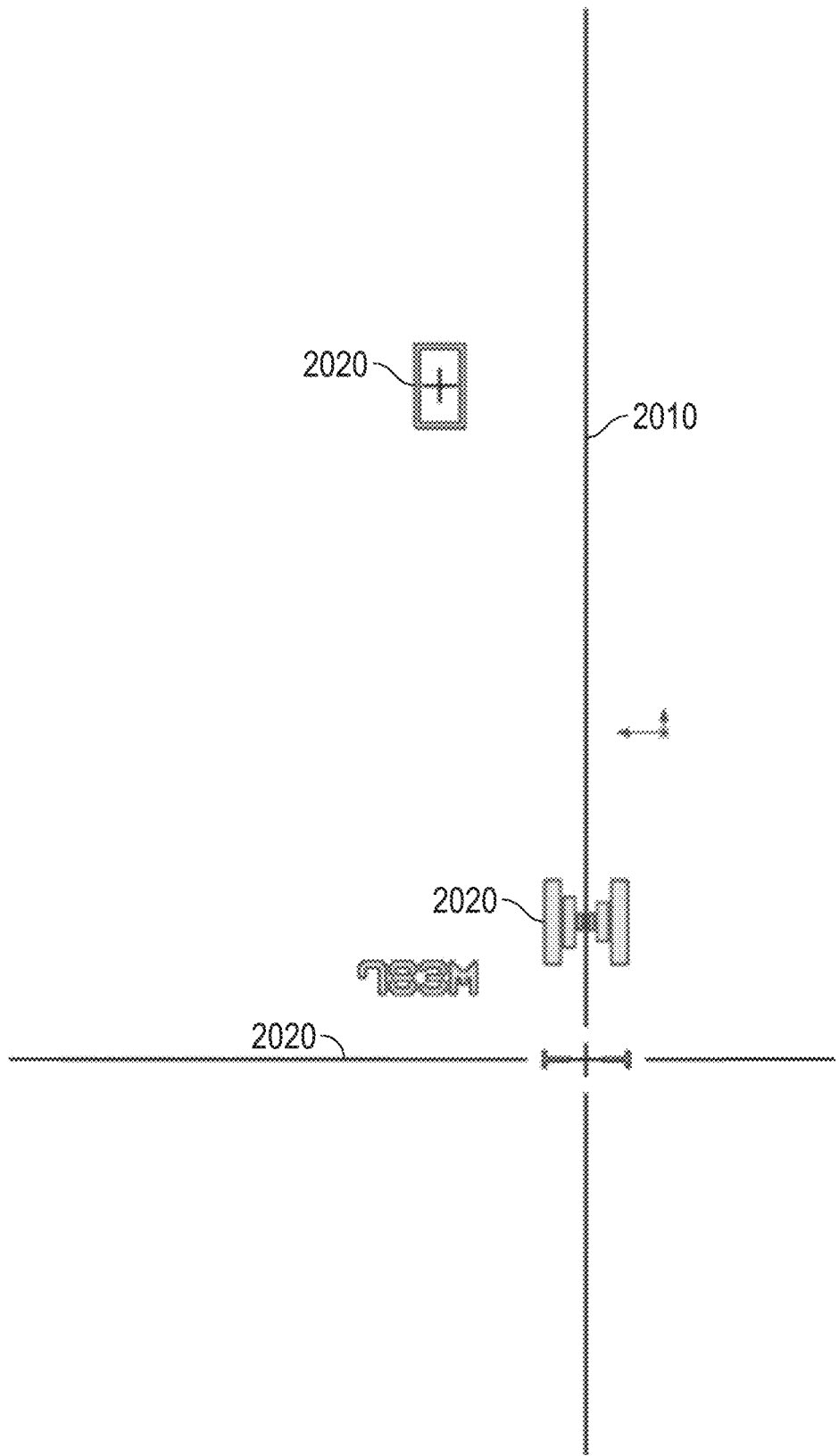
FIG. 20 is a schematic of exemplary images that can be displayed with a 530 nm-570 nm digital display according to one embodiment of the disclosure.

FIG. 20 is a schematic of exemplary images 2020 that can be displayed with a 530 nm-570 nm digital display 1910. As shown in FIG. 20, a glass etched reticle 2010 can be used with the apparatuses and systems disclosed herein. These images are examples only and should not be construed to limit the amount or type of information that can be displayed with an active display.

In another embodiment, the integration of the 530 nm-570 nm digital display 1910 allows for relatively higher efficacy than any other color display, due to the sensitivity of the human eye. This allows for a smaller amount of power consumption, relative to powering a red or blue display to the same photometric brightness.

In yet another embodiment, the integration of the 530 nm-570 nm digital display 1910 gives the end user greater ability to discern digital overlays from the background created by the ambient light in a day sight.

b. AMOLED

In one embodiment, the disclosure relates to an integrated display system that includes an AMOLED micro display.

Figure 21:
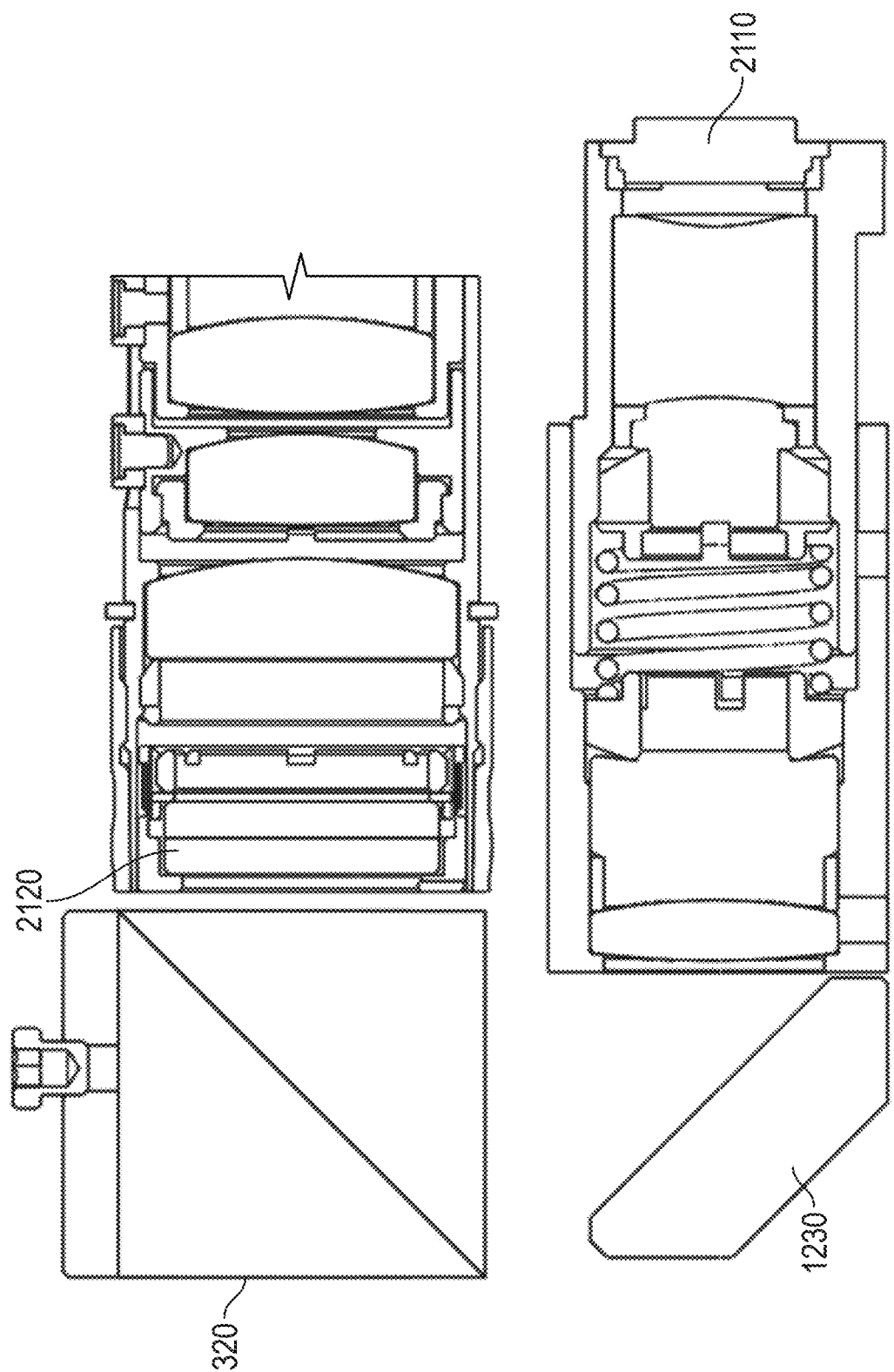
FIG. 21 depicts an integrated display system with an AMOLED digital display according to one embodiment of the disclosure.

FIG. 21 depicts an integrated display system with a AMOLED digital display 2110.

Figure 22:
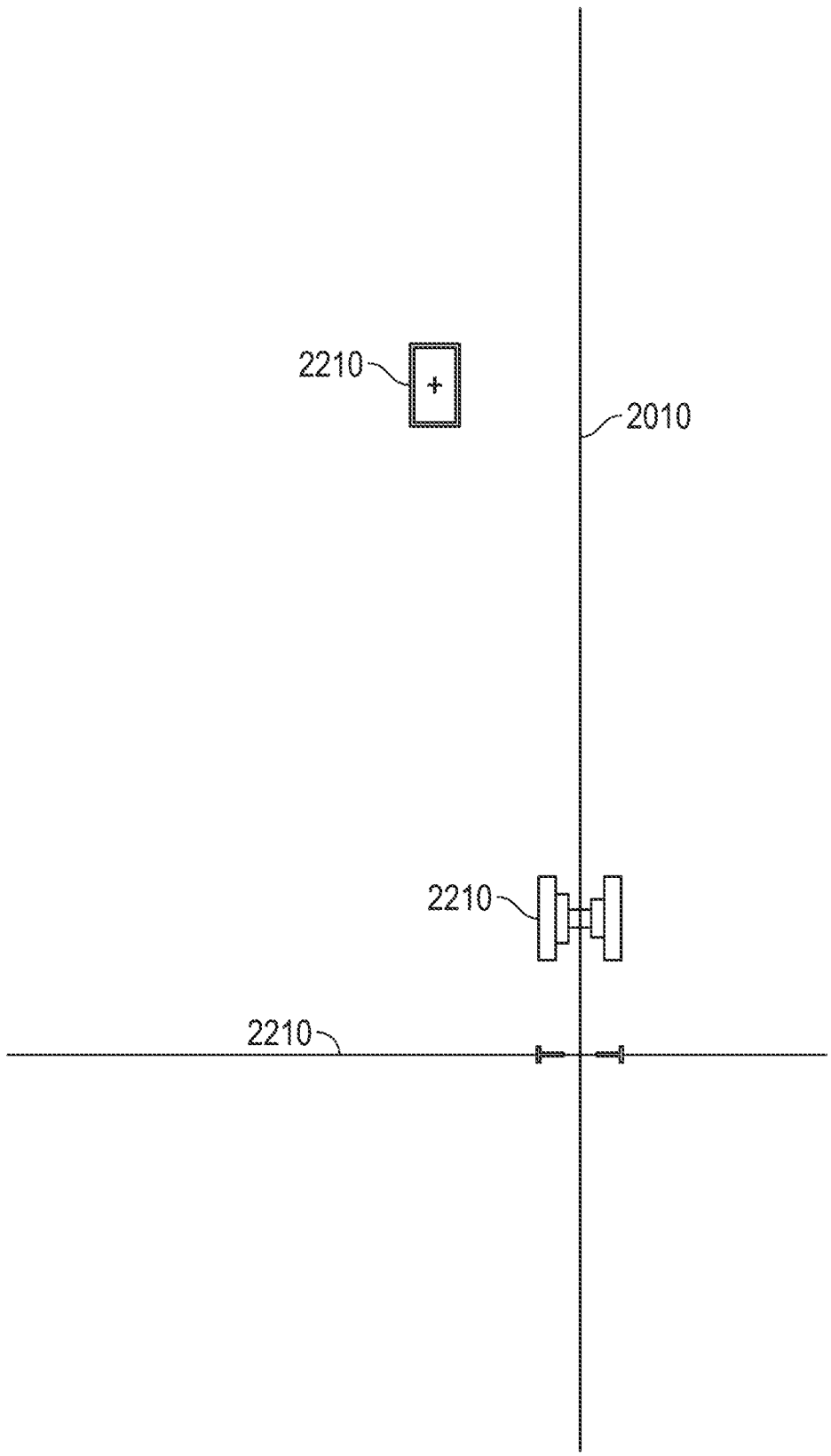
FIG. 22 is a schematic of exemplary images that can be displayed with an AMOLED digital display according to one embodiment of the disclosure.

FIG. 22 is a schematic of exemplary images 2210 that can be displayed with an AMOLED digital display. As shown in FIG. 22, a glass etched reticle 2010 can be used with the apparatuses and systems disclosed herein. These images are examples only and should not be construed to limit the amount or type of information that can be displayed with an active display.

In one embodiment, the AMOLED 2110 generated image is integrated/imaged/focused in the first focal plane. In one embodiment, the use of an AMOLED display 2110 allows for increased contrast and greater complexity within data displayed into a riflescope.

In one embodiment, the integration of the AMOLED display 2110 allows for the selection of individual pixels to be illuminated, giving the ability for complex data configurations to be displayed with ease in the riflescope.

In another embodiment, the integration of the AMOLED display 2110 allows for a small, lightweight package size inside the riflescope, due to the decreased need for back lighting in the system.

In another embodiment, the integrated display system does not require a backlight display assembly.

In yet another embodiment, the integration of the AMOLED display 2110 allows for decreased power consumption, as the ability to optimize power usage to individual pixels is now available.

In one embodiment, the integration of the AMOLED display 2110 gives a contrast ratio, which allows for a clean "heads up" style display within the scope. The contrast ratio allows each floating feature to be individually targeted and represented without a low glow around the pixels.

B. Collector Lens System

In one embodiment, integrated display system has an optical system based upon the use of optical lenses as a part of one or more lens cells, which include the lens itself and a lens cell body to which the lens is mounted. In one embodiment, the lens cell includes a precision formed body that is generally cylindrical, or disc shaped. This body has a central aperture for mounting the lens in alignment with an optical axis of a larger optical system. The cell body can also be said to have its own alignment axis, which will ultimately be aligned with the optical axis for the larger system when the lens cell is mounted therein. In addition, the lens cell serves as a "holder" for the lens, serves as a mechanism by which the lens can be mounted to and in the larger optical system, and (finally) serves as a means by which the lens can be manipulated by and for the purposes of that system.

In one embodiment, the integrated display system comprises a collector lens system, also referred to as a lens system. In one embodiment, the collector lens system comprises an inner lens cell and an outer lens cell.

Figure 23:
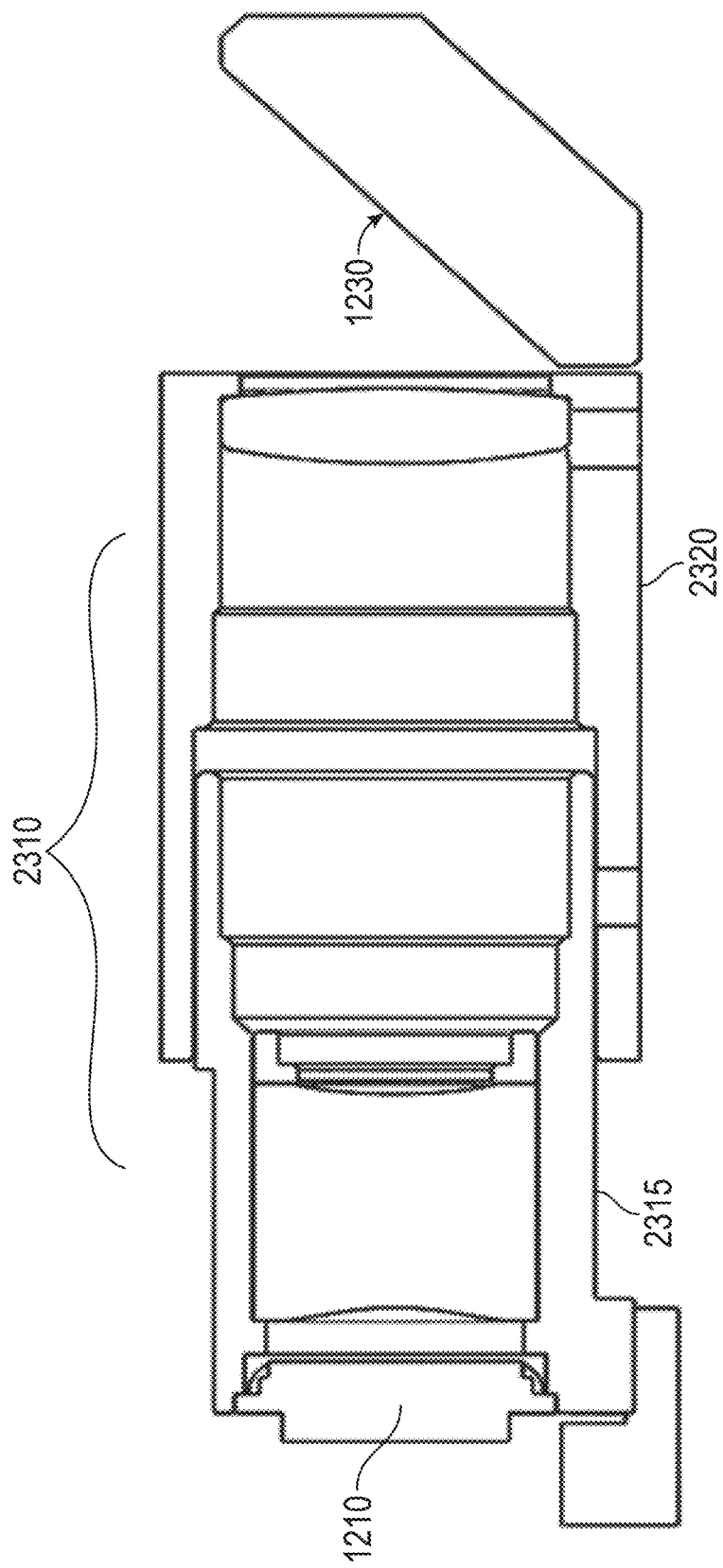
FIG. 23 is a representative schematic of a side cutaway view showing an active display and an optics system having an inner and an outer lens cell according to one embodiment of the disclosure.

FIG. 23 is a representative example of a collector lens system 2310, which has an inner lens cell 2315 and an outer lens cell 2320. In one embodiment, an outer lens cell 2320 contains at least one lens and an inner lens cell 2315 contains at least one lens. In one embodiment, the inner lens cell 2315 rotates on the inside surface of the outer lens cell 2320. As shown in FIG. 23, an active display 1210 is coupled to a flat machined surface at the back of the inner lens cell 2315. In one embodiment, the active display 1210 can be directly coupled to the inner lens cell 2315. In yet another embodiment, the active display 1210 can be indirectly coupled to the inner lens cell 2315.

One advantage of the collector optics system disclosed herein is that the inner lens cell being combined with the micro display mount provides a solid rotational mechanical axis to position the vertical axis of the micro display.

Figure 24:
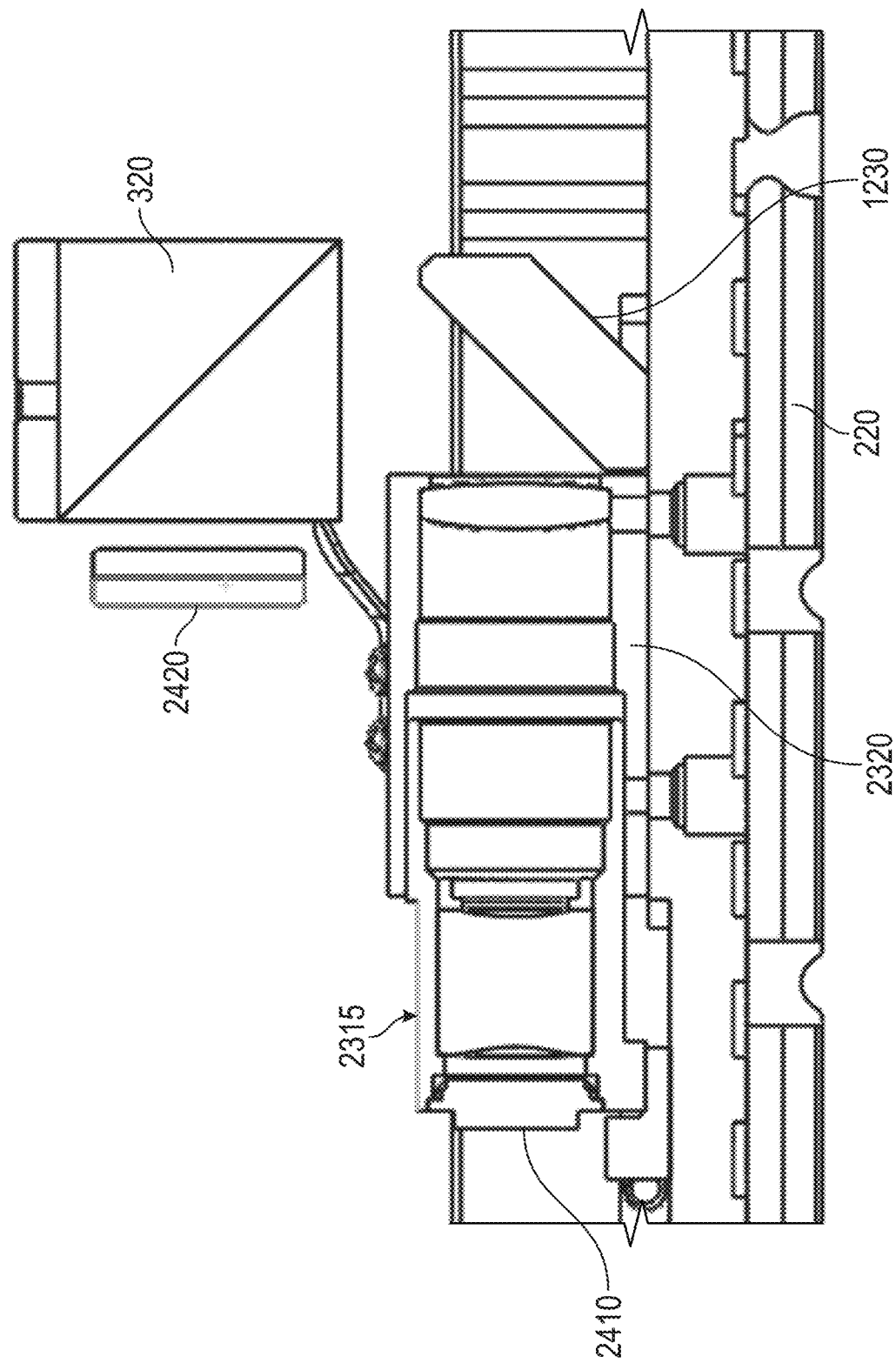
FIG. 24 is a side cutaway view of an integrated display system with a collector optics system installed into a viewing optic according to one embodiment of the disclosure.

FIG. 24 is a representative depiction of a base 220 that couples to a main body of a viewing optic, wherein the base has a collector optics system 2310 as part of an integrated display system. In FIG. 24, the main body is depicted by the beam combiner 320 and the viewing optic reticle 2420.

The outer lens cell 2320 is fixed in place in relation to the viewing optic system in the main body while the inner lens cell 2315 is allowed to rotationally float inside of the outer lens cell 2320. By placing pressure against a surface 2410 of the inner lens cell 2315 that is located below the axis of rotation of the lens cell, the vertical axis of an active display 1210 can be aligned with the vertical axis of the reticle 1610 of the viewing optic system.

Figure 25:
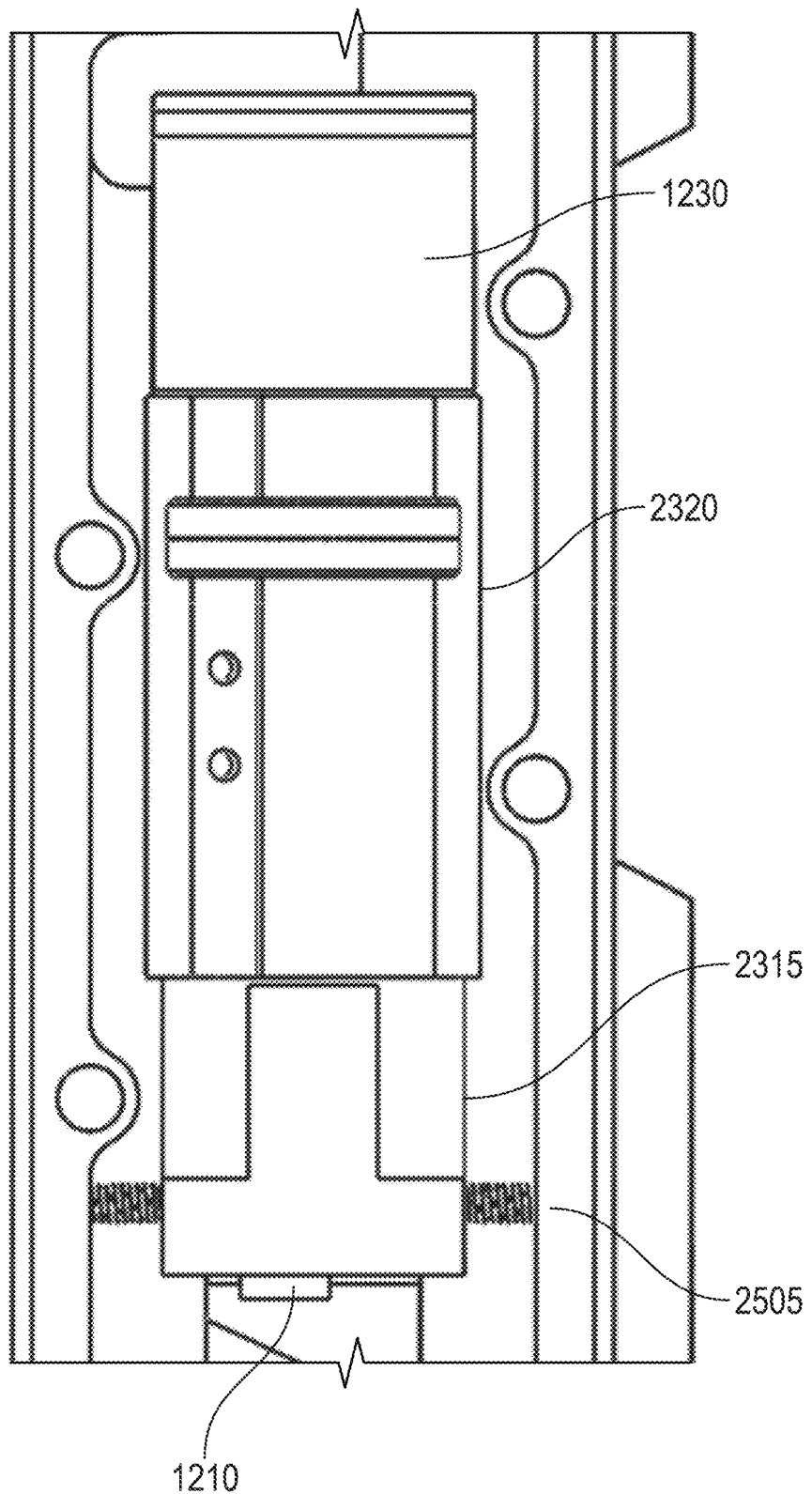
FIG. 25 is a representative schematic of a top view of an integrated display system with an active display, a collector optics system having an inner cell, and an outer cell, a mirror and a screw for adjusting tilt of a active display according to one embodiment of the disclosure.

FIG. 25 is a representative depiction of one embodiment for aligning the tilt of the vertical axis of the active display with the vertical axis of the reticle. As shown in FIG. 25, opposing set screws 2505 can be tightened against a surface of the inner lens cell 2315 that is located below the axis of rotation of the lens cell. The set screws 2505 can be used to align the vertical axis of the micro display 1210 with the vertical axis of a reticle in the optical system in a main body of a viewing optic. The rotation of the inner lens cell 2315 can be retained by tightening set screws 2505 securely against the lower surface of the inner lens cell 2315, thereby, rotationally locking the vertical axis of the micro display 1210 in place.

Figure 26:
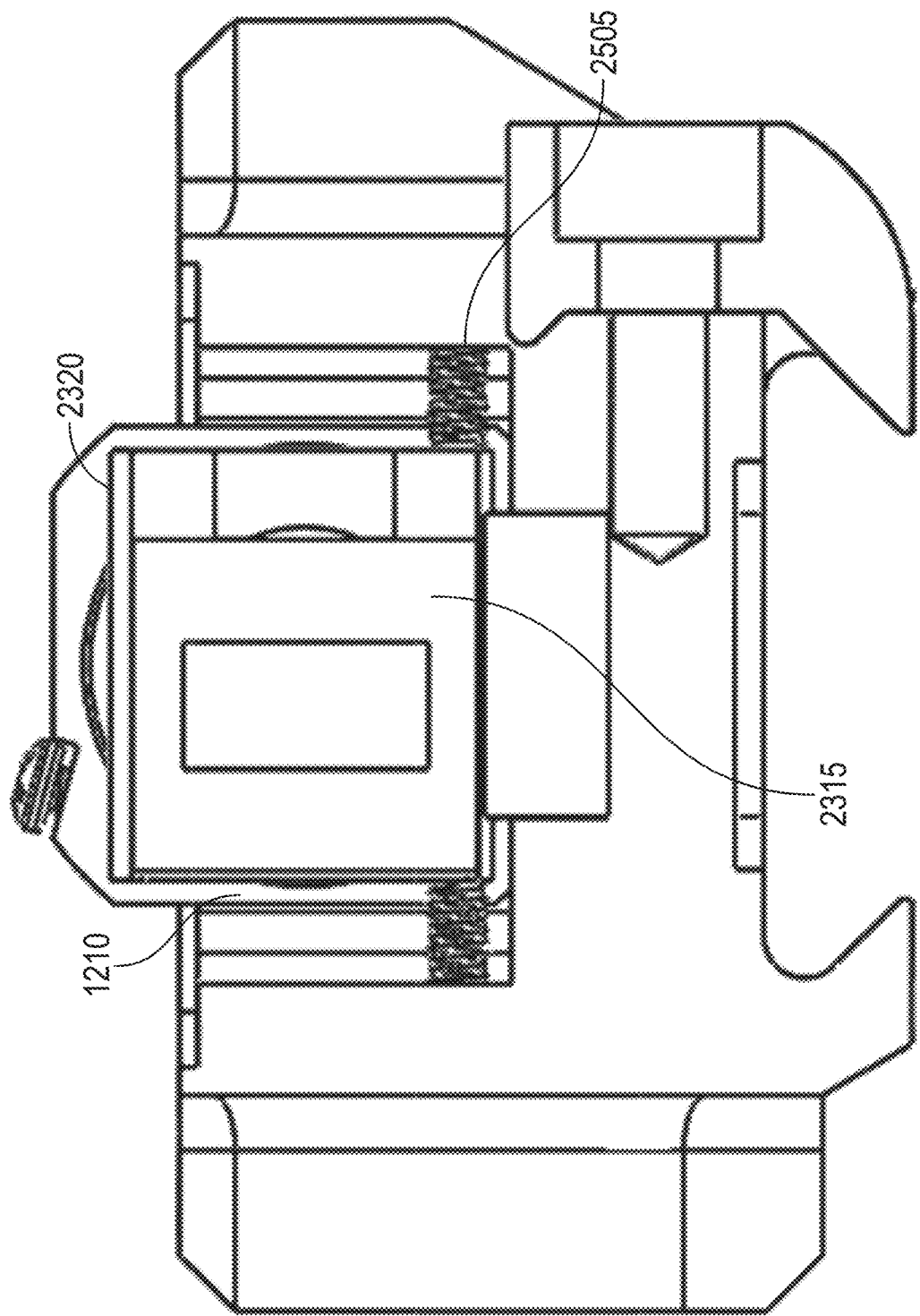
FIG. 26 is a representative schematic of a rear cutaway view of an integrated display system with an active display, a collector optics system having an inner cell, and an outer cell, a mirror and a screw for adjusting tilt of a active display according to one embodiment of the disclosure.

FIG. 26 is a representative depiction of a rear cut-away view of the collector lens system 2300 with a micro display 1210 or active display tilt adjustment mechanism. When a micro display is injected into the optical system of a viewing optic through the use of beam combiners or wave guides, an additional method of compensation is needed in order to eliminate tilt error between the reticle's vertical axis and the injected image of the micro display's vertical axis. Set screws 2505 can be tightened against a surface of the inner lens cell 2315 that is located below the axis of rotation of the lens cell, thereby aligning the vertical axis of the micro display 1210 with the vertical axis of a reticle in the optical system in a main body of a viewing optic.

Figure 27:
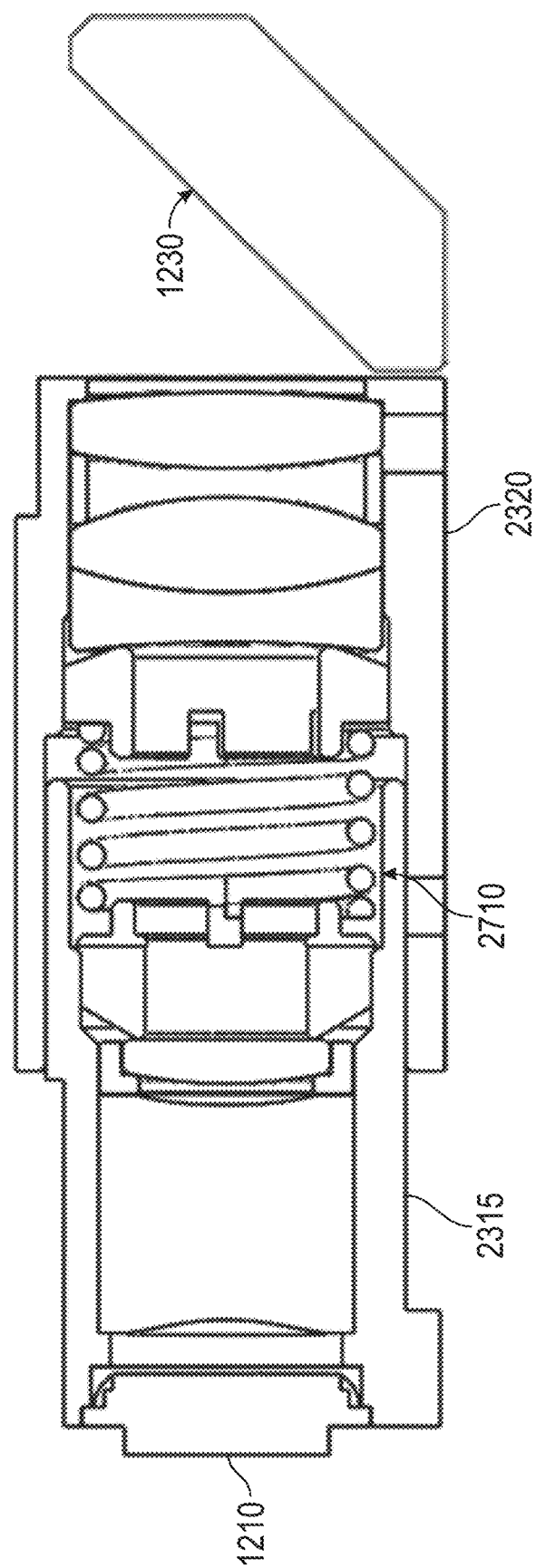
FIG. 27 is a representative depiction of a side cutaway view showing a micro display, inner and outer lens cells, and a spring located between the inner and outer cells according to one embodiment of the disclosure.

FIG. 27 is a representative depiction of a method and apparatus for eliminating parallax between a micro display and the reticle in an optical system in the main body of a viewing optic. An outer lens cell 2320 contains at least one lens on the right hand side of FIG. 27 and an inner lens cell 2315 contains at least one lens on the left hand side of FIG. 27. The inner lens cell 2315 slides along the optical axis on the inside surface of the outer lens cell 2320. A micro display 1210 is coupled to the inner lens cell 2315. A spring 2710 is installed between the outer lens cell 2320 and the inner lens cell 2315 to cause the cells to separate when not under a compression force.

Figure 28A:
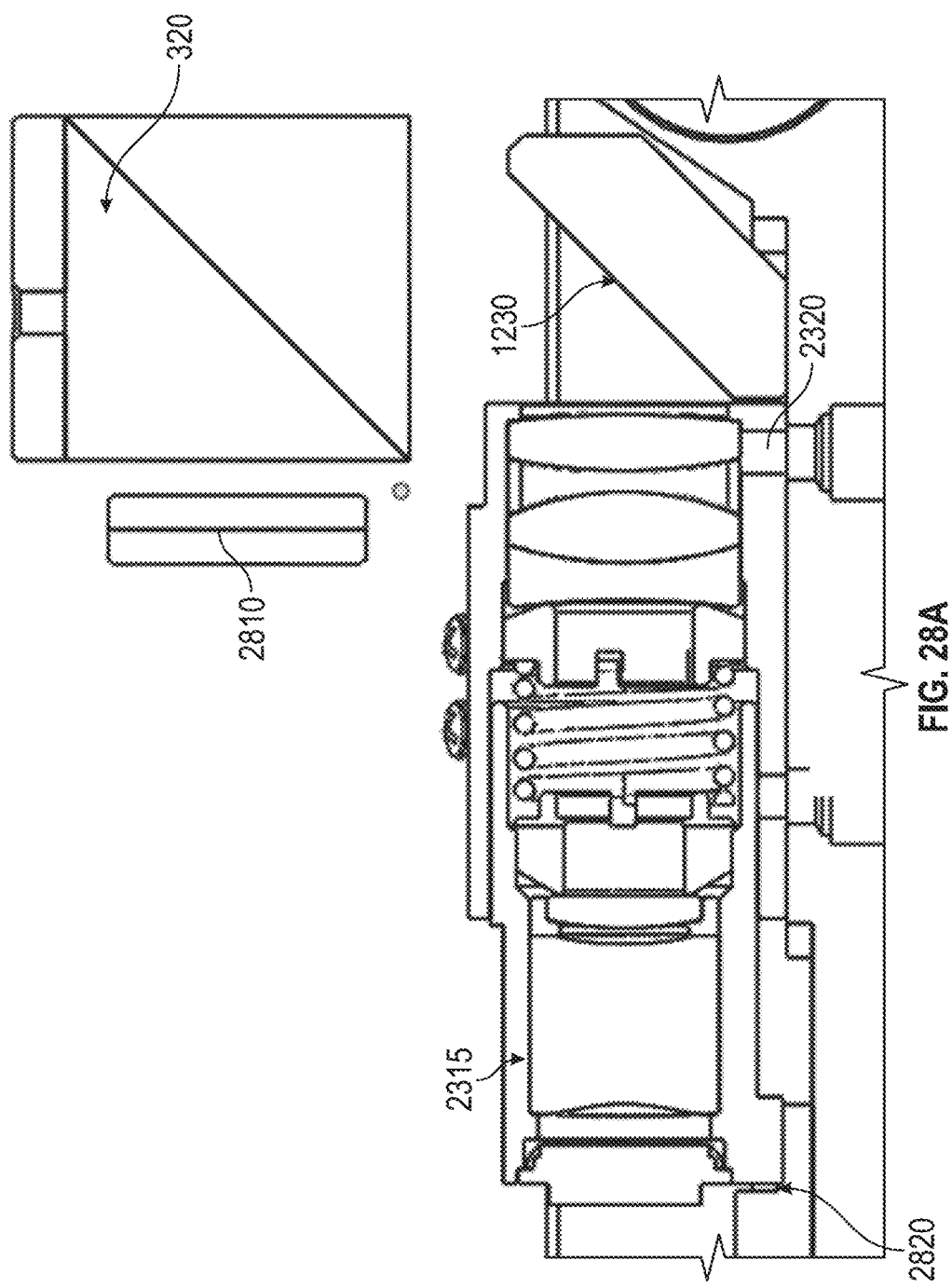
FIG. 28A is a representative depiction of an integrated display system showing a surface that can be used to adjust position of inner lens cell and eliminate parallax error according to one embodiment of the disclosure.

FIG. 28A is a representative depiction of a base, which has the collector optics system 2300, coupled to a main body of a viewing optic. In FIG. 28A, the main body is depicted by the beam combiner 320 and the viewing optical reticle 2810.

The outer lens cell 2320 is fixed in place in relation to the viewing optic and the inner lens cell 2315 is allowed to float inside of the outer lens cell 2320. By forcing the inner lens cell 2315 forward by use of a screw or a wedge 2820 that places force on the back of the inner lens cell/active display mount, the axial position of the image is changed so that the focal plane of the micro display image lies on the same plane as the viewing optic reticle in the main body of the viewing optic. Thus, parallax between the micro display and the reticle is eliminated.

The position of the inner lens cell is kept in place through the action of the spring pressing outwards against the screw or wedge. Parallax between the active display and the reticle can be eliminated without changing the amount of light that is collected from the active display and without degrading the image quality of the system.

By implementing the use of the spring between the inner and outer lens cell and the force on the back of the inner lens cell/micro display, the maximum amount of light can be collected from the micro display and provides a rapid, simple, and accurate method of adjustment.

In one embodiment, the inner lens cell 2315 and the outer lens cell 2320 can comprise two or more lenses. In yet another embodiment, the lens system can comprise 3, 4, 5, 6, 7, 8, 9, 10 or greater than 10 lenses. Lens can be obtained from a variety of commercial manufacturers including but not limited to LaCroix Optics (www.lacroixoptics.com) and Diverse Optics (www.diverseoptics.com). In one embodiment, the inner lens cell and the outer lens cell comprise a collector lens system.

In one embodiment, the lens system is composed of a five (5) lens system. In one embodiment, the five lens system is comprised of 5 singlet lenses. In another embodiment, the five lens system is comprised of two doublet lenses and a singlet lens. In yet another embodiment, the five lens system is comprised of 3 singlet lenses and 1 doublet lens. In one embodiment, at least one plastic aspheric is used as a first element.

In one embodiment, the lens system is a five lens system with the following order: an aspheric singlet closest to the active display, followed by a singlet lens, followed by a doublet lens, followed by the final singlet lens.

In one embodiment, the lens system is a five lens system with the following order: an aspheric singlet closest to the active display, followed by a singlet lens, followed by a singlet lens, followed by a doublet lens.

In one embodiment, the lens system is a five lens system having the following configuration: lens 1 closes to the active display is 11 mm in diameter and 9.3 mm thick; lens 2 is 9 mm in diameter and 1.9 mm thick, the doublet has one lens (lens 3) that is 13.5 mm in diameter and 2.1 mm thick, and another lens (lens 4) that is 13.5 mm in diameter and 4.1 mm thick, and lens 5 that is 13.5 mm in diameter and 3.3 mm thick.

In one embodiment, the air space between one lens to the next lens ranges from about 1 mm to about 20 mm. In one embodiment, the air space between one lens to a subsequent lens ranges from about 5 mm to about 20 mm. In one embodiment, the air space between one lens to a subsequent lens ranges from about 10 mm to about 20 mm.

In one embodiment, the distance between the active display and the first lens is minimized in order to collect the maximum amount of light from the display. In one embodiment, the distance between the active display and the first lens is less than 2 mm. In another embodiment, the distance between the active display and the first lens is selected from the group consisting of: less than 1.8 mm, less than 1.5 mm, less than 1.3 mm, less than 1.1 mm, less than 0.9 mm, less than 0.7 mm, less than 0.5 mm, and less than 0.3 mm.

In one embodiment, a five lens system is housed in an inner lens cell and an outer lens cell. In one embodiment, the inner lens cell is constructed by installing an a sphere into the inner lens cell from the opposite end of where the display seat is; followed by a spacer; followed by lens 2, which can be a 9 mm singlet; followed by a lock ring, which holds both lenses in place.

In one embodiment, the outer lens cell is constructed by inserting lens 5, which can be the 13.5 mm singlet into the outer lens cell from the display end of the cell; followed by a spacer; followed by the doublet, which can be lens 3 and 4, followed by a lock ring.

Figure 28B:
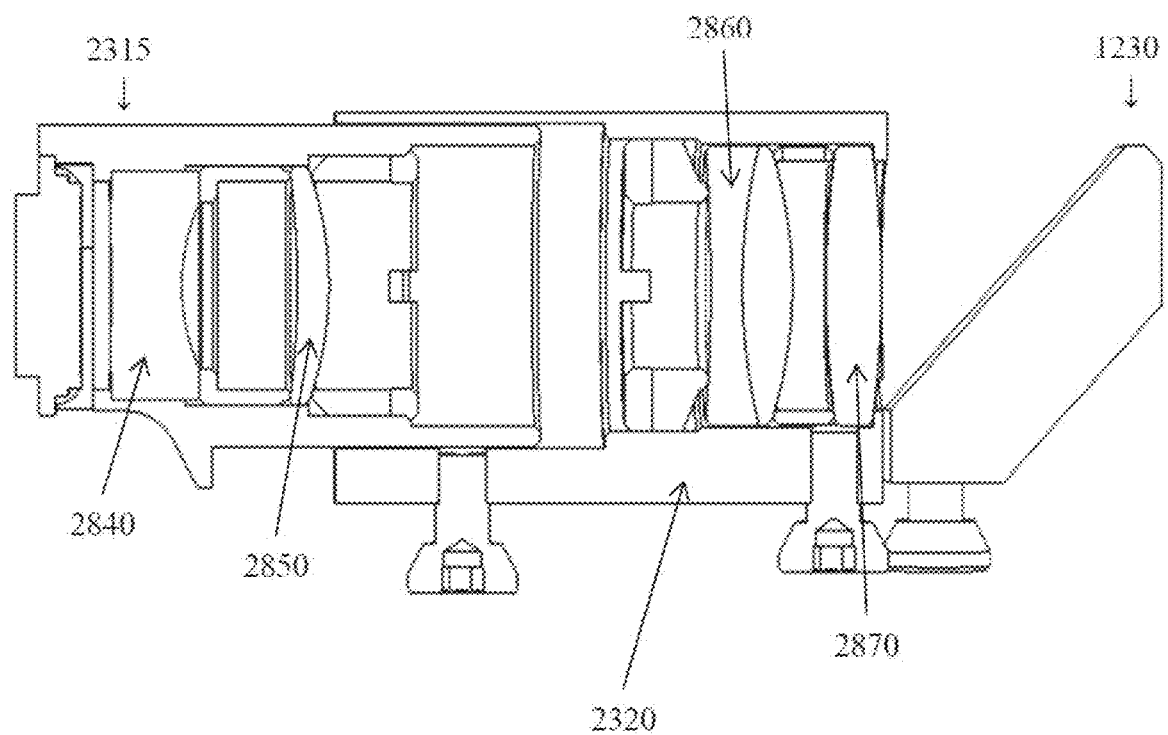
FIG. 28B is a representative depiction of an integrated display system showing a lens system in one embodiment of the disclosure.

FIG. 28B is a representative depiction of a base, which has the collector optics system or collector lens system. The inner lens cell 2315 is constructed by installing an a sphere 2840 into the inner lens cell from the opposite end of where the display seat is; followed by a spacer; followed by a glass meniscus 2850. In one embodiment, the glass meniscus can be lens 2 as described above. The outer lens cell 2320 can be constructed by inserting a glass doublet 2860 followed by a glass singlet 2870.

In one embodiment, the collector lens system comprises a five lens system comprising 2840, 2850, 2860, and 2870, with 2840 being closest to the active display, and 2870 being farthest from the active display. In one embodiment, the inner lens cell 2315 comprises 2840 and 2850. In one embodiment, the outer lens cell 2320 comprises 2860 and 2870.

In one embodiment, the spacing between lens 2 in the inner cell and lens 3 in the outer cell is changed when the inner lens cell moves axially along the inner diameter of the outer lens cell. This causes the focal plane of the image of the display to shift and is used to null out parallax between the projected display image and the passive reticle in the main body of the viewing optic.

In one embodiment, the focusing of the display image onto the first focal plane of the optic system in the main body is accomplished by changing the air spacing between lens 2 and lens 3, of a 5-lens system, which is accomplished by varying the position of the inner lens cell with respect to the outer lens cell.

In one embodiment, lens assemblies may also be assembled together within a lens barrel, which is an integral mechanical structure holding a series of lenses. It is used to position the lenses axially and radially with respect to each other, and to provide a means of interfacing the lens assembly with the system of which it is a part. Lens elements are radially positioned by the inside diameter or ID of the barrel wall. The outside diameter or OD of the lens elements are ground to fit ID of the barrel wall. The axial position of the lens elements is accomplished by cutting lens seats during assembly. The lens elements can then be constrained on the seats by epoxy, retaining rings, etc.

C. Reflective Material

In one embodiment, the integrated display system comprises a reflective material 1230. In one embodiment, the reflective material 1230 is a mirror. In one embodiment, the integrated display system comprises one or more mirrors. In one embodiment, the integrated display system comprises two, three, four or more mirrors.

In one embodiment, the mirror is positioned at an angle from 30° to 60°, or from 30° to 55°, 30° to 50°, or from 30° to 45°, or from 30° to 40°, or from 30° to 35° relative to the emitted light of the display.

In one embodiment, the mirror is positioned at an angle from 30° to 60°, or from 35° to 60°, 40° to 60°, or from 45° to 60°, or from 50° to 60°, or from 55° to 60° relative to the emitted light of the display.

In one embodiment, the mirror is positioned at an angle of at least 40°. In one embodiment, the mirror is positioned at an angle of 45° relative to the emitted light of the display.

In one embodiment, and as shown in FIG. 29, the tilt of a mirror 2910 along the vertical axis is able to be adjusted by use of a screw or similar mechanism. By turning a screw in against the base or rear of the mirror 2910, the angle at which the image of the micro display is reflected into the beam combiner can be changed. This correspondingly changes the tilt of the focal plane at the viewing optic's reticle 2930 of the optical system in the main body of a viewing optic. Using this adjustment, parallax error can be eliminated between the micro display and the reticle along the vertical axis.

In one embodiment, the mirror is fastened to the base with one or more screws. In one embodiment, the mirror is fastened to the base using a chemical compound such as an epoxy, a resin, or a glue or combinations thereof.

In one embodiment, the position of the mirror can be adjusted in relation to the beam combiner to eliminate any errors, including but not limited to parallax error.

In one embodiment, the position of the mirror can be adjusted in relation to the active display to eliminate any errors, including but not limited to parallax error.

2. Power System

In one embodiment, the base that couples to the main body of the viewing optic has a power system. In another embodiment, the base of a viewing optic has a cavity. A battery cavity can be integrated into the base that couples to the main body of a viewing optic.

Figure 30:
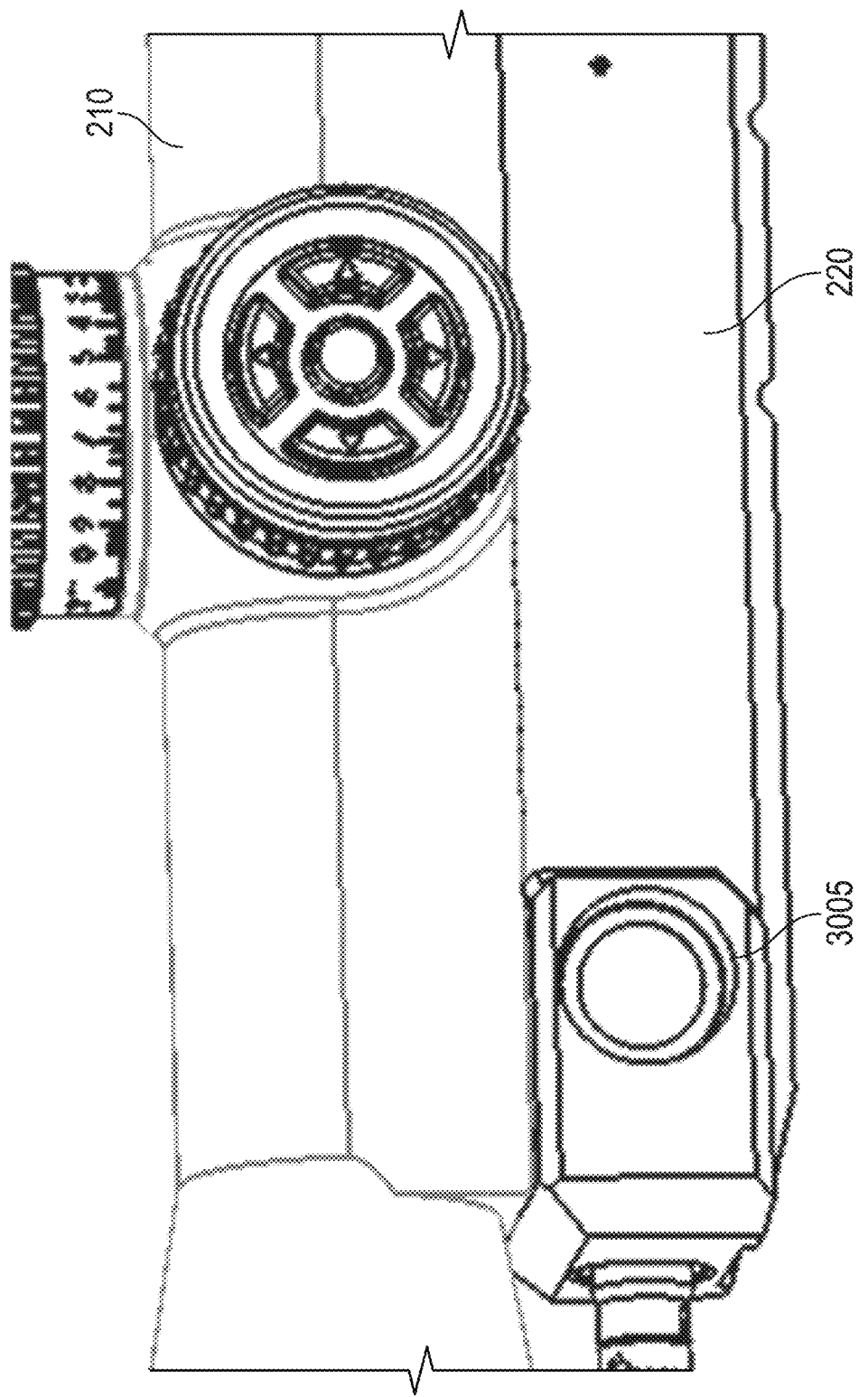
FIG. 30 is a representative schematic of a left side view of a battery compartment in a base that can couple to a main body of a riflescope according to one embodiment of the disclosure.
Figure 31:
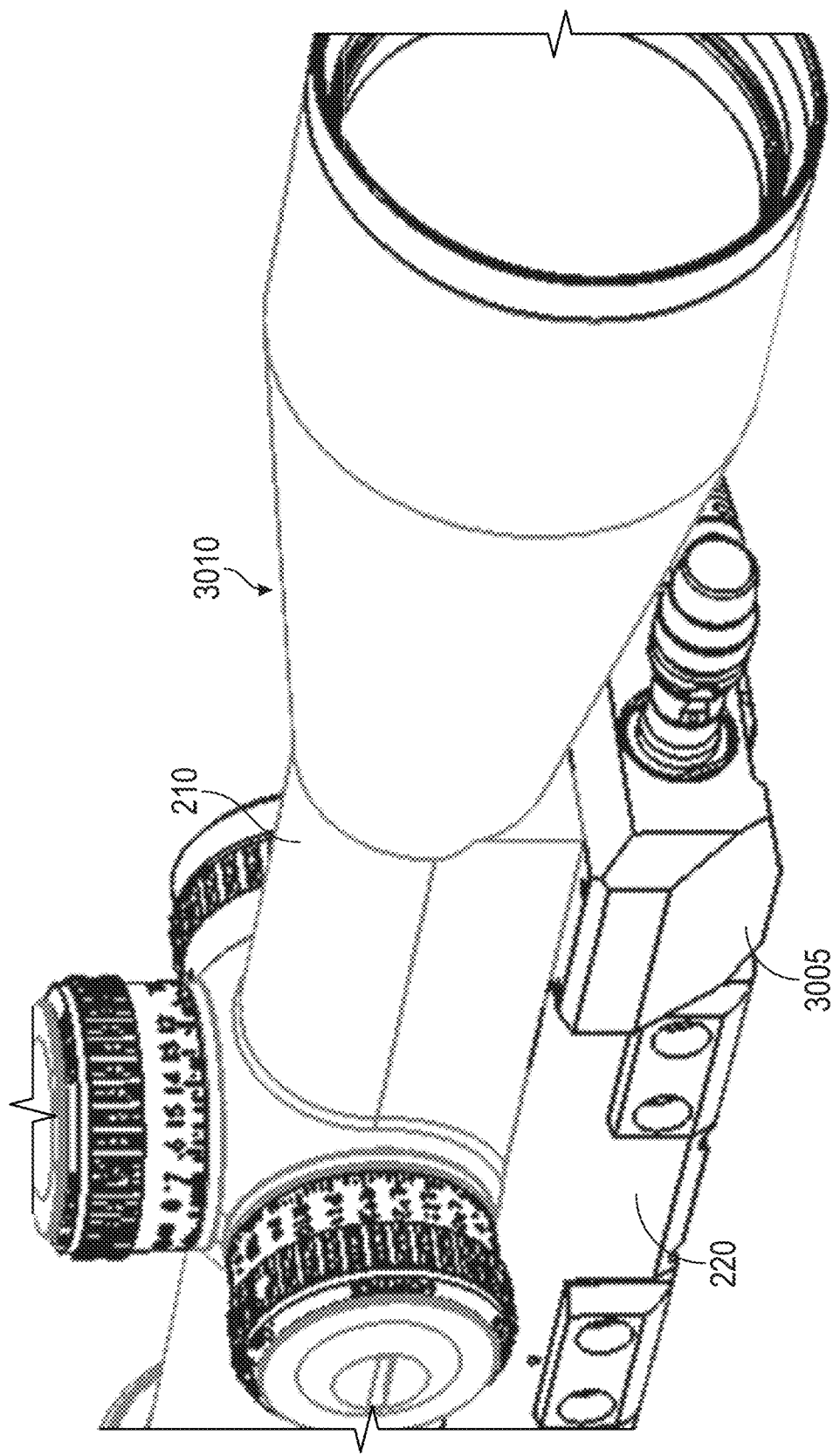
FIG. 31 is a representative schematic of a right side view of an integrated battery compartment in a base that can couple to a main body of a riflescope according to one embodiment of the disclosure.

FIG. 30 is a representative schematic of a base 220 with a battery compartment 3005, wherein the base 220 is coupled to the main body 210 of a riflescope 3000. As shown in FIGS. 30 and 31, the battery cavity 3005 extends from each side of the base to encase a battery, including but not limited to a CR123 battery. The CR123 battery has increased power capacity and discharge as compared to smaller batteries or coin style batteries.

In one embodiment, the battery cavity 3005 is integral to the base 220 so that only the battery cap is needed to protect the battery from the environment. No additional sealing is required.

In one embodiment, the battery cavity 3005 in the base 220 is located closer to the objective assembly 3010 of the main body 210 of a viewing optic as compared to the ocular assembly.

In one embodiment, the battery cavity 3005 in the base 220 is located closer to the ocular assembly of the main body 210 of a viewing optic as compared to the objective assembly.

Figure 32:
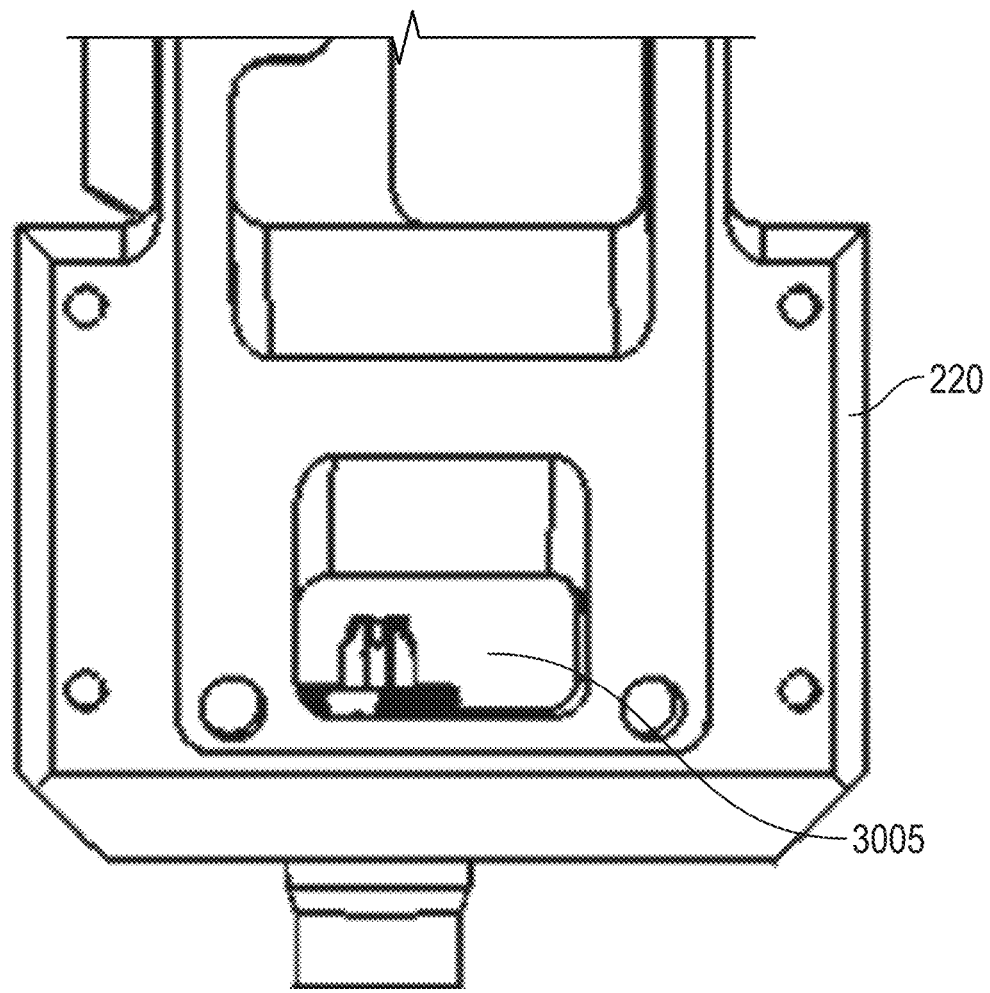
FIG. 32 is a representative schematic of a top view of an integrated battery compartment in base that can couple to a main body of a riflescope according to one embodiment of the disclosure.

FIG. 32 is a representative depiction of the battery compartment 3005 integrated into the base 220. In one embodiment, the cavity 3005 is designed to have the positive side of the battery inserted first with a mechanical stop at the bottom of the battery cavity to prevent improper installation and operation of the battery.

In one embodiment, the integrated battery cavity 3005 can use the same gasket as the base 220 uses to the main body 210 of the riflescope. This provides a more reliable seal and eliminates a mechanical device as a separate battery cavity is not required. Secondly, there is no mechanical device securing the battery cavity since it is integrated into the base. This reduces the need for any mechanical interface for securing the battery compartment. Because there is no need for mechanical locking of the battery cavity, the integrated battery compartment reduces the points of failure for a traditional battery compartment.

The integrated battery compartment eliminates any obstacles that are in the way of the user. The integrated battery compartment is located under the viewing optic out of the way of any of the adjustments and knobs found on traditional viewing optics. The integrated battery cavity is a significant advancement as it allows the necessary space to accommodate a larger battery.

In one embodiment, the viewing optic can be set-up in a manner to minimize battery drain and to maximize battery life. For example, the viewing optic with a laser rangefinder is activated when an operator presses a button or switch. A range finder designator is displayed on the screen. An external range finder's output laser will coincide with the designator through an initial calibration step when zeroing the viewing optic. When the external rangefinder is activated by the operator, information is sent to the viewing optic wirelessly or via the communication port signaling the device that information has been received and needs to be displayed.

If the viewing optic is turned on and no data is received from an external device, the viewing optic will power down after a user set time. After displaying received information from an external device, the power down timer is started and will power down the device if no further button presses are registered.

If more information is received from an external device, the screen will be cleared of the prior information and the updated information will be displayed and the power down timer will be started. This cycle can continue as many times as the operator chooses.

During the time when information is displayed on the screen, a cant indicator is displayed on the screen. This is refreshed from an accelerometer communicating with the microcontroller on a time interval. When the microcontroller is in sleep mode, the integral buttons on the viewing optic will control the brightness of LEDS illuminating a glass etched reticle. When the viewing optic is operating, control of these LEDS becomes suspended and the brightness of the screen will be altered during the corresponding buttons presses.

3. Picatinny Mount

In one embodiment, the disclosure relates to a viewing optic having a main body and a base with a battery compartment and a picatinny mount that can couple to the battery compartment. In one embodiment, a removable picatinny mount is attached to a protruded battery compartment that is incorporated into a base coupled to a main body of a riflescope.

Figure 33:
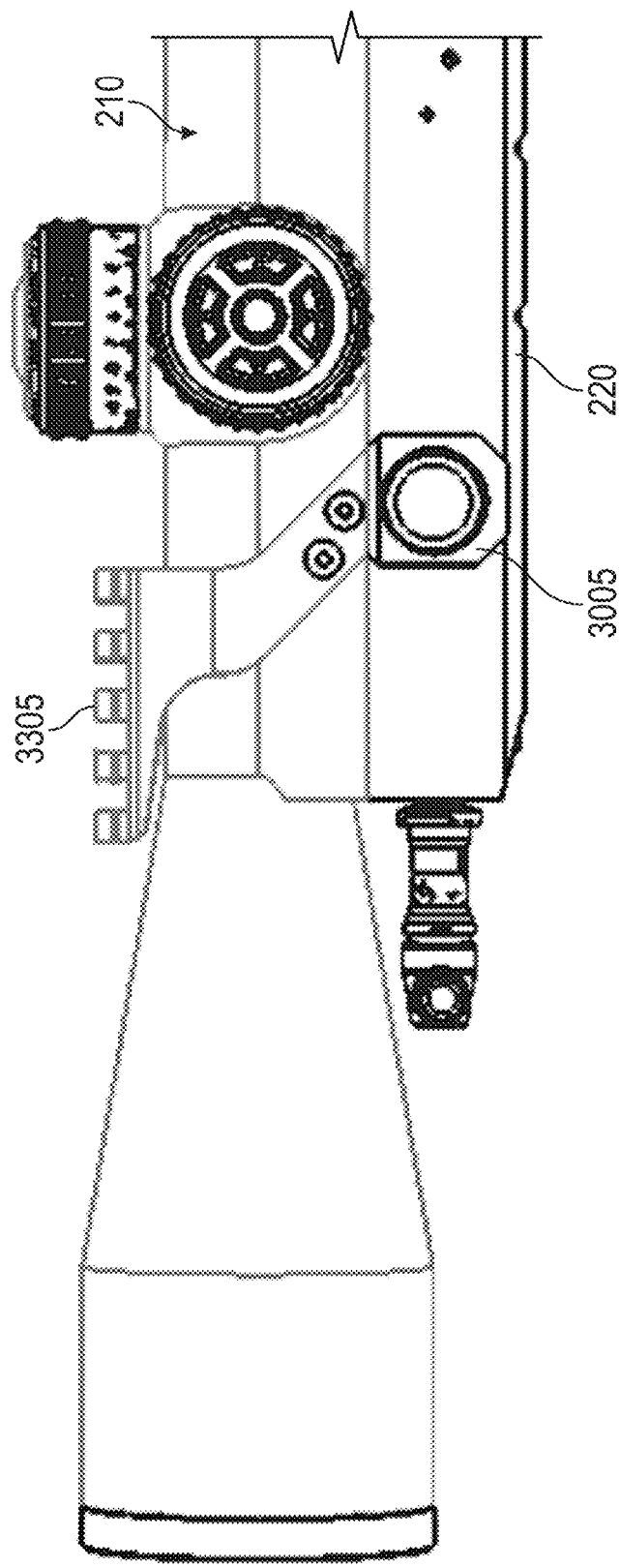
FIG. 33 is a representative schematic of a side view of a base with a battery compartment that can be used to couple to a picatinny mount according to one embodiment of the disclosure.
Figure 34:
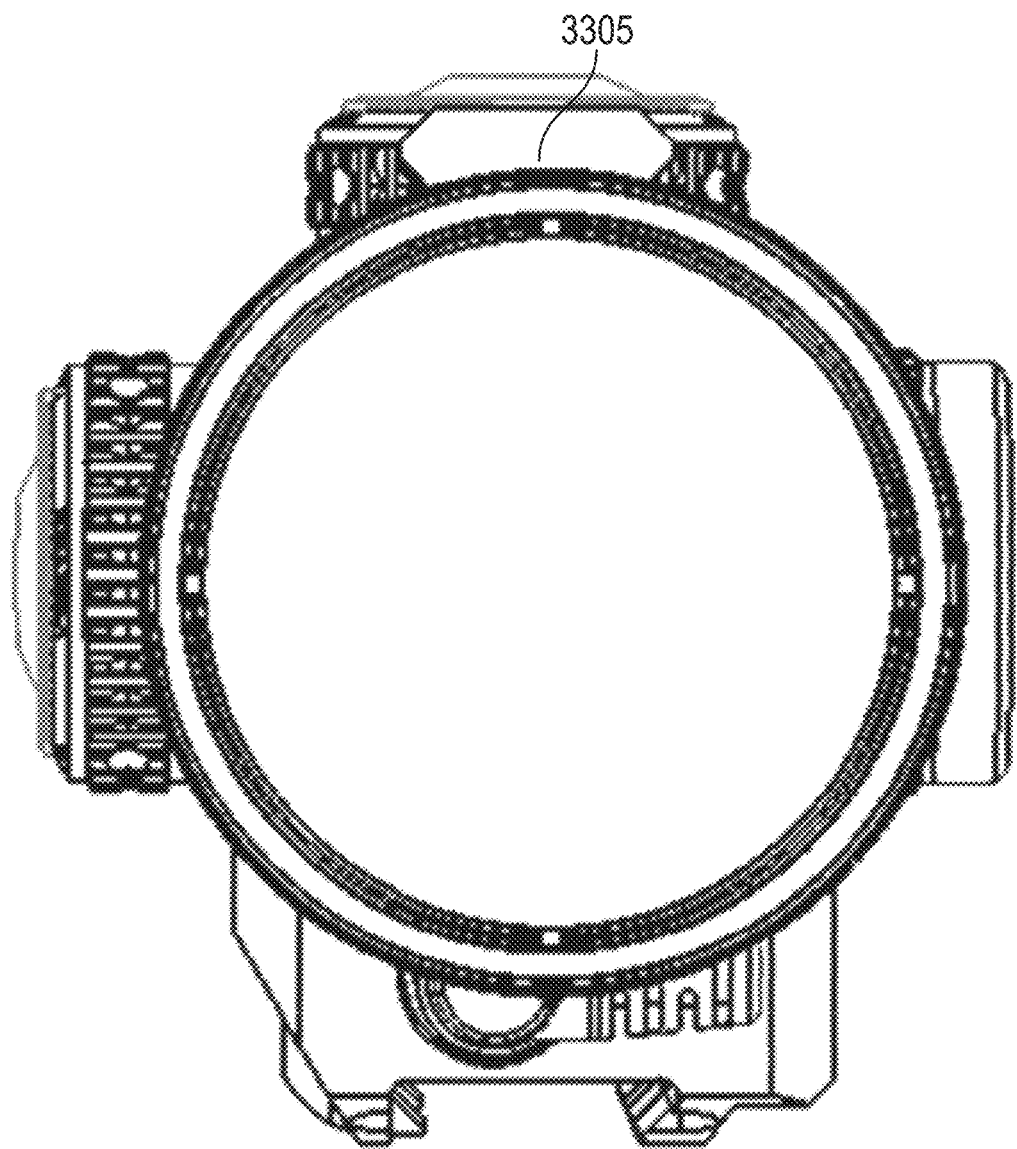
FIG. 34 is a representative schematic of a front view of cantilevered picatinny mount coupled to a battery compartment of a base according to one embodiment of the disclosure.
Figure 35:
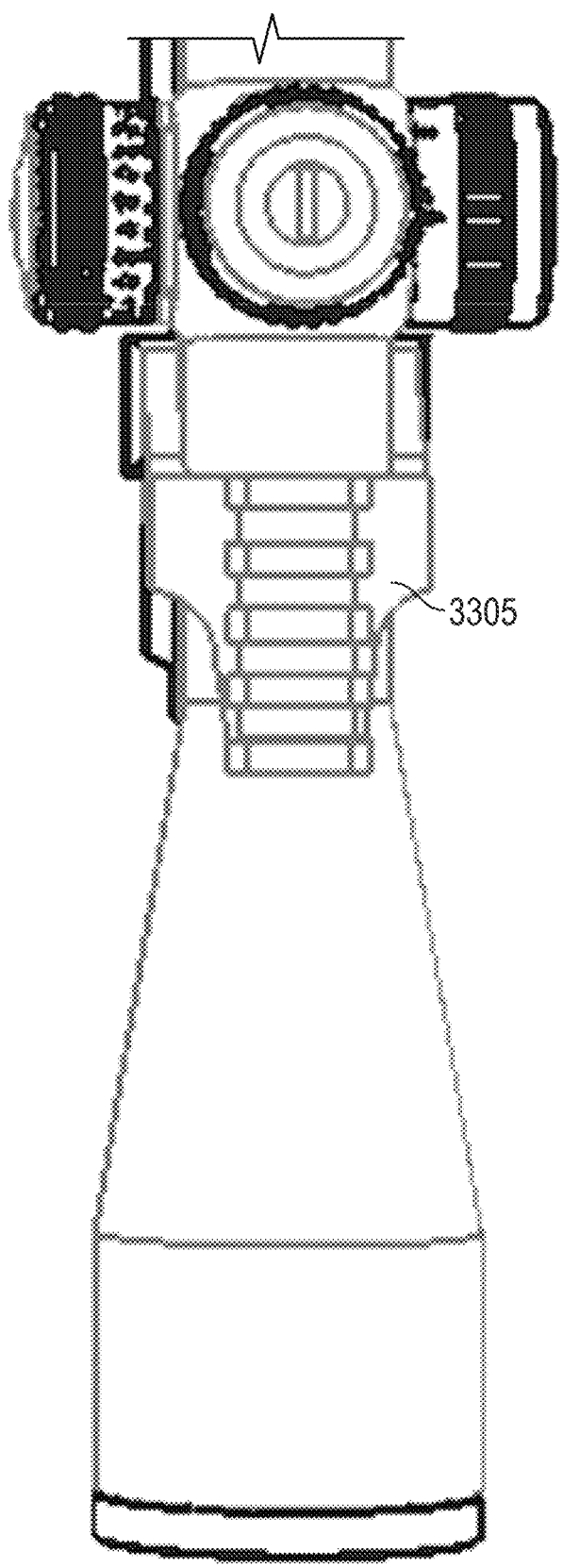
FIG. 35 is a representative schematic of a top view of cantilevered picatinny mount coupled to a battery compartment of a base according to one embodiment of the disclosure.

FIGS. 33-35 are representative schematics of a riflescope with a main body 210 and a base 220 coupled to the main body 210, with the base having a battery compartment 3005 that can attach to a picatinny mount 3305. In one embodiment, the picatinny mount 3305 is aligned with the battery compartment 3005 and secured with fasteners.

By attaching the mount 3305 to the battery compartment 3005 of the base 220, it utilizes the material needed to make the cavity 3005 for the battery. This eliminates the need for any additional material from the base, thereby making the viewing optic lighter and less invasive.

In one embodiment, the mount is located towards the objective of the turrets and parallax knob so as to not intrude on the user's ability to adjust the riflescope. Further, the top ring is removable allowing for easy attachment of an accessory device, such as a laser rangefinder. By utilizing the picatinny mount disclosed herein, no additional structural support from the top portion of the ring is needed since the integrated base secures the riflescope.

In one embodiment, the mount incorporates a cantilevered picatinny rail that extends forward towards the objective of the riflescope. This allows a weapons mounted laser range finder to sit directly over the bell of the riflescope. This style of mount allows for decreased shift of impact and increased accuracy of the ranging device. It decreases the potential for shift of impact since there are fewer variables that may affect the ranging device from acquiring the desired target.

4. Data Ports

In one embodiment, the disclosure relates to a viewing optic with a main body and a base with an active micro display for generating an image and combining the generated image into the image of the scene in the First Focal Plane of the main body of the viewing optic, wherein the base has axially orientated data ports for interfacing with ancillary devices including but not limited to remote control switches and laser range-finders.

Figure 36:
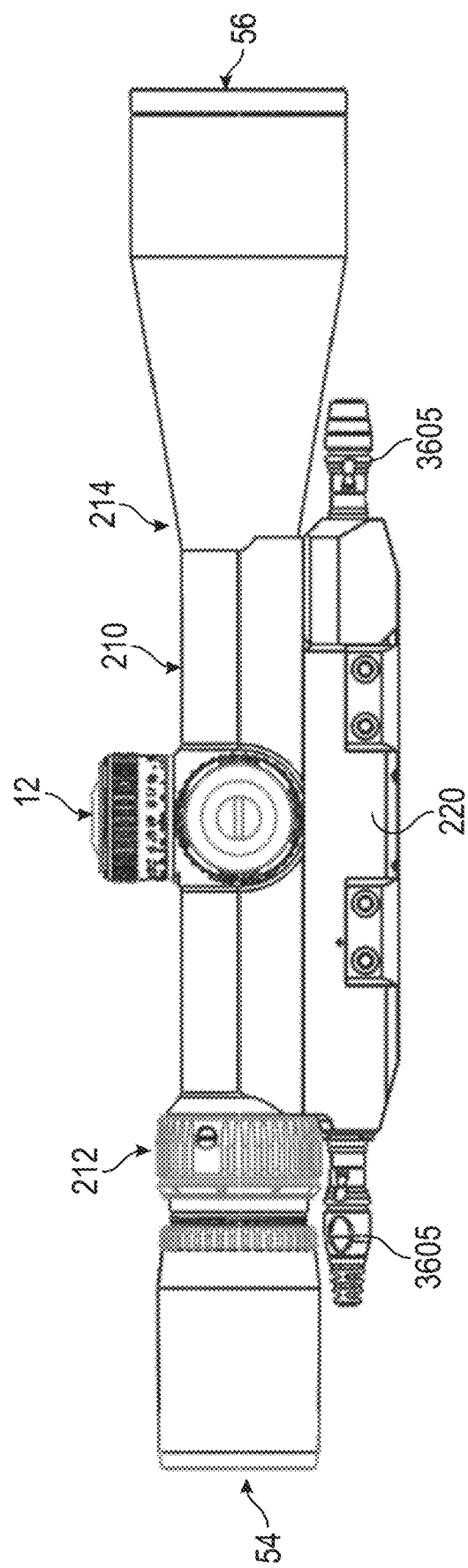
FIG. 36 is a representative schematic of a side profile view of the riflescope with a main body and a base having axially orientated data/communication connections according to one embodiment of the disclosure.

FIG. 36 is a representative schematic of a riflescope 3600 with a main body 210 and a base 220 with axially oriented data ports 3605. In one embodiment, the viewing optic can have one axially oriented data port. In another embodiment, the viewing optic can have two or more axially oriented data ports.

By utilizing an axially oriented data port 3605, the top down profile of the overall viewing optic is minimized, thereby increasing the robustness of the mounted system and its connections.

5. External Video Sources

In one embodiment, the active display in the base can be used as the optical train or optical system of a clip on device, including but not limited to a thermal imaging system and a night vision system.

Thermal imaging systems allow for various waves of the electromagnetic spectrum to be imaged and relayed to the user, which typically cannot be captured by the human eye. Traditional thermal weapon sights are composed of two systems paired together: an infrared optical system, which views the scene and a visible wavelength optical system consisting of a micro display and lenses to recreate the image in front of the riflescope. There are also instances of catalytic photon enhancement, creating what us known as "night vision" systems. However, clip-on devices are typically attached to the rifle rail in front of the main body of the riflescope. This setup blocks all of the ambient light typically imaged by the scope and allows for use of the digital image only. In order to switch back to the traditional image, the user must remove the system from the rail. This can cause an impact shift due to the alignment setup that you go through each time the sight is changed. These clip-on units also tend to be large, due to the need for an eyepiece/imaging system behind the digital display in the units. In traditional systems, any live video feed would be a completely digital image, including the visible spectrum output.

Figure 37:
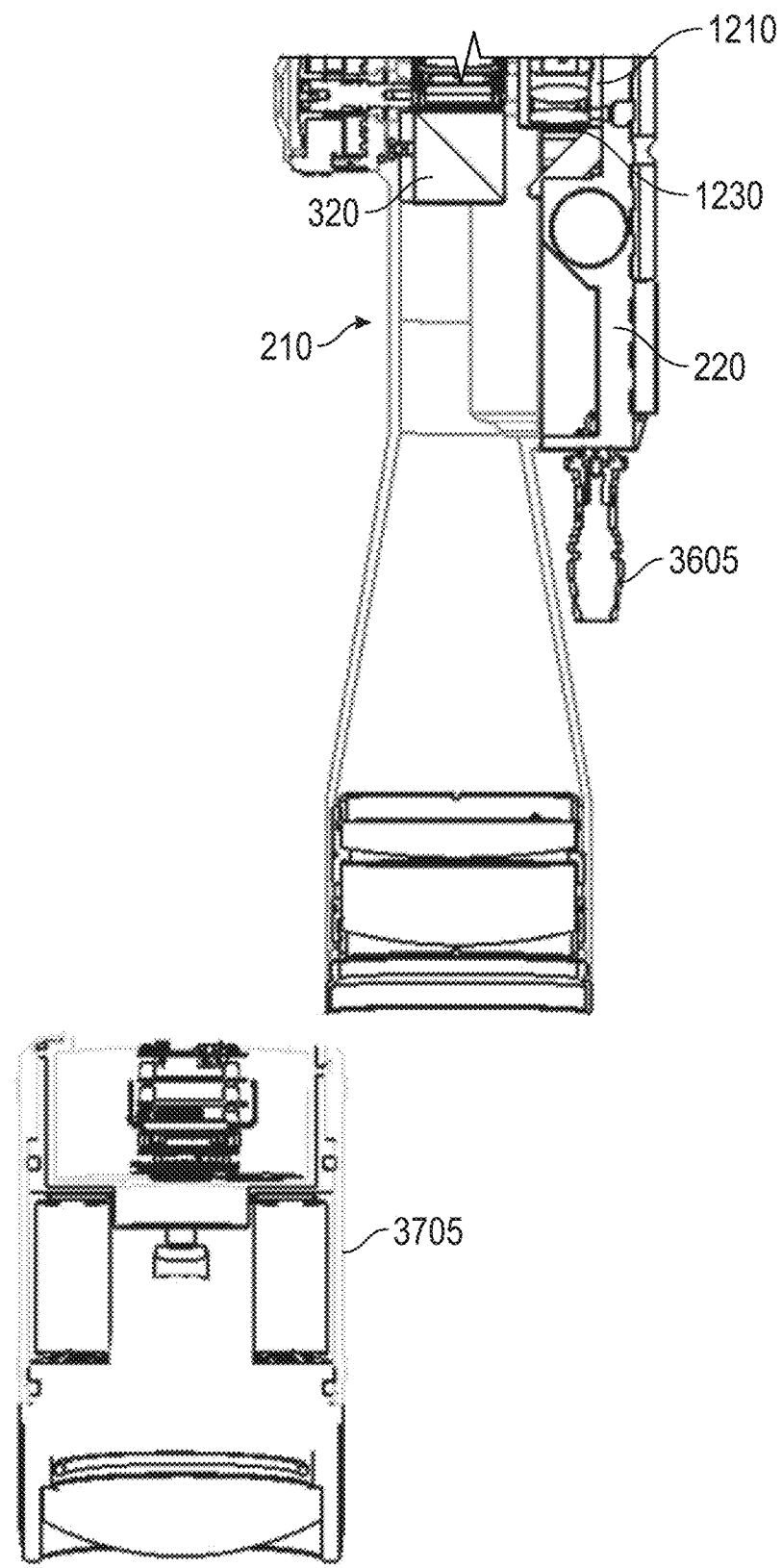
FIG. 37 a representative schematic of a riflescope with a main body and a base having one or more connection interface for communicating with a thermal imaging unit according to one embodiment of the disclosure.
Figure 38:
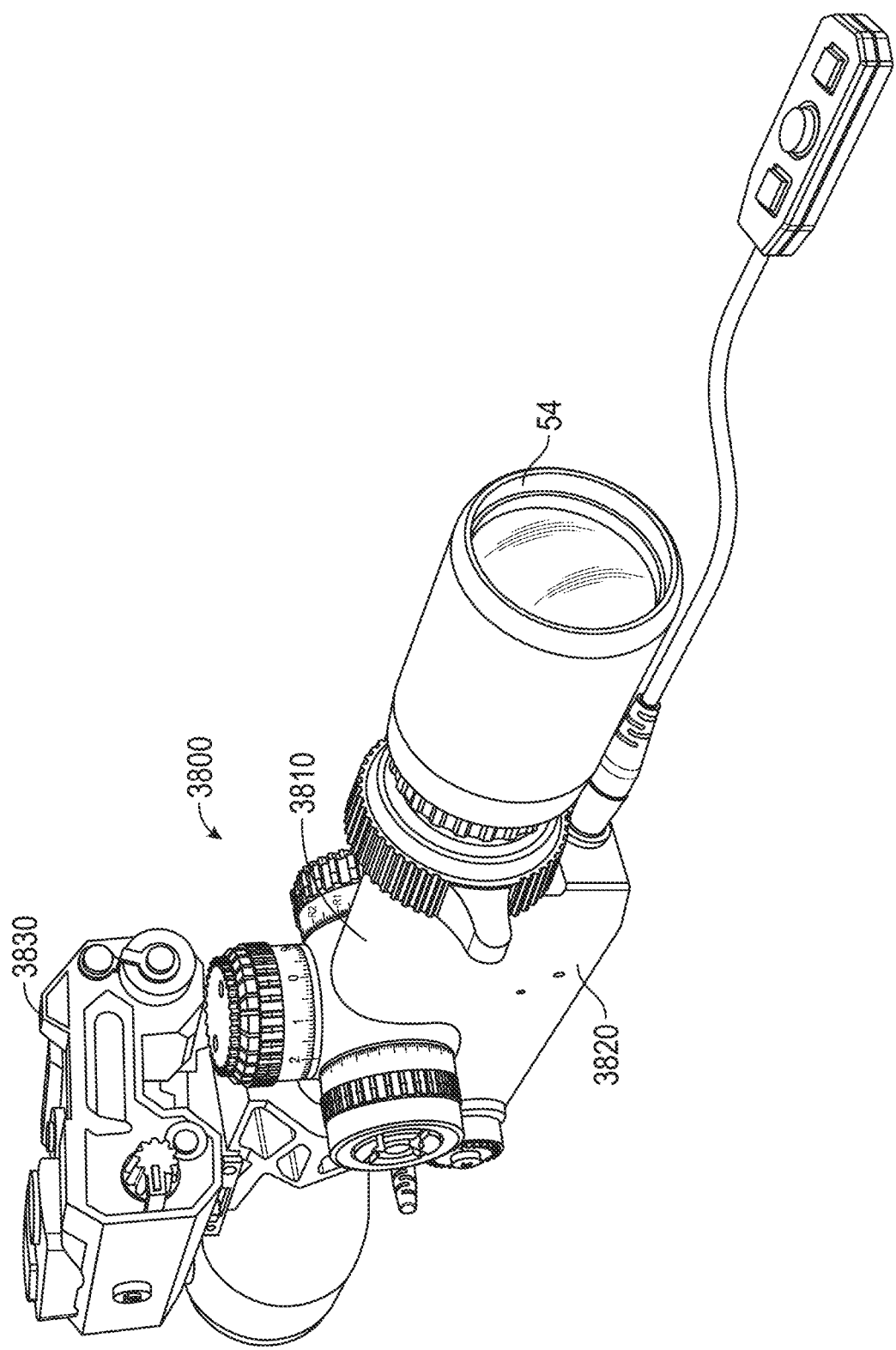
FIG. 38 is a back, left-side view of one embodiment of a riflescope with a laser rangefinder according to one embodiment of the disclosure.
Figure 39:
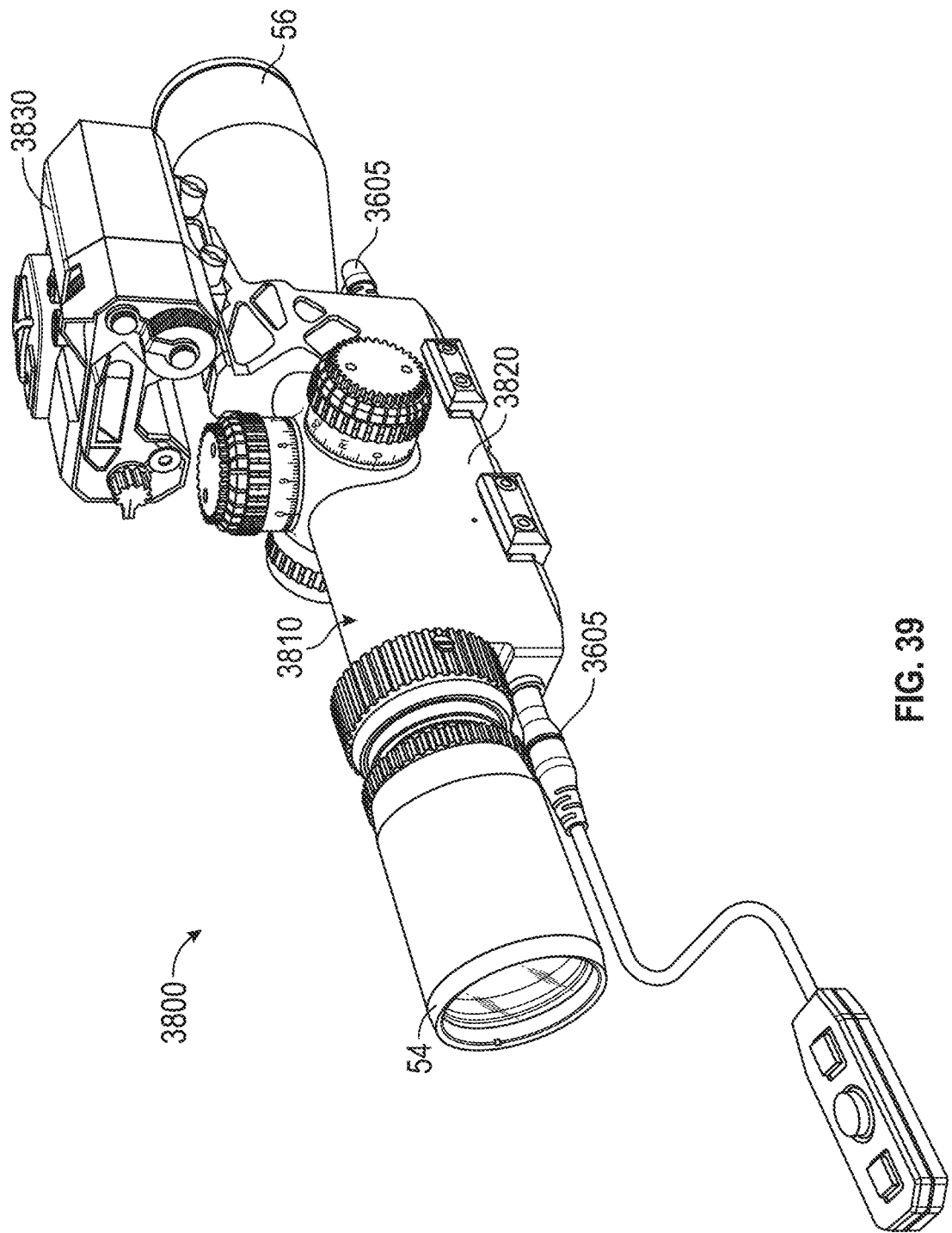
FIG. 39 is a back, right-side view of one embodiment of a riflescope with a laser rangefinder according to one embodiment of the disclosure.
Figure 40:
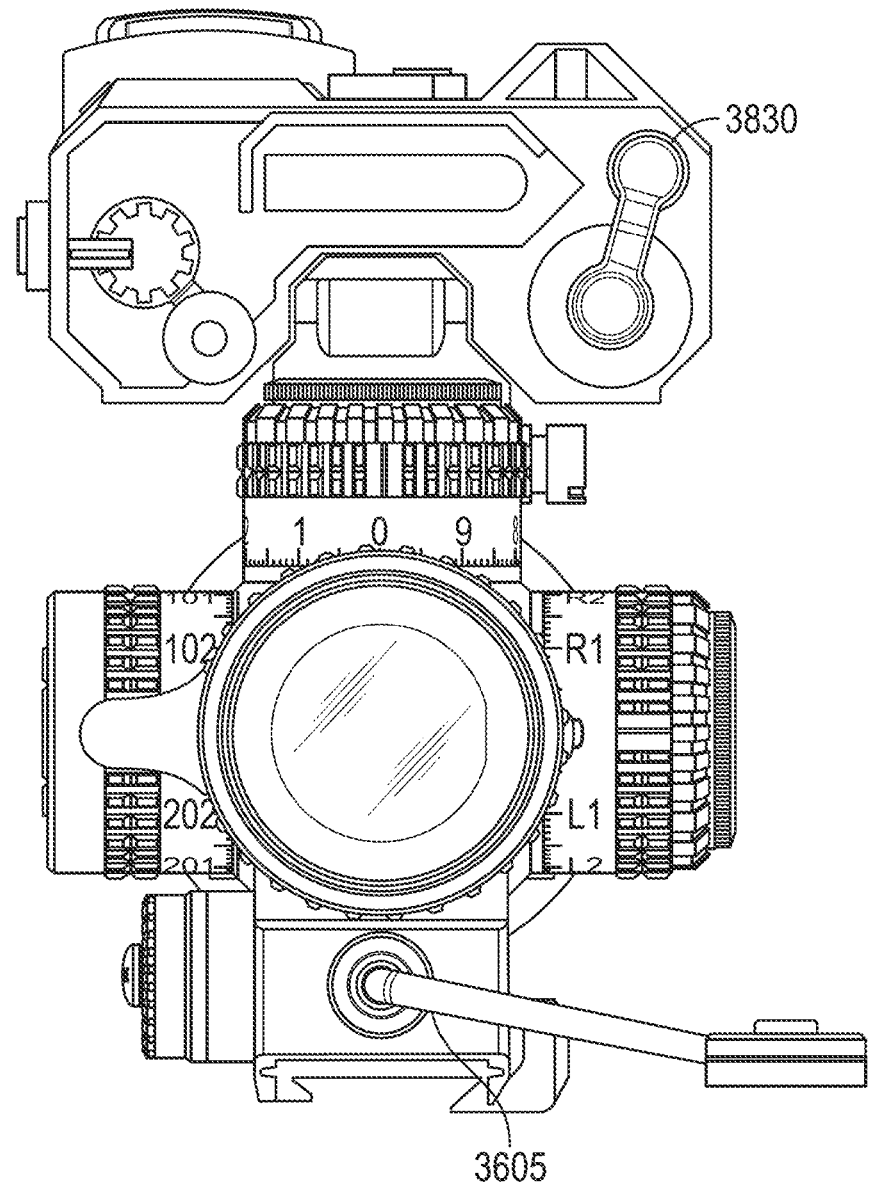
FIG. 40 is a back, right-side view of one embodiment of a riflescope with a laser rangefinder according to one embodiment of the disclosure.
Figure 41:
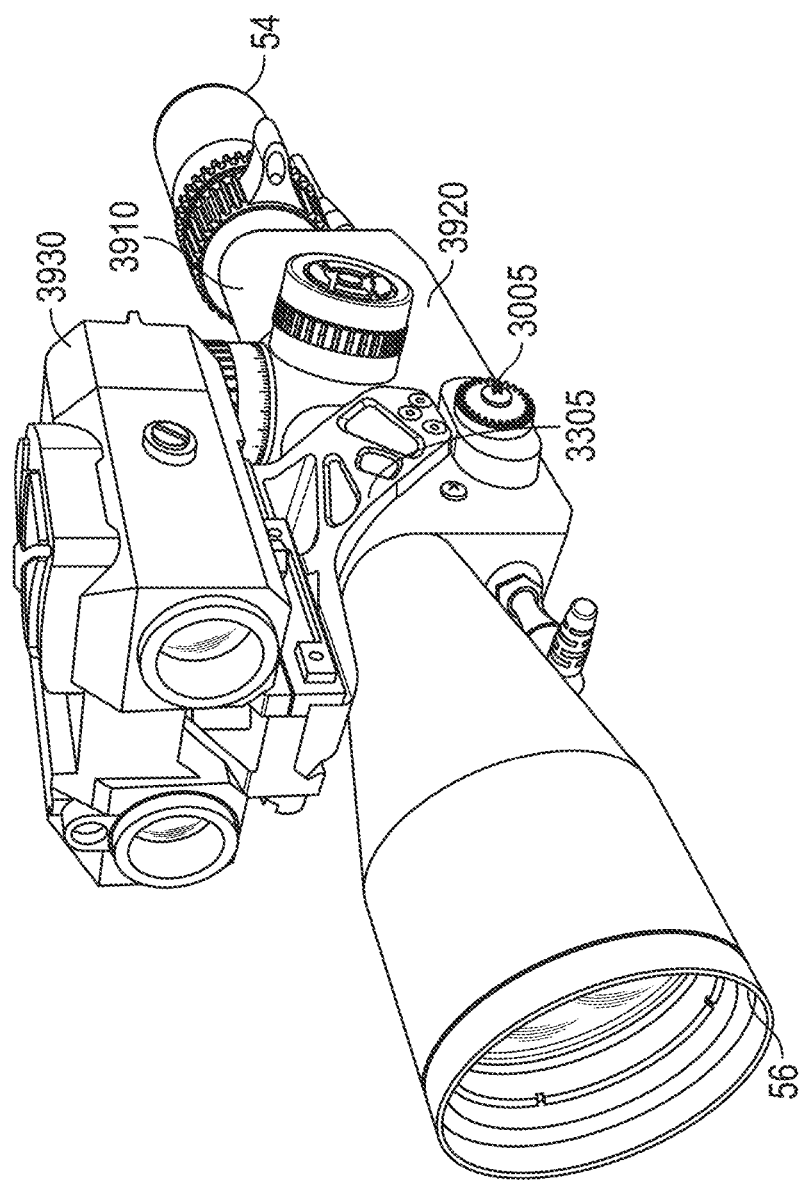
FIG. 41 is a front, left-side view of one embodiment of a riflescope with a laser rangefinder according to one embodiment of the disclosure.
Figure 42:
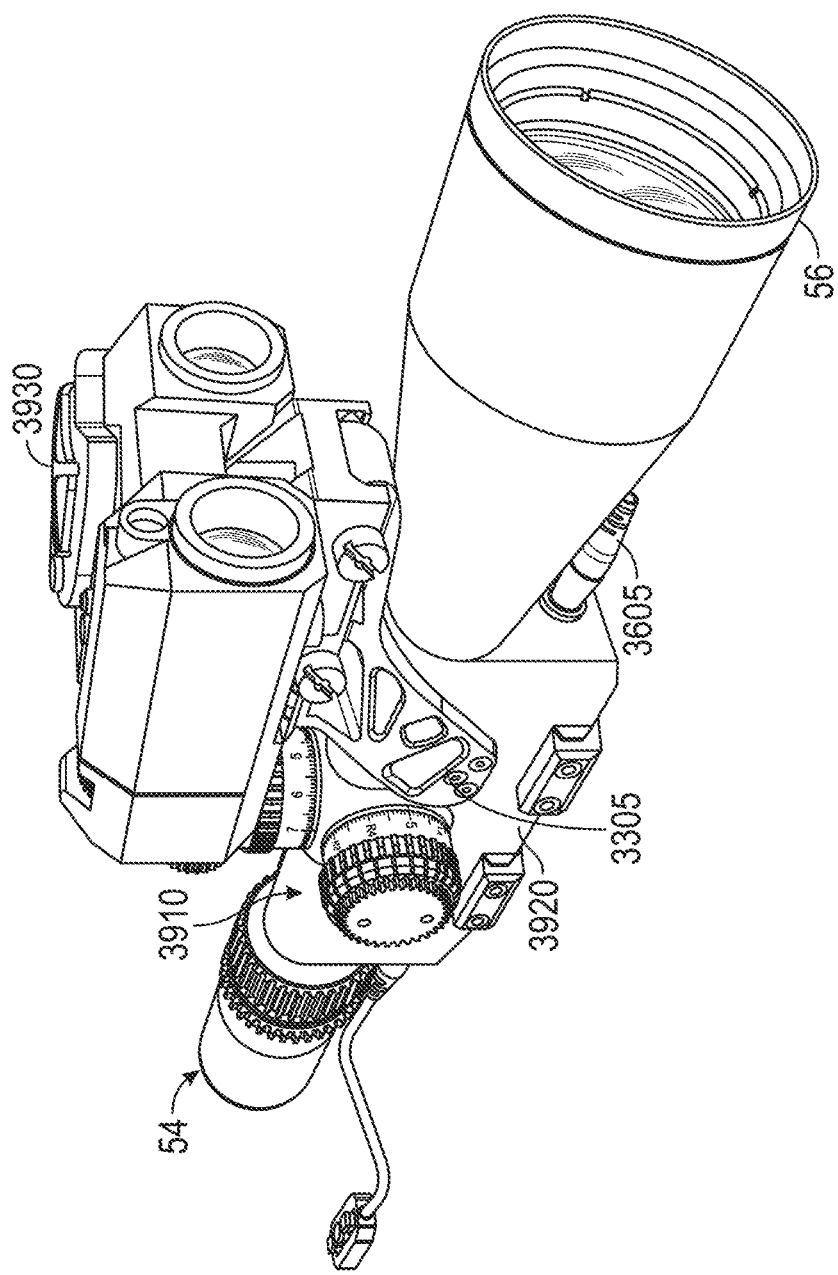
FIG. 42 is a front, right-side view of one embodiment of a riflescope with a laser rangefinder according to one embodiment of the disclosure.
Figure 43:
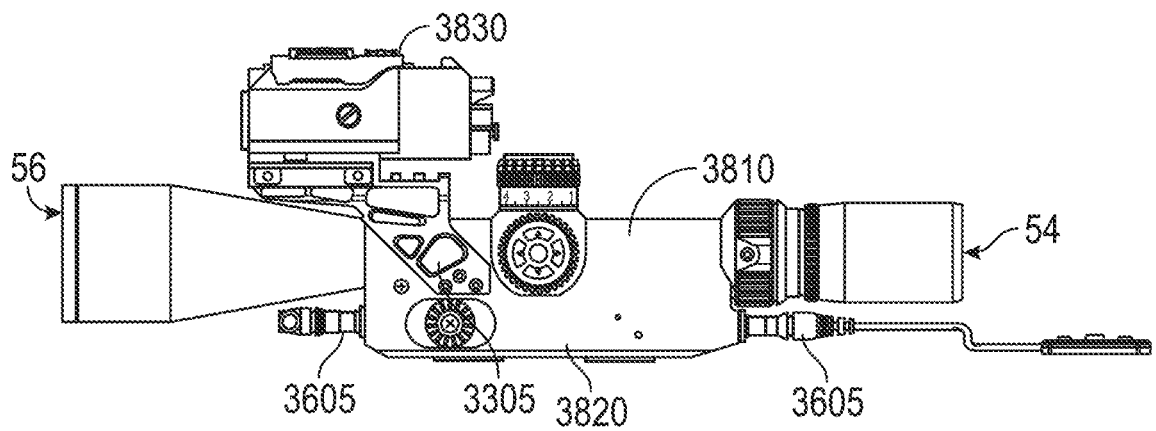
FIG. 43 is a left-side view of one embodiment of a riflescope with a laser rangefinder according to one embodiment of the disclosure.
Figure 44:
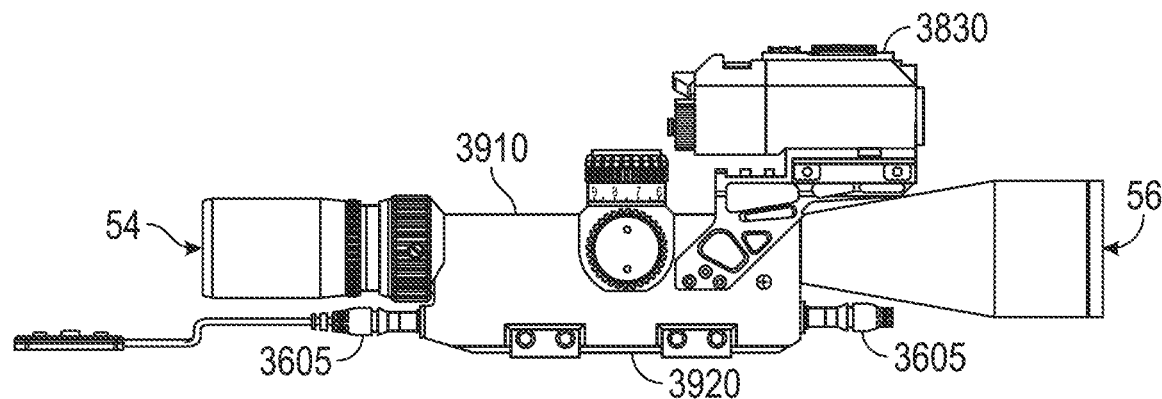
FIG. 44 is a right-side view of one embodiment a riflescope with a laser rangefinder according to one embodiment of the disclosure.

FIG. 37 is a representative schematic of a riflescope 3700 with a main body 210 and a base 220 with an active display 1210 and collector optics 1220 that can be used as the optical system of a thermal imaging unit 3705. The active display 1210 generates an image that is focused on a first focal plane of the main body of the scope, using a beam combiner to integrate the image into the traditional day optic. The integration of the digital display allows for the user to overlay the digital image onto the ambient day optic. With the digital display disclosed herein, the clip-on unit does not have to be removed from the front of the viewing optic to view the ambient day optic. Rather, the digital display can be turned on and off as needed.

The integration of the digital display allows for zero image shift when switching between day visible and digital optic. Since the system is fully integrated, there is no need to zero each time the digital optic is turned on. The system is synchronous, due to the alignment of the combiner optical system.

In one embodiment, the integration of the digital display makes up the optical train that would typically be the rear half of a clip-on unit. Because there is already a micro display in the base of the viewing optic, the thermal sight would only need the infrared optics; the image created by the thermal sensor can be transmitted to the active display, which is already incorporated into the base of the viewing optic. By integrating a thermal or NV sight in this manner, the thermal/NV device will be much shorter and lighter than current weapon sights on the market. This allows for the design of smaller lighter systems, since half of the optical train is now integrated directly into the base that couples to the main body of a viewing optic. There is no need for a rear optical system or display to be integrated into the clip-on unit that contains the sensing device.

Additionally, if the thermal weapon sight were to be mounted off to the side of the riflescope so that the thermal optics did not occlude the riflescope objective, then it would be possible to overlay a thermal image overtop of the visible image that the user would be viewing. This would have the benefit of being able to highlight humans, animals, or anything with a heat signature that stands out in an otherwise neutral daylight scene.

In one embodiment, the integration of the digital display disclosed herein creates the advantage of having live video feed into the focal plan of a viewing optic, without interruption of the day visible sight.

In one embodiment, the integration of the digital display allows for seamless integration of imaging overlays, such as live thermal imaging view, and hyperspectral overlay systems. The visible image is now analog, rather than another digital display.

In one embodiment, the integration of the digital display disclosed herein creates the advantage of continued image feed, even if power were to suddenly drain on the digital system. A true analog image would still be available, which would not be the case in traditional digital output systems.

In one embodiment, the integration of the digital display allows for multiple types of imaging systems to be mounted separate from the front of the viewing optic. A thermal imaging system can be aligned to the bottom or side of the viewing optic and still feed that image directly onto a focal plane within the main body of the viewing optic.

6. EMI Permeable Window

In one embodiment, the main body, the base or both the main body and the base of a viewing optic can have a window that is sealed with a material transparent to the electromagnetic waves used for the wireless communication. Transparent materials include but are not limited to plastics, resins or epoxies.

In one embodiment, the window allows EM waves to propagate from the communicating device with reduced interaction from the metallic body of the viewing optic. This increases the rate at which data can be transmitted. It also allows the wireless communication device to operate at a lower power level due to reduced signal losses.

III. Additional Sensors/Devices

In another embodiment, the disclosure relates to a viewing optic with a main body and a base with an integrated display system and one or more sensors. In one embodiment, the sensors include but are not limited to a Global Positioning System, accelerometers, a magnetometer, MEMS rate sensors, tilt sensors, laser rangefinder.

A. Pointing Angle, Target Location, and Communication

In one embodiment, the viewing optic can have inertial MEMS Rate Sensors to determine the pointing angle of the weapon in inertial space. Example products are the LCG-50 by Systron Donner and the SiRRS01 by Silicon Sensing. In another embodiment, accelerometers can be incorporated into the embedded electronics to determine absolute tilt angle of the viewing optic and track weapon accelerations due to general movement or a firing event.

To support targeting, in various embodiments, the viewing optic can have a GPS and/or digital compass. In one embodiment, the GPS and/or digital compass can be integrated into the viewing optic, for example, as board level modules. In another embodiment, the GPS and/or digital compass can be associated with a separate device that communicates with the viewing optic.

Several manufacturers offer custom of the shelf modules for GPS and digital compass functionality that are small form factor and have low power consumption characteristics. These devices are designed to be integrated into embedded components. For example, Ocean Server Technology makes a OS4000-T compass with 0.5 deg. accuracy and has a power consumption under 30 ma and is less than 3/4" square. An example of a GPS device is the DeLorme GPS2058-10 Module that is 16 mm×16 mm and is available in a surface mount package offering 2 meter accuracy.

In one embodiment, the viewing optic can have a data interface that provides one or both of wired and wireless capabilities designed to interface to systems such as the BAE Personal Network Node and the emerging SRW radio. These interfaces provide various communications capabilities, such as range, sensor, and other tactical data (e.g. anti-fratricide detector, environmental sensors, etc.). This unique functionality is used in various embodiments to obtain and communicate environmental, target, and situational awareness information to the community of interest. Generally speaking, the various embodiments are designed to enable the war fighter to quickly acquire, reacquire, process, and otherwise integrate data from a variety of passive and active sources into a ballistic firing solution thereby increasing the shooter's effectiveness.

In another embodiment, the sensors provide information to the active display in order to generate real time position data of different targets onto the first focal plane of the main body of the viewing optic. In another embodiment, the sensors are part of an external device that communicates with the integrated display system.

By using these sensors in the viewing optic, or on an external device that is rigidly connected to the viewing optic, or on a weapon that the viewing optic is mounted to, the exact position of the viewing optic can be obtained, as well as the exact direction that the viewing optic is pointed, and external targets can be calculated in relation to the viewing optic position and aimed direction.

As the user moves the viewing optic around or as targets move in relation to the viewing optic, the position of the targets would be updated continuously and in real time by the sensors communicating with the integrated display system, so that by viewing through the viewing optic the user would be able to see where the targets are in relation to where they are looking.

This approach has strong utility in military applications where you may have personnel in different locations that are trying to communicate a specific target location to one another. For example, with Close Air Support (CAS), a pilot may be flying an aircraft and a unit on the ground may be relying on the aircraft to drop a bomb on a target. Often times, it is difficult for the unit on the ground to relay to the aircraft the exact location of the target. The process of relaying the target information between the ground unit and the aircraft is often referred to as "talking on to the target," and involves communicating what the unit or aircraft is seeing in their field of view, such as what landmarks might be visible near the target and so on.

This process often takes quite a bit of time and can cause confusion because things often look different from the air than they do on the ground. It is critical that each unit be sure that they are all looking at the same target, because if the aircraft mistakes the target they may drop a bomb on friendly units, or non-combatants.

By allowing location and position sensors to communicate with the active reticle display of the integrated display system, these issues are solved. The user of the viewing optic can designate a target in their scope, the scope knows the GPS location of the scope, the exact direction it is pointing and distance to the target and can calculate the exact GPS coordinate of the target. This information can be fed into a universal system, such as Link 16, that all friendly units are connected to. Now the aircraft can simply look at a display in their aircraft and the new target is displayed on their map as soon as another unit designates it.

This makes finding targets much quicker and the confirmation that both units are looking at the same target much easier. Accuracy is extremely important in determining target locations, thus, the active display generated images need to be displayed in the first focal plane of the main body of the viewing optic. If the generated image from the active display were put into the second focal plane of the viewing optic, then the target locations would only be accurate when the viewing optic reticle was at its "zeroed" location. If the user of the viewing optic had dialed anything on their turrets, for example to engage a long range target, then all of the target information in the display would be shifted the amount dialed in the turrets and not be accurate.

By using this with the active display images injected into the first focal plane, the displayed data is agnostic of any adjustments made to the reticle position and is automatically compensated for. This means that target data in the field of view is always accurate.

B. Environmental Sensors

In one embodiment, the viewing optic can have one or more pressure, humidity, and/or temperature sensors designed to collect and use environmental data for ballistic correction purposes. The sensors are available in miniature configurations suitable for integration into the viewing optic. An example of a miniature, low power, water proof, barometric pressure sensor is the MS5540 from Intersema. This component measures 6 2×6.4 mm.

In one embodiment, the sensors can be coupled to the main tube of the viewing optic or to the base of the viewing optic.

C. Uphill and Downhill

In one embodiment, the viewing optic can have a z-axis accelerometer that can be used to measure tilt angle of the scope with respect to vertical. This tilt angle can be integrated into a ballistic solution at the time of target selection. Once the target is selected, the system may be able to automatically integrate actual uphill or down tilt into the ballistic solution and display the solution into the first focal plane of the viewing optic so that the digital reticle or corrected aiming point is displayed correctly. This can provide for a very fast and effective means of aiming in long range uphill or downhill engagements.

IV. Viewing Optic with Display System and Laser Range Finder

In one embodiment, the disclosure relates to a viewing optic having a main body and a base with an integrated display system, and a laser rangefinder. In one embodiment, the laser rangefinder is coupled to the viewing optic. In another embodiment, the laser rangefinder is independent from the viewing optic and communicates with the viewing optic, either wirelessly or through a cable.

In one embodiment, the laser rangefinder couples to the viewing optic via a mounting rail that attaches to the base through the battery compartment.

In one embodiment, a laser rangefinder can be used to determine distance to target. In various embodiments, the laser transmits in the near IR for covertness. A typical wavelength used for laser rangefinder devices operating in the near infrared (NIR) is 905 nm.

In one embodiment, the specific laser power and spectral characteristics are selected to meet range and eye safety requirements of the viewing optic. The rangefinder is of sufficient power to produce accurate measurements out to, illustratively, 1500 meters, 2500 meters or whatever effective range is associated with the firearm or weapon intended to be used with the viewing optic. For rangefinder operation, in some embodiments a single button control is dedicated for making or executing a rangefinder measurement.

In one embodiment, the range to target may be communicated to the active display that generates an image of the range to target and superimposes the range to target onto the first focal plane of a viewing optic when viewing the target scene.

In one embodiment, the viewing optic has a computing device with ballistics calculator capabilities. In one embodiment, the main body of the viewing optic has a computing device with ballistics calculator capabilities.

In one embodiment, a laser rangefinder can be used to measure a target distance, calculate projectile ballistics and communicate the corrected aim point to an active display in an integrated display system, which then superimposes the image of the corrected aim point onto the first focal plane of a viewing optic with a reticle attached to a moveable erector lens system.

Importantly, because the active display generated image is combined with the image from the target in front of the first focal plane and then focused onto the first focal plane, the target image and display image never move in relation to one another. Therefore, any aiming reference created by the digital display will always be accurate, regardless of how the moveable erector system is adjusted.

When an external laser range finder feeds range information to the riflescope, an aiming reference or laser designator will need to be created by the digital display in order for the user to know where in the field of view the LRF is aiming in order to accurately hit the correct target with the laser. The digital display image and the target image of the objective lens system in the main body of the riflescope do not move in relation to one another. Therefore, the digital laser designator will accurately show the user the correct location of the LRF laser point of aim, no matter how the turrets have been adjusted to move the moveable erector lens system.

On the other hand, if the digital display image was integrated into the optic system anywhere behind the first focal plane then when the turrets are adjusted, and the erector lens system is moved/tilted, then the image of the digital display would move in relation to the target image and the digital LRF designator would move in relation to the actual laser point of aim. This could lead to an incorrect range measurement if the user dials any elevation or windage adjustment into the turrets and forgets to dial back to the original position the turrets were set to when the user aligned the digital reticle with the actual laser point of aim.

In addition, when a traditional riflescope is zeroed to the rifle, the user will typically select a "zero" range, often times 100 yards, that is used align the riflescope reticle with the point of impact of the rifle projectile. This is usually accomplished by adjusting the turrets of the riflescope, and thus the angle of tilt of the erector lens system, in order to align the reticle with the point of impact of the projectile. After the initial "zero" of the riflescope has been set, the turrets allow the user to further make adjustments to the riflescope reticle position in order to compensate for targets at different ranges or for changing wind drift variables that affect where the point of impact of the projectile may change from the initial "zero" position.

If the digital display were to be integrated into the riflescope system behind the first focal plane, then the ballistically calculated correction factor to the point of aim would have the potential to be incorrect if the user had made any adjustments to the turrets from the initial "zero." For example, if a ballistic calculator determined that the correction required 10 milliradians of elevation adjustment to hit the target, the digital display would place an aim point 10 milliradians below the center of the crosshair. However, if the user had dialed 5 milliradians into the elevation turret from the initial "zero" position, the digital aim point would actually be aiming 15 milliradians below the initial "zero."

By injecting the digital display into the first focal plane of the optic system of the main body of a riflescope, it allows the digital display to be totally unaffected by any change in the turret adjustment or position of the erector system. This means that in the example above, the digital aim point would actually appear only 5 milliradians below the center of the reticle, for a total of, the correct, 10 milliradian ballistic drop (user had previously dialed 5 milliradians into the elevation turret from the initial "zero" position). In short, injecting the digital display image into the first focal plane of the optic system of the main body renders the digital display image completely agnostic to any change in the turret position and thus the erector lens system movement/tilt, which provides the needed accuracy.

In one embodiment, the laser range finder capability provides dynamically defined ballistic solutions based upon data acquired. The range to target may be used by the on-board computer when processing tracer trajectory to determine the best point along the measured trajectory path to use for determining the ballistic correction for the next shot.

In one embodiment, the laser rangefinder is integrated into the scope and has a dedicated outgoing laser transmission port. In one embodiment, the optical path of this dedicated laser axis is positioned in the corner of the housing, so it is unobstructed by the main objective lens. The detection path for the incoming reflected laser signal is through the main objective of the scope where the light is directed to a photo detector by a near IR beamsplitter. This arrangement takes advantage of the relatively large aperture of the main objective lens to increase the signal to noise of the measurement.

FIGS. 38 through 44 provides photographs of a viewing optic 3800 having a main body 3810 with an optical system and a base 3820 coupled to the main body 3810 having an integrated display system, with a laser range finder 3830 coupled to the top of the main body 3810. The viewing optic 3800 can have two auxiliary ports 3805 for communication with an external source. The viewing optic 3800 can have a picatinny mount 3305 that couples to the outside of a battery cap for a battery cavity 3005 in the base 3820.

Figure 45:
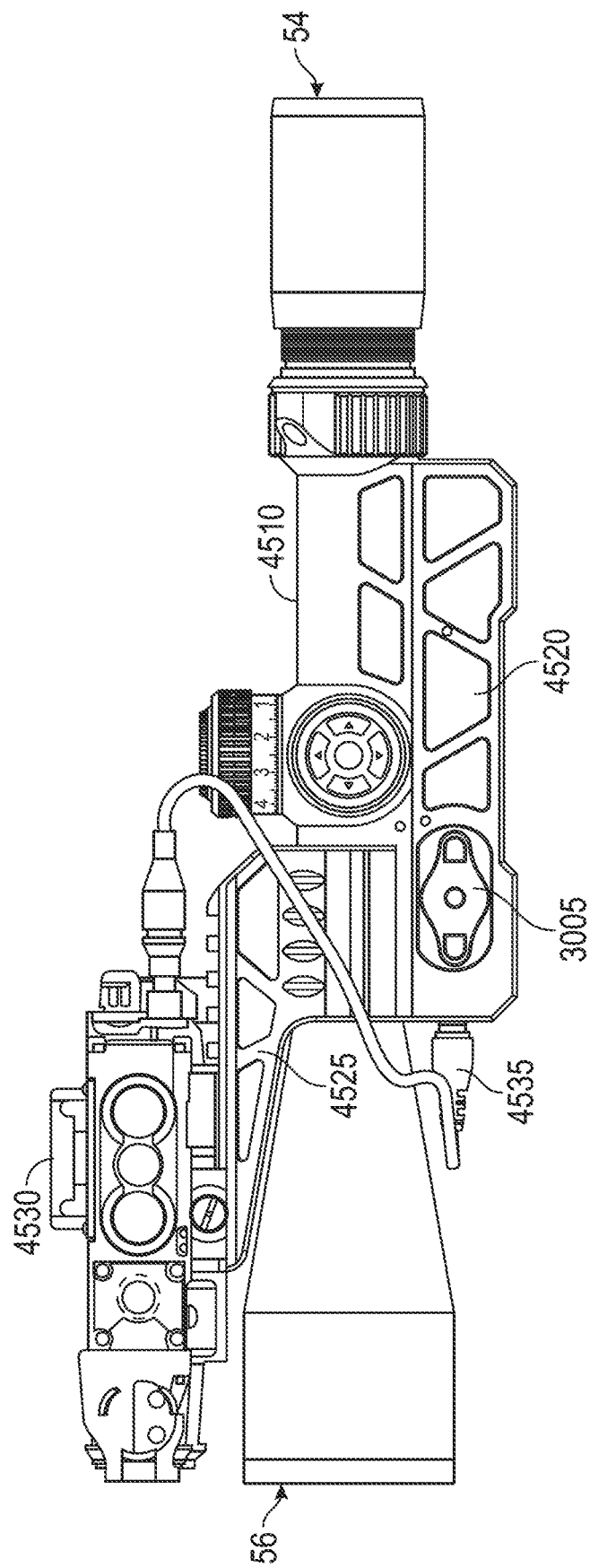
FIG. 45 is a right-side view of one embodiment of a riflescope according to one embodiment of the disclosure.
Figure 46:
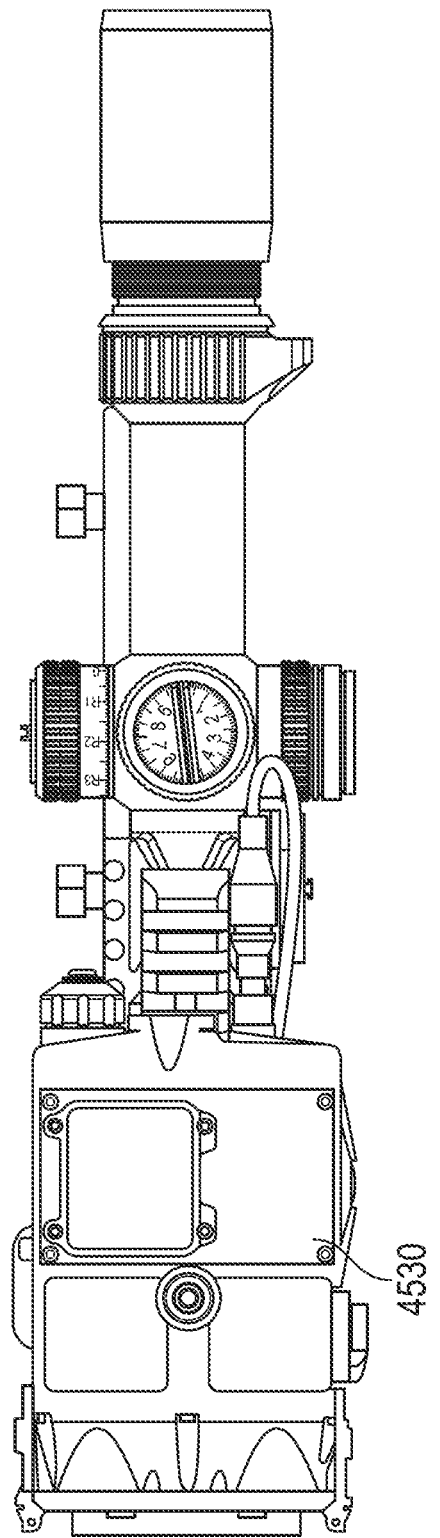
FIG. 46 is a top-side view of one embodiment of a riflescope according to one embodiment of the disclosure.

FIGS. 45 through 46 provide depictions of a viewing optic 4500 having a main body 4510 with an optical system and a base 4520 coupled to the main body 4510 having an integrated display system, with a laser range finder 4530 coupled to the top of the main body 4510. The viewing optic 4500 can have a single auxiliary port 4535 for communication with the laser range finder 4530.

Figure 47:
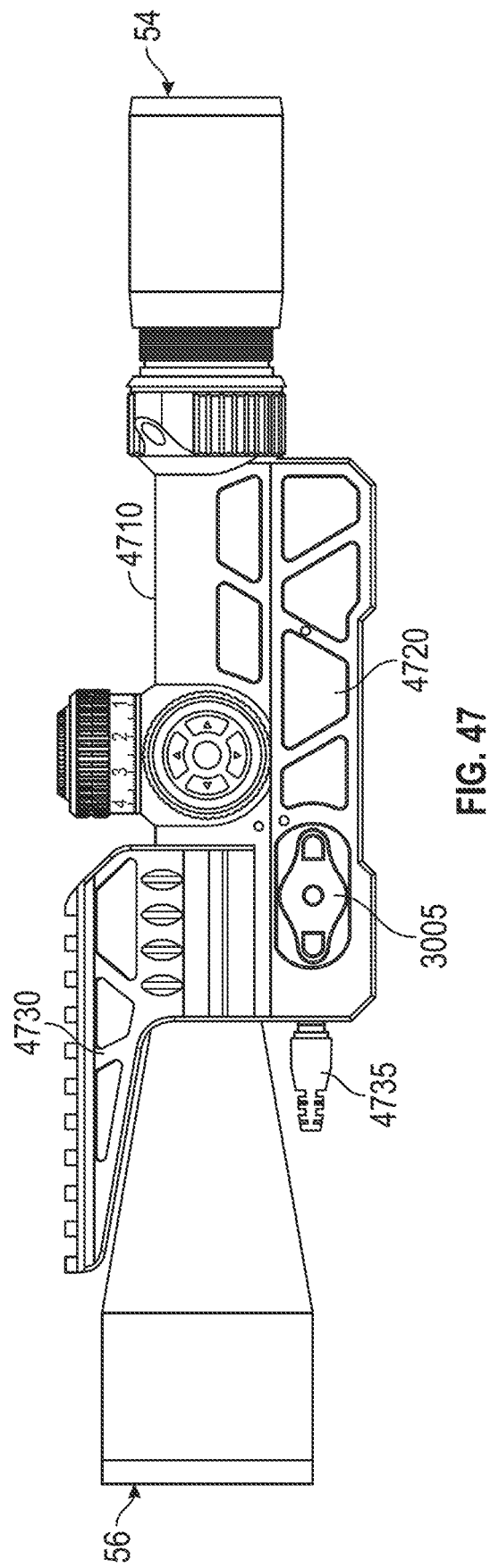
FIG. 47 is a right-side view of one embodiment of a riflescope with a laser rangefinder according to one embodiment of the disclosure.
Figure 48:
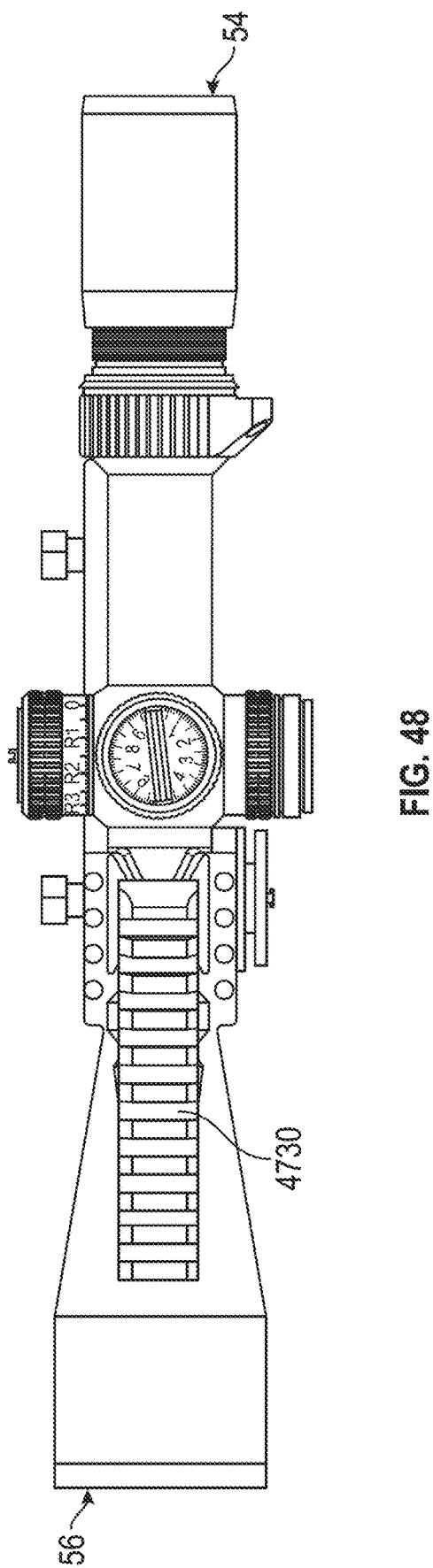
FIG. 48 is a top-side view of one embodiment of a riflescope with a laser rangefinder according to one embodiment of the disclosure.

FIGS. 47 and 48 provide depictions of a viewing optic 4700 having a main body 4710 with an optical system and a base 4720 coupled to the main body 4710 having an integrated display system. In certain embodiments, the viewing optic 4700 can have a picatinny mount 4730. In certain embodiments, the viewing optic can have an auxiliary port 4735.

V. Additional Embodiments

1. Digital Zeroing

In one embodiment, the disclosure relates to method for using a digital reticle for alignment and zeroing purposes. In one embodiment, the viewing optic has a physical reticle and a digital reticle, with the physical reticle being connected to the erector system. The user "zeros" the physical reticle by using turrets to move the reticle and erector system so that the center of the reticle coincides with the bullet point of impact.

After the physical reticle is zeroed, the digital reticle must also be zeroed. Since the digital reticle is formed by an active or digital display that is fixed in position, the only way to zero or align the digital reticle is by using a digital means. The digital reticle position can be moved by the user so that the center of the digital reticle coincides with the center of the physical reticle.

In another embodiment, digital zeroing can also be used with a laser designator. When used in conjunction with an external laser range finder, the viewing optic laser designator must be aligned with the direction that the laser range finder is pointing. Most external laser rangefinders have a visible laser and an infrared laser. The infrared laser is the laser that actually measures the range. The visible laser can be turned on an off and coincides with the aim of the infrared laser. The visible laser allows the user to see where the laser is aiming. Once the visible laser is turned on, the user can then digitally adjust the laser designator to coincide with the point of aim of the visible laser. Then the visible laser can be turned off and the user can use the laser designator in the viewing optic display to ensure accurate aiming of the laser rangefinder.

2. Holographic Waveguide

In one embodiment, the disclosure relates to a viewing optic having a main body with a first optical system and a base with active display and a holographic waveguide. In one embodiment, the integration of the holographic waveguide reduces the package size and weight of a traditional beam combining system. The integration of the holographic waveguide can increase the overall transmitted brightness ratio, such that a greater percentage of each optic system light gets to the end user.

Figure 49:
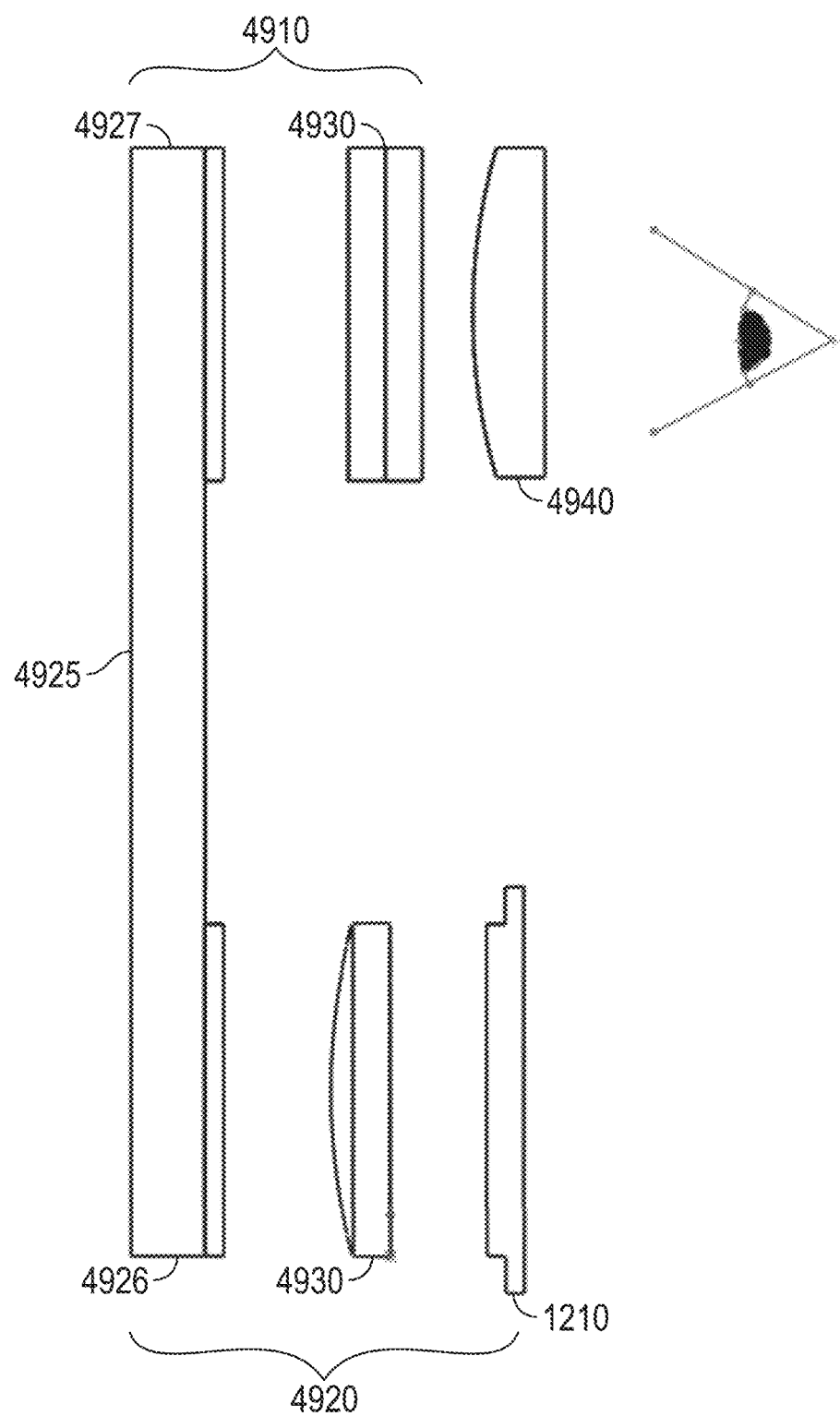
FIG. 49 is a representative schematic of a holographic waveguide setup with the digital display coupled into the waveguide and sent out of the second hologram which focuses the light onto a predetermined focal plane according to one embodiment of the disclosure.

FIG. 49 is a representative depiction of a viewing optic 4900 with an optical system in a main body 4910 and a base 49 having an active display 1210 and a holographic waveguide system 4925. The holographic waveguide system 4925 spans the main body 4910 as well as the base 4920. A digital or active display 1210 generates an image to the collimation optic 4930, which sends the image to the incoming hologram waveguide 4926. The image exits the waveguide via the output hologram 4927 and the image is injected into the first focal plane 4930 of the optical system 4940.

In one embodiment, the integration of the holographic waveguide reduces the need in specialized coatings made for beam combiners. In addition, the integration of the holographic waveguide disrupts the need for a mirror system, alleviating the need for complex mechanical alignment systems.

The integration of the holographic waveguide allows you to create a copy of the complex optical system needed to image a display, eliminating the need for a complex system to be put into every system.

The integration of the holographic waveguide allows for the use of LCOS, LCD and OLED systems to display information within an optical system. The nature of the system allows for various types of illumination systems in conjunction with the different types of displays used within the system.

The use of a holographic waveguide allows for the implementation of non-static illuminated reticles. The reticles can be changed just as images on a screen are changed. The holographic waveguide allows for daylight bright reticle systems without the need for traditional illumination methods.

The integration of the holographic waveguide creates the ability to create a non-static holographic sight. The out coupling hologram can send light as defined by the master optical system, allowing for changes in the sight picture of a holographic sight.

The integration of a holographic waveguide can be used with any monochromatic or polychromatic light source. The use of complex multiplexed Bragg gratings allow for the integration of multi-chromatic illumination systems.

3. Tracking Bullet Trajectory

One of the difficulties associated with long range engagements is the ability to determine the accuracy of an initial shot so that a timely correction can be made to improve the accuracy of the next shot. A traditional technique used to determine the round's point of impact is to attempt to detect bullet trace and/or actual splash point of bullet. This can be difficult in many long range engagements. In the case of a sniper team, the follow up shots also require feedback from the spotter to get the pertinent data back to the shooter. This can take several seconds using only verbal communications.

In one embodiment, the viewing optic can have an imaging sensor adapted to detect image frames associated with a bullet flight path and communicate said image frames to a computing device, which can then calculate bullet trajectory therefrom.

In one embodiment, the viewing optic with a main body and a base with an integrated display system can allow tracer rounds to be detected by on-board image processing capabilities so as to determine the bullet's trajectory just before it impacts the target area. In one embodiment, this data can be communicated back into a ballistics computer thereby quickly and efficiently creating a follow up firing solution for the second round, which can be communicated to the active display and the corrected aiming point superimposed into the first focal plane of the main body of the viewing optic.

Automating the feedback loop with trajectory and splash point detection by computer and combining this to the active display and superimposing an electronic aiming point correction in the first focal plane advantageously decreases the total time required to make an accurate second shot. This time reduction can be at a critical point in the engagement process. After the first shot is made, the window of opportunity to make a second shot can quickly narrow, especially if delays extend past the point in time when the sonic boom of the initial shot reaches the intended target.

Environmental conditions and windage drifts can have substantial impact on the ballistic trajectory of the round over large distances. For instance a M193 bullet can drift about 4 feet in a modest 10 mph crosswind at 500 yards. Windage effects become even more exaggerated at greater distances since the speed of the bullet decreases as the range and total time of flight increases.

A variety of tracer round options are available. A standard tracer is used conventionally by the shooter to see the trajectory of the bullets in-flight path. A tracer round can emit light in the visible or IR spectrum depending on the composition of the tracer material. The latter is effective when the shooter is using night vision equipment. In addition, some tracers can emit light dimly at first and then brighten as the round travels downrange. A fuse element can control when the tracer lights up after firing of the round in order to delay igniting the tracer material until the bullet is well downrange. The fuse delay mitigates the risk of the tracer revealing the shooter's firing location.

In one embodiment, a viewing optic with an integrated display system can use tracer rounds to detect, determine and/or display a bullet's trajectory just before it impacts the target area. In one embodiment, covert tracers that have long delay fuses and emit in the near IR region (700 nm to 1000 nm) of the electromagnetic spectrum can be used. Light emitted in the near IR region is invisible to the human eye but can be detected by an imaging sensor using conventional glass optics. A tracer round of this type can be particularly effective in maintaining the shooter's covertness for Sniper operations while providing a significant automated bullet tracking capability for accurately determining next shot correction requirements. Thus, various embodiments are adapted to cooperate with one or more types of tracer rounds to implement the functions described herein.

Since the imaging sensor in the daylight embodiment is also sensitive to visible light, a standard daylight tracer can also be used for bullet tracking. In both the visible and near IR cases, the tracer rounds can take advantage of having long delay fuses to increase covertness as the system only needs to detect the bullet's flight in the final moments before impact.

In one embodiment, a camera associated with a viewing optic can record the trajectory of the bullet and using the suite of sensors embedded into the viewing optic, it can calculate the exact geo-positional trajectory of the bullet, as well as the bullet's point of impact.

In another embodiment, the viewing optic may also use a stabilized camera to compensate for recoil from the firearm. The viewing optic would accurately track the movement of the stabilized camera and compensate for that movement to accurately calculate the geo-positional trajectory of the bullet. This embodiment would allow the shooter to track their own trajectory and compensate for any misses more accurately.

In both embodiments, the geo-positional trajectory of the bullet could then be shared to other users who also active displays in devices they are using, such as another riflescope, spotting scope, or goggles using a microdisplay or holographic technology to display the trajectory into their field of view.

In one embodiment, the tracking of the bullet's trajectory incorporates capturing video frame images of the glowing tracer bullet in flight. The spatial location of the bullet in selected image frames is extracted through image processing techniques and then correlated with data from other video frames to establish the bullet's trajectory.

Image frames are selected for processing based on correlation with the firing event. When the round is fired from the weapon, the time of muzzle exit is immediately determined by processing accelerometer data obtained from an on-board weapon axis accelerometer included in various embodiments A correlation window from the time of muzzle exit is then started where various embodiments begin frame by frame processing of video images to identify therein a small cluster of pixels associated with the tracer round at a particular X-Y position in space. The frame images may be taken with an exposure time that is optimized to capture the bullet as it transmits a small number of individual pixels in the X-Y frame. Since the frame rate of the camera and time of muzzle exit is known, the bullet's distance from the weapon in each frame can be established using the known flight characteristic of the bullet. This data is contained in the onboard tables pertinent to each weapon and its associated rounds or, alternatively, received from a tactical network communication with the weapon sight.

If an absolute range to target is known from a laser rangefinder measurement, the position of the round at the target range can be calculated by determining the point in the trajectory that corresponds to the target range. The elegance of this technique is that the measurement is done from in-flight data and does not rely on bullet impact with a physical surface. The position calculated would correspond to an angular elevation and azimuth relative to the weapon's position and can be used to determine the ballistic pointing correction needed for increased accuracy. As part of this next shot ballistic correction calculation, various embodiments use inertial pointing angle data to calculate the relative reference point between inertial pointing angle of the gun at muzzle exit and the pointing angle at the time of splash. This allows the calculation to consider any angular movement of the gun that occurred during the bullet's time of flight to target range.

4. Additional Configurations

Figure 50:
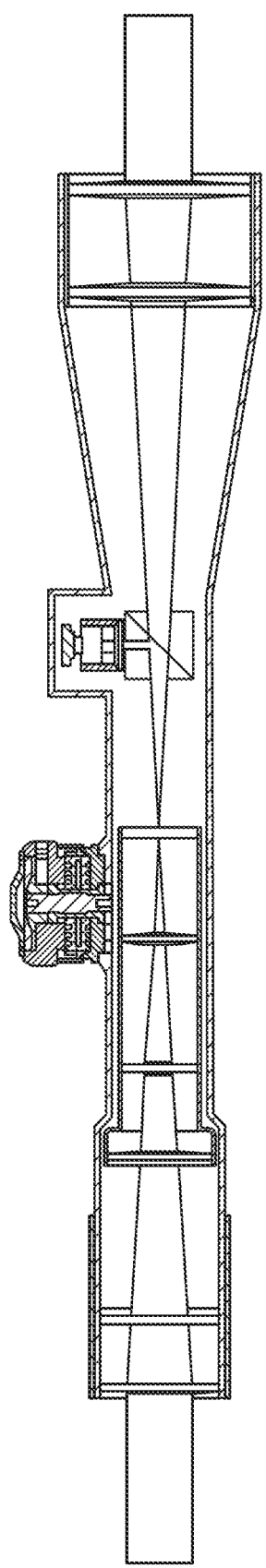
FIG. 50 is a representative schematic of an alternative configuration of a viewing optic according to one embodiment of the disclosure.

FIG. 50 depicts an alternative embodiment of a riflescope 5000 having a scope body 5005 and a compartment or notch 5010 on the top of the scope body 5005. The compartment 5010 has an integrated display system comprising an active display 5015, and collector optics 5020. The integrated display system is oriented such the display 5015 and the collector optics 5020 are parallel with the beam combiner 5025. In this embodiment, no reflective surface, such as a mirror, is needed.

Figure 51:
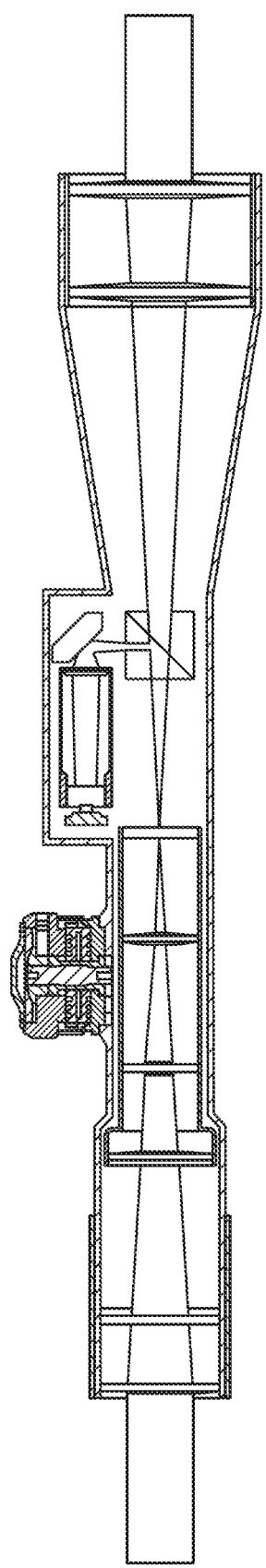
FIG. 51 is a representative schematic of an alternative configuration of a viewing optic according to one embodiment of the disclosure.

FIG. 51 depicts an alternative embodiment of a viewing optic 5000 having a scope body 5005 and a compartment or notch 5010 on the top of the scope body 5005. The compartment 5010 has an integrated display system comprising an active display 5105, collector optics 5110, and a mirror 5115. The integrated display system is oriented such the display 5115 and the collector optics 5110 are perpendicular with the beam combiner 5025. In FIG. 51, the active display 5105 is closer to the ocular system as compared to the objective system of the viewing optic.

Figure 52:
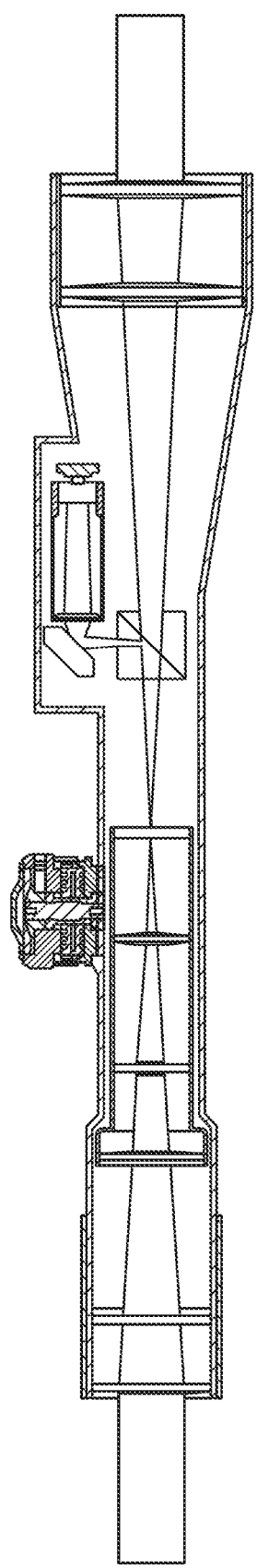
FIG. 52 is a representative schematic of an alternative configuration of a viewing optic according to one embodiment of the disclosure.

FIG. 52 depicts an alternative embodiment of a viewing optic 5000 having a scope body 5005 and a compartment or notch 5010 on the top of the scope body 5005. The compartment 5010 has an integrated display system comprising an active display 5105, collector optics 5110, and a mirror 5115. The integrated display system is oriented such the display 5105 and the collector optics 5110 are perpendicular with the beam combiner 5025. In FIG. 52, the active display 5105 is closer to the objective system as compared to the ocular system of the viewing optic.

The images generated from the active display 5105 can be directed to the mirror 5115 combined with the images of the scene viewed by the viewer through the viewing optics with a beam combiner 5025 in the scope body 5005 for simultaneously superimposing or overlaying the generated images and the viewed images, wherein the combined image is injected into the first focal plane. Because the beam combiner 5025 is positioned before the first focal plane, and the combined image is focused on the first focal plane, the displayed image and the viewed image do not move in relation to one another. This is a major advancement compared to devices that inject the image into the second focal plane.

In yet another alternative embodiment, the viewing optic has a scope body and a separable base having an active display and collector optics, with the active display and the collector optics being parallel with the beam combiner. In this embodiment, no reflective surface, such as a mirror, is needed. The base couples to the bottom of the main body of the viewing optic.

The images generated from the micro display can be combined with the images of the scene viewed by the viewer through the viewing optics with a beam combiner in the scope body for simultaneously superimposing or overlaying the generated images and the viewed images, wherein the combined image is injected into the first focal plane. Because the beam combiner is positioned before the first focal plane, and the combined image is focused on the first focal plane, the displayed image and the viewed image do not move in relation to one another. This is a major advancement compared to devices that inject the image into the second focal plane.

The optic sight and methods disclosed herein can be a display or viewing apparatus, device, sight, or scope, which can be for or on, or part of a weapon, gun, rifle, laser target locater, range finder, or as an add-on accessory thereto. Embodiments can be mounted on a weapon, or apparatus, or can be hand held or helmet mounted.

V. Viewing Optic with Advanced Reticle Features

A. Active Display Pattern Based on Magnification Setting

In one embodiment, the disclosure relates to a viewing optic having a main body and a base with an integrated display system, wherein the active display of the integrated display system generates multiple reticle patterns that are projected into the first focal plane of the field of view.

In one embodiment, the disclosure relates to a viewing optic having a main body and a base with an integrated display system, wherein an active display of the integrated display system generates a reticle pattern based on magnification level.

In one embodiment, the disclosure relates to a viewing optic having a main body with one or more sensors that can track or monitor the magnification level of the optic and a base with an integrated display system, wherein an active display of the integrated display system generates a reticle pattern based on magnification level. Depending on the magnification level, the active display system can generate different reticle patterns that are optimized for different optical magnification levels. In one embodiment, the active display of the integrated display system can automatically switch between reticle patterns based on the magnificent level.

In one embodiment, the viewing optic with an integrated display system can project digital features or aim points that are optimized for the specific magnification setting being used.

In one embodiment, the main body of the viewing optic has a sensor associated with a magnification adjustment mechanism of the sighting device to produce a signal indicative of an adjustment of the optical magnification of the viewing optic. The viewing optic further includes an electronic controller in communication with the sensor and the active display of the integrated display system. The electronic controller in response to the signal produced by the sensor, communicates to the active display to generate a reticle pattern, which is viewable through an eyepiece in a field of view thereof superimposed upon an image of a distant object.

In some embodiments, the electronic controller and active display are configured to produce a first reticle pattern, such as a close-quarters reticle pattern, in response to the signal indicating a first magnification setting; and, in response to the signal indicating a second magnification setting greater than the first magnification setting, the electronic controller and active display may produce a second reticle pattern that is distinct from the first reticle pattern. For example, the second reticle pattern may be a long-range reticle pattern, such as a sniper reticle.

In some embodiments, the sensor may include an electromechanical or optical digital encoder (which may be rotational or linear), a potentiometer, a combination of one or more magnets and one or more hall effect sensors, or other suitable device operable for sensing the position or movement of the magnification adjustment mechanism and producing a corresponding electrical signal. In one embodiment, the sensor and described in FIGS. 69 and 70.

In one embodiment, the active display is not in the main body of the viewing optic.

In one embodiment, one or more reticle patterns can be selected from including but not limited to 2, 3, 4, 5, 6, 7, 8, 9, 10, 11, 12, 13, 14, 15, 16, 17, 18, 19, 20, and greater than 20. In one embodiment, the viewing optic with an integrated display system can chose between at least 10, or at least 20, or at least 30, or at least 40 or at least 50 reticle patterns.

In one embodiment, the active display of the integrated display system projects reticle patterns into the first focal plane of the field of view that are based on specific magnification settings. Upon a change in magnification setting, the reticle pattern generated from the active display switches so that the aim point is immediately useful for the operator. The switching of the reticle can be based on the magnification setting.

As way of example, and not to be limited, at a 1× magnification setting, the active display can generate a small center dot that is projected into the first focal plane. Upon a magnification change to 8×, the active display generates a cross hair pattern with long range hold over dots that are projected into the first focal plane. The sensor determines a change in magnification, which is communicated to a controller, which changes the reticle pattern of the active display.

In one embodiment, the viewing optic with an integrated display system projects information and aim points that are designed to aid the operator in engaging targets at short and long ranges. In one embodiment, multiple "pages" of information or reticle patterns can be designed and loaded into the system and different pages can be displayed depending upon the magnification setting.

In one embodiment, the reticle pattern from the active display is projected onto an etched reticle of the first focal plane. Projecting the digital reticle onto an etched or fixed reticle provides necessary protection in the event of a system failure.

Figure 53:
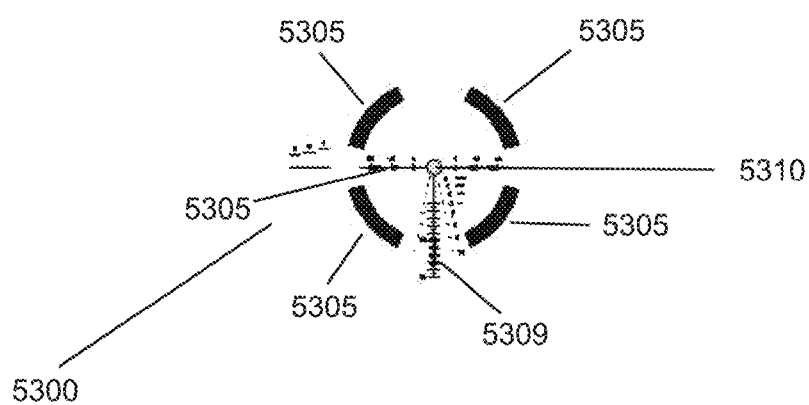
FIG. 53 is a representative depiction of a reticle at 1X showing both passive (fixed or etched) reticle features and marks or features from an active display.

FIG. 53 is a representative depiction of a Close Quarter Battle reticle 5300 at 1× magnification. The thick arched lines 5305, the primary horizontal line 5307, the primary vertical line 5309, numbers and arrows are components of an etched reticle. The center dot 5310 is generated from an active display of an integrated display system. This type of reticle is used for close quarter battle; the center dot represents a fast target acquisition aim point.

Figure 54:
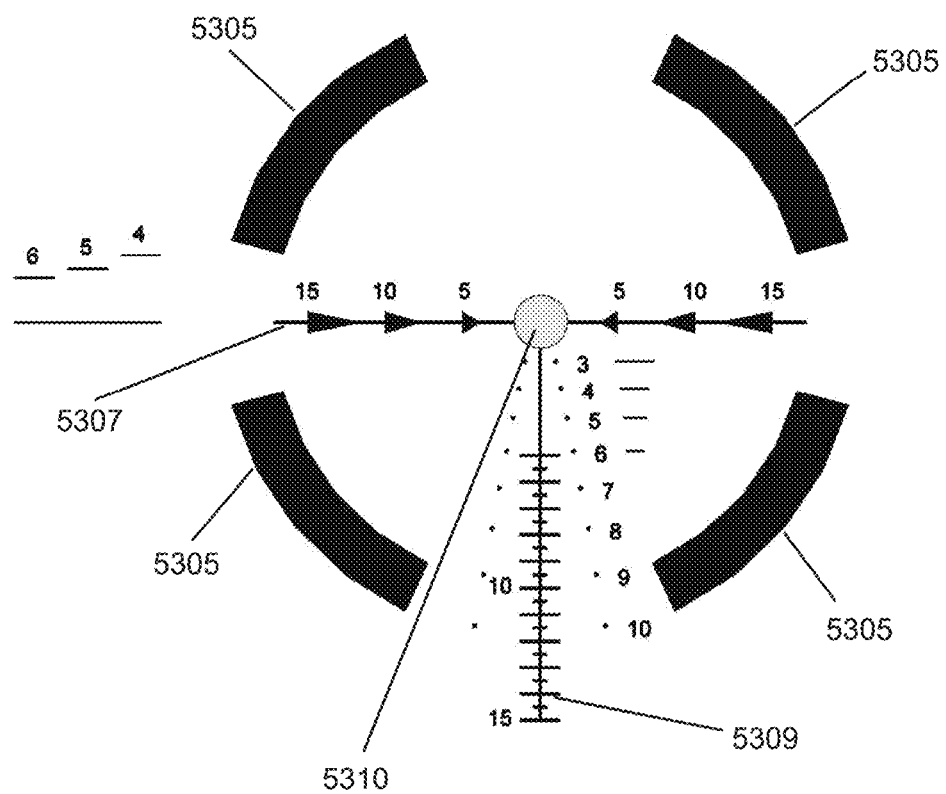
FIG. 54 is a representative depiction of a reticle at 8X showing both passive (fixed or etched) reticle features and marks or features from an active display.

FIG. 54 is a schematic representation of the reticle from FIG. 53 but with the magnification setting of the viewing optic at 8×. As can be seen, the center dot 5310 being projected from the active display has become obtrusively large under 8× magnification.

Figure 55:
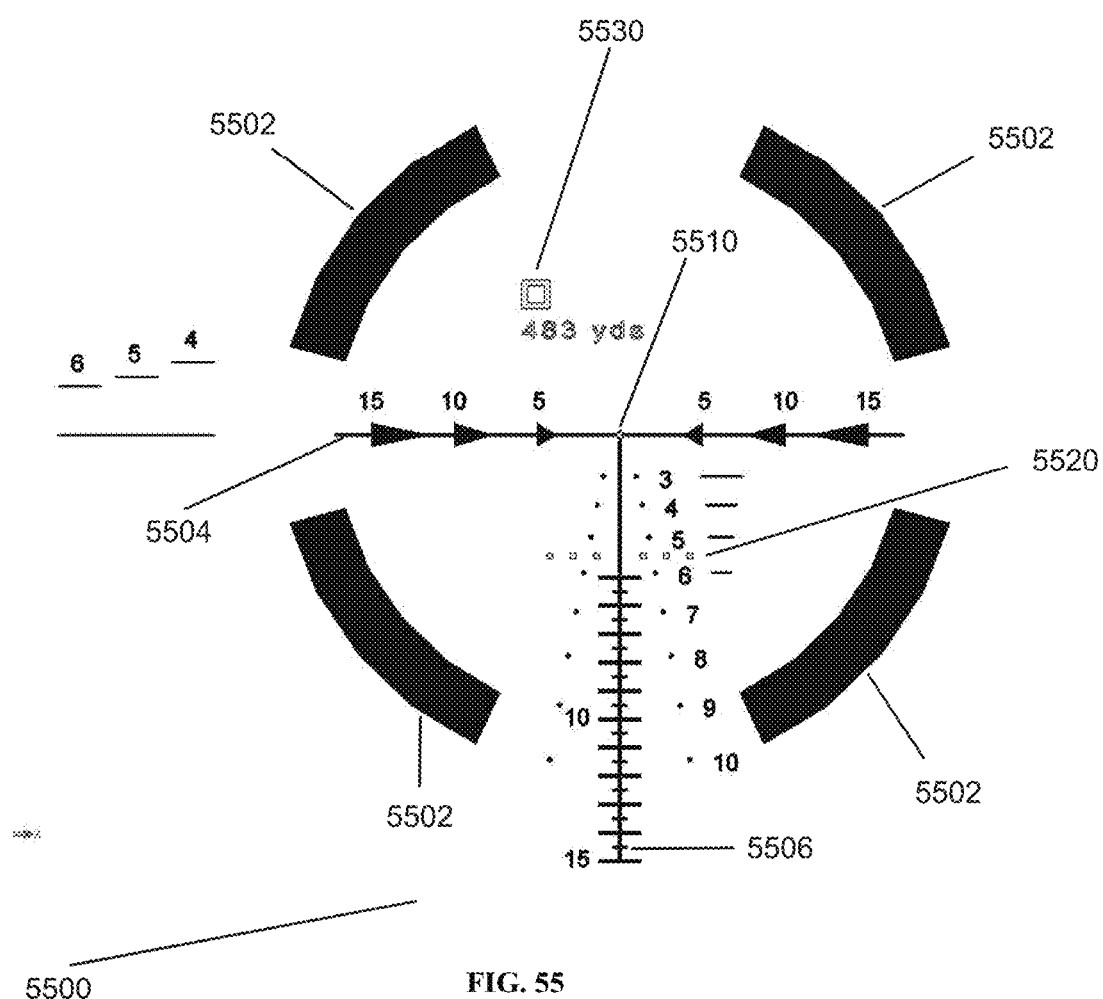
FIG. 55 is a representative depiction of a reticle at 8X showing both passive (fixed or etched) reticle features and marks or features from an active display including a range measurement and wind holdover marks.

FIG. 55 is a representative depiction of a reticle pattern 5500 that provides useful information when the viewing optic is set at a magnification setting of 8×. The thick arched lines 5502, the primary horizontal line 5504, the primary vertical line 5506, numbers and arrows represent the etched reticle. The center aim point 5510, the 6 ballistically compensated windage dots 5520, and the square in the upper left 5530, which represents a rangefinder designator displaying a hypothetical range to target are components generated by the active display.

Figure 56:
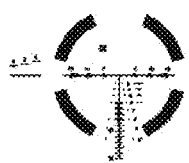
FIG. 56 is a representative depiction of a reticle at 8X showing both passive (fixed or etched) reticle features and marks or features from an active display including a range measurement and wind holdover marks.

FIG. 56 is a representative depiction of the reticle pattern 5500 at a low magnification setting.

With references to FIGS. 53-56, when the optical magnification setting is at 1×, the reticle pattern 5300 includes etched reticle features 5305, 5307, and 5309 as well as a first set of multiple marks 5310 (such as a circle and/or an aiming dot) generated from the active display and projected onto the first focal plane reticle. Preferably, the reticle pattern 5300 formed at least in part by the first set of marks 5310, is a type of close-quarters reticle (CQB reticle) having minimal marks to provide a less cluttered viewable area, such as illustrated in FIG. 53.

When the optical magnification setting is increased, an electronic controller and the active display (in response to a signal received from a sensor, including but not limited to the sensor described in FIGS. 69 and 70) replace/alter/change the first reticle pattern with a second set of multiple marks, which form (at least in part) a second reticle pattern 5500 that is distinct from the first reticle pattern 5300 and which typically includes at least some different functionality.

For instance, the second reticle pattern may include different aiming features and additional marks, such as relating to estimating distance, calculating windage and elevation adjustments, or other suitable marks commonly used in ranging reticles such as shown in FIG. 55.

It can be seen therefore, that creating multiple "pages" of features and reticle patterns for the active display, storing them in a memory system, and automatically switching between the reticle patter s as the operator changes magnification settings on the viewing optic will be extremely useful.

B. Active BDC Reticle

Ballistic Drop Compensating (BDC) reticles are designed to have hash marks located on the portion of the vertical cross hair that is located below the horizontal cross hair. These hash marks are designed at specific distances to try and closely match a specific or set of specific ballistic profiles.

However, the current BDC reticle designs are fixed designs. This is because the reticles are made using wire, metal, or etched on glass. Once the reticle is made and installed in the riflescope it can't be changed without taking the reticle out and installing a new one, which can only be practically accomplished by sending the scope back to the manufacturer.

In one embodiment, the disclosure relates to a viewing optic having a main body with an optical system and a base having an integrated display system with an active display that can generate a BDC reticle that can be changed manually by the user at any time, or even automatically by the software and sensors of the viewing optic in real time.

To generate the BDC reticle for the viewing optic disclosed herein, the riflescope can be programmed for the specific ballistic profile of the rifle and the to be fired cartridge. Second, the viewing optic has sensors, as described above, such as temperature, pressure, humidity, cant angle, inclination angle, that can aid in giving real time updates to the BDC reticle so that it is as accurate as possible for all conditions. This allows the BDC reticle to be custom tailored to each rifle and the specific shooting conditions.

The BDC reticle generated in real-time by the active display allows the shooter to have an accurate system for shooting at various distances accurately and quickly.

Figure 57:
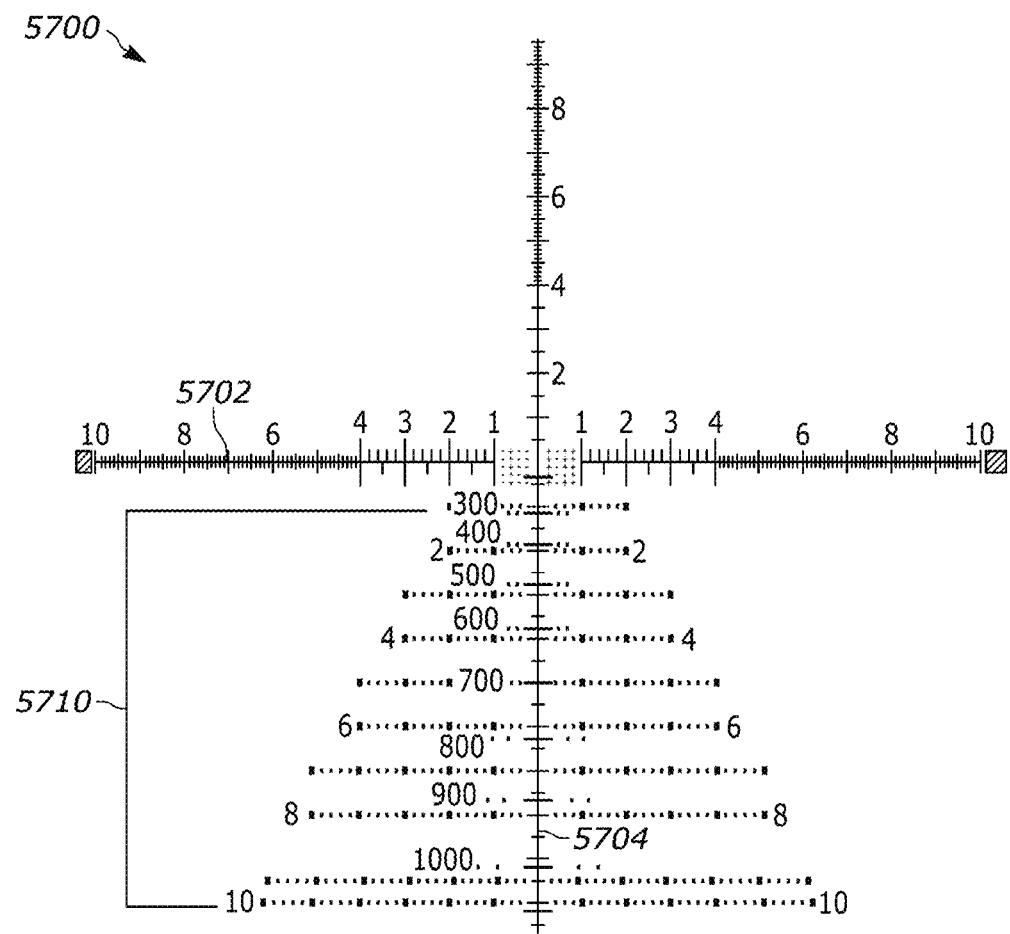
FIG. 57 is a representative depiction of a reticle with standard etch and fill portions as well as images generated from a digital display.

As shown in FIG. 57, the reticle 5700 has standard etch and fill portions including a primary horizontal line 5702, a primary vertical line 5704, and numerical markings and hash marks along the primary and vertical crosshairs. Reticle 5700 also has patterns and marks generated by the active display and projected onto the first focal plane reticle. The active display marks in the form of a BDC reticle include the numerical markings 5710 (100-900 on the vertical axis in quadrants 3 and 4). As this portion is projected from the digital display, it can be updated in real time.

In addition to an active BDC reticle, there are times where a user/shooter might find themselves in a position where they are providing cover for other individuals in an area where targets may present themselves quickly and at varying ranges. An example might be a sniper who is on top of a building looking down an alley or a road that has cross streets or doorways. The active display can be used in conjunction with a variety of sensors embedded into the riflescope, such as compass, cant angle, inclination angle, GPS, etc. to be able to accurately determine the direction the riflescope is pointed.

Using a viewing optic having environmental sensors, an integrated display system having an active display for generating and projecting a BDC reticle into the first focal plane, and a rangefinder, a user will be able to range known landmarks, such as doors, windows, cars, etc. and use the controller and active display to place a range marker on those landmarks. These range markers are projected into the first focal plane and visible through the viewing optic. The environmental sensors allow the user to move the viewing optic around to view other targets, but the range markers would remain on the targets.

Figure 58:
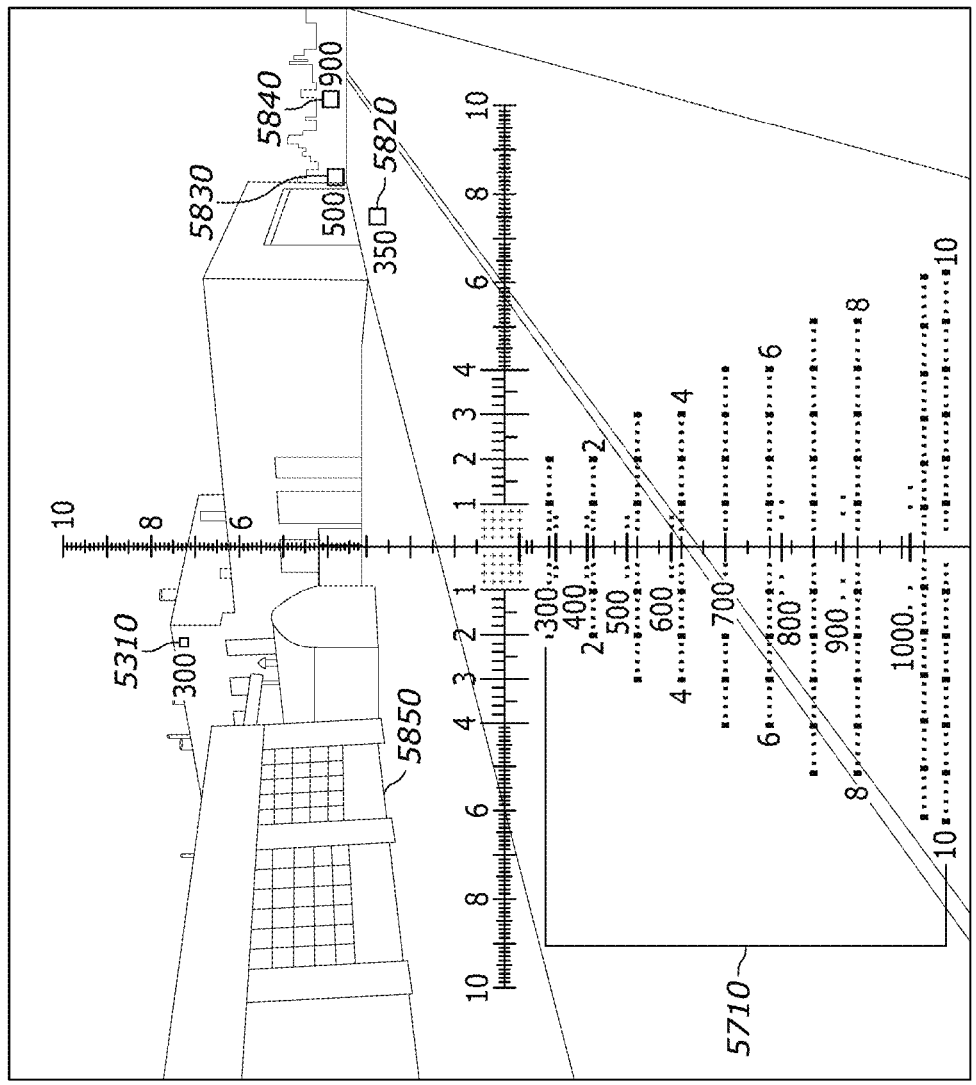
FIG. 58 is a representative depiction of a BDC reticle with range markers.

FIG. 58 is a representative image of a BDC reticle generated by the active display and projected onto a first focal plane reticle, with range to potential targets indicated. A viewing optic having a main body with environmental sensors and a base having an integrated display system with an active display for generating a BDC reticle will allow the user to mark multiple targets in one or more areas with distance indications on the target markers. Then, if a target were to present itself near a target marker, the user would be able to quickly identify the range to the target without having to range the target. The user can then employ the active BDC reticle to quickly hold in the correct location to engage the target.

C. Reticle Compensated for Firearm Cant

In a traditional riflescope, when shooting long range, it is important that the firearm and scope are level when taking a shot. When a bullet travels over a long distance, the bullet is affected by gravity to a degree that the shooter must consider. Gravity pulls the bullet towards the ground in a consistent direction creating "bullet drop." Shooters compensate for this bullet drop by aiming higher than their target so that by the time the bullet reaches the target, it has dropped to the appropriate height, such that it hits the target.

Figure 59:
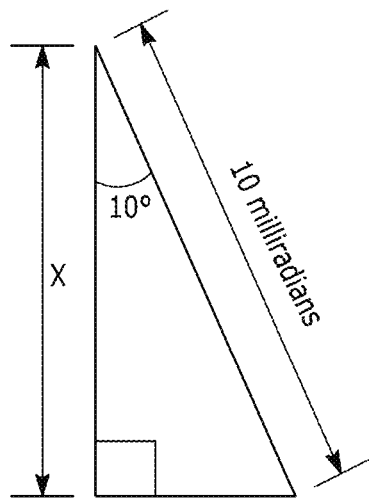
FIG. 59 is a representative schematic depicting the effect of cant on a shot.

FIG. 59 is a representative depiction of cant angle. It can be clearly seen that the triangle is a right triangle with the 10° angle at the top and the right angle at the bottom. The 10 milliradian leg has become the side of the triangle that is the hypotenuse and represents a canted vertical section of crosshair. However, gravity is acting on the vertical leg of the triangle.

Using trigonometry, the length of the vertical leg can be solved with the following equation: $\cos 10° = x/10$ milliradians. Solving for x results in a value of 9.85 milliradians. So, in this example, while the user/shooter may have held or dialed 10 milliradians, they only compensated for a 9.85 milliradian shot. At long range, this is easily enough to miss the target.

In one embodiment, the disclosure relates to a viewing optic with an integrated display system that uses an active display to generate a reticle that can compensates for cant of the firearm. The user can seamlessly shoot at distance without having to worry about cant angle.

In a traditional riflescope the reticle is a physical cross hair that is either metal, wire, or a pattern that is permanently etched on glass. This means that the cant of the reticle is always fixed. However, with the active display technology for generating a real-time reticle, by overlaying a digital reticle onto the passive image, the digital reticle can be changed at any time. In one embodiment, the viewing optic has an internal cant sensor that can instantly orient the reticle generated by the active display to compensate for cant angle.

Figure 60:
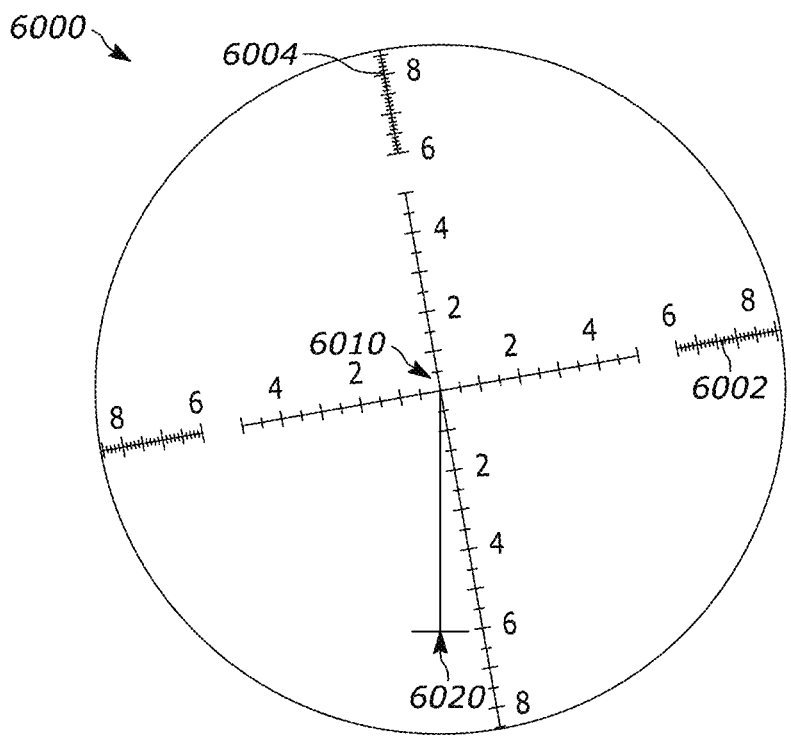
FIG. 60 is a representative schematic of a digital or active display that can compensate for cant.

FIG. 60 is a representative depiction of a reticle 6000 with marks and patterns oriented for cant and generated by an active display of an integrated display system. The primary horizontal line 6002 and the primary vertical line 6004 are provided by the passive or etched or fixed reticle. The aiming point generated by the active reticle 6020 compensates for cant and is projected or overlaid onto the passive reticle. The pivot point 6010 is at the center of the reticle. In this case, an electronic controller/micro-controller would use the information gathered from cant angle and inclination angle sensors and apply software logic and communicate with the active display to adjust the generated image aiming point 6020 to reflect the new zero position, associated geometry and hold points that correspond to the orientation of the firearm at that point in time. The user would shoot off the digital reticle generated by the active display, instead of the passive or fixed reticle.

In another embodiment, the active display of the integrated display system can generate a digital reticle that compensates for cant, as well as for shooting at an inclined or decline angle, by adjusting the aim point up or down on the digital reticle. This would eliminate the need for a cosine indicator, which is often used to compensate for shooting in these types of situations.

D. Digital Reticle with Wind Drift Indicators

In a traditional riflescope, reticles that have wind indicators are usually a glass etched reticle. Often these reticles will have a grid pattern or rows of dots to allow the user to have a reference point to use to aim with and compensate for wind speed. The problem with these reticles is that they are fixed in shape and size, since they are physically and permanently etched onto a piece of glass.

In one embodiment, the disclosure relates to a viewing optic having a main body and a base with an integrated display system having an active display for generating a digital reticle that uses wind drift indicators that compensate for the range to target. In one embodiment, the digital reticle is overlaid onto a passive reticle. By using a digital reticle that is overlaid on a passive reticle, the viewing optic can have a reticle that can adapt real-time wind holds to the ballistics, range, and environment of the specific situation.

Typically, the longer the range, the more effect a crosswind has on a bullet. By using a digital reticle, the wind holds can be spread out more as the distance increases to compensate for wind values at the specific range for the target.

Figure 61:
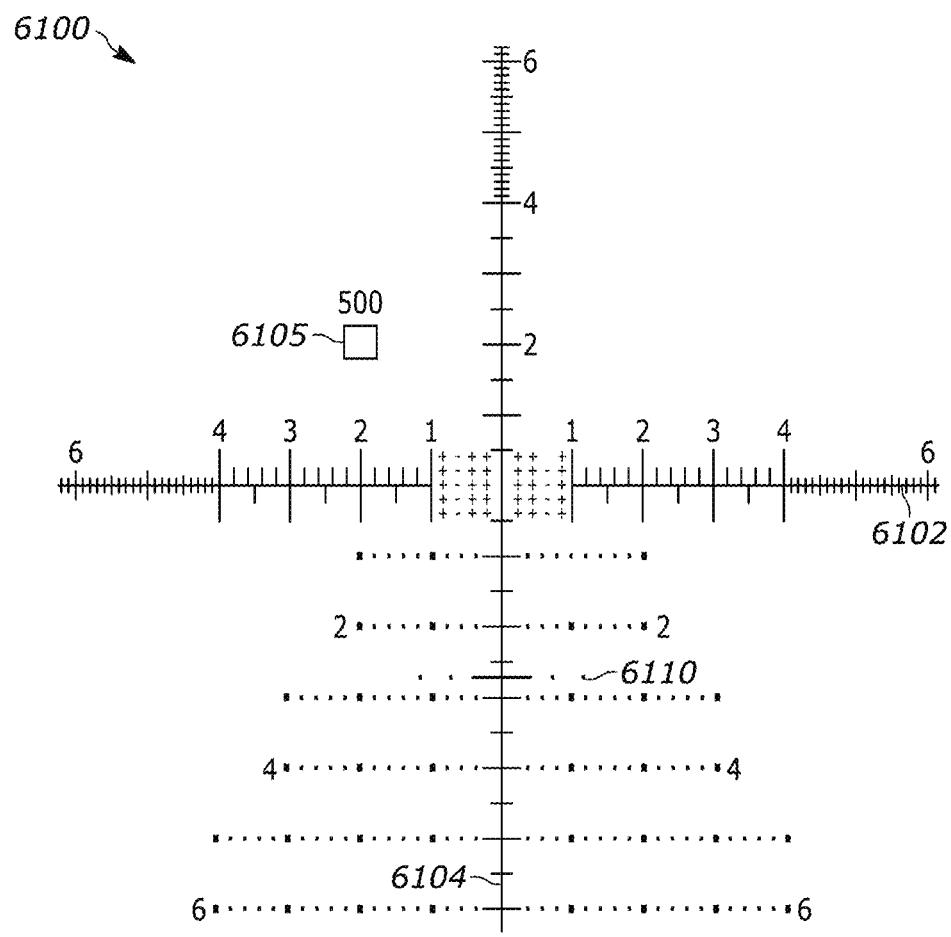
FIG. 61 is a representative depiction of a reticle with a target that was ranged at 500 yards displaying the real-time location of the drop and wind holds for 500 yards.

FIG. 61 is a representative depiction of a reticle 6100. Multiple components or markers are provided by the passive reticle including the primary horizontal crosshair 6102 and the primary vertical crosshair 6104. The active display of the integrated display system generated and projects a target that was ranged at 500 yards 6105 and wind holds 6110 for the specific conditions. The end of the secondary horizontal line (across the main vertical line) would equal a 5 mph wind drift, the next dot would be 10 mph, and the outer most dot would be 15 mph. The images generated from the active display 6105 and 6110 are overlaid onto the passive reticle.

Figure 62:
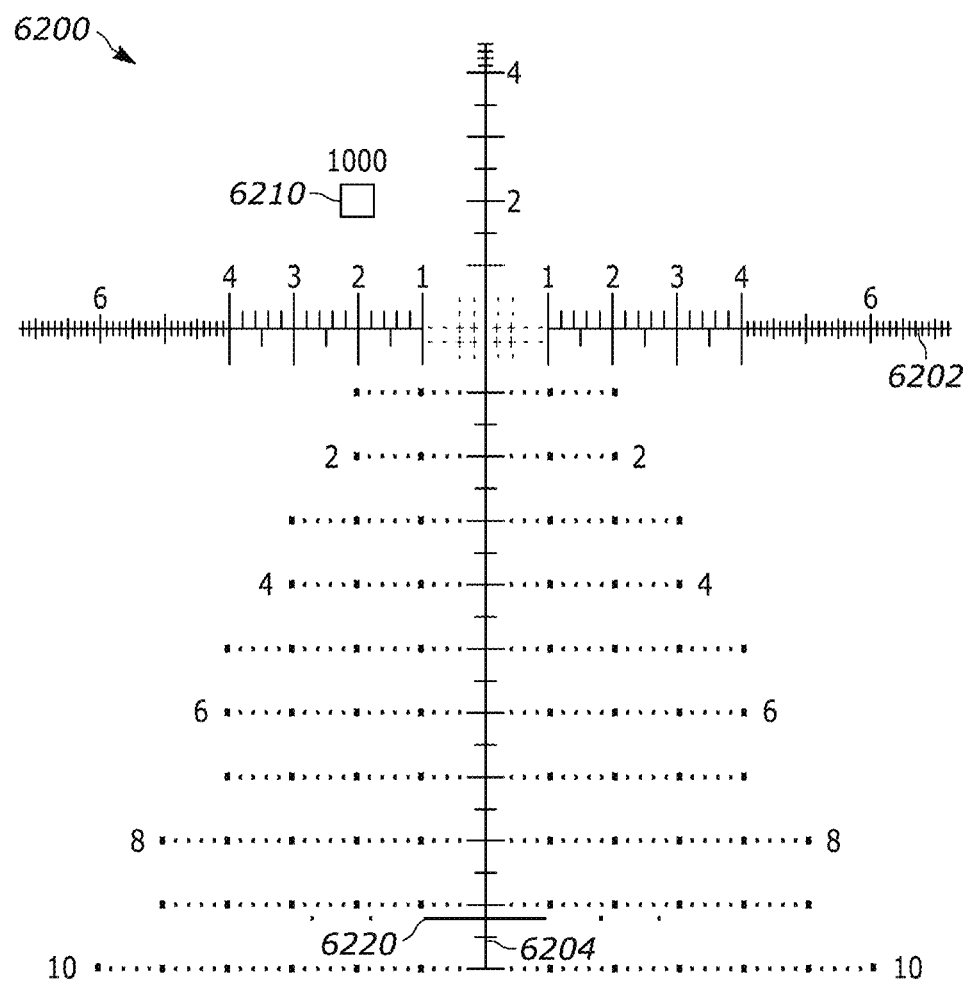
FIG. 62 is a representative depiction of a reticle with a target ranged at 1000 yards displaying the real-time drop and wind holds for 1000 yards.

FIG. 62 is a representative depiction of a reticle 6200. Multiple components or markers are provided by the passive reticle including the primary horizontal crosshair 6202 and the primary vertical crosshair 6204. The active display of the integrated display system generated and projects a target that was ranged at 1000 yards 6210 and wind holds 6220 for the specific conditions. The end of the horizontal line (across the main vertical line) would equal a 5 mph wind drift, the next dot would be 10 mph, and the outer most dot would be 15 mph. The images generated from the active display 6210 and 6220 are overlaid onto the passive reticle. It can be seen that the secondary horizontal line 6220 extends wider, and the wind dots are spread further to the sides compared to the 500 yard (FIG. 61) solution to compensate for additional wind drift induced when the bullet travels a longer distance.

E. Reticle with Center Grid for Second Shot Correction

In the past, passive reticles have been designed to allow the shooter to have many reference points for shooting in varying conditions and varying ballistics. However, since the variety of conditions and ballistics vary so widely, these reticles have tended to have many features on them, such as grids of lines or dots, that cause the reticle to appear cluttered, or busy to the user.

In one embodiment, the disclosure relates to a reticle system comprising a digital reticle generated with an active display overlaid a passive reticle. The use of the digital reticle allows information to be shown as needed and as appropriate, which eliminates the need for certain information to be displayed on the passive reticle, thereby providing a cleaner or more easily discerned passive reticle.

In one embodiment, the disclosure relates to a viewing optic having a passive or analog reticle that is designed to work most efficiently in conjunction with an active reticle. The active reticle technology allows the viewing optic to do the complicated calculations and display a ballistic solution for the user. Typically, the ballistic solution will not be in the center of the field of view or the center of the passive reticle cross hair. This gives the user the option to either hold over center on the ballistic solution, or to dial the turrets until the ballistic solution is in the center of the field of view and in the center of the passive cross hair to take the shot.

In one embodiment, the disclosure relates to a viewing optic with an analog and digital reticle that will allow the shooter to most effectively and efficiently make a second shot correction, while minimally obstructing their field of view like previous passive reticles have done, which use extensive grids of lines and dots.

Figure 63:
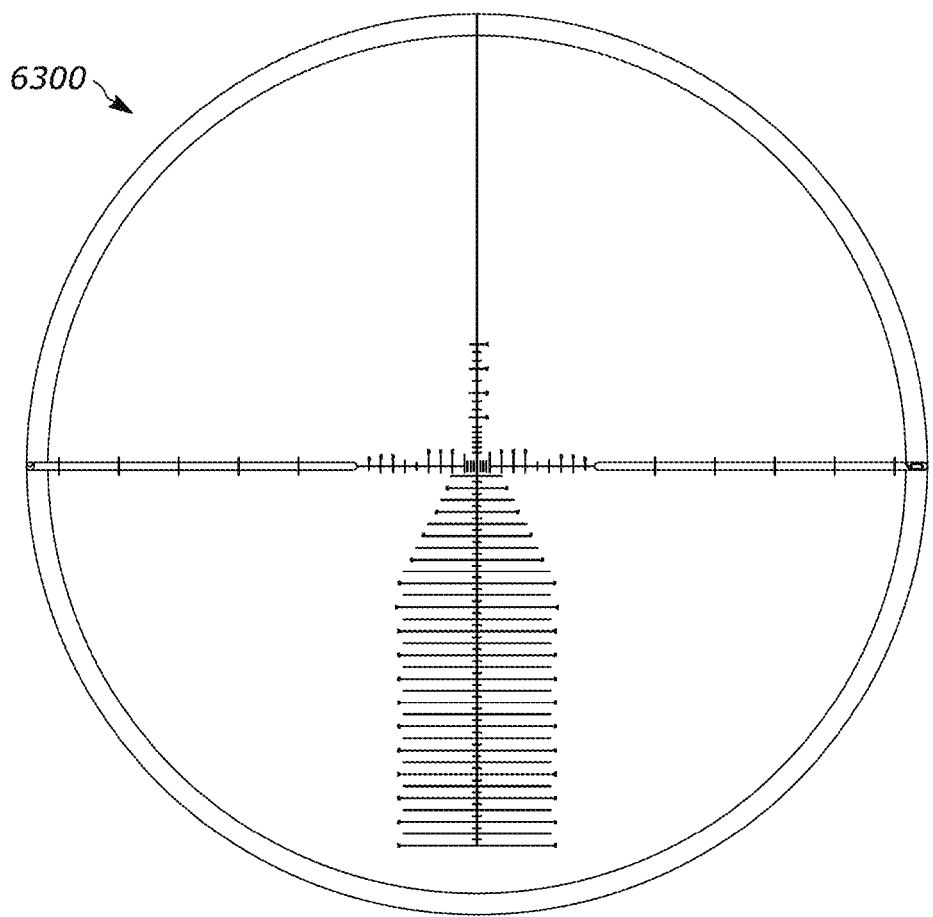
FIG. 63 is a representative depiction of a wide angle view of a reticle at low magnification with fewer rows of dots below the horizontal cross hair.

FIG. 63 is a representative depiction of a wide angle view of a reticle 6300 at low magnification. A less obtrusive row of dots is used below the horizontal cross hair. This passive reticle can be used as a backup, in the event the active display cannot be generated because the battery power or electronics of the viewing optic fail.

Figure 64:
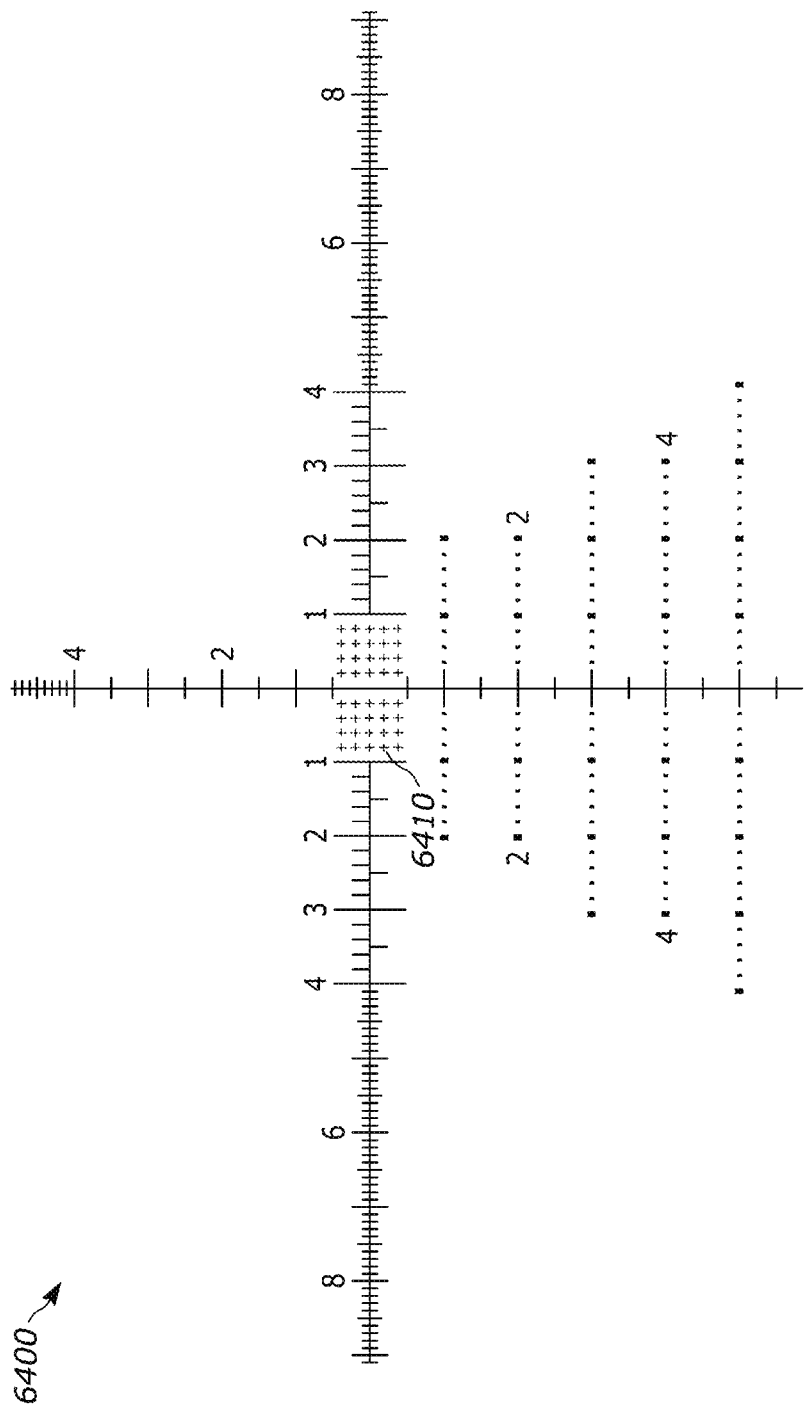
FIG. 64 is a representative depiction of a center portion of a reticle at higher magnification with a smaller center grid.

FIG. 64 is a representative depiction of a close-up view of the center portion of the reticle 6400. FIG. 64 provides a view at higher magnification. This image shows a small grid 6410 generated by the active display of the integrated display system, which is located at the center of the reticle. This will allow the user to make accurate measurements of first shot impact location to make accurate second shot corrections.

In one embodiment, the grid 6410 generated by the active display is wider than it is tall. This is specifically designed since calculating elevation of an impact is more accurate than estimating wind drift of a first shot. In this embodiment, the small plus features of the small grid are not illuminated but are very fine features, which allow very precise measurement.

The active or digital reticle should get the first shot very close, therefore, the center grid can be much smaller than a typical passive reticle, which requires an extensive grid that covers a significant portion of the field of view below the horizontal cross hair.

VI. Auto Brightness Adjustment

As discussed throughout the application, the integrated display system allows digital images generated by an active display to be overlaid on top an image of an outward scene. This active display is injected into the image of the outward scene using illuminated portions of the display. For the display to be most usable it is desirable to have a high contrast ratio between the brightness of the passive scene and the illuminated display such that both can be easily seen. If the display is too dim the user will not be able to see it. If the display is too bright the display will overpower the passive scene.

In one embodiment, the disclosure relates to viewing optic having a main body with an integrated display system and a light sensor that can detect the specific target brightness and compensate for it.

Figure 71:
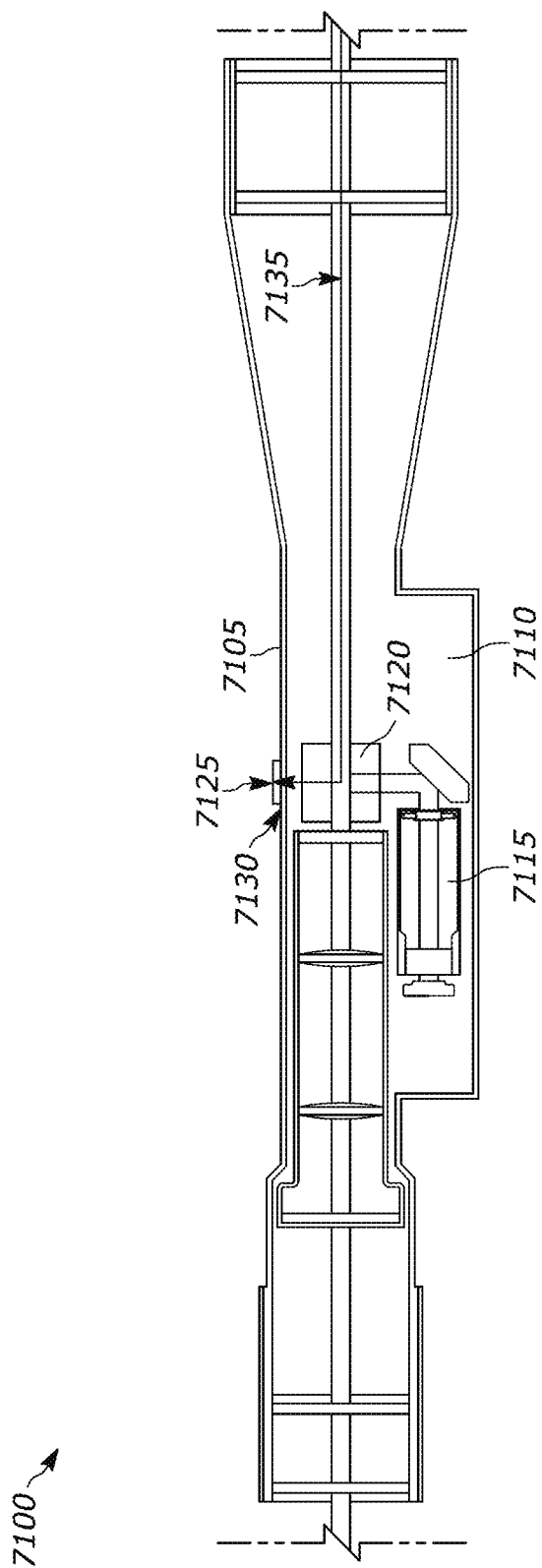
FIG. 71 is a representative schematic of a viewing optic with a beam combiner in the main body and having a photosensor and light filtered coupled to the beam combiner.

FIG. 71 provides a representative schematic of a viewing optic 7000 with a main body 7005 and a base coupled to the main body 7010. The main body 7005 has an optical system for viewing an image of an outward scene and a beam combiner 7020 with a photo sensor 7025 and a light filter 7030 located above the beam combiner 7020. This allows the photo sensor to look directly at the target scene, without creating an obstruction in the field of view. The base 7010 has an integrated display system 7015 having an active display for generating an image that is projected into the first focal plane of the viewing optic.

The photo sensor 7025 and light filter 7030 generate a high contrast ratio between the brightness of the image of the outward scene and the generated image from the active display.

In one embodiment, the transmission band of the filter in front of the photo sensor can be tuned to be narrow enough so that only the brightness of the target will be measured and the additional light from the display system will not be measured, which would distort the measurement.

VII. Viewing Optic with Auto-Ranging Capabilities

In one embodiment, the disclosure relates to a viewing optic with an integrated display system that incorporates the use of a camera to aid in an auto-ranging. In one embodiment, the disclosure relates to a system comprising a viewing optic with an integrated display system, a camera to aid in an auto-ranging, and a laser range finder.

In one embodiment, the disclosure relates to a viewing optic having an integrated display system and a camera that incorporates image recognition technology. The systems and methods disclosed herein greatly increase the speed of acquiring a target solution and eliminate the need of a button press that may affect point of aim. In addition, the systems and methods disclosed herein integrate artificial intelligence into the system to determine the quality of the ranged target solution.

In one embodiment, the viewing optic has a camera that incorporates image recognition technology. In one embodiment, the camera can be attached to either the viewing optic having an integrated display system or a firearm and would point towards the point of aim of the riflescope.

In one embodiment, the camera has artificial intelligence to detect a target and communicate with an active display of the integrated display system to highlight the target. In another embodiment, the artificial intelligence system can be incorporated into the viewing optic. In one embodiment, the artificial intelligence system can be located in the base coupled to the main body of the viewing optic.

In another embodiment, a thermal imaging camera lacking image recognition technology can be used. This would allow the thermal image to be communicated to the active display and overlaid onto the image of an outward scene in the viewing optic. The viewing optic could be programmed to only display "hot spots" of interest. For example, hot spots that indicate human heat, or vehicle heat, etc. Eliminating artificial intelligence will greatly reduce the power consumed by the system. In addition, all appropriate hot spots would appear in the field of view of the viewing optic, allowing the user to evaluate each one to determine if the target was valid or not.

After identifying a valid target, the user would simply move the viewing optic so that the LRF designator in the FOV was over top of the desired hot spot. Once the LRF designator was aligned with the hot spot, the system would automatically trigger the LRF to take a range at that hot spot. After taking a range, the viewing optic could either display a hold point for the range of the target or could simply show the range and the user could use the Active BDC mode and hold on the active BDC reticle for the appropriate measured range to the target.

An additional capability to the system is that it could automatically detect if the hot spot remained within the LRF designator long enough to get a valid range. If not, it would wait to display a range until the hot spot remained within the LRF designator the appropriate length of time to achieve a valid target acquisition before displaying a solution. This would eliminate the second problem with pressing a button.

In one embodiment, the disclosure relates to the technology and method of using an overlaid camera image projected into the first focal plane of a viewing optic and using that image in conjunction with a LRF designator to automatically range a target.

VIII. Viewing Optic with a Photosensor to Conserve Power

In one embodiment, the disclosure relates to a viewing optic with an integrated display system and a power saving system. In one embodiment, the power saving system is located in a base coupled to the main body of the viewing optic. In one embodiment, the power saving system comprises a proximity sensor. In one embodiment, the proximity sensor is in communication with a microcontroller.

In one embodiment, the power saving system can be used to place the viewing optic in a sleep or standby mode when a user/operator is not looking through the optic. In one embodiment, the systems and mechanisms can wake or activate the viewing optic when a user/operator is detected behind the eyepiece of the optic.

Current methods of putting the electronics to sleep or into standby are by using a "time out" feature, which is disadvantageous if the optic is being used for Close Quarter Battle work since the optic must stay on for an indeterminate amount of time as long as there is an operator looking through it. An accelerometer can also be used to detect motion and thus turn the system on. The disadvantage of that method is that if an operator is doing observation then the gun may have very little movement for long periods of time and thus go to sleep, even though the operator is still looking through the optic.

In one embodiment, the disclosure relates to a system to conserve battery power by turning on the viewing optic when there is an operator detected behind an eyepiece of the optic.

In one embodiment, the power saving system can be used in any electro-optics compatible with implementing a proximity sensor that is within a few inches of where the operator's face will be when using the optic.

In one embodiment, the disclosure relates to a viewing optic having a main body and a base coupled to the main body, wherein the base has a window in the back of the base toward eyepiece.

In one embodiment, the base has a proximity sensor installed into a carrier and the carrier is installed into the window located at the end of the base toward the eyepiece. The proximity sensor can communicate a signal to a microcontroller in the base or main body when the proximity sensor detects a reflection that is within a few inches of the window. The distance at which an object will activate the sensor can be adjusted either at the factory or a software option can be built into the user interface to allow the operator to either adjust the sensitivity of the sensor or disable/enable the auto sleep/standby feature.

Figure 72:
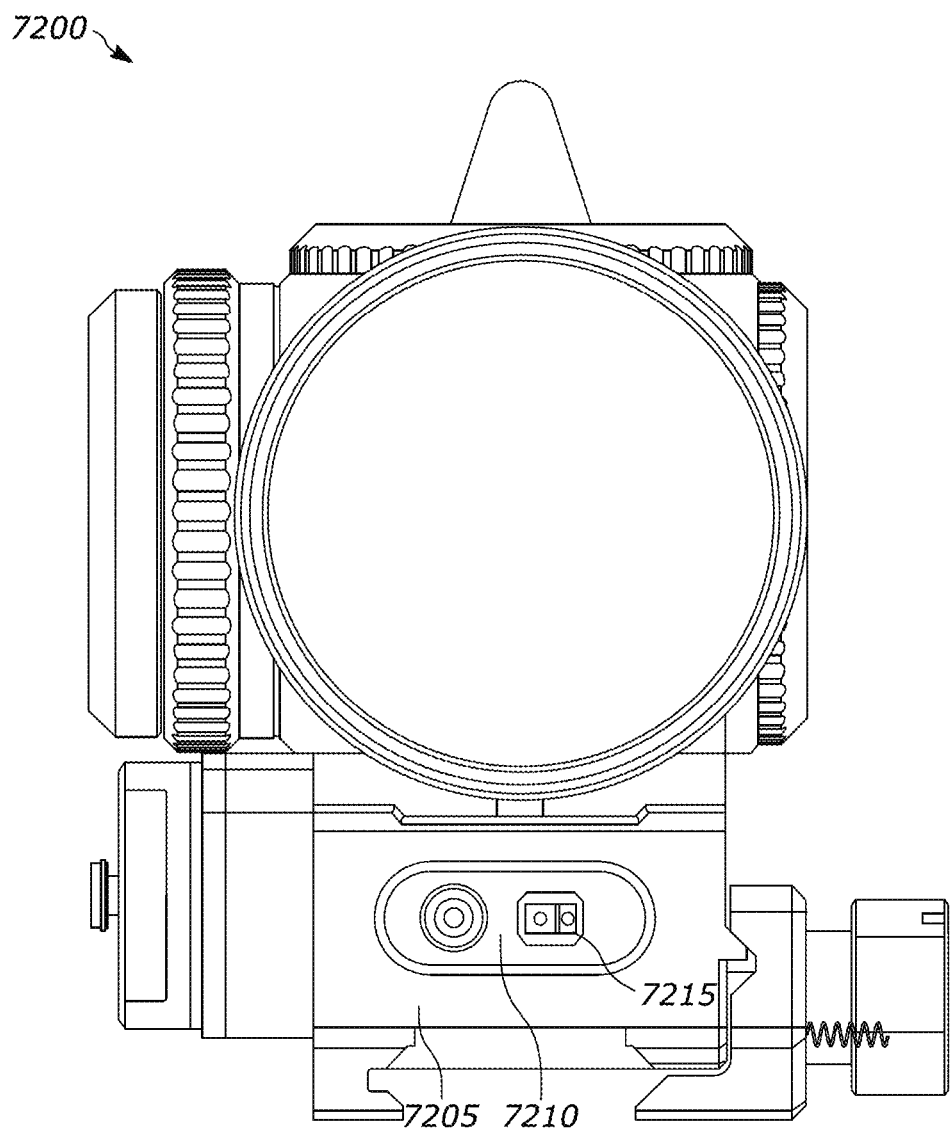
FIG. 72 is a representative depiction of the rear of the viewing optic showing a window milled into a base coupled to the main body of a viewing optic, the proximity sensor, and the carrier, which are all located below the eyepiece.

FIG. 72 is a representative depiction of a viewing optic 7200 having a base 7205. The base 7205 has a window 7210 located toward the eyepiece of the main body of the viewing optic. A proximity sensor and carrier 7215 are located in the window 7210, which is located below the eyepiece.

Figure 73:
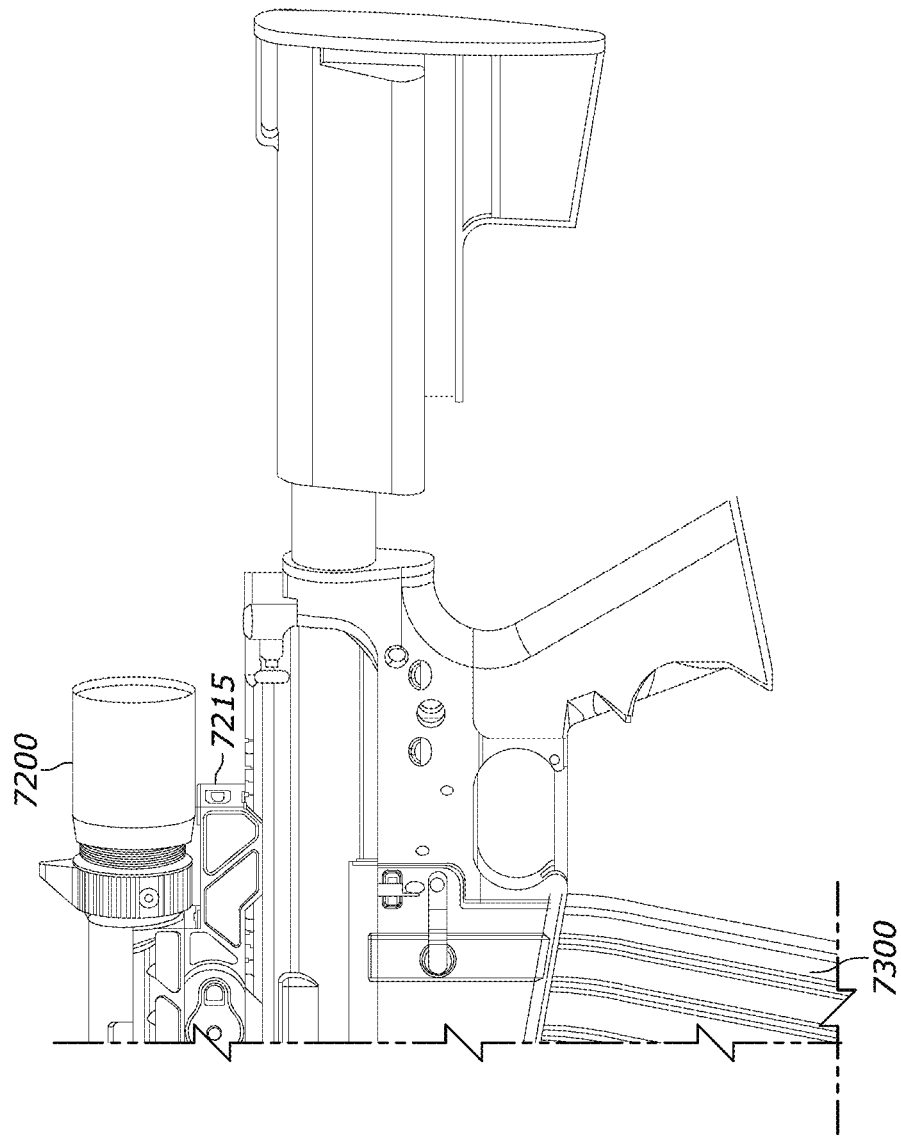
FIGS. 73 and 74 are representative illustrations of a viewing optic with a base having a power saving system, with the viewing optic mounted on a rifle.
Figure 74:
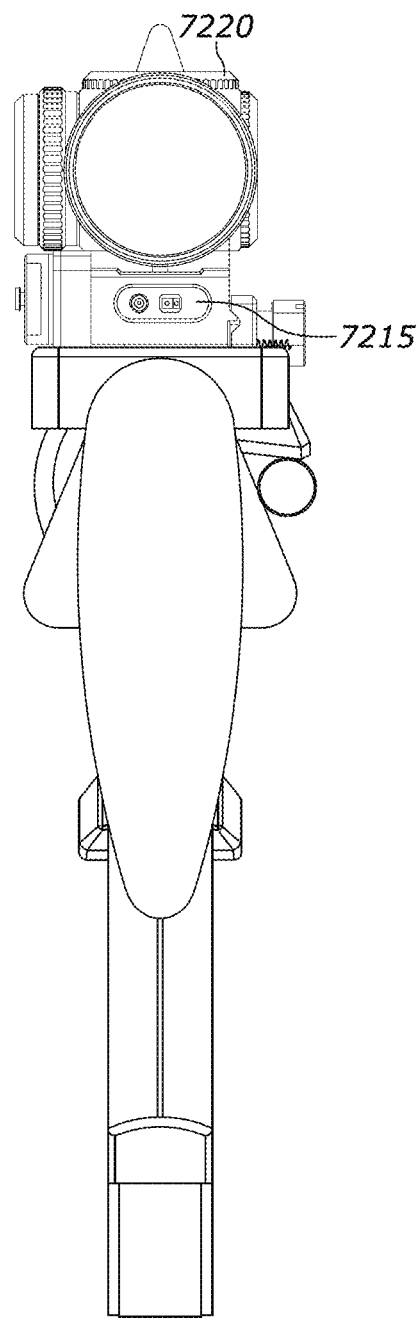

FIGS. 73 and 74 are representative depictions of a viewing optic 7200 having a base with with a power saving system, with the viewing optic mounted on a rifle. It can be seen that an operators face will be within a few inches of the back of the optic. The sensor 7215 in the base 7205 of the viewing optic 7200 will detect a reflection from the operator's face, thus waking the optic up from a sleep mode. When the operator removes his/her head from the view position, the sensor will no longer see a reflection and will put the viewing optic into a sleep or standby mode.

IX. Viewing Optic with Power Rail

In one embodiment, the disclosure relates to a viewing optic having a main body and a base with an integrated display system, wherein the viewing optic can be powered by an external power source that is housed in the host firearm. In one embodiment, the viewing optic has a main body and a base coupled to the main body, wherein electrical pins are built into the base to provide power from the firearm to the viewing optic. In another embodiment, the viewing optic can be powered by the firearm using electrical pins that are built into the remote keypad assembly.

In one embodiment, the disclosure relates to methods and systems to provide additional power for extended periods of time to the viewing optic.

In one embodiment, the disclosure relates to a viewing optic with a main body and a base coupled to the main body, wherein the base has PCBs that are being used to control a display, sensors, and user interface of the viewing optic. In one embodiment, the base has power input pins that protrude through the base and contact a power pad. In one embodiment, the power pad is built into a Picatinny rail.

In one embodiment, the PCBs are located in a position that allows interaction with the input pins. In one embodiment, the pins are sealed against the base of the riflescope to keep the interior of the riflescope protected from the environment.

Figure 75:
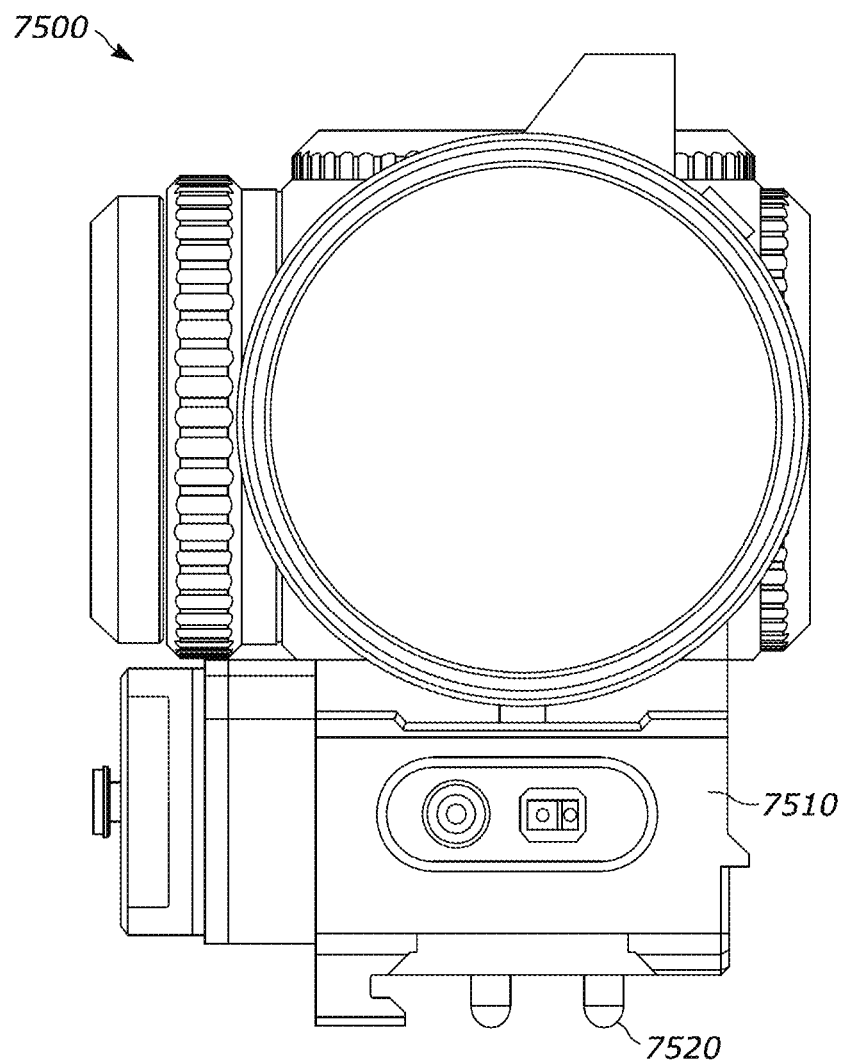
FIGS. 75 and 76 are representative schematics of a viewing optic with power pins protruding through a base coupled to a main body of a viewing optic.
Figure 76:
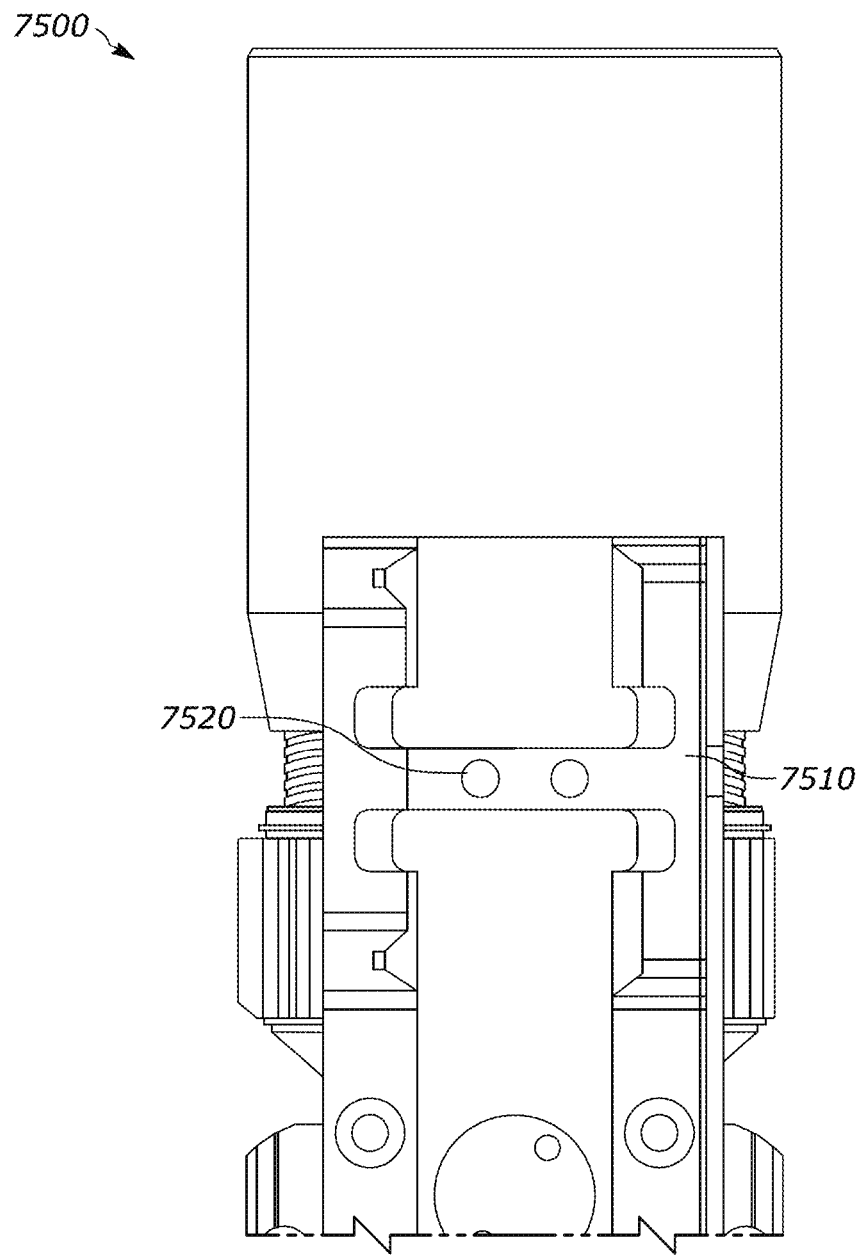

FIGS. 75 and 76 are representative depictions of a viewing optic 7500 having a main body and a base 7510 with power pins 7520 protruding through the base 7510 of the viewing optic 7500.

Figure 77:
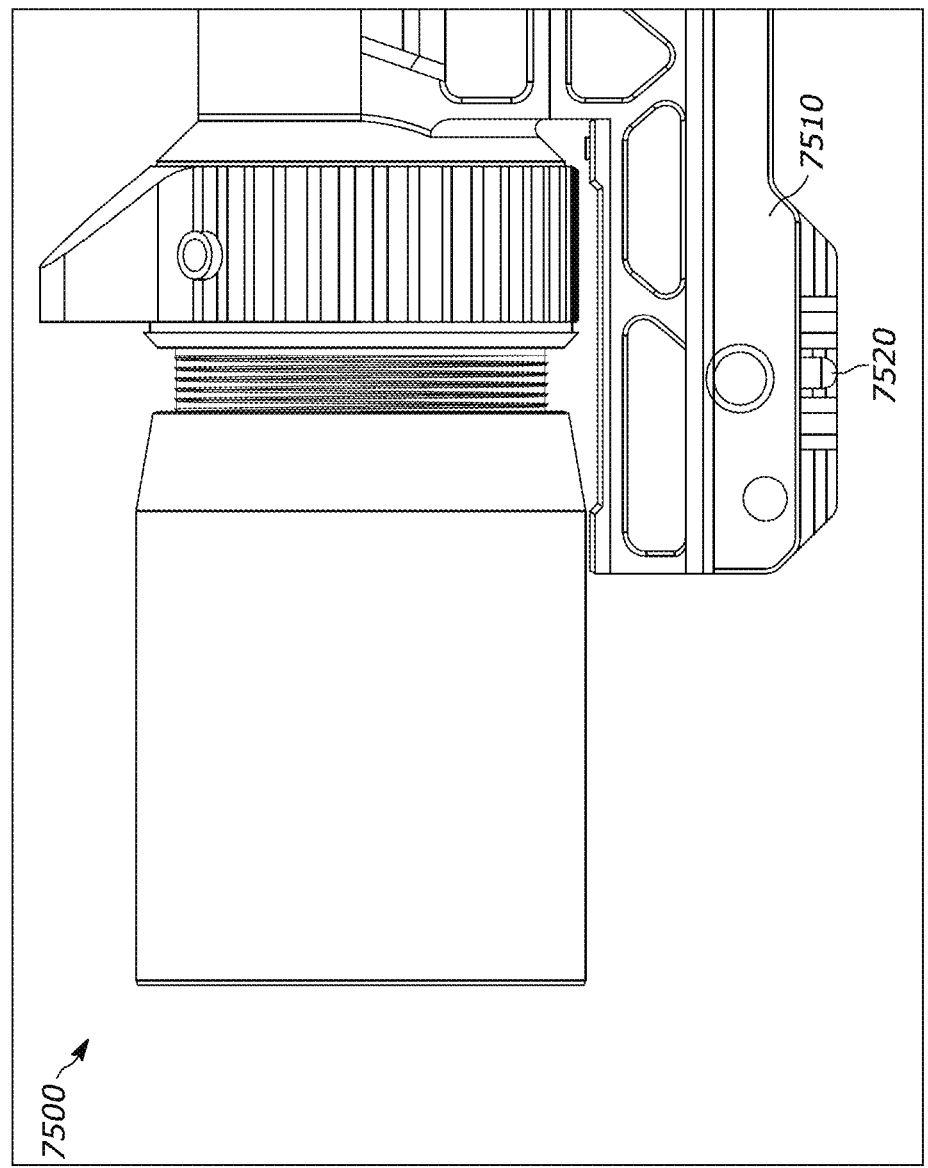
FIG. 77 is a representative side profile of the base showing the power pins protruding through the base of the viewing optic.

FIG. 77 is a representative side profile of viewing optic 7500 showing the power pins 7520 protruding through the base 7510 of the viewing optic 7500.

Figure 78:
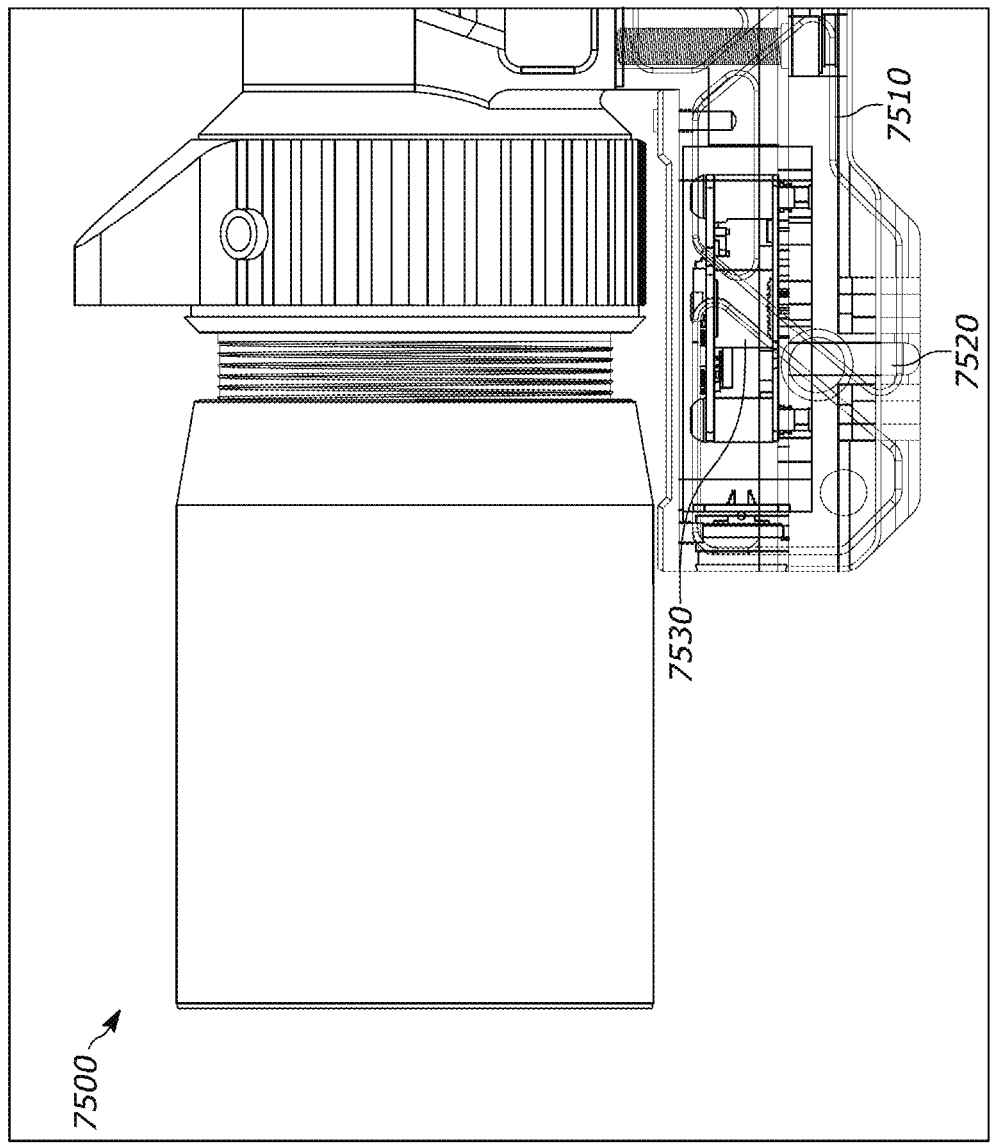
FIG. 78 is a representative view of the side profile with the base of the viewing optic made transparent to show the power pins, which are attached to the PCBs.

FIG. 78 is a representative view of the side profile of viewing optic 7500 with the base of the viewing optic made transparent to show the power pins 7520 which that are attached to the built in PCBs 7530.

In another embodiment, power supplied by the picatinny rail on the firearm could be delivered to the viewing optic through a remote keypad, which is used to control the viewing optic. In this scenario, the power pins are connected to the PCB that is in the remote keypad and they protrude through the built in recoil lug in the remote keypad housing. Power is then sent through two dedicated lines in the cable into the base of the riflescope.

Figure 79:
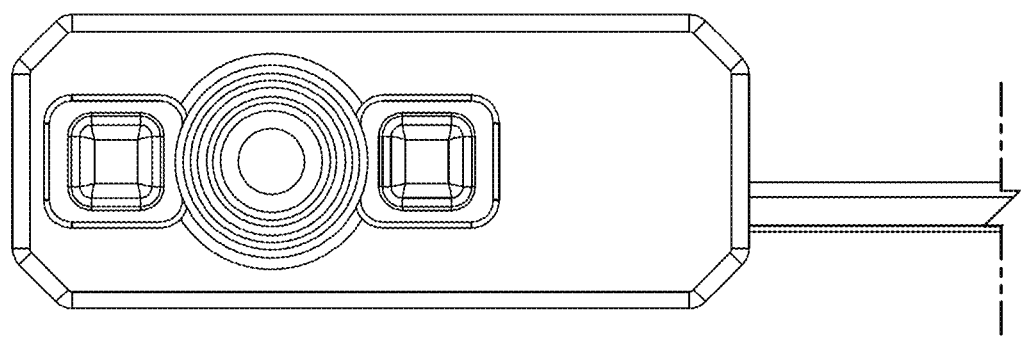
FIG. 79 is a representative image of the top of a remote keypad for communicating with a viewing optic.

FIG. 79 is a representative image of the top of the remote keypad 7900.

Figure 80:
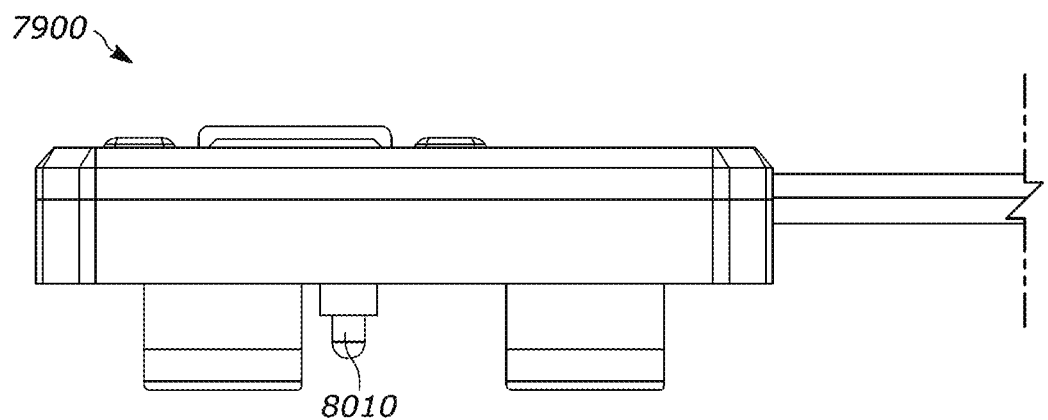
FIG. 80 is a representative side profile of the remote keypad showing power pins protruding through the built in recoil lug.

FIG. 80 is a representative side profile of the remote keypad 7900 showing power pins 8010 protruding through the built in recoil lug.

Figure 81:
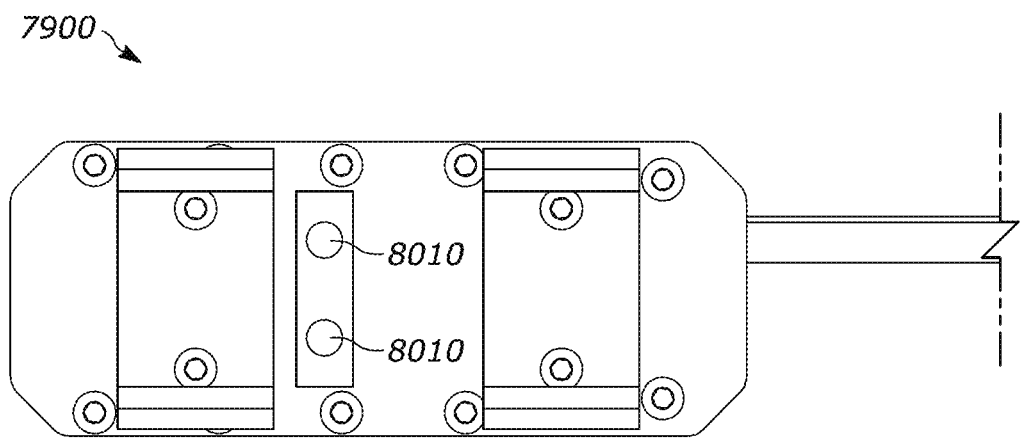
FIG. 81 is a representative bottom view showing the two power pins protruding through the remote recoil lug.

FIG. 81 is a representative bottom view of the remote keypad 7900 showing the 2 power pins 8010 protruding out of the remote recoil lug.

Figure 82:
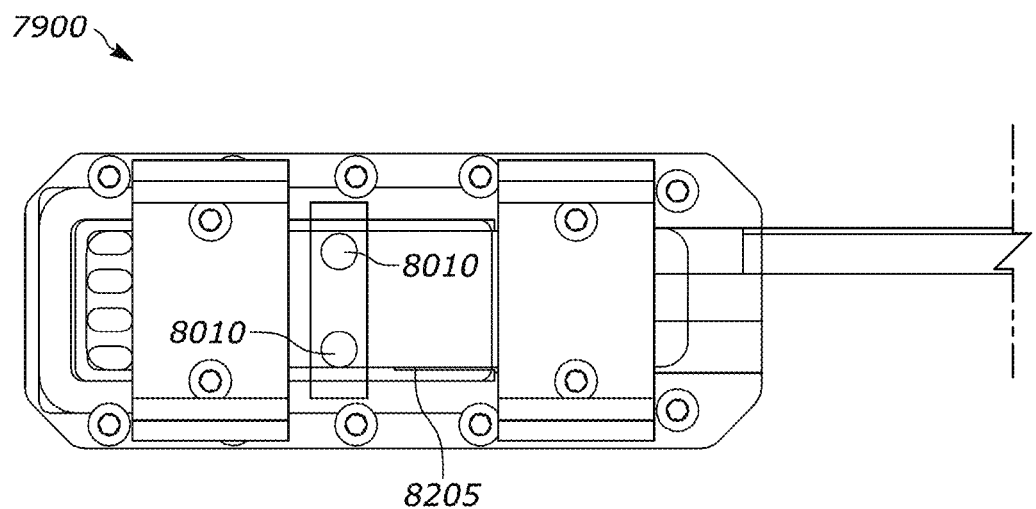
FIG. 82 is a representative bottom view with the cover made transparent to show the PCB inside of the remote body.

FIG. 82 is a representative bottom view of the remote keypad 7900 with the cover made transparent to show the PCB 8205 inside of the remote body.

X. Viewing Optics with a Single Keypad with Multiple Functions

In one embodiment, the disclosure relates to a system comprising a viewing optic having an integrated display system and a remote keypad system with more than one function per keypad button. In one embodiment, the remote keypad can control more than one aspect of functionality of the viewing optic, i.e. more than one function per button. In one embodiment, the function of the button depends on the state of either a control signal or software bit.

In one embodiment, the disclosure relates to a remote keypad that expands the control that a user/operator has over a viewing optic and/or auxiliary devices that are used with the viewing optic.

In one embodiment, the disclosure relates to a keypad for a viewing optic and/or one or more auxiliary devices that are used with the viewing optic. In one embodiment, more than one function is assigned to a single button of the keypad, wherein the desired function can be determined with a software bit or a separate mechanical switch. This can significantly increase the functionality of the viewing optic.

In one representative embodiment, in a first mode, a button can change the brightness of the display and in a second mode, the same button can activate an infrared pointer on the system. Using the same button for more than one function keeps the remote keypad small and simple with the minimal number of buttons required.

Figure 83:
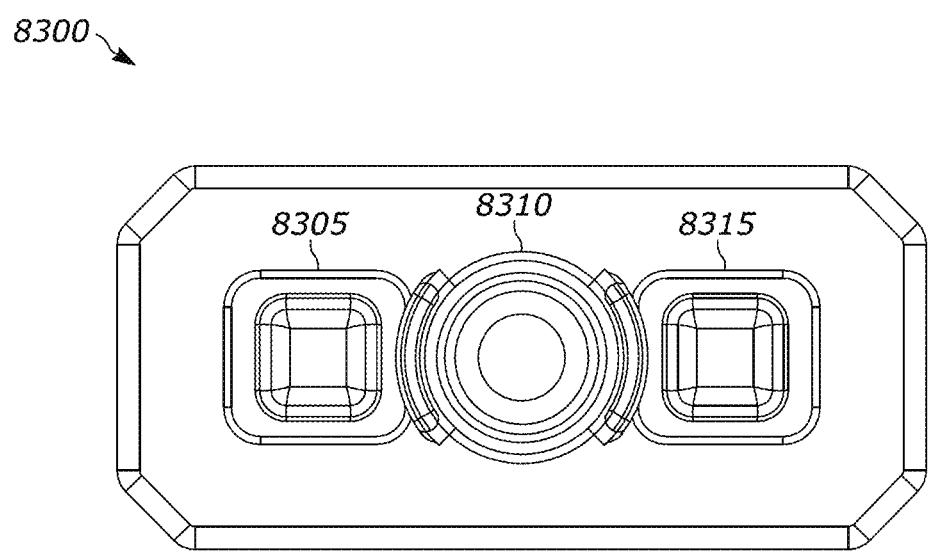
FIG. 83 is a representative depiction of a keypad with three buttons for communicating with a viewing optic disclosed herein.

FIG. 83 is a representative depiction of a keypad with three buttons. A remote keypad associated with a viewing optic has 3 buttons. The top button 8305 is used to increase the brightness of the display, the middle button 8310 is used to fire the laser rangefinder to range a target and the bottom button 8315 is used to decrease the brightness of the display. The functionality of each button depends on the mode of operation.

In one embodiment, the keypad can have 2, 3, 4, 5, 6, 7, 8, 9, 10, or more than 10 modes of operation. In one embodiment, the keypad can be in communication with a processor setting from 10 to 50 modes of operation for the keypad. By way of example, a keypad in communication with a processor having 10 modes of operation for the keypad, would provide 10 functions for each button, with the functionality determined by the mode of operation.

Several methods can be used to change the functionality of the buttons. In one embodiment, when a user/operator presses and holds a button on the remote for a period of time, the micro controller changes the function of one or more buttons. In one embodiment, an operator can press and hold one of the 3 buttons for a prolonged period of time, for example, 1 second, and this will signal the micro controller inside of the viewing optic to change a bit that assigns new functions to the buttons. In one embodiment, pressing and holding the top button 8305 for a period of time can set mode A, pressing and holding the middle button 8310 for a period of time can set mode B, and pressing and holding the bottom button 8315 for a period of time can set mode C. Varying the time each button is engaged can activate further modes of operation. For example, holding button 8305 for five seconds can active mode A, engaging button 8305 five quick taps can active mode F.

In another embodiment, the functionality of the remote keypad buttons can be changed is through a separate mechanical switch on the viewing optic. In one embodiment, a mechanical switch can have 3 distinct positions, which are in communication with 3 separate bits or programs in the micro controller. These bits or programs can be used to assign various functions to the remote keypad buttons.

Figure 84:
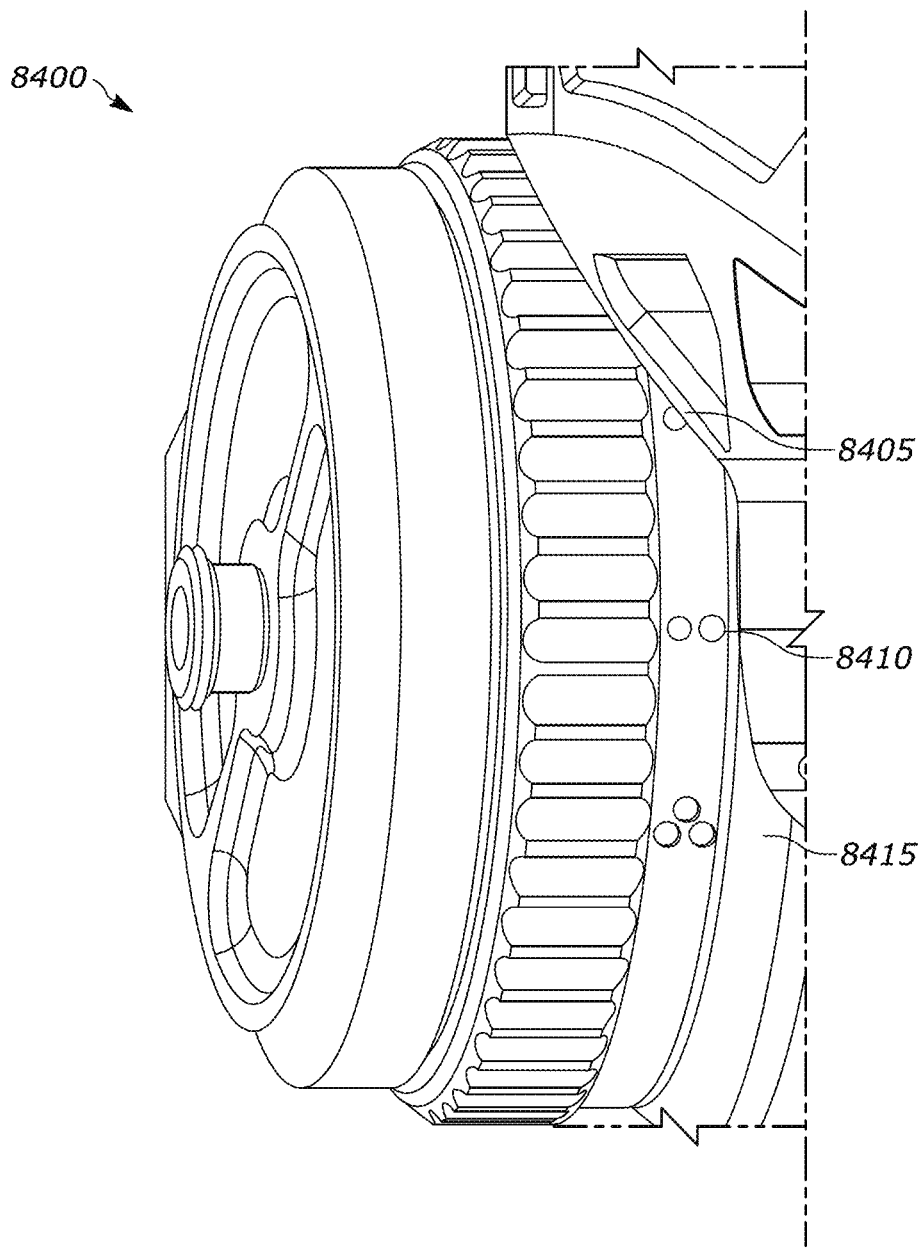
FIG. 84 is a representative depiction of a viewing optic with a mechanical switch for altering functionality of a remote keypad for communicating with the viewing optic.

A representative example is shown in FIG. 84. The viewing optic has a switch 8400 in communication with a remote keypad 8300. A first setting 8405 can assign the top button 8305 of a remote keypad 8300 the function to increase display brightness, the middle button 8310 could fire the laser rangefinder, and the bottom button 8315 could decrease display brightness. When the mechanical switch 8400 is set to a second setting 8410, the function of the top 8305 and bottom buttons 8315 can be programmed to turn on and off auxillary pointing lasers on the viewing optic and the middle button 8310 can still be programmed to fire the laser rangefinder. When the mechanical switch 8400 is set to a third setting 8415, the functions of the 3 buttons could be altered again. For instance, if the viewing optic is equipped with a digital magnetic compass and location and landmark data was saved to the memory of a micro controller then information about the position of objects could be displayed inside of the field of view of the viewing optic (augmented reality data).

In one embodiment, the keypad is in communication with a processor of the viewing optic that allows varying modes of operation to be assigned to each button or switch of the keypad. For example, in one mode of operation, the buttons of the keypad have specific functions for marking a target of interest. The operator can use the laser rangefinder to range a target and, use the heading data from a digital magnetic compass to "mark" a target of interest inside the field of view. The buttons on the keypad could be assigned functions that are specifically suited for this task.

The center button on the keypad could be used to fire the laser rangefinder to range the target. Once the target is ranged, the top and bottom buttons could be used to select from a predefined list of descriptors to label the target, e.g. "landmark," "friendly," "hostile," "unknown" etc. Once the operator is done with this action, the mechanical switch can be changed to quickly assign functions back to the remote keypad buttons that allow the operator to change brightness settings, activate an infrared laser, or obtain a ballistic solution for a target downrange.

XII. Viewing Optic with a Relative Coordinate Mapping System

In one embodiment, the disclosure relates to technology and a method of using a viewing optic with an integrated display system to accurately tag and track targets using a relative coordinate mapping system, and/or drone technology.

Soldiers need to be able to accurately identify the location of enemy targets and to share that location with other soldiers, close air support, etc, and to be able to see those targets easily by having them overlaid into the field of view of their primary optic. The most obvious way to achieve this is using a combination of GPS, compass heading, altitude, inclination, and range finding sensors. However, there are disadvantages in relying on GPS, such as GPS signals require direct line of sight to the GPS satellite, which may not always be possible. Using relative coordinate technology and/or the use of drones, the need for GPS can be diminished. Relative Coordinate Technology becomes feasible when used in conjunction with a viewing optic having an integrated display system.

In one embodiment, a user would be able to point the viewing optic with an integrated display system at a landmark or target and "tag" it. If the user "tagged" several targets, then a relative location map could be created from the tagged targets. These tagged targets could be transmitted to a viewing optic of other users, who would see those tagged targets displayed in the field of view. All this target data would then be stored locally in one or memory devices in the viewing optic.

In one embodiment, the user could also use drones either as an alternative to tagging targets, or as a supplement to tagging targets. This would work by launching a "cloud" of many small or micro drones that would contain cameras and the appropriate sensors to fly over a battlefield and begin tagging and marking landmarks. The drones could share that information with each other and back to the users who would have it displayed in the active display of their viewing optic.

By using relative coordinate technology and/or a cloud of drones, the disadvantages of GPS can be overcome:

With multiple users and multiple viewing optics, there becomes an inherent redundancy in the stored target data. When using a cloud of drones, that redundancy can be increased even further. With redundancy, it becomes much less likely that a signal or data would be lost.

GPS requires sending and receiving data over very long distances to and from satellites in orbit. By using other users who are in the same battle space, or a cloud of drones in the same battle space, the network is much closer to the users and target, which increases the accuracy of the user and target coordinates.

GPS is much easier to block, since there are a limited number of GPS satellites. With a cloud of users and/or drones, it becomes much harder to block all the signals and creates more redundancy.

Eliminating the need for a GPS module makes the viewing optic less bulky.

XIII. Viewing Optic with Ammunition Status Indicator

When shooting in high stress scenarios, shooters can easily lose track of how many rounds are left in the firearm. Currently, there is no easy or convenient method to determine the number of rounds remaining in a firearm magazine while holding the firearm in a firing position. A mechanical counter may be added or integrated into the magazine, but checking a mechanical counter requires a shooter to look away from his sights and/or target to check the round count. Other current methods and systems for determining the number of rounds in a magazine require the shooter to lose his sight picture, physically check the magazine, or otherwise disrupt his stance or position.

Some magazines are clear or have clear windows to show the remaining rounds, but the shooter needs to break their shooting position to observe the level. Additionally, the remaining rounds can be obscured by a grip or receiver. In military environments, some shooters have loaded tracer rounds as the final rounds in a magazine to indicate that the magazine they are using is almost empty, but this can reveal a shooters position and requires the use of specific rounds.

Other methods and systems have tried to address this issue by placing a digital read-out on a grip, but these read-outs both project light back at the shooter and are often placed in areas where the shooter must break concentration from a sight picture to see the remaining rounds. Sometimes the read-out is an attachment to an existing firearm component, other times the shooter is required to replace a part, like a grip, to have the read-out mounted on the weapon. Some read-outs are even mounted to the bottom of a magazine, which can be considered a disposable or semi disposable item in some military applications, a more expensive item.

In one embodiment, the disclosure relates to a viewing optic with an integrated display system that allows the user/shooter to monitor ammunition status. The ammunition status can be projected into a first focal plane and combined with the images of the outward scene. Proactively conducting or preparing for a magazine change better allows the shooter to reload at a time of their choosing rather than at a sub optimal time dictated by an empty weapon and magazine.

In one embodiment, the disclosure relates to a round counter system. In one embodiment, the round counter system comprises one or more magnets in a magazine or another ammunition feed device and a sensor on or in a weapon to count the rounds in a magazine. In one embodiment, the sensor can be in a remote that is mounted to a weapons magazine well to count the final rounds in a magazine. The information is then displayed via the active display and projected into a first focal plane of the optics system providing simultaneous viewing of the generated image (round indicator/round status) and images of the outward scene when looking through an eyepiece of the viewing optic.

In one embodiment, the viewing optic with an integrated display system and a round counter system can be used by military, law enforcement, competition or civilian shooters to indicate they have a specific number of rounds remaining without the user having to break their sight picture through the optic. Further, the shooter is aware of the final rounds in the magazine without breaking their concentration from the sight picture within the optic and remain engaged with the target more continually. It also better provides the shooter the opportunity to proactively prepare or conduct a magazine change. Proactively conducting or preparing for a magazine change provides the shooter an opportunity to reload at a time of their choosing rather than at a potentially sub optimal time. As used herein, the terms round counter system and ammunition status indicator are used interchangeably.

In one embodiment, the round counter system can include a chamber status indicator, thereby acting as a safety notice by telling the user there is a round in the chamber. This could be particularly useful on a bullpup weapon as it can be difficult to visually inspect the chamber on some weapon designs.

Additionally, the system adds minimal weight as it could use largely existing hardware and would not require substantial or expensive modifications to the weapon or the weapon's magazine.

In one embodiment, the round counter system can either be entirely integrated into a weapon system or it could be a minor and inexpensive modification to an existing weapon system.

In one embodiment, the disclosure relates to a viewing optic with an integrated display system having an active display and a round counter system that projects ammunition status or a round count into the first focal plane of the viewing optic.

The round counter system disclosed herein differs from prior disclosed apparatuses that use recoil impulses to determine the number of rounds left a magazine. Previously disclosed apparatuses typically require the user to hit a button, or perform another action, to tell the system they have loaded a new magazine. Additionally, prior disclosed systems only count down from a set number. Thus, if the user loads a 30 round capacity magazine, and it only has 7 rounds, the previously disclosed devices may read that the user has 30 rounds available. This could lead to very dangerous results. By contrast, the round counter system disclosed herein would read the number of rounds remaining in a magazine and would not be dependent on counting down rounds. The result of this is that the user could insert a partially loaded magazine and see the exact number of rounds they have.

In one embodiment, the round counter disclosed herein is independent of counting down mechanism.

In one embodiment, the round counter system comprises one or more magnets in an ammunition feeding device, and magnetic sensors on or in a firearm. As rounds are fired, the magnets move and interface with the magnetic sensors. Signals are sent from the sensor to a processing unit configured to communicate with an integrated display system inside a viewing optic. The remaining rounds in the ammunition feeding device are determined based on the location of the magnets to the sensors. The round counter system disclosed herein is configured to communicate with the integrated display system, which will then display to the user the number of remaining rounds without the user having to break concentration from their sight picture.

Figure 91:
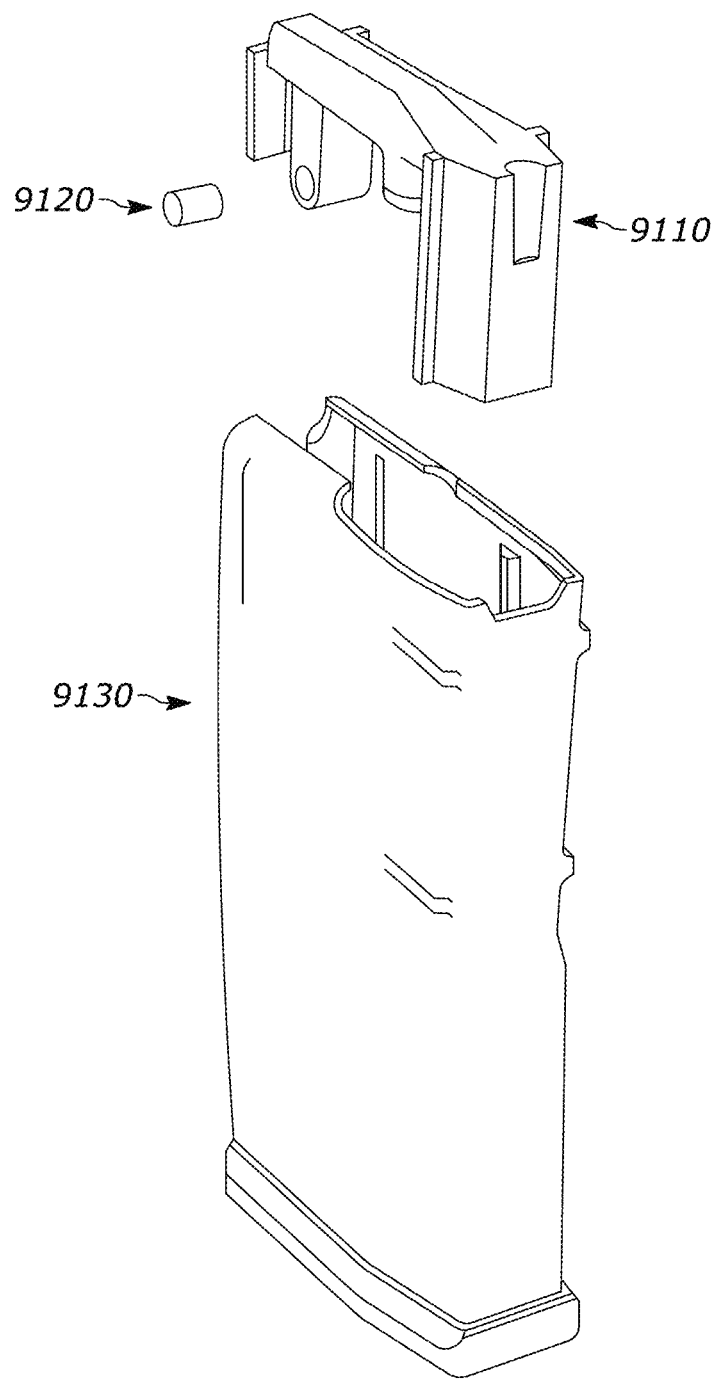
FIG. 91 is a schematic of a follower with a magnetic and a magazine used as compounds of a round counter system in accordance with embodiments disclosed herein.

FIG. 91 depicts one representative magazine follower 9110 and magazine 9130 that can be used in the round counter system disclosed herein. As shown in FIG. 91, one or more directional magnets 9120 is placed in the rear of the of a magazine follower 9110. The magnetic field is projected outside of the magazine 9130 perpendicular to the rounds in the magazine 9130 so that the magnetic field does not interfere with the feeding or loading of steel cased or armor piercing steel or other magnetically affected tips.

Figure 92:
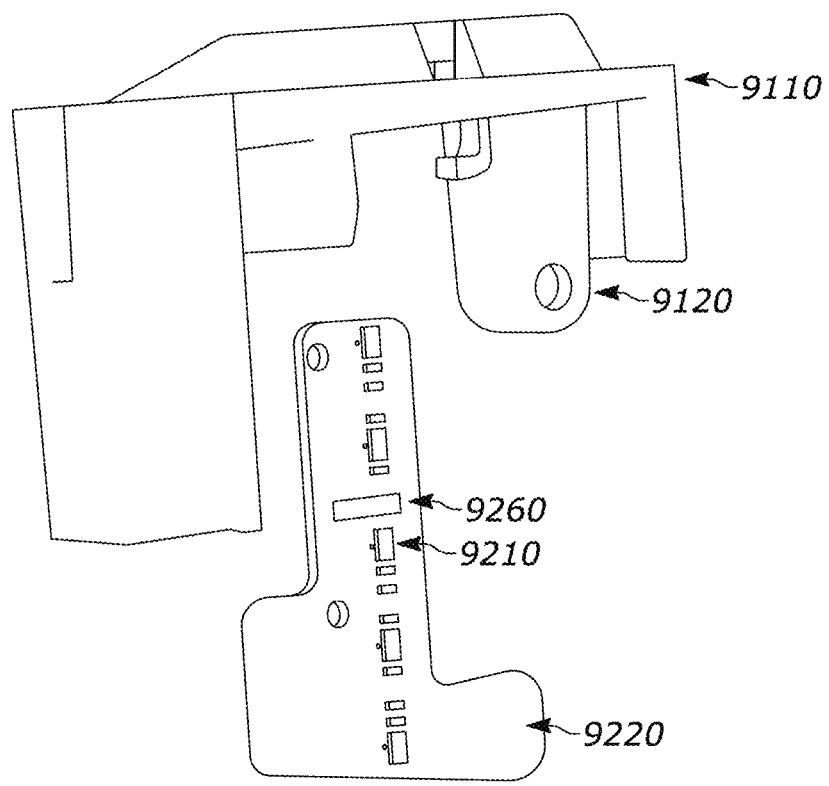
FIG. 92 is a schematic of the follower, magazine and sensors on a circuit board located to detect the magnetic field in accordance with embodiments disclosed herein.

FIG. 92 depicts one representative sensor that can be used with the round counter system disclosed herein. As rounds are fed through the magazine 9130, the follower 9110, and therefore the included one or more magnets 9120, is raised by a spring as each round is stripped from the magazine 9130. Sensors, such as Hall effect sensors 9210, on a circuit board 9220 are located on the receiver 9230 of the firearm to detect the magnetic fields, to detect the changes in strength of the field and to detect the changing position of the magnetic field.

In one embodiment, the sensors then send signals to a processing unit that is used to correlate the height of the follower within the magazine with the number of remaining rounds. The processing unit is configured to send information to an active display in a viewing optic, which projects this information into the first focal plane of the optics train in the main body of the viewing optic. The remaining number of rounds is displayed inside the shooter's field of view within the optic via the active reticle display.

In one embodiment, each magnetic sensor generates and sends an electrical signal depending on the magnetic field detected, to a processor 9260, which receives a plurality of electrical signals from different receptors and as a function of the signals received it associates a number of rounds or cartridges corresponding to the position of the magazine follower.

The processor runs a program from a set of instructions stored in a storage unit. In one embodiment, the storage unit can be on the circuit board housing the magnetic sensors. An instruction may be defined differently for different types of magazine, either by necessity as a result of the different technical possibilities of different types of magazine such as the number of cartridges it can hold, its storage method (in-line, staggered, etc.); or as a result of a choice made by the bearer of the firearm.

Consequently, the processor calculates the supply as a function of the different types of signals that can be associated with different numerical values, such that, depending on the values received it calculates the number of cartridges that are still held in the magazine.

Figure 93A:
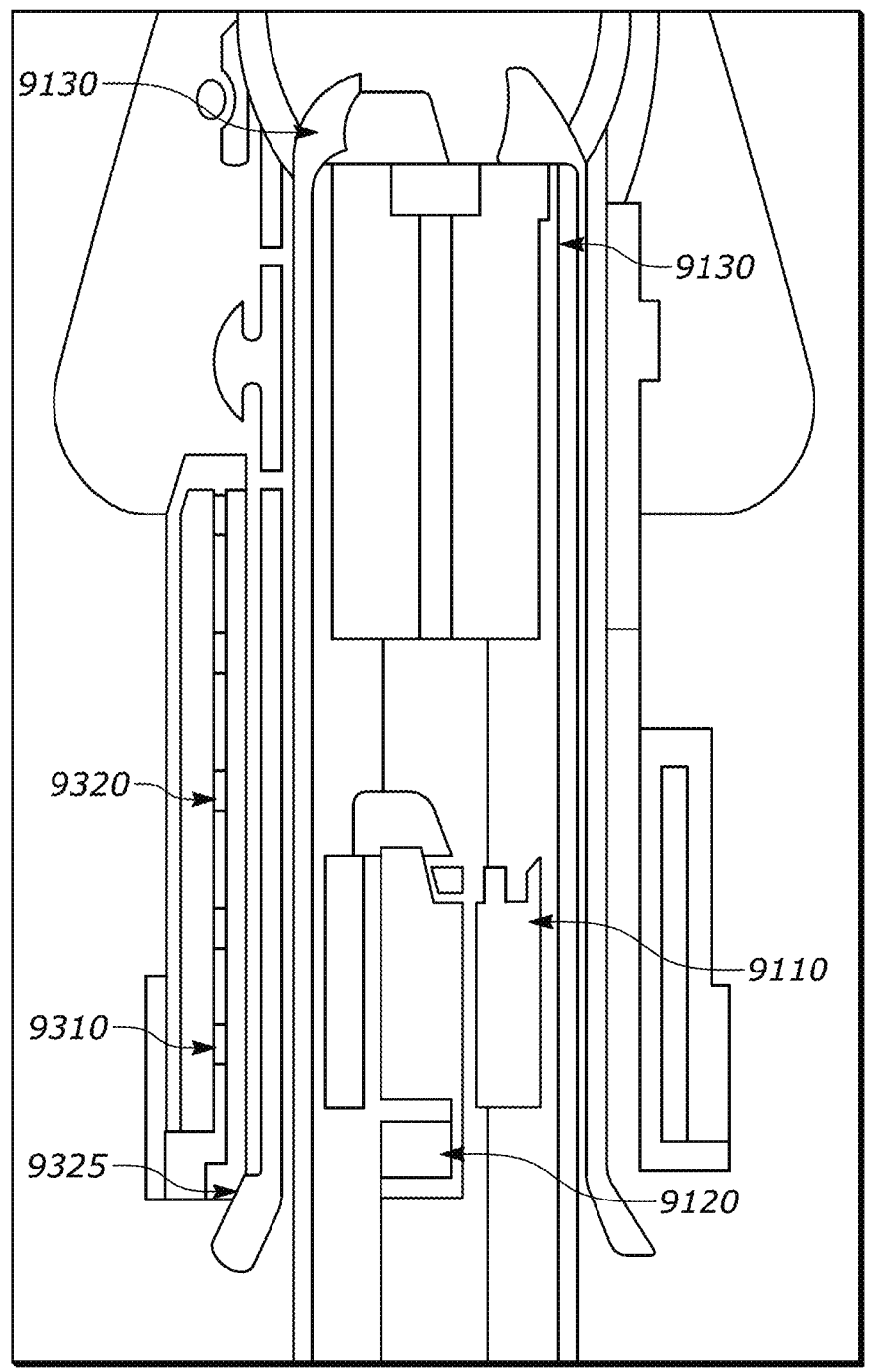
FIG. 93A is a schematic of a cut away view of the round counter system mounted into the lower receiver of a firearm, M4, in accordance with embodiments of the disclosure. The follower raises in a magazine and demonstrates approximately 8 rounds remaining.
Figure 93B:
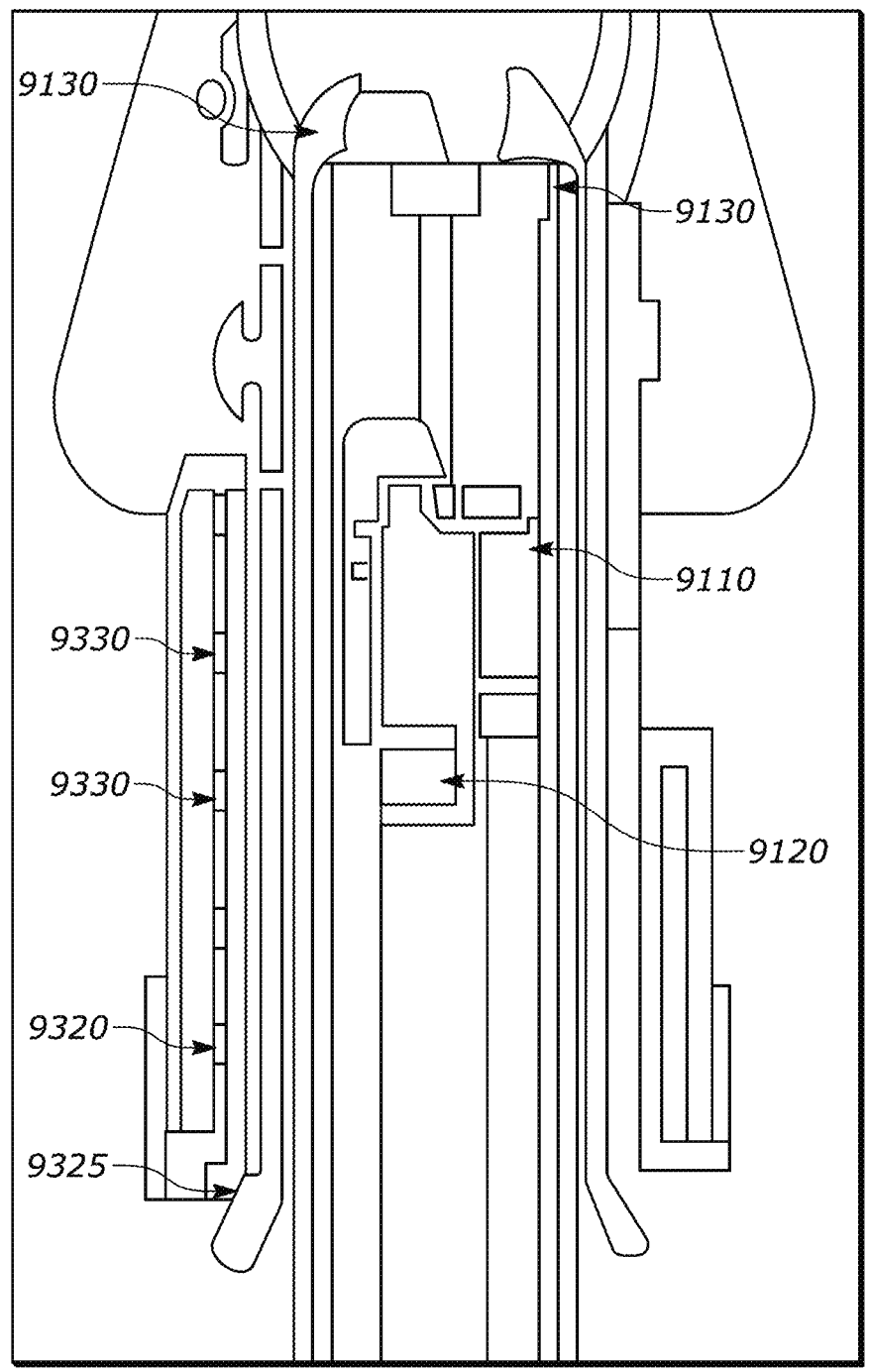
FIG. 93B is a schematic of a cut away view of the round counter system mounted into the lower receiver of a firearm, M4, in accordance with embodiments of the disclosure. The follower raises in a magazine and demonstrates approximately 4 rounds remaining.
Figure 93C:
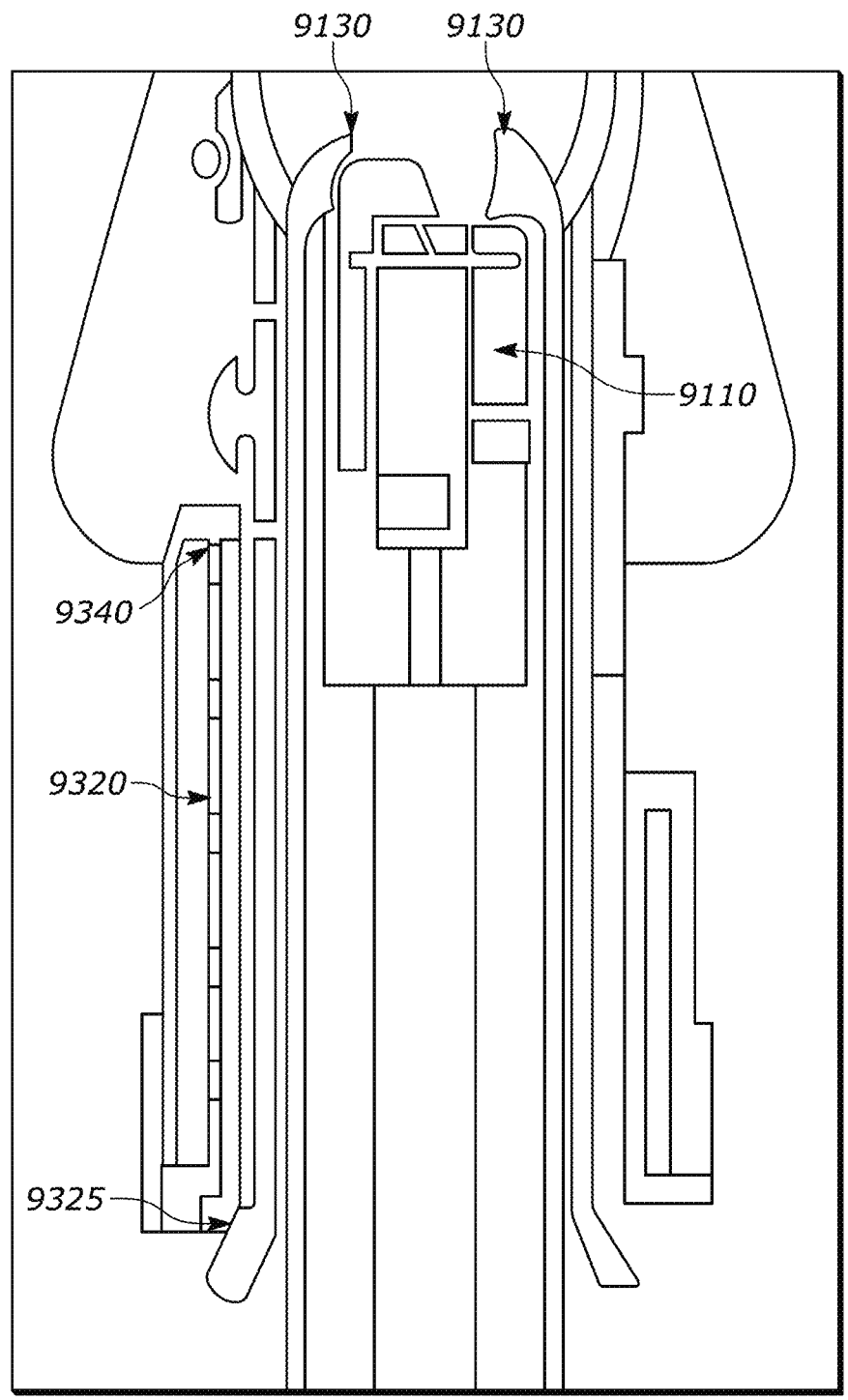
FIG. 93 C is a schematic of a cut away view of the round counter system mounted into the lower receiver of a firearm, M4, in accordance with embodiments of the disclosure. The follower raises in a magazine and demonstrates zero rounds remaining in the magazine in accordance with embodiments of the disclosure.

FIG. 93A, 93B and 93C depict cut-away views of a magazine follower 9110 with one or more magnets 9120, a magazine 9130, and hall effect sensors (9310, 9330, and 9340) on a circuit board 9320 mounted into the lower receiver 9325 of an M4. The follower 9110 raises in a magazine 9130 and the location of the magnetic field changes. Different sensors (9310, 9320, and 9340) are positioned to detect the changing position of the magnetic field.

FIG. 93A demonstrates approximately 8 rounds remaining with hall effect sensors 9310 detecting the magnetic field. FIG. 93B demonstrates approximately 4 rounds remaining with hall effect sensors 9330 detecting the magnetic field. FIG. 93C demonstrates zero rounds remaining in the magazine with hall effect sensors 9340 detecting the magnetic field. With each position, the magnet 9120 interacts with a different combination of hall effect sensors 9310, 9330, or 9340. Any number of hall effect sensors can be used, including but not limited to 1, 2, 3, 4, 5, 6, 7, 8, 9, 10, 11, 12, 13, 14, 15, and greater than 15.

In one embodiment, the combination of sensors that the magnet interacts with allows magazine height to be determined and the remaining number of rounds calculated. In one embodiment, the sensors may be spaced vertically and evenly from one another. The spacing of the sensors may correlate the vertical distance traveled by the follower each time a round is removed.

In one embodiment, the information can be transmitted physically through a cable or wirelessly to a viewing optic with an active display. The remaining number of rounds can then be displayed inside the shooter's field of view within the viewing optic via the active reticle display. In one embodiment, the number of rounds can be displayed alphanumerically or with graphone or with graphics. In one embodiment, the ammunition status can be displayed through color codes. In one embodiment, the ammunition status can be indicated with a green color indicating sufficient rounds remain. In another embodiment, the ammunition status can be indicated with a red color to indicate an ammunition change is required. In one embodiment, ammunition status can be indicated with a yellow color to indicate an ammunition change will be required soon.

In one embodiment, the round counter system tracks or monitors the ammunition status. In one embodiment, the round counter system determines the number of rounds remaining. In another embodiment, the round counter system counts rounds in a magazine.

Figure 94A:
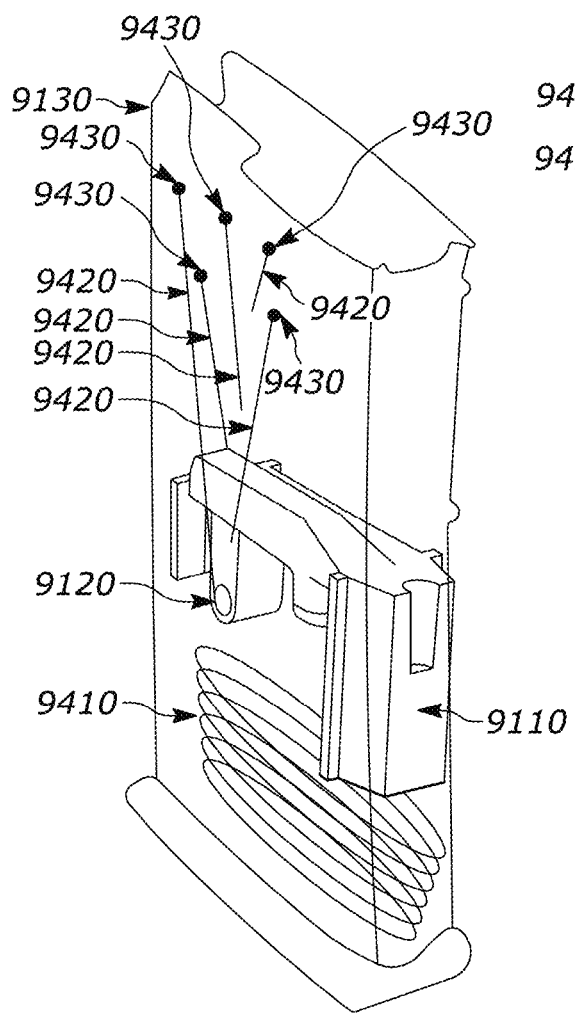
FIGS. 94A and 94B are representative schematics of another embodiment of a round counter system, wherein the magazine follower has a magnet that interacts with ferrous wires in or on the wall the magazine in accordance with embodiments of the disclosure.
Figure 94B:
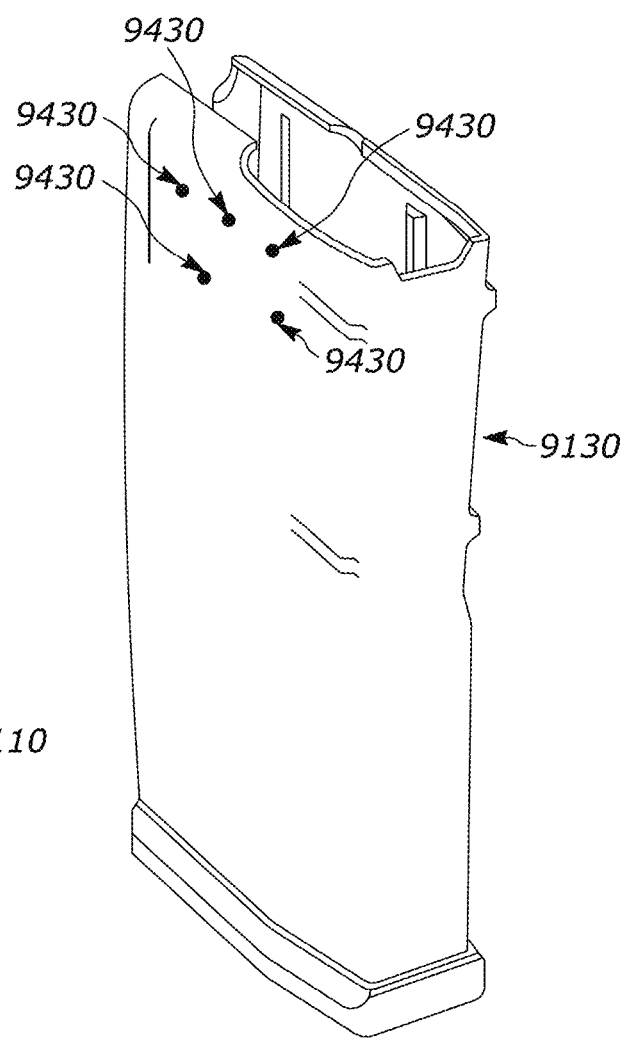

FIGS. 94A and 94B depict additional embodiments of a round counter system. As shown in FIGS. 94A and 94B, the magazine follower 9110 has one or more magnets 9120 that interacts with one or more ferrous wires 9420 in or on the wall the magazine 9130. When the magnet comes in contact, or near proximity with the one or more wires 9420, the wire 9420 picks up the magnetic flux emitted from the magnet 9120 thus magnetizing the wire 9420. The one or more wires 9420 feed to one or more nodes 9430 at or near the top of the magazine 9130, where a sensor, including but not limited to a hall effect sensor, interacts with the magnetic field of the nodes 9430. Based on the position of the follower 9110, different nodes 9430 will be magnetized, allowing the number of remaining rounds in the magazine to be determined. In this scenario, the remaining rounds in an entire magazine 9130, rather than just the remaining rounds at the end of a magazine can be determined. FIG. 94A shows an internal cut away of this system. FIG. 94B shows an exterior view with the nodes 9430 showing through the side of the magazine 9130.

In another embodiment, the round counter system displays ammunition status or the status of the chamber. This could be accomplished through either a magnetized round, or another chamber status indication system. The information could be transmitted to the viewing optic wirelessly, through a direct wired connection, or through other interfaces, such as a smart rail, that could transmit data. The ammunition status or chamber status could be displayed with the status of the rounds in the magazine or indicate to the user that there is a round in the chamber or indicate to the user that there are rounds in the magazine, but the chamber is empty. The round counter system disclosed herein can serve as a safety mechanism to help the user be aware of their chamber status. While this feature would be useful with any weapon, it could be particularly useful with bullpup weapons as their designs can be difficult to confirm the chamber status.

In another embodiment, the rounds or cartridge cases could have magnets, or magnetic properties that interact with the hall effect sensor. This would eliminate the need for a special follower to interact with the hall effect sensor.

In one embodiment, different types of rounds could also have unique signatures. This can provide the user information to which type of round was loaded in the magazine or in the chambers. Different symbols, or colors could be used to distinguish between load types. Some examples could include, but would not be limited to, ball rounds, armor piercing, match, tracer, sub sonic, higher or lower power, incendiary, explosive, breaching, buckshot, slug, flechette, and less lethal. The type of round loaded could be very useful in military and police environments, particularly when dealing with less than lethal vs lethal rounds.

In another embodiment, the type of round loaded in the chamber and/or magazine could also be fed to the ballistic calculator in the viewing optic with an integrated display system. The system could identify the chambered round and update the ballistic solution to match that cartridge. This would prevent the shooter from having to select a different type of munition in their menu.

In still another embodiment, the loaded round information could also interface with weapon information. The viewing optic with integrated display system could detect weapon settings and display signals to alert the user to alter the weapon recoil or operating settings, like a gas setting or a buffer weight, based off the loaded rounds. This would help ensure the weapon would cycle more reliably with that round and could help reduce wear and tear on the weapon system. The system could even direct weapons to adjust these settings themselves if the weapon was capable.

In another embodiment, the ammunition status can be transmitted to third parties in addition to the user of the viewing optic. Status can be transmitted through the viewing optic with integrated display system with a wireless chip set, or it could occur through a communication hub on the circuit board with the hall effect sensor/s or additional points throughout the system. The ammunition status could be sent externally to other team members. Ammunition status could be sent to a sniper spotter team or to a heads-up display worn by the user, or other team members. The ammunition status of a machine gun or automatic rifle could be sent to a team lead and/or an assistant gunner to better coordinate reloads, and fire and maneuver.

If hall effect sensors and a communication hub were incorporated into a user's magazine pouches, the status of the entire load out could be displayed to a user or team leader. In a range or training environment, the magazine and chamber status could be sent to range officers and instructors. This would better allow control over a range and create a safer live fire environment, especially when training individuals who are unfamiliar with weapons.

In one embodiment, the round counter system may display the entire round count in the magazine or it may serve only as an indicator that the shooter is approaching their final rounds in a magazine.

Figure 95:
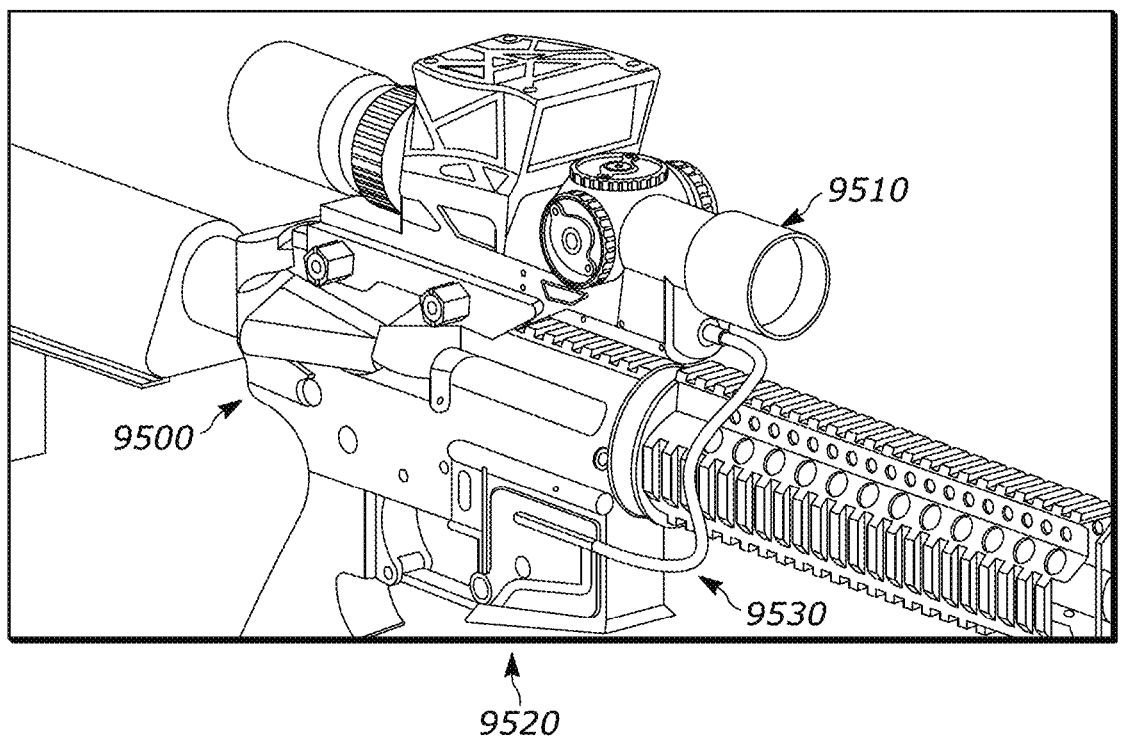
FIG. 95 is a representative photograph of a viewing optic with an integrated display system and a round counter system on a firearm with a conventional layout, wherein the integrated display system and the round counter system communicate via a cable in accordance with embodiments of the disclosure.
Figure 96:
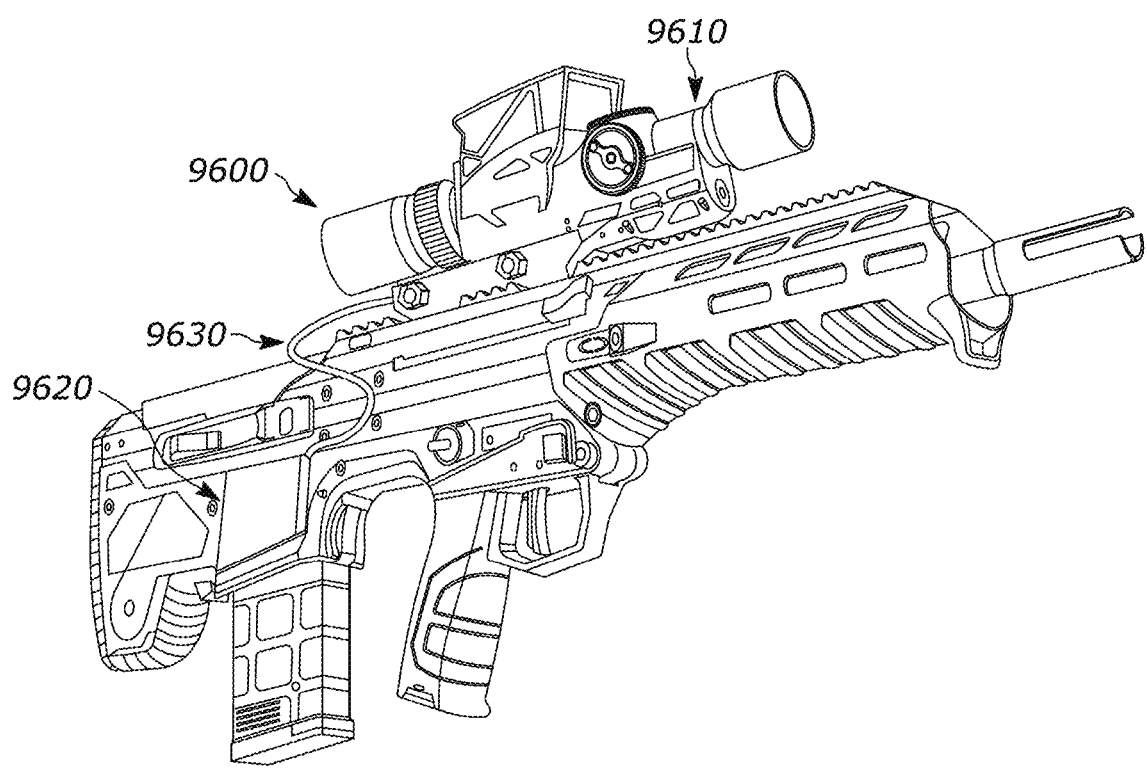
FIG. 96 is a representative photograph of a viewing optic with an integrated display system and a round counter system on a firearm with a bullpup layout, wherein the integrated display system and the round counter system communicate via a cable in accordance with embodiments of the disclosure.

In one embodiment, the round counter system disclosed herein may be used on weapons with a conventional layout as shown in FIG. 95 or in bullpup designs as shown in FIG. 96.

As shown in FIG. 95, a system 9500 is disclosed herein comprising a firearm with a conventional layout, a viewing optic 9510, a round counter system 9520, and a cable 9530 that supports communication between the viewing optic 9510 and the round counter system. The viewing optic 9510 can include any of the embodiments and configurations disclosed throughout the application.

FIG. 96 depicts another embodiment of a system 9600 disclosed herein comprising a firearm with a bullpup design, a viewing optic with an active display 9610, a round counter system 9620, and a cable that supports communication between the viewing optic 9610 and the round counter 9620. The viewing optic 9610 can include any of the embodiments and configurations disclosed throughout the application.

In addition, the round counter system can be used with firearms with magazines in the grip or any other magazine fed weapon. The round counter system disclosed herein can also be used with belt fed weapons using special metallic links or a non-disintegrating belt that has progressive magnets to trip the invention's sensors.

In one embodiment, one or more magnets can be located within a magazine follower to trigger one or more sensors on a weapon receiver. In one embodiment, the magnetic sensors can reside in a remote already connected to the viewing optic. The remote is attached to the magazine well of the weapon. The magazine follower rises as the rounds are stripped or discharged from the magazine and the magnetic sensors send information to the active display of the viewing optic.

This design will give the shooter feedback with regard to the number of rounds they have remaining in their magazine without having to break concentration from the sight picture. In addition, this design for ammunition tracking has limited cost and does not increase weight of the weapon system as the integrated display system is already present in the viewing optic. Additionally, sensors could reside in a remote already attached to a weapon's magazine well.

In one embodiment, the disclosure relates to a viewing optic with an integrated display system that can display the round count in the magazine from full to an empty magazine or it may serve only as an indicator that the shooter is approaching their final rounds in a magazine.

In one embodiment, the hall effect sensors may reside in a remote that controls or is linked to the optic or parts of the optics system. In one embodiment, a new magazine follower can be inserted into the magazine.

In one embodiment, the hall effect sensor casing or package may be removable or fully integrated into the receiver or furniture of the firearm. In one embodiment, the hall effect sensors may reside in a remote that controls or is linked to the viewing optic or part of the optic system. The at least one magnet and the corresponding at least one sensor/s may be placed on any side to best facilitate a clear reading of magnets associated with the magazine or other feed device.

XIV. Viewing Optic Capable of Integrated Images from Augmented Reality Goggles Augmented reality goggles are a technology that is currently being developed to allow the user to have the capability of seeing information digitally projected into their field of view and overlaid on top of what they would normally view through the naked eye. This could be anything from target information, to thermal and night vision imaging.

As discussed throughout this application, a viewing optic with an integrated display system allows the user to have the capability of seeing information digitally projected into their field of view and overlaid on top of what they would normally view through the optic. In one embodiment, the disclosure relates to a viewing optic with an integrated display system that can integrate images from an augmented reality goggle.

If a user with augmented reality goggles was in a night vision mode, the entire field of view is filled with a digital image of the scene in front of the user. Likewise, a viewing optic could also display a night vision augmented reality. In this situation, if the user tried to look through the viewing optic with an active display, their vision will be impaired by the digital image being projected by the augmented reality goggles.

In one embodiment, this disclosure solves this problem by determining when the viewing optic with an integrated display system was brought to the user's eye so that it could either completely deactivate the digital image projected by the augmented reality goggles, or disable a portion of the digital image in the field of view (FOV) of the augmented reality goggles only where the FOV of the viewing optic with an integrated display system would be covering the FOV through the augmented reality goggles.

Weapon mounted optics often have a limited area in which the user can clearly see through the optic. This area exists as a 3D space comprised of, and determined by, the exit pupil and the eye relief. This area is also known as the "eye box."

In one embodiment, the disclosure relates to systems and methods that provide a user of augmented reality goggles a way of determining when a viewing optic with an integrated display system is brought to the user's eye using a proximity sensor correlating to an optic's eye box.

In one embodiment, augmented reality goggles could have a proximity sensor configured to communicate with a viewing optic having an integrated display system. The proximity sensor may vary in its form, function, or technology. When an input from the viewing optic is received by the sensor of the augmented reality goggles, the augmented reality goggle can either completely deactivate the digital image projected by the goggles or disable a portion of the digital image in the field of view (FOV) of the augmented reality goggles. The input from the senor could deactivate the augmented reality goggle where the FOV of the viewing optic with an integrated display system would overlap the FOV through the augmented reality goggles. Some methods to achieve this could use RFID, or other wireless transmitting methods.

In one embodiment, the disclosure relates to the use of an IR laser mounted to a viewing optic with an integrated display system and an IR camera mounted to the augmented reality goggles. The IR laser would be aimed back towards the user's augmented reality goggles. When the user brought the firearm and the viewing optic with an integrated display system up to their eye, the IR laser would hit the IR camera on the augmented reality goggles and indicate to the augmented reality goggles that the viewing optic with an integrated display system was positioned in front of the user's eye. The augmented reality goggles could be programmed to shut off the augmented reality goggle imagery so that the user could then look through the viewing optic with an integrated display system.

Figure 97:
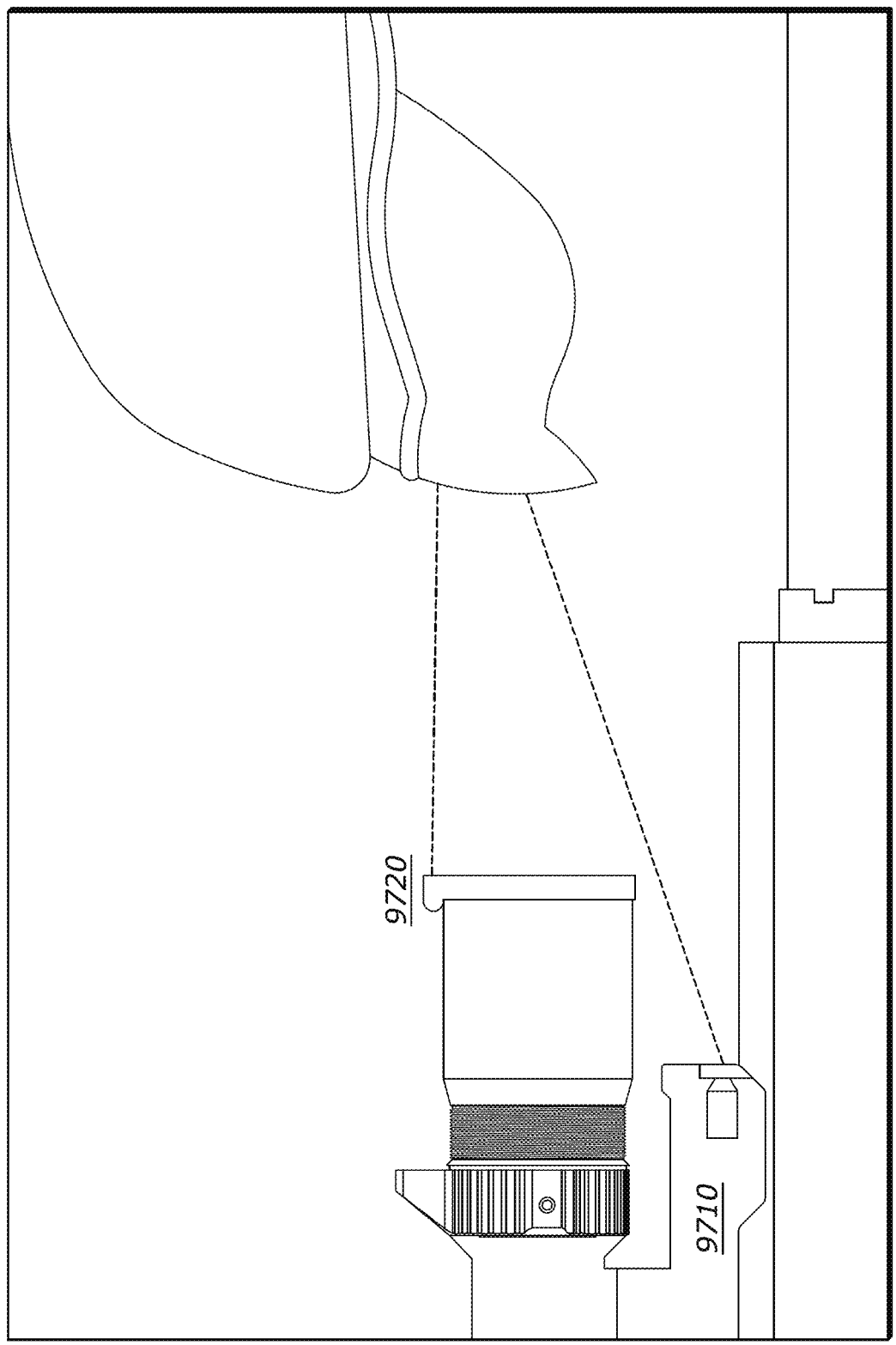
FIG. 97 is a representative depiction showing multiple locations for an IR laser to be mounted to the viewing optic disclosed herein.

FIG. 97 provides a representative depiction of two possible mounting locations for the IR laser configured to communicate with the goggles. In one embodiment, the IR laser 9710 is positioned at the ocular end of the base or housing that is coupled to the main body. In yet another embodiment, the IR laser 9720 is positioned at the ocular end of the main body.

In one embodiment, the viewing optic can have two or more than 2 IR lasers. In one embodiment, the IR laser has 2, 3, 4, 5, or greater than 5 IR lasers.

In another embodiment, the IR laser could also indicate the exact position and orientation of the viewing optic with an integrated display system, relative to the augmented reality goggles. Using this feature, the augmented reality goggles could be programmed to only turn off the imagery in the portion of the field of view that was occluded by the viewing optic with an integrated display system.

This would allow the user to operate with both eyes open and give them a much larger field of view for much better situational awareness. The augmented reality goggles would be providing the augmented reality imagery for everything outside of FOV of the viewing optic with an integrated display system, while the viewing optic with an integrated display system would be providing all the augmented reality imagery inside the viewing optic's field of view.

In another embodiment, the disclosure relates to the use of magnets on or in a weapon and a magnetic sensor in an augmented reality goggle system to detect and measure the presence of a magnetic field. The sensor and magnet locations may also be reversed. The sensor would be calibrated to measure when the user would be within the eye box. When the sensor detected the field or the strength of the field that the user was in firing position and looking through the eye box, the goggles could shut down all or part of their augmented reality display so to not interfere with the viewing optic's FOV.

In another embodiment, the disclosure relates to the use of a pressure switch mounted to the stock or the augmented reality goggle system. This pressure sensor could be mounted on the top of the stock and be activated by a shooter's check weld. Alternatively, the pressure sensor could be mounted on a variety of locations on the stock. If mounted on the stock, a wireless transmission could be sent to the goggle indicating that the shooter was in position to look through the optic.

The pressure switch may be fixed or adjustable to various shooters, optics locations, clothing or other variables. The switch may also allow for a certain pressure threshold to be crossed before sending a signal to the augmented reality goggle system.

The pressure sensor could also be integrated into or onto the augmented reality goggle system. This may be a placed, moved or calibrated to active when pressed against the stock when the shooter is in a firing position looking through the optic.

In all configurations, the system between the viewing optic with an integrated display system and the augmented reality goggles could be designed so that the shooter/user could shoulder and fire the weapon from their non-dominant/support while having the augmented reality display disabled on the appropriate side.

XV. Viewing Optic Displaying Dryfire Feedback

During dry fire practice, shooters practice marksmanship by manipulating, aiming, and pulling the trigger on a weapon with either an empty chamber or a non-live round. In its most base form, shooters practice with an empty weapon, aiming at a basic target reference, on or off a range. They then observe the weapon movement as the trigger is pulled, but they have no feedback beyond their own observations as to whether they would have hit their intended target had they fired a live round.

In more advanced configurations, shooters use laser indicators attached to or inserted into weapons that give more visual feedback as to muzzle movement as the trigger breaks for the shot. These lasers may give feedback as to a hit or miss but only when paired with very specific and sometimes expensive target systems.

In one embodiment, the disclosure relates to a viewing optic with an integrated display system with an active display configured to generate a target onto the internal screen of the viewing optic. Sensors can track the movement of the viewing optic to the internally projected aim point. The shooter would then dryfire the weapon. Upon the breaking of the shot, the scope would give the shooter an indicator that the user would have hit or missed the projected target had the user been firing a live round at a physical target.

In one embodiment, the viewing optic can project an aiming or target reference for the user; the viewing optic does not have to digitally display an entire target environment. The user can then have a digital target overlaid on the image they are receiving though the optical train in the main body of the viewing optic. This system will greatly increase the battery life of the viewing optic as an entire environment does not need to be recreated and projected by a digital display.

In one embodiment, as the main body of the viewing optic has an etched reticle, no reticle image is required to be projected onto a display. Additionally, the viewing optic with an integrated display system includes onboard atmospheric sensors that can calculate and compensate for ballistics, and projected ballistics of a dryfire shot. Therefore, the shooter can have their dry fire training account for environmental and atmospheric conditions that they are experiencing at the time of the training.

In one embodiment, the viewing optic with an integrated display system has an active display that projects an aiming point into the first focal plane of the optics train of the main body. The user then moves the weapon system to place a reticle over, or in reference to, the projected aiming point in a manner as if the shooter was aiming at a target down range during a live fire event.

In one embodiment, the viewing optic can use internal or external accelerometers, gyroscopes or other sensors to track the physical movement of the viewing optic in relation to the internally project image. When the reticle is in a position to take a simulated shot, the shooter pulls the trigger. The viewing optic tracks the firing pin impact or movement using accelerometers, microphones, gyroscopes or sensors. The shot placement, and potentially the follow through, is tracked and measured against the aiming reticles point at the time of the shot in relation to the projected aiming point. The system then gives the shooter an indicator on the internal display whether as to the shooter would have hit or missed the shot in a live fire scenario. The system may provide the shooter information as to where the shot would have landed and/or provide instructions as to how the user should correct the shot placement, or physical technique used by the shooter.

In another embodiment, the viewing optic with an integrated display system has an active display that projects a target that a user can measure using an etched/passive or active/digital reticle. The shooter could then utilize holds built into a reticle or dial a windage and/or elevation dials to replicate taking a shot at distance.

In another embodiment, the viewing optic with an integrated display system could simulate the shooter using a laser range finder to range the projected target. The shooter could then apply an appropriate hold or dial windage and/or elevation adjustment to make a simulated shot at the specified distance In one embodiment, the viewing optic with an integrated display system can monitor and/or display wind speed, wind direction and other atmospheric changes including, but not limited to pressure, altitude, temperatures, humidity, angles, cant, inclination, Coriolis effect, spin drift, and down force from helicopter blades.

In another embodiment, the viewing optic with an integrated display system can include environmental effects including rain, snow, sleet, or other effects. These atmospheric and/or environmental changes may be digitally simulated or gathered from on board sensors that could reflect real time conditions that would or could affect ballistics.

In one embodiment, the viewing optic with an integrated display system can include user selectable targets for the most applicable application to the shooter. Targets may be 2d or 3d images. Examples of targets could include but are not limited to geometric shapes, traditional targets shapes (example bowling pins), silhouettes, bullseyes, small game, medium game, large game, birds, water fowl, humans, human silhouettes, enemy combatants, images of specific objectives, known or suspected terrorists, high value targets, equipment or vehicles. The system may include moving targets including, but not limited to objects what are moving at the speed of a target walking, trotting, jogging, running, driving, riding, swimming, flying or on a pitching deck of a water craft or vessel. Direction of movement may not be limited to a single plane but simulated vertical, horizontal or movement as an oblique may be represented. Target simulations may vary in direction and speed.

In another embodiment, the viewing optic with an integrated display system may or may not include "shoot" or "no-shoot" scenarios or targets that may be partially obscured or covered. Obscured objects/persons/characters may be displayed through image processing. The system may display simulated friendly or "no-shoot" units or images. The system may also network with other systems so that real friendly systems are displayed within the reticle so that the user has "no-shoot" points of reference and/or muzzle awareness indicators so that the shooter does not needlessly or unintentionally "flag" or point their weapon at a real "no-shoot" object.

In one embodiment, the viewing optic with an integrated display system communicates hit, miss or other information to the shooter and observers or trainers. This could be communicated via audible differentiating between hits or misses. This could also be communicating via external light/s that signal a hit or miss through different colors, pulses, or light locations.

In one embodiment, the viewing optic with an integrated display system communicates with external systems. The information communicated could be feedback giving hit or miss indicators or it may show the shooters sight picture at the time that the shot broke. The communication link may be unidirectional or omnidirectional. The external system may be able to send observer/spotter/trainer corrections, comments, or messages to the shooter and display the information within the viewing optic. The communication may be via physical cords, wireless signals, network connections, radio frequency or other means of transmitting data. In another embodiment, the viewing optic can have a camera that records the trajectory of the shot.

In another embodiment, the viewing optic with an integrated display system works and/or communicates with auxiliary or external systems to create a more in-depth environment. The system could work with a thermal unit, night vision, or CEMOS camera that is connected physically or digitally to the unit to mimic shooting a target displayed by a thermal optic or a target in no light or low light environment. The system may communicate with a heads-up display, or digital screen worn by a shooter to allow for an augmented reality scenario that extends beyond the screen of the viewing optic and is additionally mimicked or displayed by a user's head mounted system or display interface.

In one embodiment, the viewing optic with an integrated display system may fire a laser from a laser system integrated with or connected to the optic upon the trigger dropping. This would allow down range sensors or targets to detect the muzzle placement and orientation upon the simulated shot.

In one embodiment, the viewing optic with an integrated display system is placed on a completely unmodified weapon. The system may be used with or without snap caps, blanks, or other simulated or dummy bullets or munitions.

In one embodiment, the viewing optic with an integrated display system allows the user/shooter to actively select a dryfire setting via a menu, switch or another setting selector to active the program/dry fire feature of the viewing optic. The viewing optic may display an alert that the user has selected a dryfire mode or setting. The viewing optic may have a program that asks the user to accept the dryfire setting and may display and/or require the user to click or verify firearm safety rules or conditions.

In another embodiment, the viewing optic with an integrated display system is placed on a modified or purpose-built weapon. The system may interact with a trigger sensor to detect a trigger pull. The system may work with a trigger resetting system that would prevent the user from having to manually charge or cock a weapon or trigger system after the hammer, strikers, firing pin, or firing mechanism is dropped, initiated, activated or induced. The system may be placed on recoil simulating systems that mimic weapon operations via hydraulics, air, motors, or other recoil/momentum replication systems, mechanisms, or units.

In one embodiment, the disclosure relates to a viewing optic with an integrated display system that may allow for additional extremal sensors, connection, devices or housings to be placed onto a weapon. These external sensors/systems could link physically, wirelessly, or through a network. The additional external sensors could allow for more accurate movement measurements. Extra or alternative programs, scenarios, settings controls or power could be connected to the unit to allow for a wider variety of training and/or longer unit run time. External housings or connections could also simulate outside/external forces on the physical weapon.

In another embodiment, the viewing optic with an integrated display system may have an additional augmented reality unit attached. The unit could feed information to the viewing optic via a physical or wireless connection. This unit may have a camera and/or a compass so that it can accurately geo locate and image and place characters onto the proper location within a display. The module may not have a separate display but may only feed information to the viewing optic's display. The module may act as an image processing unit that may create and/or register, among other things, simulated people, bullet impacts, and hit indicators. Occluded objects/images/persons/characters may be displayed through image processing.

In one embodiment, the viewing optic with an integrated display system that can simulate real world conditions for a dryfire session does not require an electrical signal to be sent from the trigger itself and therefore does not require any modifications to a host weapon outside of mounting the optic to the weapon.

In one embodiment, the viewing optic with an integrated display system that can simulate real world conditions for a dryfire session will provide shooters with instant dry fire feedback without requiring specific external targets. The system does not have to alter the weight, handling or balance of a weapon.

In one embodiment, the viewing optic with an integrated display system that can simulate real world conditions for a dryfire session can be used by shooters to receive clear feedback during dryfire practice. It does not require elaborate target systems to be set up nor does it have to project a forward signature. The system does not require any changes to be made to a host weapon, and it allows the shooter to practice and become better familiar with a weapon and sighting system they would use during live fire events, exercises or scenarios.

In one embodiment, the viewing optic with an integrated display system that can simulate real world conditions for a dryfire session allows for all information to be internal and does not require a physical target for any feedback. This system does not require external attachments and can be accomplished without changing the weight, balance or handling of weapon.

In another embodiment, the viewing optic with an integrated display system that can simulate real world conditions for a dryfire session may be built as a dedicated training tool deferring to, or only featuring, the dry fire functionality.

In one embodiment, the viewing optic with an integrated display system that can simulate real world conditions for a dryfire session does not require a camera to capture an image.

XVI. Viewing Optic with an Integrated Display System and Multiple User Interfaces In one embodiment, the disclosure relates to a viewing optic with an integrated display system with user interface technology, which allows the extensive functionality of the viewing optic to be easily employed by the user.

In one embodiment, the user interface can be used to navigate and quickly use an Active Reticle Scope's features and functions.

In one embodiment, the viewing optic could employ different remote devices to input commands or information based on the technologies that are added to a particular viewing optic. Ideally, for simplicity, a single button remote would be used, however a multi-button remote could be used if enough features were added to the viewing optic. These remotes could be physically connected or wireless.

The viewing optic may also communicate with other devices such as smartphones, tablets, computers, watches or any other devices, which provide information or functionality to the viewing optic. These devices could communicate wirelessly or through a physical connection.

In one embodiment, the viewing optic could also or alternatively receive and execute commands input by the user through voice commands. The scope may have a microphone, or it may be linked to a communication system already used by the shooter. The scope could also integrate eye tracking technology that would allow the user to navigate and/or perform functions in the optic.

In one embodiment, the viewing optic with an integrated display system can have ranging targets as well as tagging target capabilities. As discussed above, the viewing optic with an integrated display system can be used to "tag" a target. If a single button remote is used there needs to be a way for the user to distinguish from tagging a target and ranging a target.

In one embodiment, for ranging a target, the user would simply tap the single button on the remote. This would tell the viewing optic with an integrated display system to fire a laser pulse and measure the range to the target and display a ballistic solution and hold point. For tagging a target, the user would push and hold the single button. As the button was being held, the display would show a short animation that would indicate to the user that the tagging function was activated. For example, the user might see a shape being drawn in the center of the field of view where they were pointing the viewing optic. Once the shape finished drawing the user could release the button and this would communicate to the viewing optic that the user wanted to tag the target currently covered by the drawn shape.

Immediately upon button release a menu would appear that would give the user multiple selections to label the type of target that the user just tagged. For example, the selections could include, but are not limited to: Enemy, Friendly, Waypoint, Unknown, etc. The user could cycle through the selections using the single remote button with single taps and then select a target with a press and hold, or the user would have the option of using the 5-button pad on the viewing optic to navigate the menu and make a selection.

Once a target was tagged and labeled the display would show a symbol in the user's field of view. The shape could indicate to the user what type of target it was for them to quickly identify. In one embodiment, the menu can request confirmation of the correct tag.

There is also a need for a user to be able to change or delete a target. To do this, the user would press and hold the remote button and wait for the tagging symbol to be drawn. Once the tagging symbol was drawn, and without releasing the button, the user would simply move the viewing optic so that the tagging symbol was covering or touching an existing tagged target symbol and then release the button. Upon button release a menu would appear that would list the target types, as well as a delete option. The user could cycle through the selections using the single remote button with single taps and then select a target with a press and hold, or the user would have the option of using the 5-button pad on the viewing optic to navigate the menu and make a selection.

In one embodiment, the viewing optic with an integrated display system has the ability to indicate Close Proximity Target Tags. When tagging targets in very close proximity to one another, the system may mistake an attempt to designate a new target, as the selection of a previously marked target. When the menu is displayed for the previously marked target, an option would appear that would allow the marking of a new target. The user could press and hold to select this option or use the 5-button pad on the viewing optic to make the selection. The user would then be prompted to select the target label they desire for the new target.

In one embodiment, the viewing optic with an integrated display system can have the ability to display coordinates. In one embodiment, the viewing optic may have, or be paired with a laser rangefinder, a compass and a GPS unit. These features may provide the functionality to provide the user with coordinates for tagged targets. This feature could be very useful for establishing rally points, directing air support, coordinating artillery fire or other applications. Full and constant coordinate display may not be desired by users though as it may clutter a display.

In one embodiment, full customizable options may be available through a deep menu option, or through a computer or other more advanced interface technology. In one embodiment, the default settings could be streamlined to users with only a remote. Certain target tag label selections, such as rendezvous points or air strike locations, could always have a coordinate displayed adjacent to a target marker.

Alternatively, some or all of the target tags labels may only display the coordinates when the optic's reticle is hovering over the target tag for more than a few of seconds. The coordinates could be displayed adjacent to the target tag or in another part of the viewing optic. The display could be passive and be displayed automatically or it could require a button press combination to display the coordinate. The same press combination could remove a displayed coordinate from the screen. The duration of the coordinate display could be determined by a user in a separate menu option.

XVII. Viewing Optic with a Turret Tracking System

Adjusting an optic's reticle typically involves dialing a turret, which moves an optic's aiming reticle up or down or side to side a specific number of units, usually mil radians (mils) or minutes of angle (MOA). These units are usually defined by small detents and often make small audible and tactile "clicks."

Certain turrets can allow for greater than 360° of rotation. This benefits the shooter as they have access to a greater adjustment range. For example, if a single rotation will move a reticle 5 mils, two full rotations would allow for 10 mils of adjustment. This significantly extends this distance a shooter can engage a target while using the reticle as an aiming reference. Without a clear reference though, a shooter can quickly become confused as to which rotation is currently on. This problem is further exacerbated when a shooter has 3, 4, or more than four rotations of adjustments available to them.

Some scopes feature reference lines on their turret. As the turret is rotated, the body of the turret head would raise and expose horizontal reference lines. However, these lines are small and hard to see from behind a firearm under even the best conditions. In no light or low light environments, there is no good way for a shooter to observe their turret revolution without using a light source to illuminate the turret. For some hunting, law enforcement and military scenarios this is not a feasible option.

One alternative is to have a revolution indicator installed on the scope. Often these indicators consist of a physical pin that slowly protrudes from the optic as the turret rotates. The changing pin height gives the shooter a reference point as to the turret rotation when using the optic in low light or no light conditions, but it does not easily provide a distinct reading as to the exact turret adjustment. For example, a scope may have a pin that protrudes on the second rotation, but the user may not know if they are dialed at 11.1 mils or 17.3 mils on a turret that has 10 mils of adjustment per rotation. These values will result in substantially different points of impact, particularly if the shooter is engaging a target at mid to long range distances.

Using a revolution indicator also means the shooter must physically feel their optic to know their turret setting. This would require the shooter to break their firing position by moving either their firing or support hands from their respective positions. This is not an acceptable solution when a shooter may need to engage a target at a moment's notice.

In one embodiment, the disclosure relates to a method to track the turret adjustments of a viewing optic whereby the components of the tracking mechanism are reliable, transparent to the operator, and environmentally protected. The turret tracking system disclosed herein employs an LED, a photosensor and a strip of material that has varying degrees of optical reflectance/absorption.

In one embodiment, the turret information can be transmitted to an active display, which can then project the turret information into the first focal plane of the viewing optic with an integrated display system.

In one embodiment, the turret tracking system disclosed herein provides users with an easy to read display of their current adjusted value of an optic turret. In one embodiment, the disclosure relates to a viewing optic with an integrated display system and a turret position tracking system comprising an LED, a photosensor and a strip of material that has varying degrees of optical reflectance/absorption. The sensor then transmits data to an active display of an integrated display system, which projects the information into the first focal plane of the optical train of the main body.

In one embodiment, the turret tracking system may be used on elevation/vertical adjustment, windage/horizontal adjustment turrets and/or any other rotating adjustment on or in a viewing optic.

Figure 88:
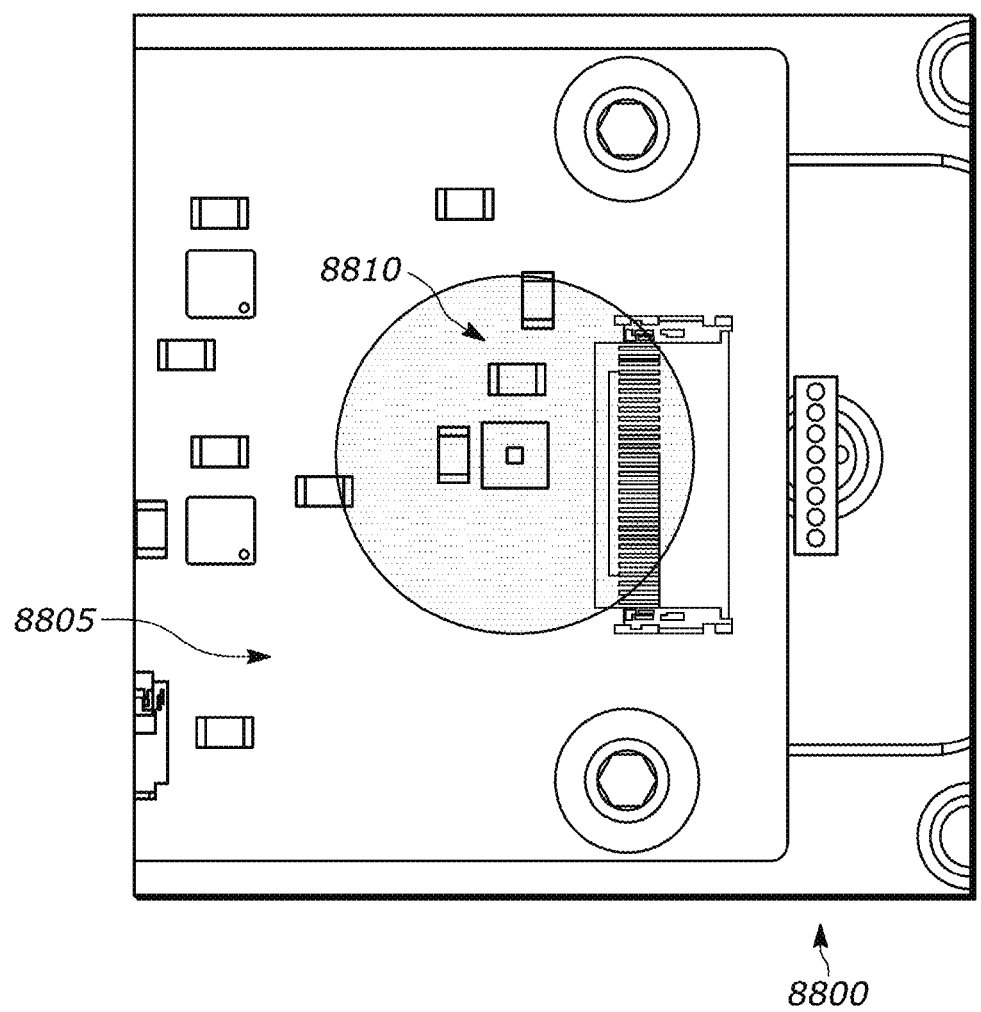
FIG. 88 is an image of the printed circuit board having a photosensor, LED and microprocessor functions.
Figure 89:
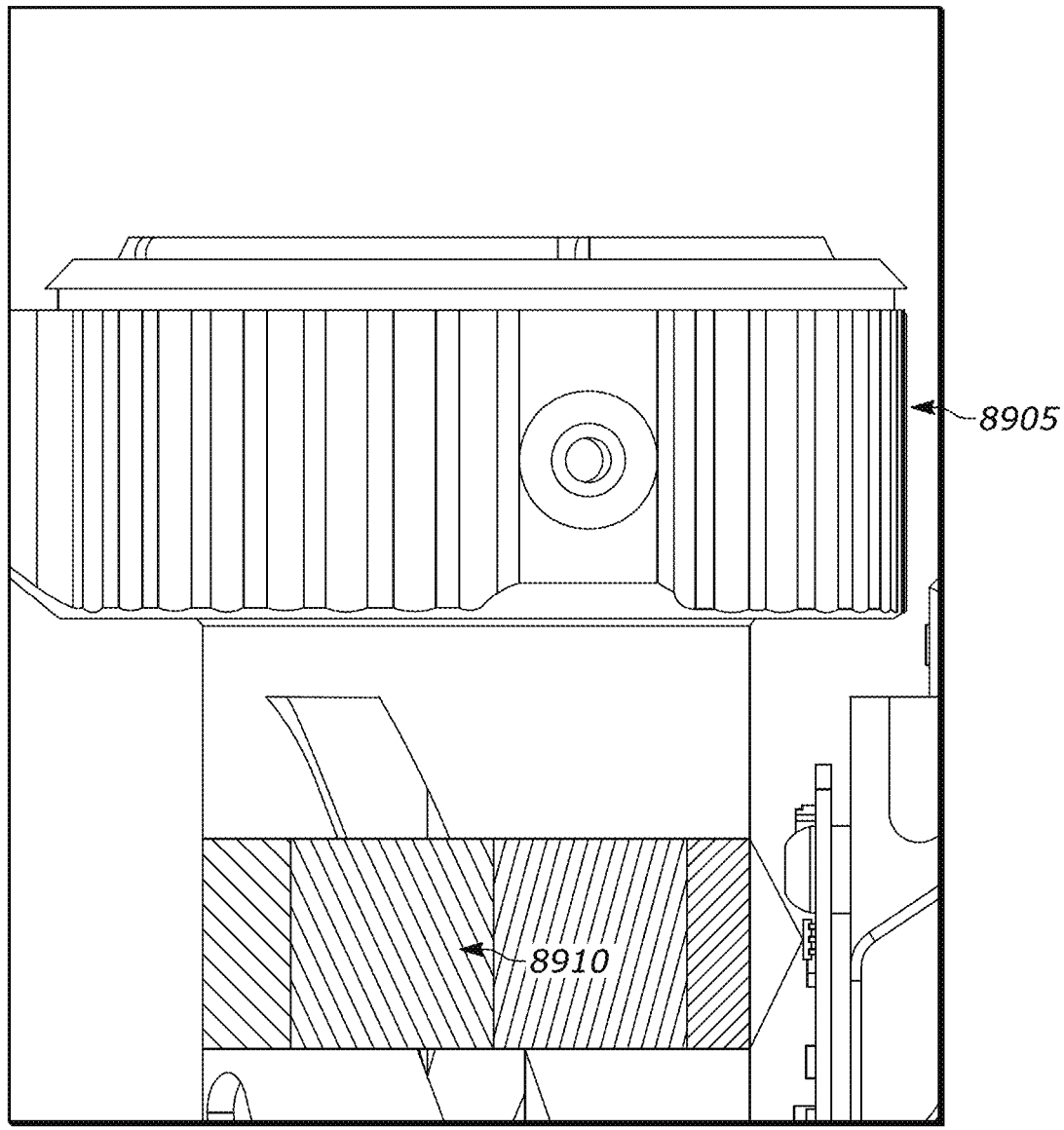
FIG. 89 is a representative depiction of a turret with a reflective gradient strip that is attached to the outer turret sleeve to measure the turret position. This illustration shows a gradient strip that has 4 specific sections of differing reflectivities but it should be noted that this strip could be infinitely varying in its reflectivity.

FIGS. 88 and 89 are representative depictions of a turret tracking system. FIG. 88 is a representative depiction of a printed circuit board 8805 with microprocessor, photosensor and LED 8810 and a simulated cone of vision drawn to illustrate the angle of acceptance of light for the photosensor. FIG. 89 is a representative depiction of a turret 8905 with material having a grayscale gradient 8910.

In one embodiment, the viewing optic has one or more turrets 8905 having a turret tracking system with an LED and photosensor 8810 housed within a fixed position inside the turret. When the turret 8905 is rotated by the operator, an erector tube is moved, which changes the position of the optic's reticle. Affixed to the inside diameter of the turret is a material 8910. In one embodiment, the material 8910 is approximately 10 mm wide and 40 mm long. The material may cover 360° of the turret 8905. One side of this material 8910 has an adhesive that is used to attach it to the interior turret wall. The other side of the material 8910 has a printed grayscale gradient on it which, when an LED is shone on it, will reflect varying amounts of light depending on which portion of the gradient is being exposed to the LED.

The LED illuminates the gradient strip and the photosensor receives a portion of the light reflected off the gradient strip, and sends a signal to a microcontroller, the strength of the signal varying with the amount of light detected. When an adjustment turret is rotated by the operator a different portion of the gradient strip is exposed to the LED and photosensor which in turn changes the signal strength sent to the microcontroller. The turret setting of the system is therefore able to be tracked by associating it with the amount of light detected by the photosensor. This information is then sent from a microcontroller, for example, to an active display within the integrated display system of the viewing optic, which gives the user a value correlating to the turret position. This value may correlate to the exterior reading of the turret.

In another embodiment, the reflective material can be fixed in position and the photosensor and LED can rotate around the reflective material.

In another embodiment, the LED and sensor may be located outside of the turret and the reflective material is affixed to the exterior of a turret mechanism. This design may be beneficial to protect against outside elements.

In one embodiment, the turret tracking system may reside inside and/or outside the viewing optic body. In one embodiment, the turret tracking system may reside within and/or outside a turret body and may be part of the turret.

In one embodiment, the turret tracking system may be a module residing with or next to the optic turrets.

In another embodiment, the reflective gradient strip may have defined sections, or may have infinitely varying reflectivity. The reflective material may be attached to the viewing optic and/or turret or it may be integrated into the viewing optic, turret body, housing, coating or another element. If the reflective gradient has defined sections, those sections may correlate and/or match to the rotation and/or click adjust of the physical turret mechanism.

In another embodiment the reflective material has two or more alternating levels of reflectivity. The sensor would then track the changes and send the information to a processor, which would "count" the number of changes to provide a value to the display.

In one embodiment, the turret tracking system may also "count" or track full revolutions to allow the display of an adjustment past a single rotation. In another embodiment the material may be finely calibrated and/or have reference marks and the material or the sensor may move up or down with or on an erector tube to allow for a greater spectrum of reflectivity so which could allow the system to sense/read multiple turret rotations.

In one embodiment, the turret display may remain visible at all times or it may only be displayed when the shooter has dialed an adjustment that is not their zero. The turret display options may be user selectable. Turret values may be displayed using numerical values, words, acronyms, symbols, graphics or other methods. The display settings may be user adjustable. The display may show turret and unit references.

In one embodiment, the displayed units of angular measurement are usable selectable that could include but are not limited to mil radians (mRad or mils), Minutes of Angle (MOA), Gunners Mils or Shooter's MOA. This would allow for the shooter to work with spotter elements who are giving corrections in another unit.

For example, if a marksman had a scope with 0.1 mRad adjustment turrets, and an mRad calibrated reticle, the spotter may be giving feedback in MOA. The shooter could then switch their optic to digitally display the units in MOA. As the viewing optic cannot change the physical adjustments increment, the optic would do a unit conversion for the shooter.

For this example, 1 MOA=0.30 mils. If the spotter told the shooter they were low by 2 MOA, the shooter could then switch their displayed units to MOA. The shooter would dial their adjustment. The scope turret could read+0.1 mil→0.2 mil→0.3 mil→0.4 mil→0.5 mil→0.6 mil.

While dialing the internal displayed adjustment could read+0.34 MOA→0.68 MOA—1.02 MOA→1.36 MOA→1.7 MOA→2.04 MOA. This would allow the shooter to make their adjustments off another unit of angular measurement.

In another embodiment, the viewing optic having an integrated display system and a turret tracking system could communicate with a laser range finder and a ballistic calculator to provide corrections in units of linear measurement rather than units of angular measurement. These units could include, but are not limited to, inches, feet, yards, millimeters, centimeters, and meters. As the optic itself cannot change the physical adjustments increment, the optic would do the unit conversion for the shooter based on the given distance to the target and the ballistic profile of the projectile.

For this example, 0.1 mil is 0.36" at 100 yards. The shooter could switch their viewing optic to display units in inches and the shooter could measure the distance to the target. The distance could be entered into a scope menu or measured and automatically input by a laser range finder that could be connected physically or wirelessly to the optic.

If the shooter was 1.5 inches low at 100 yards the shooter would dial their adjustment. The scope turret could read+0.1 mil→0.2 mil→0.3 mil→0.4 mil. When dialing, the displayed adjustment, provided by the active display and projected into the first focal plane of the optical train, could read+0.36 inches→0.72 inches→1.08 inches→1.44 inches. This would allow the shooter to make their adjustments based off units of linear measurement.

In one embodiment, the viewing optic having an integrated display system and a turret tracking system could display units that correlate to weapon profile zeros stored in the viewing optic menu. These weapon profiles could contain zero information, ballistic software and/or data and other auxiliary information that could be used by a shooter to help successfully calculate and/or conduct a shot. This may be integrated with or without a physical turret zero stop. This feature could be used with switch caliber weapons, switch barrel weapons, different ammo loads, with or without silencers/sound suppressors, when moved to different weapon platforms or in any other circumstance when the shooter has different zeros.

For example, a shooter could have a switch cartridge/caliber/barrel rifle with a 26-inch 0.300 Norma barrel shooting a 230-grain bullet and an 18-inch 7.62×51 NATO barrel shooting a 175-grain bullet. These two barrels would have substantially different velocities and ballistics. If a shooter zeroed their optic with the 0.300 Norma at 100 m and then switched barrels to the 7.62 NATO round and shot the weapon again at 100 m the shooter would find their rounds would not impact in the same spot. For the sake of the example, the 7.62 NATO load was 1.3 mils low and 4 mils to the left when shooting at 100 meters after zeroing with the 300 Norma.

The shooter could choose to reset the zero of the scope, but that could compromise the 0.300 Norma zero and the process could prove tedious if the shooter must switch cartridges on a frequent basis.

The shooter could choose to maintain the 0.300 Norma zero and just dial for the distance, but the shooter would then have to be cognizant of the required adjustment for the zero. For example, if the shooter had to dial for a shot that required 5.2 mils of adjustment, their final turret reading would be 6.5 mils (5.2 mils would be for the new shot, and 1.3 would be the correction for the 100-yard zero). Additionally, when the shooter returned their scope to their zero setting after taking the shot, they would need to remember to stop at 1.3 mils, not at 0 mils.

Finally, the shooter could try to zero the cartridges at distances that correlated to their bullet drop, but this rarely corresponds to round, easy to remember, distances. The shooter may zero the 7.62 NATO at 100 m but the 0.300 Norma may be zeroed at 217 m. This is not convenient when the shooter is trying to shoot and make corrections quickly, and it does not account for any shift in the windage correction/horizontal direction when switching between the two zeros.

In one embodiment, the viewing optic having an integrated display system and a turret tracking system could use saved weapon profiles to solve these issues. For example, the shooter could set their mechanical zero for the 0.300 Norma. The optics weapon profile for the 0.300 would save/preserve that zero in its memory. The interior display could read zero, or display 0 elevation and/or 0 wind, or any other written or graphical indication as the turret status to include abbreviations, arrows, symbols, tic marks, or markings on an etched, passive, active or digital reticle. The display or optic may or may not include which weapon profile is selected.

The shooter could conduct a barrel change to the 7.62 NATO, and then select a saved weapon profile for the new barrel. Once the appropriate weapon profile is selected, the scope display would show that the user was currently 1.3 mils low and 0.4 mils to the left of the barrel's zero. The shooter could then dial the turrets to those settings and the display could show the optic was zeroed for that profile. The shooter could then take their shot that required 5.2 mils of adjustment. After dialing the turret for the bullet drop, the internals could display 5.2 mils above zero to the shooter. The physical turrets could show that there 6.5 mils dialed, but the shooter would not have to remember the 1.3 mil correction as it could be stored inside the optic's memory/program. Instead, the shooter could use the digital zero for that weapon profile as a reference points for all future shots regardless of the mechanical zero so long as there was enough travel in the scope dials to make the adjustment/correction.

In another embodiment the viewing optic having an integrated display system and a turret tracking system may account for variables resulting from being placed on, connected to, or integrated with an adjustable base, rail, mount or fixture. Any additional angle, cant, incline or other variable induced in any direction by the fixture may be input through a user interface or it may be accounted for automatically through a physical or wireless connection. The viewing optic having an integrated display system and a turret tracking system may store and/or project this information in the display using numerical values, words, acronyms, symbols, graphics or other methods. This information can be shown as a single sum that includes both optic dial adjustments and the angle or variable induced by the fixture. Alternatively, this information may be displayed separately with a total sum that may or may not be included.

An example of this would be when using the viewing optic having an integrated display system and a turret tracking system attached to an adjustable base for the firearm or weapon. A shooter could zero their optic with the firearm base imparting zero MOA. At such time, the internal display would show the shooter was at their zero. To gain additional elevation travel, the shooter may apply an additional 20 MOA through the adjustable firearm base. No adjustments would have been made within the viewing optic, but the reticle now has a 20 MOA incline. The shooter could input this information into the viewing optic. After the input, the viewing optic having an integrated display system and a turret tracking system could display that the shooter was at 20 MOA, rather than at the weapon's zero. If the shooter needed to then fire at a target using a 25 MOA correction, the shooter would dial 5 MOA into the scope for a total of 25 MOA. 5 MOA from the scope and 20 MOA from the firearm base.

In another embodiment, the viewing optic having an integrated display system and a turret tracking system may transmit the displayed information to another user such as, but not limited to spotters, trainers, hunting guides, or range officers. This could allow for other clear communication between two or more different parties. The information could be transmitted through a physical, wireless, network, radio, or other communication means. The information could be displayed in other optics, cell phones, tablets, computers, watches or any other devices.

In another embodiment, the viewing optic having an integrated display system and a turret tracking system can use an additional light sensor, or proximity sensor or other sensor to indicate when or if a turret lock was engaged. This information could be displayed within the optics display. This information could be displayed using numerical values, words, acronyms, symbols, graphics or other methods.

In another embodiment, the viewing optic having an integrated display system and a turret tracking system allows the shooter to see the dialed adjustment/s without having to break concentration from a sight picture by displaying the value/s within the display of an active reticle optic. Additionally, the shooter is not required to break their shooting position to manually feel a dial, knob, or other form of turret position or rotation indication.

In one embodiment, the disclosure relates to a viewing optic comprising: a main body with an optical system having a moveable optical element configured to generate an image of an outward scene, a turret configured to adjust of the moveable optical element, wherein the turret has (a) a material with varying degrees of optical absorption/reflectance coupled to a portion of the turret and (b) a photosensor configured to detect light reflected from the material, wherein the amount of light detected in indicative of turret position and a beam combiner and an active display in communication with the photosensor and configured to generate an image indicating turret position for simultaneous viewing of the generated image and image of the outward scene in a first focal plane of the optical system.

In one embodiment, the disclosure relates to a viewing optic comprising: (i) a main body with an optical system having a moveable optical element configured to generate an image of an outward scene, a turret configured to adjust of the moveable optical element, wherein the turret has (a) a material with varying degrees of optical absorption/reflectance coupled to a portion of the turret and (b) a photosensor configured to receive light reflected from the material, wherein the amount of light detected in indicative of turret position and a beam combiner and (ii) a base coupled to the main body and having an active display in communication with the photosensor and configured to generate an image indicating turret position and a reflective material for directing the generated image to the beam combiner for simultaneous viewing of the generated image and image of the outward scene in a first focal plane of the optical system.

XVIII. A Viewing Optic Capable of Generating and Displaying an Engagement Window Urban snipers may use "loop holes" (a small hole through a barrier) to keep themselves in cover while still being able to precisely engage a target. With some basic math, a shooter can adjust their optic to shoot through one of these holes at a given distance and place precision fire on a target at a further range.

In one embodiment, the disclosure relates to a viewing optic with an integrated display system that can display an engagement window using the loop hole size, and other loop hole characteristics including but not limited to the distance to the loop hole, a weapon's physical characteristics, ballistic data of the projectile and weapon system, and atmospherics measured by, or input into, the viewing optic. The viewing optic can provide multiple wind and elevation hold marks as well as boundary marks for internal dimensions of a measured loop hole.

In one embodiment, the disclosure relate to a viewing optic with an integrated display system that can be used to shoot through a loophole, which is considerably easier and safer than other systems. Shooters engaging a target can experience a height over bore effect. Height over bore is the difference in height between the barrel of a weapon and the center of the aiming device, be that iron sights, a magnified optic, a red dot, or another aiming mechanism. When shooting in tight confines, and under stress, the shooter may be able to see a target through their aiming mechanism, but their barrel or bore doesn't clear an obstruction.

For example, a shooter may try to engage a target over the hood of a car. The shooter, attempting to keep as low as possible may be able to see their target through their sights, but their muzzle may not clear the car. Because of the difference in height over bore, instead of bullets hitting the target when the shooter fires what they think is a clear shot through their sights, the bullet/s instead hit the car hood. This height over bore effect can be further magnified by a shooter attempting to take shots at a long distance due to the angles of the weapon system.

In one embodiment, a viewing optic with an integrated display system makes this process considerably easier for the shooter by displaying a digital box within their optic that represents the area the shooter can successfully engage the target through the loophole.

In one embodiment, the viewing optic with an integrated display system is configurable to a multitude of host weapons, with varying height over bores, accounts for vertical and horizontal constraints, and accounts for ballistic drop at a variety of distances.

In one embodiment, the disclosure relates to a viewing optic with an integrated display system that can generate an engagement window customizable via user's personal ballistic information, loop hole size, and distance to loop hole. In one embodiment, the active display can project the engagement window into a first focal plane and can provide boundary marks as well as multiple wind and elevation hold marks for targets through the loophole.

Figure 90:
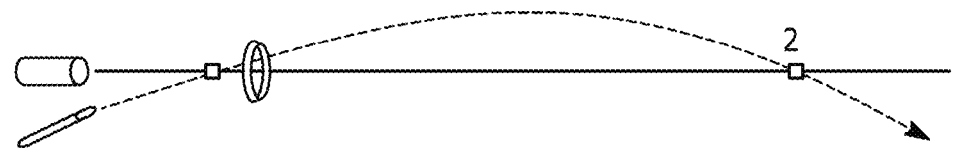
FIG. 90 is a schematic depiction of the principle of a near zero and a far zero.

Shooting through loop holes is a practice achieved by using the principle of a Near Zero and a Far Zero. FIG. 90 is a representative schematic of the Near Zero and a Far Zero concept.

In one embodiment, a viewing optic with an integrated display system can calculate near and far zeros, and account for height over bore, thereby allowing a shooter to more easily shoot through a loophole to engage a target at a much longer distance.

In one embodiment, the disclosure relates to a viewing optic with an integrated display system, wherein the active display projects a window, which is based on the calculations mentioned in the preceding paragraphs, through which a shooter can use near and far range zeros to engage a target. This window may be based off the measurement of the scope height over the bore, the distance to the loophole, the size and depth of the loophole, atmospherics, ballistic data of the projectile, angles, cant, projectile caliber/diameter, weapon/shooter accuracy and/or any other factors that may affect a shooter's target engagement. This box may be adjusted in tandem with elevation/vertical and/or windage/horizontal turret adjustments. The boundary marks may be any number of colors, line thicknesses, and may be dashed or solid. The optic may use accelerometers or other sensors to track the engagement window location while the scope is physically moved.

When the shooter is pointed at an area that would cause an impact rather than a successful engagement through the loophole, the viewing optic with an integrated display system will give the shooter a warning message. This message could be written or displayed in graphics. There may be an indicator on the reticle/s that shows the shooter they would be unsuccessful in shooting through the loophole.

In one embodiment, the shooter inputs the dimensions, orientation and the distance to the loophole into a program or menu within the viewing optic. The viewing optic via one or more processing units/microcontrollers could keep standard shapes that the shooter could use to describe the loophole. The viewing optic could also allow the shooter to enter length and angle measurements of the opening to better customize their loophole boundary display.

In another embodiment, the shooter could use a laser range finder to get the distance to the loophole. The viewing optic could also allow the shooter to "trace" the outline of the loophole within the scope. This could be drawing the loophole on the display using a keypad or another interfacing control device. The viewing optic could also allow the shooter to track the movement of the optic as the shooter "traces" the loophole outline with a reticle/s or tracing point.

In another embodiment, the viewing optic could use cameras that would be able to "see" the loophole. The shooter could have the cameras register the opening and display the shoot window within the optic. The cameras could track the shooters movement so that if the shooters height, distance or angle to the loophole changed the camera could automatically track the changes and display an updated shoot window within the optic.

In another embodiment, the viewing optic could create a custom bullet drop compensating (BDC) reticle that could be displayed in the optic. The BDC could display ranges that the shooter could successfully engage a target through the loophole as well as appropriate wind holds to a target.

In one embodiment, the viewing optic could allow for atmospherics to be gathered from sensors on/in the optic, sensors outside the optic to include sensors outside the loophole, or atmospherics could be entered into the optic by the shooter via a menu and keypad or another interfacing control device.

In another embodiment, if the shooter attempted to dial or hold for a shot that was outside of the loophole, the viewing optic could give the shooter directions as to how the shooter could successfully engage the target. The viewing optic could tell the shooter to move their shooting position left if there was not enough horizontal distance in the loophole to engage the target they wanted to shoot. These directions could be written, displayed in symbols, graphics, audible through communications gear, or they could be communicated through other methods. These directions could be displayed within the optic or transmitted to other communication devices.

In another embodiment, the viewing optic could be paired with a programmable bipod, tripod, chassis, support system, or device that could allow the weapon to swing, move or pivot the weapon system within the shooting loophole angles. The support device could use rails, pivoting or panning supports, articulating balls or other mechanisms that could both support and allow the movement of the weapon system. The support device could fully support the weapon or require additional support from the shooter. The device could feature programmable stops that could prevent the weapon from engaging targets outside the window. The rotation or travel stops may be input/set by the shooter or through communication with the optic. The support device could be linked physically to the optic or wirelessly. The support device could be manually controlled or controlled via motors or electronics.

XIX. Protective Shield for a Lens

Lenses on optical systems can easy become scratched, which reduces the users' image quality. Some lenses are also fragile enough to fracture, break or shatter when impacted. To prevent damage to lenses, users often use optic covers on their systems.

While optics covers help protect the lenses they can often be slow to deploy or remove. It is also common for covers to negatively affect image quality by reducing clarity, distorting colors, creating the feeling of a tube effect or by restricting or blocking light to the user.

In one embodiment, the disclosure relates to a protective window to protect exterior lenses. With the protective window, users will eliminate deployment time issue and image quality should be minimally affected, if affected at all, in comparison to a system with no covers.

In one embodiment, the disclosure relates to an integrated transparent shield to protect the exterior lenses of a viewing optic. This window may be made of glass, acrylic, polymer, ceramic, Nano grain structured elements, or other clear mediums. The window may have additional coatings applied to increase hardness, improve scratch resistance, increase water repellence, reduce color distortion or otherwise increase desirable characteristics and minimize undesirable affects.

In one embodiment, the transparent shield is part of a sealed and/or purged optical system. In one embodiment, the shield may be held in place by any suitable method including but not limited to being held by grooves sealed by O-Rings, adhesives, or other methods that could preserve an airtight seal for an optical system.

In another embodiment, the transparent shield may exist in front of a sealed optical system so that the window could be removed or replaced. Replacing the window could be for the purposes of replacement in case of damage, using different coatings for optimum light filtration, changing window tints or colors, insertion or removal of a polarized window or other reasons. This window could be held in place by snaps, detents, grooves, threads or another method that could allow for the extraction and replacement of the window while withstanding the burdens placed on the optic, such as recoil.

In one embodiment, the transparent shield can be any shape including a round shape. The shield can be sized and shaped to best fit the needs of the protected optical system.

In one embodiment, the shield can be used to protect forward or rear facing lenses.

Figure 98:
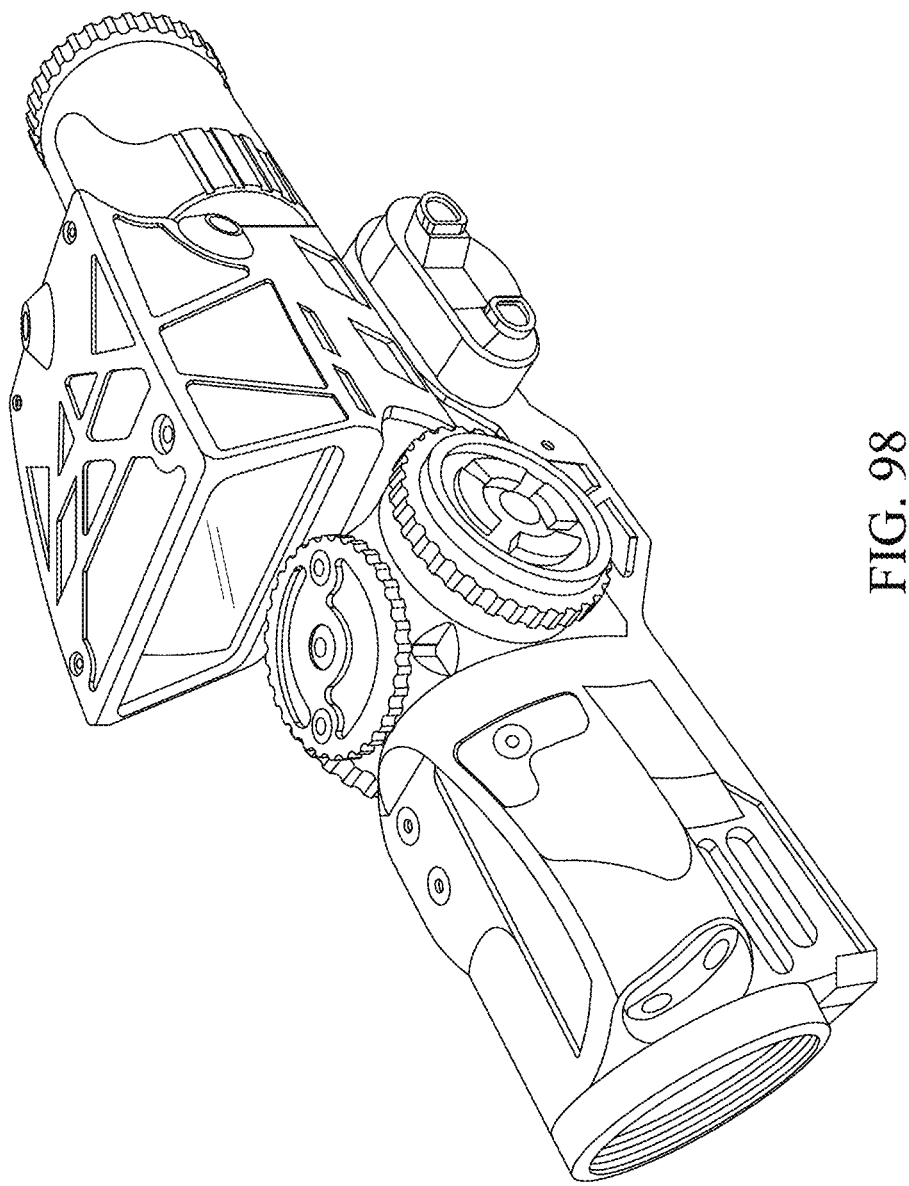
FIG. 98 is a representative photograph of a riflescope showing the perspective from the objective of the scope.

FIG. 98 is a representative photograph showing the objective perspective of a riflescope having a main body with an optical system having an objective lens system that focuses a target image from an outward scene to a first focal plane, an erector lens system that inverts the target image, and a beam combiner and a base having an active display.

Figure 99:
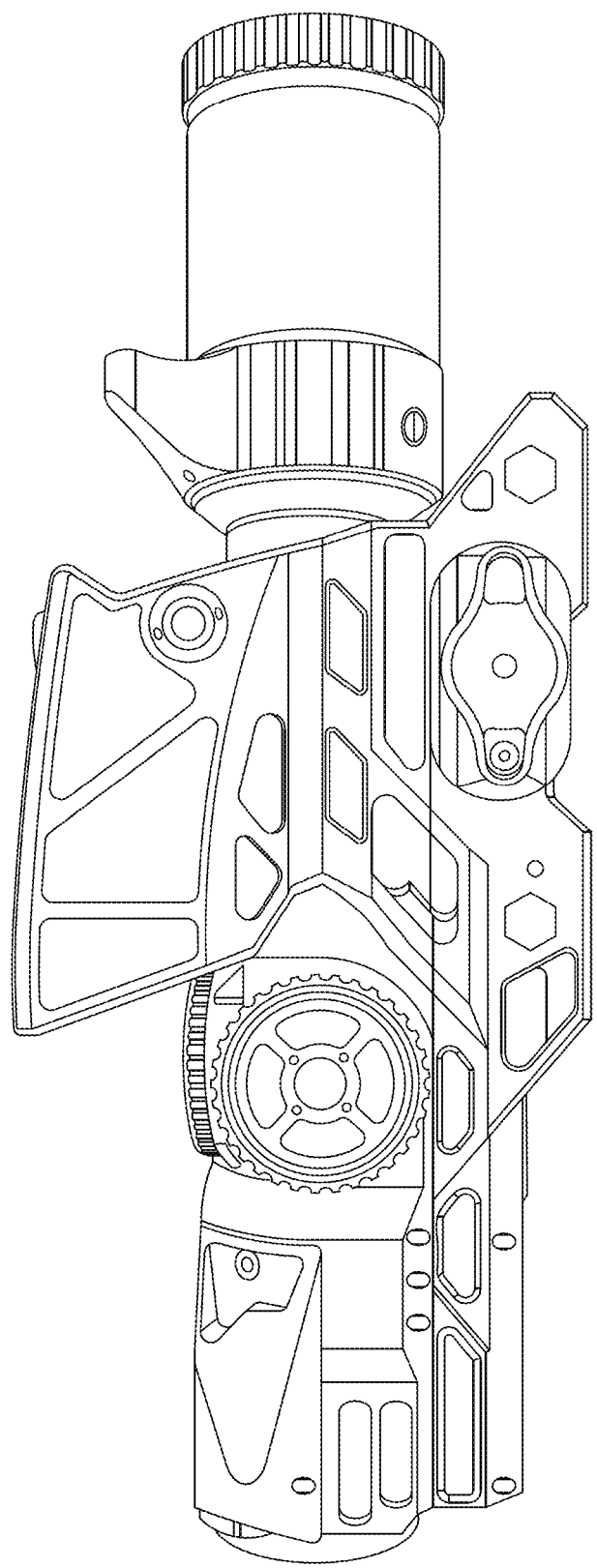
FIG. 99 is a representative photograph of a riflescope showing the left side perspective of the riflescope (right and left determined from the perspective of a user viewing through the ocular piece).

FIG. 99 is a representative photograph of a left side view of a riflescope having a main body with an optical system having an objective lens system that focuses a target image from an outward scene to a first focal plane, an erector lens system that inverts the target image, and a beam combiner and a base having an active display. The base has a compartment for one or more power sources. In one embodiment, the compartment for the one or more power sources is located closer to the ocular assembly as compared to the objective assembly. In one embodiment, the cover for the compartment for the one or more power sources is a detent body cap.

Figure 100:
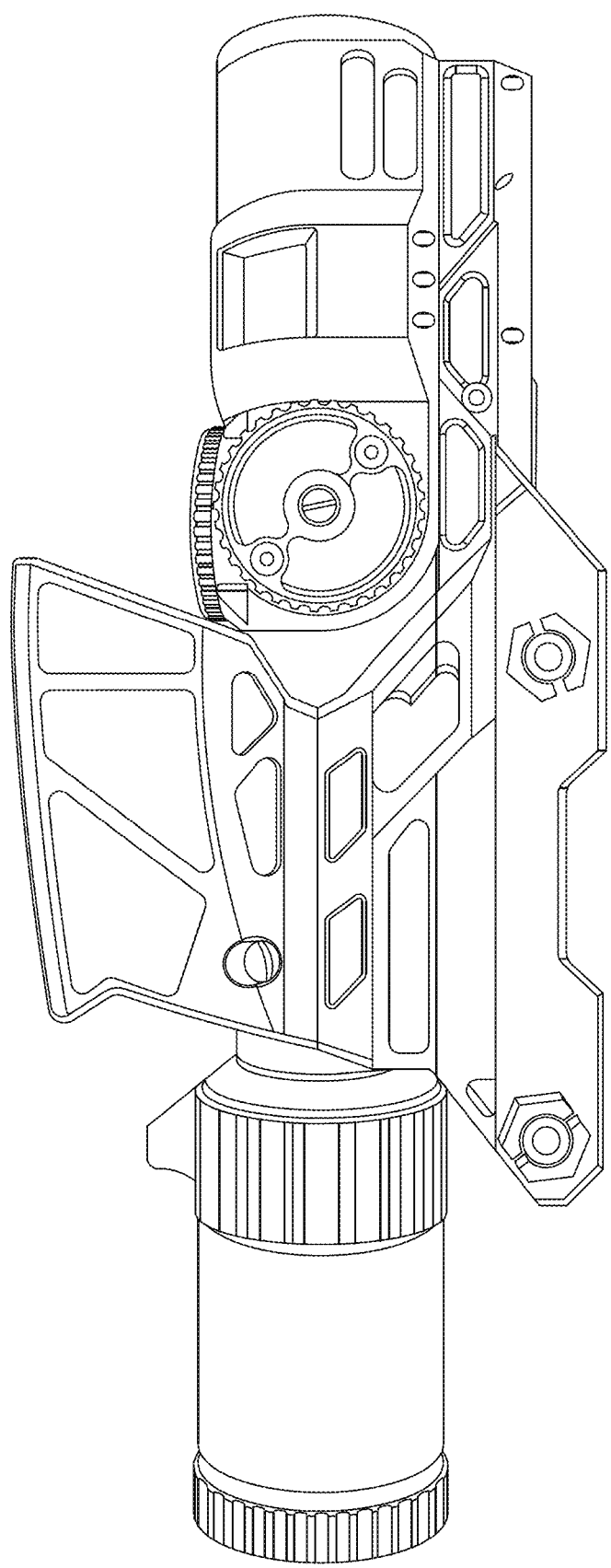
FIG. 100 is a representative photograph of a riflescope showing the right side perspective of the riflescope (right and left determined from the perspective of a user viewing through the ocular piece).

FIG. 100 is a representative depiction showing a right side view of a riflescope having a main body with an optical system having an objective lens system that focuses a target image from an outward scene to a first focal plane, an erector lens system that inverts the target image, and a beam combiner and a base having an active display.

Figure 101:
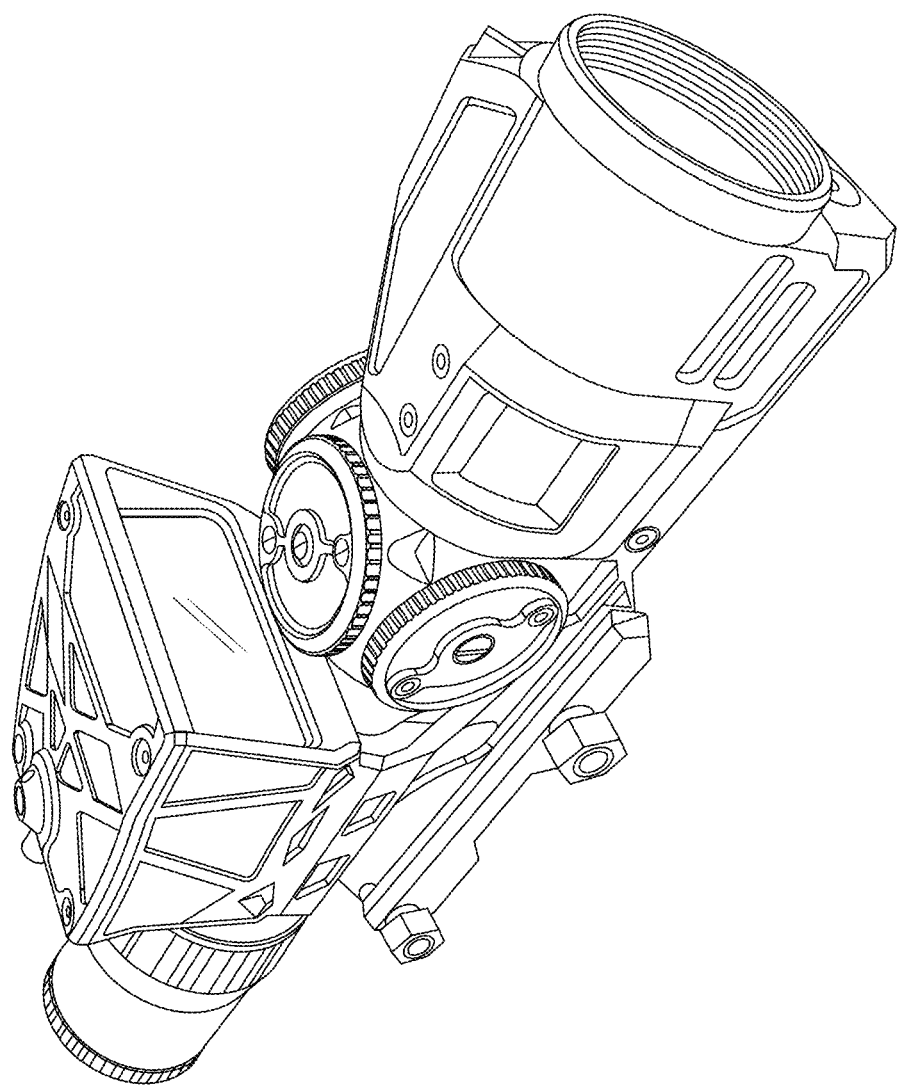
FIG. 101 is a representative photograph of a riflescope showing the perspective from the ocular system.

FIG. 101 is a representative depiction showing the ocular perspective of a riflescope having a main body with an optical system having an objective lens system that focuses a target image from an outward scene to a first focal plane, an erector lens system that inverts the target image, and a beam combiner and a base having an active display.

The apparatuses and methods disclosed herein can be further described in the following paragraphs:

1. A viewing optic comprising:
   a body having (i) a first optical system having an objective lens system that focuses a target image from an outward scene to a first focal plane, an erector lens system that inverts the target image, a second focal plane, and (ii) a beam combiner between the objective lens system and the first focal plane; and
   a second optical system with an active display and a lens system that collects the light from the active display, and (ii) a mirror that directs the image from the active display to the beam combiner where the image from the active display and the target image from the objective lens system are combined into the first focal plane and viewed simultaneously.

2. A viewing optic comprising: an optical system configured to define a first focal plane; an active display for generating a digital image, wherein the digital image is superimposed on the first focal plane; and a controller coupled to the active display, the controller configured to selectively power one or more display elements to generate the digital image.

3. A viewing optic comprising: (a) a main tube; (b) an objective system coupled to a first end of the main tube; (c) an ocular system coupled to the second end of the main tube, the main tube, objective system and ocular system being configured to define at least a first focal plane; and (d) a beam combiner positioned between the objective assembly and the first focal plane.

4. A viewing optic comprising: (a) a main tube; (b) an objective system coupled to a first end of the main tube that focuses a target image from an outward scene; (c) an ocular system coupled to the second end of the main tube, the main tube, objective system and ocular system being configured to define at least a first focal plane; (d) a beam combiner positioned between the objective assembly and the first focal plane; and (e) an active display for generating an image and directing the image to the beam combiner, wherein the generated image and the target image are combined into the first focal plane.

5. A viewing optic comprising (i) a main body with an optical system for generating images of an outward scene and a beam combiner and (ii) a base coupled to the body and having an active display for generating images and a mirror for directing the generated images to the beam combiner for simultaneous overlaid viewing of the generated images and images of the outward scene in a first focal plane of the main body.

6. A viewing optic comprising:
   (i) a main tube having (a) an objective system coupled to a first end of the main tube that focuses a target image from an outward scene; (b) an ocular system coupled to the second end of the main tube, the main tube, objective system and ocular system being configured to define at least a first focal plane; and (c) a beam combiner positioned between the objective assembly and the first focal plane; and
   (ii) a base having an active display for generating an image and directing the image to the beam combiner, wherein the generated image and the target image are combined into the first focal plane.

7. A viewing optic comprising: an optical system having a beam combiner between a first focal plane and an objective lens system, a focus cell positioned between the beam combiner and the objective lens system, and an active display for generating a digital image, wherein the digital image is superimposed on the first focal plane; and a controller coupled to the active display, the controller configured to selectively power one or more display elements to generate the digital image.

8. A viewing optic comprising: (a) a main tube; (b) an objective system coupled to a first end of the main tube; (c) an ocular system coupled to the second end of the main tube, (c) a beam combiner positioned between the objective assembly and the first focal plane; and (d) a focus cell positioned between the beam combiner and the objective assembly.

9. A viewing optic comprising (i) a main body with an optical system for generating images of an outward scene and a beam combiner and (ii) a base coupled to the main body and having an active display for generating images and a mirror for directing the generated images to the beam combiner for simultaneous overlaid viewing of the generated images and images of the outward scene in a first focal plane of the main body, and wherein the base has a compartment for one or more power sources.

10. A viewing optic comprising:
    a body having (i) a first optical system having an objective lens system that focuses a target image from an outward scene to a first focal plane, an erector lens system that inverts the target image, a second focal plane, and (ii) a beam combiner that is placed between the objective lens system and the first focal plane; and
    a base with (i) a second optical system with (a) an active display and a lens system that collects the light from the active display, (b) a mirror that directs the image from the active display to the beam combiner where the image from the active display and the target image from the objective lens system are combined into the first focal plane and viewed simultaneously; and (ii) a compartment for one or more power sources.

11. A viewing optic comprising: an optical system configured to define a first focal plane; an active display for generating a digital image and a lens system for collecting the light from the active display, wherein the digital image is superimposed on the first focal plane; and a controller coupled to the active display, the controller configured to selectively power one or more display elements to generate the digital image, and further wherein the lens system is composed of an inner cell having two lenses and an outer cell having three lenses, wherein the outer cell is fixed in relation to the inner cell.

12. A viewing optic comprising: (a) a main tube having an objective system coupled to a first end of the main tube and an ocular system coupled to the second end of the main tube and a beam combiner located between the objective assembly and a first focal plane of an optics system; (b) an integrated display system for generating a digital image; and (c) a computing device for processing ballistics relevant data and causing said integrated display system to adapt an aiming reticle within the digital image.

13. A viewing optic comprising: (i) a main body with an optical system for generating an image of an outward scene along a viewing optical axis and a beam combiner and (ii) a base coupled to a bottom portion of the main body having an active display for generating an image and a reflective material for directing the generated image to the beam combiner for simultaneous overlaid viewing of the generated image and image of the outward scene in a first focal plane of the optical system, a sensor for detecting the presence of a user and a processor in communication with the sensor and capable of controlling power state of the viewing optic.

14. A viewing optic comprising:
a main body having (i) an optical system having an objective lens system that focuses a target image from an outward scene to a first focal plane, and (ii) a beam combiner that is placed between the objective lens system and the first focal plane; and
a base coupled to a bottom portion of the main body having (i) an active display that generates an image and a lens system that collects the light from the active display, (ii) a reflective material that directs the generated image to the beam combiner where the generated image and the target image from the objective lens system are combined into the first focal plane for simultaneous overlaid viewing of the generated image and image of the outward scene, (iii) a sensor for detecting the presence of a user and (iv) a processor in communication with the sensor and capable of controlling power state of the viewing optic.

15. A viewing optic comprising:
a main body having an objective system coupled to a first end of a main tube that focuses a target image from an outward scene and an ocular system coupled to the second end of the main tube, the main tube, objective system and ocular system being configured to define at least a first focal plane and a beam combiner positioned between the objective assembly and the first focal plane; and
a base having an active display for generating an image and directing the image to the beam combiner, wherein the generated image and the target image are combined into the first focal plane, the base further having a compartment for one or more power sources.

16. A viewing optic comprising: a body having an objective lens system at one end that focuses a target image from an outward scene, an ocular lens system at the other end and a movable erector tube with an erector lens system located between the objective and ocular systems, the movable erector lens system, the objective lens system and the ocular lens system forming a first optical system having a first focal plane and a second focal plane, with a first reticle at the first focal plane that moves in conjunction with the movable erector tube and a beam combiner located between the first focal plane and the objective assembly; and
a second optical system with an active display for generating an image and a lens system that collects light from the active display, and a reflective material that directs the generated image from the active display to the beam combiner where the image from the active display and the target image from the objective lens system are combined into the first focal plane and viewed simultaneously, and the generated image from the active display does not move in conjunction with the movable erector tube.

17. A viewing optic comprising a main body having an optical train and a first beam combiner and a base having a first active display and a second beam combiner located in front of the first active display and a second active display that is perpendicular to the first active display.

18. A viewing optic comprising a main body having an optical train and a beam combiner and a base with an integrated display system having an active display, wherein the active display can project ammunition status into the first focal plane of the optical train of the main body.

19. A viewing optic comprising: a body having an objective lens system at one end that focuses a target image from an outward scene, an ocular lens system at the other end and a movable erector tube with an erector lens system located between the objective and ocular systems, the movable erector lens system, the objective lens system and the ocular lens system forming a first optical system having a first focal plane and a second focal plane, with a first reticle at the first focal plane that moves in conjunction with the movable erector tube and a beam combiner located between the first focal plane and the objective assembly; and
a second optical system with an active display for generating an image and a lens system that collects light from the active display, and a reflective material that directs the generated image from the active display to the beam combiner where the image from the active display and the target image from the objective lens system are combined into the first focal plane and viewed simultaneously, and the generated image from the active display does not move in conjunction with the movable erector tube.

20. A viewing optic comprising a main body having an optical train and a first beam combiner and a base having a first active display and a second beam combiner located in front of the first active display and a second active display that is perpendicular to the first active display.

21. A viewing optic comprising a main body having an optical train and a beam combiner and a base with an integrated display system having an active display, wherein the active display can project ammunition status into the first focal plane of the optical train of the main body.

22. A viewing optic system comprising a main body having an optical train and a beam combiner and a base with an integrated display system, an IR laser mounted to a portion of the viewing optic and an IR camera mounted to augmented reality goggles.

23. Methods and systems for monitoring and tracking dryfire session as substantially shown and described herein 24. Methods and systems for simulating a real world condition using a viewing optic with an integrated display system as substantially shown and described herein.

25. A viewing optic comprising:
a body having an objective lens system at one end that focuses a target image from an outward scene,
an ocular lens system at the other end of the body and a movable erector tube with an erector lens system located between the objective and ocular systems, the erector lens system, the objective lens system and the ocular lens system forming a first optical system having a first focal plane and a second focal plane, with a first reticle at the first focal plane that moves in conjunction with the movable erector tube;
a beam combiner located between the first focal plane and the objective assembly, wherein a photo sensor is coupled to the beam combiner; and
a second optical system with a first active display for generating an image, a second active display for generating an image and a lens system that collects light from the first active display and/or the second active display, and a reflective material that directs the generated image from the first and/or second active display to the beam combiner where the image from the active display and the target image from the objective lens system are combined into the first focal plane and viewed simultaneously.

26. A viewing optic comprising: (a) a main tube; (b) an objective system coupled to a first end of the main tube that focuses a target image from an outward scene; (c) an ocular system coupled to the second end of the main tube, the main tube, objective system and ocular system being configured to define at least a first focal plane, with a first reticle at the first focal plane that moves in relation to a turret adjustment; (d) a first beam combiner positioned between the objective assembly and the first focal plane, wherein a photo sensor and light filter are coupled to the beam combiner; and (e) a first active display and a second active display for generating an image and directing the image to the first beam combiner, wherein the generated image and the target image are combined into the first focal plane.

27. A viewing optic comprising: (i) a main body with an optical system for generating images along a viewing optical axis of an outward scene and a first beam combiner, wherein a photo sensor is coupled to the beam combiner and (ii) a base coupled to the main body and having a first active display for generating images in front of a second beam combiner, a second active display perpendicular to the first active display, wherein the images from the first active display and the second active display are combined in the second beam combiner, and directed toward a reflective material for directing the generated images to the first beam combiner for simultaneous overlaid viewing of the generated images and images of the outward scene in a first focal plane of the optical system.

28. A viewing optic comprising:
a main body having (i) a first optical system having an objective lens system that focuses a target image from an outward scene to a first focal plane, an erector lens system that inverts the target image, a second focal plane, and (ii) a first beam combiner that is placed between the objective lens system and the first focal plane; and
a base that couples to the main body having a second optical system with (i) an active display that generates an image and a lens system that collects the light from the active display and a second active display perpendicular to the first active display; (ii) a second beam combiner that combines the images from the first active display and the second active display; (iii) a mirror that directs the combined images from the active displays to the first beam combiner where the image from the active displays and the target image from the objective lens system are combined into the first focal plane and viewed simultaneously; and further wherein the base comprises a proximity sensor.

29. An viewing optic comprising a main body with an optical system for viewing an outward scene and a base that couples to a bottom portion of the main body, the base having a cavity with at least two active displays for generating images, wherein the generated images are combined into an image of the outward scene in a first focal plane of the optical system, the base further comprising a proximity sensor located at the back of the base.

30. A viewing optic comprising: an optical system having a beam combiner between a first focal plane and an objective lens system, a turret tracking mechanism having material with varying degrees of optical reflectance/absorption, an active display for generating an image, wherein the image is superimposed on the first focal plane; and a controller coupled to the active display, the controller configured to selectively power one or more display elements to generate the image.

31. A viewing optic comprising:
a main body having (i) an optical system having an objective lens system that focuses a target image from an outward scene to a first focal plane, an erector lens system that inverts the target image, a second focal plane, and (ii) a turret tracking mechanism with material having varying degrees of optical reflectance/absorption; and
a base that couples to a bottom portion of the main body having a cavity with a circuit board with a photosensor and an LED.

32. The viewing optic of any of the preceding paragraphs further comprising a base.

33. The viewing optic of any of the preceding paragraphs further comprising an integrated display system.

34. The viewing optic of any of the preceding paragraphs further comprising a base with an integrated display system.

35. The viewing optic of any of the preceding or following paragraphs wherein the base couples to the main body of the viewing optic.

36. The viewing optic of any of the preceding or following paragraphs wherein the base couples to the bottom side of the main body of the viewing optic.

37. The viewing optic of any of the preceding or following paragraphs wherein the integrated display system is contained in a housing.

38. The viewing optic of any of the preceding or following paragraphs wherein the housing couples to the top of the main body of the viewing optic.

39 The viewing optic of any of the preceding paragraphs, wherein the integrated display system has an active display.

40. The viewing optic of any of the preceding paragraphs, wherein the integrated display system has an active display and a reflective material.

41. The viewing optic of any of the preceding paragraphs wherein the integrated display system has an active display, a reflective material, and a collection optics system.

42. The viewing optic of any of the preceding paragraphs, wherein the reflective material is located beneath the beam combiner.

43. The viewing optic of any of the preceding paragraphs, wherein the reflective material is located above the beam combiner.

44. The viewing optic of any of the preceding paragraphs, wherein the reflective material is parallel to the beam combiner.

45. The viewing optic of any of the preceding paragraphs, wherein the active display and the reflective material are parallel to the beam combiner.

46. The viewing optic of any of the preceding paragraphs, wherein the reflective material is located on the objective side of the viewing optic.

47. The viewing optic of any of the preceding paragraphs, wherein the reflective material is located on the ocular side of the viewing optic.

48. The viewing optic of any of the preceding paragraphs, wherein active display is located on the objective side of the viewing optic.

49. The viewing optic of any of the preceding paragraphs, wherein active display is located on the ocular side of the viewing optic.

50. The viewing optic of any of the preceding paragraphs, wherein the second optical system is in a base coupled to the body of the viewing optic.

51. The viewing optic of any of the preceding paragraphs, wherein the beam combiner is located between an objective assembly of the main body and a first focal plane positioned and spaced along the viewing optical axis.

52. The viewing optic of any of the preceding paragraphs, wherein the beam combiner is located approximately beneath an elevation knob of the viewing optic.

53. The viewing optic of any of the preceding paragraphs, wherein the beam combiner is located closer to an objective assembly as compared to an ocular assembly of the viewing optic.

54. The viewing optic of any of the preceding paragraphs, wherein the integrated display system comprises an angled mirror.

55. The viewing optic of any of the preceding paragraphs wherein the mirror is angled from about 40° to about 50°.

56. The viewing optic of any of the preceding paragraphs wherein the mirror is angled at about 45°.

57. The viewing optic of any of the preceding paragraphs, wherein the integrated display system comprises collector optics having an inner lens cell and an outer lens cell.

58. The viewing optic of any of the preceding paragraphs, wherein one end of the base attaches near a magnification adjustment ring of the main body and the other end of the base attaches near the objective assembly of the main body.

59. The viewing optic of any of the preceding paragraphs, wherein the base is from 40% to 65% percent the length of the main body.

60. The viewing optic of any of the preceding paragraphs further comprising a focus cell.

61. The viewing optic of any of the preceding paragraphs further comprising a focus cell adjusted toward the objective side as compared to the location of a traditional focus cell.

62. The viewing optic of any of the preceding paragraphs further comprising a beam combiner.

63. The viewing optic of any of the preceding paragraphs further comprising a beam combiner positioned where a traditional focus cell is located.

64. The viewing optic of any of the preceding paragraphs further comprising a parallax adjustment assembly.

65. The viewing optic of any of the preceding paragraphs further comprising a connecting rod in the main body of the viewing optic.

66. The viewing optic of any of the preceding paragraphs wherein the connecting element is a rod or a shaft 67. The viewing optic of any of the preceding paragraphs wherein the connecting element is from about 5 mm to 50 mm in length.

68. The viewing optic of any of the preceding paragraphs wherein the connecting element is about 30 mm in length.

69. The viewing optic of any of the preceding paragraphs wherein the parallax adjustment assembly comprises a rotatable element.

70. The viewing optic of any of the preceding paragraphs wherein the parallax adjustment assembly comprises a knob.

71. The viewing optic of any of the preceding paragraphs wherein the connecting element couples the focus cell to the parallax adjustment assembly.

72. The viewing optic of any of the preceding paragraphs wherein one end of the connecting element is coupled to the focusing cell and the other end of the connecting element is coupled to a cam pin of the parallax adjustment assembly.

73. The viewing optic of any of the preceding paragraphs wherein the parallax adjustment assembly has a cam groove and a cam pin.

74. The viewing optic of any of the paragraphs enumerated herein comprising a lens system for collecting light from an active display.

75. The viewing optic of any of the paragraphs enumerated herein wherein the lens system is composed of one or more lens cells.

76. The viewing optic of any of the paragraphs enumerated herein wherein the lens system is composed of an inner lens cell and an outer lens cell.

77. The viewing optic of any of the paragraphs enumerated herein wherein the lens system is composed of a 5 lens system.

78. The viewing optic of any of the paragraphs enumerated herein wherein the lens system is composed of an inner lens cell having two lenses and an outer lens cell having three lenses.

79. The viewing optic of any of the paragraphs enumerated herein wherein the lens system is a five lens system with the first lens located within 2 mm of the active display.

80. The viewing optic of any of the paragraphs enumerated herein wherein the lens system is composed of a five lens system and the first lens is an aspheric lens.

81. The viewing optic of any of the paragraphs enumerated herein wherein the lens system is composed of an inner lens cell having at least one lens and an outer lens cell having at least one lens, and further comprising a mechanism to adjust the space between the at least one lens of the inner cell and the at least one lens of the outer cell.

82. The viewing optic of any of the paragraphs enumerated herein further wherein one or more springs are located between the outer lens cell and the inner lens cell.

83. The viewing optic of any of the paragraphs enumerated herein wherein the lens system is composed of a single lens cell.

84. The viewing optic of any of the paragraphs enumerated herein wherein the adjustment mechanism is a screw.

85 The viewing optic of any of the paragraphs enumerated herein wherein the adjustment mechanism is a wedge.

86. The viewing optic of any of the paragraphs enumerated herein wherein a screw can be tightened against a surface of the inner lens cell to align the vertical axis of the active display.

87. The viewing optic of any of the paragraphs enumerated herein wherein a screw can be tightened against a surface of the inner lens cell to adjust the active display active display.

88. The viewing optic of any of the paragraphs enumerated herein wherein the power source is one or more batteries.

89. The viewing optic of any of the paragraphs enumerated herein wherein the power source is one or more CR123 batteries.

90. The viewing optic of any of the paragraphs enumerated herein further comprising one or more of a global positioning system (GPS) receiver, a digital compass and a laser rangefinder for providing location data to said computing device, said computing device responsively using some or all of said received data to calculate a ballistic solution.

91. The viewing optic of any of the paragraphs enumerated herein, wherein said computing device receives one or more of inertial data, location data, environmental sensor data and image data, said computing device responsively using some or all of said received data to calculate a ballistic solution.

92. The viewing optic of any of the paragraphs enumerated herein wherein said viewing optic is adapted to communicate with a network as a network element (NE), said computing device propagating toward said network some or all of said received data.

93. The viewing optic of any of the paragraphs enumerated herein, wherein in response to first user interaction, said computing device enters a ranging mode in which target related information associated with a presently viewed aiming reticle is retrieved and stored in a memory.

94. The viewing optic of any of the paragraphs enumerated herein, wherein in response to a second user interaction, said computing device enters a reacquisition mode in which previously stored target related information is retrieved from memory and used to adapt reticle imagery to reacquire a target.

95. The viewing optic of any of the paragraphs enumerated herein, further comprising a rangefinder for determining a distance to target and communicating the determined distance to said computing device, said computing device responsively adapting said aiming reticle in response to said determined distance.

96. The viewing optic of any of the paragraphs enumerated herein, wherein said rangefinder comprises one of a laser rangefinder and a parallax rangefinder.

97. The viewing optic of any of the paragraphs enumerated herein, wherein said laser rangefinder comprises a near infrared (NIR) rangefinder.

98. The viewing optic of any of the paragraphs enumerated herein, further comprising an imaging sensor adapted to detect image frames associated with a bullet flight path and communicate said image frames to said computing device, said computing device operable to calculate bullet trajectory therefrom.

99. The viewing optic of any of the paragraphs enumerated herein, wherein said imaging sensor is adapted to detect emissions within a spectral region associated with a tracer round.

100. The viewing optic of any of the paragraphs enumerated herein, further comprising windage and elevation knobs adapted to communicate respective user input to said computing device, said computing device responsively adapting said aiming reticle in response to said user input.

101. The viewing optic of any of the paragraphs enumerated herein, wherein in response to user interaction indicative of a specific, said computing device enters an indirect fire targeting mode in which target related information is retrieved from memory and used to adapt aiming reticle imagery to reacquire a target.

102. The viewing optic of any of the paragraphs enumerated herein, wherein in response to user interaction indicative of a secondary ammunition mode, said computing device responsively adapting said aiming reticle in response to ballistic characteristics associated with the secondary ammunition.

103. The viewing optic of any of the paragraphs enumerated herein, wherein said environmental data comprises one or more of barometric pressure data, humidity data and temperature data, said computing device responsively using some or all of said environmental data to calculate the ballistic solution.

104. The viewing optic of any of the paragraphs enumerated herein, wherein in the case of an aiming reticle outside an optical scope field of view, said computing device utilizes inertial reference information to generate for display a simulated aim point reference.

105. The viewing optic of any of the preceding paragraphs, wherein the electronic controller is configured to adjust the actual size of the set of marks in concert with changes in the optical magnification of the sighting device.

106. The viewing optic of any of the preceding paragraphs, wherein the set of marks is a reticle.

107. The viewing optic of any of the preceding paragraphs, wherein the set of marks includes numbers or letters.

108. The viewing optic of any of the preceding paragraphs, wherein the integrated display system is not located in the main body of the viewing optic.

109. The viewing optic of any of the preceding paragraphs, wherein the active display is not disposed proximate the front focal plane of the sighting device.

110. The viewing optic of any of the preceding paragraphs, wherein: the first set of marks includes an aiming dot at an optical center of the first reticle and a circle, or an arc, or a horseshoe shape centered on an optical center; and the second set of marks includes multiple holdover aiming marks spaced apart below the optical center and multiple windage aiming marks spaced apart to the left and right of the holdover aiming marks.

111. The viewing optic of any of the preceding paragraphs, wherein the first reticle pattern is a close quarter battle reticle.

112. The viewing optic of any of the preceding paragraphs, wherein the second reticle pattern is a long distance reticle.

113. The viewing optic of any of the preceding paragraphs, wherein the set of multiple marks includes a plurality of marks and spaces there between, the marks and spaces subtending angles in an object space viewable through an eyepiece of the viewing optic; and the electronic controller is operable to adjust the actual size of the marks and spaces at the first focal plane such that all of the angles subtended in the object space by the marks and the spaces remain unchanged throughout a range of adjustments in the optical magnification.

114. The viewing optic of any of the preceding paragraphs, wherein the sensor is a material with multiple degrees of optical absorption/reflectance coupled to a cam sleeve of the viewing optic.

115. The viewing optic of any of the preceding paragraphs, wherein a bottom portion of the main body has a longitudinal split.

116. The viewing optic of any of the preceding paragraphs, wherein a bottom portion of the main body has a longitudinal split for communicating with one or components of the base.

117. The viewing optic of any of the preceding paragraphs, wherein a bottom portion of the main body has a longitudinal split for communicating with a component of the integrated display system.

118. The viewing optic of any of the previous paragraphs, wherein the proximity sensor is in the base beneath an ocular assembly of the main body.

119. A viewing optic of any of previous paragraphs, wherein the reticle pattern adjusts based on the magnification setting.

120. A round counter system used with a viewing optic of any of the preceding paragraphs.

121. A system comprising
(a) a firearm having magnetic sensors on the receiver;
(b) a round counter system coupled to the firearm and having a magazine follower having one or more magnets inserted into a magazine; wherein the magnetic sensors detect the magnetic field as the magazine follower moves through the magazine; and further wherein the height of the magazine correlates with a number of rounds in the magazine; and
(c) viewing optic having an optical system configured to focus a target image from an outward scene to a first focal plane; wherein the active display projects the number of rounds in the magazine into the first focal plane of the viewing optic.

122. A system comprising: a viewing optic having an optical system configured to focus a target image from an outward scene to a first focal plane and an active display configured to generate a digital image, and a round counter configured to track ammunition status and to communicate ammunition status to the active display; wherein the ammunition status is projected into the first focal plane of the viewing optic.

123. A system comprising: a viewing optic having: (a) a main tube; (b) an objective system coupled to a first end of the main tube that focuses a target image from an outward scene; (c) an ocular system coupled to the second end of the main tube, the main tube, objective system and ocular system being configured to define at least a first focal plane; and (d) an active display configured to generate a digital image; and a round counter system comprising a magazine follower having one or more magnets inserted into a magazine and multiple magnetic sensors placed on a magwell, wherein an activated magnetic sensor corresponds to the position of magazine follower, and a processor configured to correlate the position of the magazine follower with ammunition status and to communicate with the active display, wherein the ammunition status is projected into the first focal plane of the viewing optic.

124. A system comprising:
(a) a round counter system having a magazine follower with one or more magnets, wherein as the magazine follower moves through the magazine, the magnet is positioned in front of one or more Hall-effect sensors on a circuit board;
(b) a processing unit configured to correlate the height of the magazine follower with the number of rounds remaining in the magazine; and
(c) a viewing optic having an optical system configured to focus a target image from an outward scene to a first focal plane; wherein the active display projects the number of rounds in the magazine into the first focal plane of the viewing optic.

125. A system comprising a round counter system having a magazine follower having one or more magnets inserted into a magazine; wherein the magazine has one or more ferrous wires configured to detect the magnetic field as the magazine follower moves through the magazine and one or more nodes configured to communicate with one or more magnetic sensors; and further wherein the height of the magazine follower correlates with a number of rounds in the magazine; and a viewing optic having an optical system configured to focus a target image from an outward scene to a first focal plane; wherein the active display projects the number of rounds in the magazine into the first focal plane of the viewing optic.

126. A system comprising:
(a) a round counter system having a magazine follower with one or more magnets, and a magazine with one or more ferrous wires configured to detect a magnetic field;
(b) a processing unit configured to correlate height of the magazine follower based on activation of the ferrous wires with the number of rounds in the magazine; and
(c) a viewing optic having an optical system configured to focus a target image from an outward scene to a first focal plane; wherein the active display projects the number of rounds in the magazine into the first focal plane of the viewing optic.

127. A round counter comprising a magazine follower with one or more magnets and a magazine.

128. The round counter of any of the preceding paragraphs comprising one or more magnetic sensors.

129. The round counter of any of the preceding paragraphs, wherein the magnetic sensors are located in a magazine well.

130. The round counter of any of the preceding paragraphs, wherein the magnetic sensors are located on a receiver.

131. The round counter of any of the preceding paragraphs, wherein the magnetic sensors are located in a remote control.

132. The round counter of any of the preceding paragraphs, wherein the magnetic sensors are located in a remote control configured to communicate with a viewing optic having one or more active displays.

133. The round counter of any of the preceding paragraphs, wherein the magazine has one or more nodes.

134. The round counter of any of the preceding paragraphs, wherein the magazine has one or more nodes configured to communicate with a magnetic sensor.

135. The round counter of any of the preceding paragraphs, wherein the magnetic sensors are Hall-effect sensors.

136. A method comprising.
(a) moving a magazine follower with one or more magnets through a magazine;
(b) activating a magnetic sensor when the magazine follower is in proximity to the magnetic sensor;
(c) determining ammunition status based on the position of the magazine follower as indicated by the activated magnetic sensor;
(d) communicating the ammunition status to an active display in a viewing optic;
(e) generating a digital image of the ammunition status using the active display; and
(f) projecting the digital image into the first focal plane of the viewing optic.

While multiple embodiments of a viewing optic with an integrated display system have been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A system comprising: a viewing optic having a body with a first end and a second end; an objective system located at the first end of the body; an ocular system located at the second end of the body; an erector lens system located between the objective system and the ocular system; a first focal plane located between the objective system and the erector lens system, a beam combiner located between the objective system and the first focal plane; and an active display configured to generate a digital image, and a round counter configured to track ammunition status and to communicate ammunition status to the active display; wherein the ammunition status is projected into the first focal plane of the viewing optic.

2. The system of claim 1, wherein the round counter comprises a magazine follower with one or more magnets.

3. The system of claim 2, wherein the round counter is coupled to a firearm.

4. The system of claim 3, wherein the firearm comprises one or more magnetic sensors.

5. The system of claim 4, wherein the one or more magnetic sensors are Hall-effect sensors configured to detect the magnetic field from the one or more magnets in the magazine follower.

6. The system of claim 5, wherein the one or more Hall-effect sensors are in a magazine well.

7. The system of claim 5, wherein the one or more Hall-effect sensors are on a receiver of the firearm.

8. The system of claim 5, further comprising a processor to correlate position of the magnetic field with ammunition status.

9. The system of claim 5, wherein the ammunition status is the number of rounds in a magazine.

10. A system comprising: a viewing optic having: (a) a main tube; (b) an objective system coupled to a first end of the main tube that focuses a target image from an outward scene; (c) an ocular system coupled to the second end of the main tube; (d) an erector lens system located between the objective system and the ocular system; (e) a first focal plane located between the objective system and the erector lens system, (f) a beam combiner located between the objective system and the first focal plane; and (g) an active display configured to generate a digital image; and a round counter system comprising a magazine follower having one or more magnets inserted into a magazine and multiple magnetic sensors placed on a magwell, wherein an activated magnetic sensor corresponds to the position of the magazine follower, and the position of the magazine follower correlates with ammunition status, wherein the ammunition status is projected into the first focal plane of the viewing optic.

11. The system of claim 10, wherein the magnetic sensors are Hall-effect sensors.

12. The system of claim 10, wherein the magnetic sensors on the magwell are located in a remote control configured to communicate with the viewing optic.

13. The system of claim 10, wherein the ammunition status indicates status of the rounds in the magazine or indicates a round in the chamber or indicates a round in the magazine but an empty chamber.

14. The system of claim 10, wherein the ammunition status is the number of rounds remaining in a magazine.

15. A method comprising:
(a) moving a magazine follower with one or more magnets through a magazine;
(b) activating a magnetic sensor when the magazine follower is in proximity to said magnetic sensor;
(c) determining ammunition status based on position of the magazine follower as indicated by an activated magnetic sensor;
(d) communicating the ammunition status to an active display in a viewing optic;
(e) generating a digital image of the ammunition status using the active display; and
(f) directing the digital image to a beam combiner located between an objective system and a first focal plane of the viewing optic; wherein the first focal plane is located between the objective system and an erector lens system of the viewing optic; and
(g) focusing the digital image on the first focal plane of the viewing optic.

16. The method of claim 15, wherein the magnetic sensor is located in a magazine well.

17. The method of claim 15, wherein the magnetic sensor is located on a remote control configured to communicate with the viewing optic.

18. The method of claim 15, wherein the magnetic sensor is a Hall-effect sensor.

19. The system of claim 15, wherein the ammunition status indicates status of the rounds in the magazine or indicates there is a round in the chamber or indicates there is a round in the magazine and an empty chamber.

20. The method of claim 15, wherein the ammunition status is the number of rounds in a magazine.

* * * * *